US012388925B2

(12) United States Patent
Shim et al.

(10) Patent No.: US 12,388,925 B2
(45) Date of Patent: Aug. 12, 2025

(54) MOBILE COMMUNICATION TERMINALS, THEIR DIRECTIONAL INPUT UNITS, AND METHODS THEREOF

(71) Applicants:Youngtack Shim, Seoul (KR); Jae lark Jung, Goyang-si (KR); Jae kyu Lee, Siheung-si (KR)

(72) Inventors: Youngtack Shim, Seoul (KR); Jae lark Jung, Goyang-si (KR); Jae kyu Lee, Siheung-si (KR)

( * ) Notice: Subject to any disclaimer, the term of this patent is extended or adjusted under 35 U.S.C. 154(b) by 0 days.

(21) Appl. No.: 18/756,273

(22) Filed: Jun. 27, 2024

(65) Prior Publication Data
US 2024/0348717 A1    Oct. 17, 2024

Related U.S. Application Data

(63) Continuation of application No. 18/218,799, filed on Jul. 6, 2023, now Pat. No. 12,063,323, which is a
(Continued)

(51) Int. Cl.
*H04M 1/72466* (2021.01)
*G06F 3/0338* (2013.01)
*H04M 1/23* (2006.01)

(52) U.S. Cl.
CPC ...... *H04M 1/72466* (2021.01); *G06F 3/0338* (2013.01); *H04M 1/233* (2013.01)

(58) Field of Classification Search
CPC ...... G06F 3/0338; G06F 1/169; G06F 3/0482; G06F 21/31; G06F 1/1626; G06F 1/1671;
(Continued)

(56) References Cited

U.S. PATENT DOCUMENTS 8,072,415 B2    12/2011 Fukuhara ............ 345/156
2007/0094417 A1   4/2007 Hur et al. ............ 710/1
(Continued)

FOREIGN PATENT DOCUMENTS

WO    WO 2016/059564 A1    4/2016

OTHER PUBLICATIONS

International Search Report dated Jan. 22, 2018, issued to International Application No. PCT/KR2017/010477.
(Continued)

*Primary Examiner* — Deeprose Subedi
(74) *Attorney, Agent, or Firm* — Stein IP LLC

(57) ABSTRACT

This disclosure generally relates to various directional input units of a mobile communication terminal, where such directional input units receive a single user input or multiple concurrent user inputs and then acquires at least one selecting (user) sub-input therefrom while a terminal is in its powered-off state or its off-state. After acquiring the selecting user sub-input, a terminal runs at least one pre-selected operation which is selected from a set of multiple pre-selected operations and which matches the selecting user sub-input when a terminal powers on from its powered-off state or wakes up from its off-state. A directional input unit may acquire the selecting user sub-input from a movement of at least a portion thereof, a contact between at least a portion thereof and a user body part, or the like. As a result, a terminal can provide a user with more seamless operations.

42 Claims, 18 Drawing Sheets

Related U.S. Application Data continuation of application No. 17/534,134, filed on Nov. 23, 2021, now Pat. No. 11,743,376, which is a continuation of application No. 17/084,542, filed on Oct. 29, 2020, now Pat. No. 11,223,719, which is a continuation of application No. 16/335,101, filed as application No. PCT/KR2017/010477 on Sep. 22, 2017, now Pat. No. 10,855,832.

(60) Provisional application No. 62/398,817, filed on Sep. 23, 2016.

(58) Field of Classification Search
CPC . G06F 3/03548; H04M 1/7258; H04M 1/233; H04M 1/67
See application file for complete search history.

(56) References Cited

U.S. PATENT DOCUMENTS

| | | | |
|---|---|---|---|
| 2011/0088086 A1* | 4/2011 | Swink | G06F 3/0488 715/764 |
| 2012/0127105 A1 | 5/2012 | Kim | 345/173 |
| 2012/0133484 A1 | 5/2012 | Griffin | 340/5.54 |
| 2012/0284673 A1 | 11/2012 | Lamb et al. | 715/863 |

OTHER PUBLICATIONS

Written Opinion of the International Searching Authority dated Jan. 22, 2018, issued to International Application No. PCT/KR2017/010477.

* cited by examiner

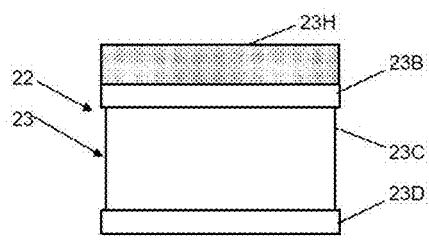
FIG. 12
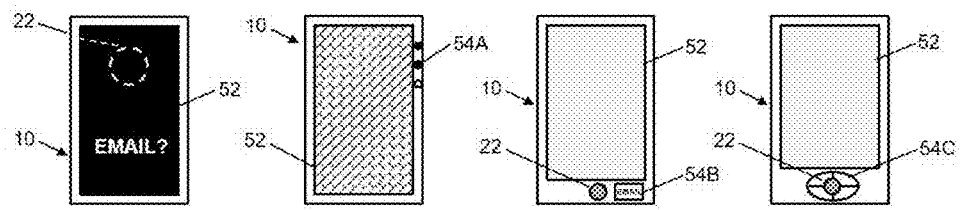
FIG. 13A   FIG. 13B   FIG. 13C   FIG. 13D
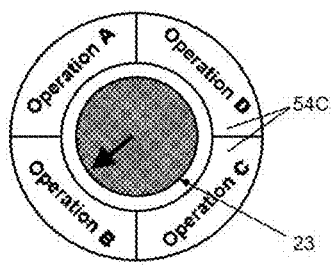 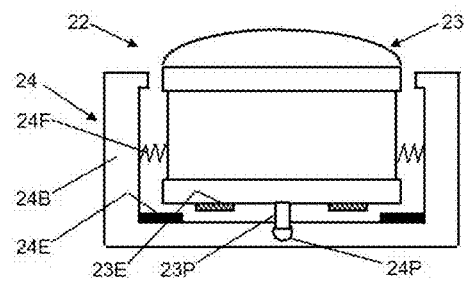
FIG. 14A   FIG. 14B

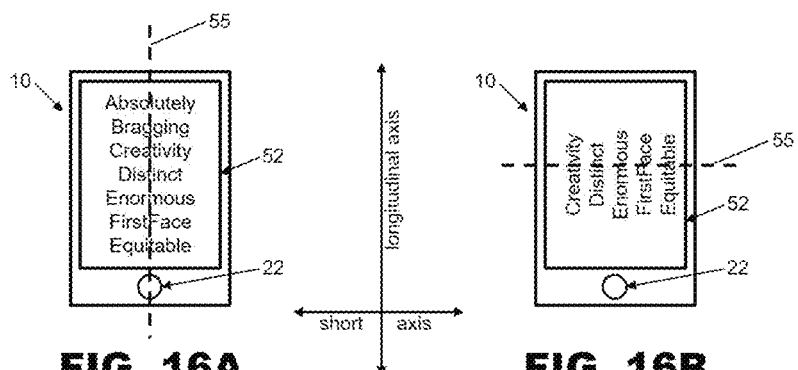
FIG. 16A  FIG. 16B
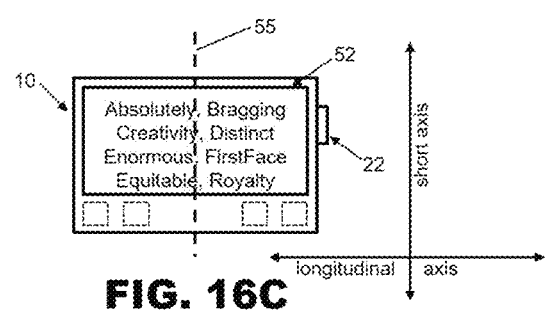
FIG. 16C
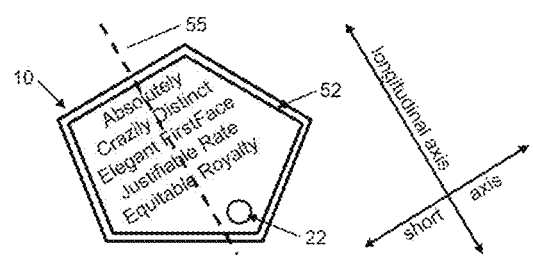
FIG. 16D

MOBILE COMMUNICATION TERMINALS, THEIR DIRECTIONAL INPUT UNITS, AND METHODS THEREOF

CROSS-REFERENCE TO RELATED APPLICATIONS

This application is a continuation of U.S. application Ser. No. 18/218,799, filed Jul. 6, 2023, which is a continuation of U.S. application Ser. No. 17/534,134, filed Nov. 23, 2021, now patented as U.S. Pat. No. 11,743,376, issued on Aug. 29, 2023, which is a continuation of U.S. application Ser. No. 17/084,542, filed Oct. 29, 2020, now patented as U.S. Pat. No. 11,223,719, issued on Jan. 11, 2022, which is a continuation of U.S. application Ser. No. 16/335,101, filed Mar. 20, 2019, now patented as U.S. Pat. No. 10,855,832, issued on Dec. 1, 2020, which is a national stage of International Application No. PCT/KR2017/010477, filed Sep. 22, 2017, which claims the benefit of priority from U.S. Provisional Patent Application No. 62/398,817, filed Sep. 23, 2016 and which is incorporated herein by reference in its entirety. In case of any discrepancy between this disclosure and the above Provisional Application, it is appreciated that descriptions provided in this disclosure prevail over the above Provisional Application. It is also appreciated that, in case of omittance, the contents which were provided in the Provisional Application but not included in this disclosure are deemed to not be incorporated into this disclosure and that such contents are not parts of this disclosure.

FIELD OF DISCLOSED DIRECTIONAL INPUT UNITS AND METHODS

This disclosure relates to various directional input units of mobile communication terminals. More particularly, such directional input units can acquire at least two different (user) sub-inputs [1] from a single user input or [2] from multiple concurrent user inputs provided by a user. Therefore, various terminals can run at least two operations in response to the user input(s), and can allow a user to seamlessly run various operations.

More particularly, a "directional input unit" of this disclosure includes multiple sensors [1] at least one of which can monitor a direction of a single user input (or multiple concurrent user inputs) with respect to a terminal or the input unit, or [2] at least one of which can monitor a direction associated with a single user input (or multiple concurrent user inputs). A terminal acquires directional information from a user input, selects an operation which matches such directional information, and then runs the operation which is selected by a user [1] while or (immediately) after a terminal powers on (i.e., from a current powered-off state in which a terminal has been powered off, to a new powered-on state in which a terminal is powered on), [2] while or (immediately) after a terminal wakes up (i.e., from a current off-state in which a terminal has been powered on and communicable but its display unit has been turned off, to a new mode in which a terminal is still powered on and communicable, and a display is turned on), [3] once a terminal begins to operate in an unlock (or lock) mode, or the like.

As a result, a terminal can run at least two operations in response to (or upon receiving) [1] a single user input or [2] multiple concurrent user inputs, where at least one of such operations belongs to a set of multiple pre-selected operations selected by a user (or a terminal), whereas the remaining operation(s) may include, e.g., an operation of turning on a display unit, an operation of authenticating a user, or the like. A terminal may instead run at least three operations in response to a single user input (or multiple concurrent user inputs), where one of such operations is an operation selected by a user from a set of multiple pre-selected operations, whereas the remaining operations may include, e.g., an operation of turning on a display unit, an operation of authenticating a user, or the like. Therefore, the directional input units of this disclosure may allow a user to provide various (user) sub-inputs [1] to power on a terminal from its powered-off state to its powered-on state, [2] to activate a terminal from its off-state to its on-state, or [3] to authenticate a user, while additionally running at least one desired operation which is selected from a set of multiple pre-selected operations, all in response to a single user input (or concurrent multiple user inputs).

By including various mechanical, electrical, optical or magnetic elements therein, various directional input units of this disclosure can acquire at least one directional (user) sub-input which may in turn carry various static or dynamic features therewith. To this end, such directional input units may acquire a directional (user) sub-input, e.g., [1] by including at least one movable portion in the input unit and monitoring movement of the movable portion, [2] by monitoring at least one movement of at least one body part of a user with respect to the input unit, [3] by monitoring at least one movement of at least one non-user object with respect to the input unit, [4] by monitoring at least one movement of a user body part or a non-user object at a distance from the directional input unit (or another input unit of a terminal), [5] by receiving electromagnetic or acoustic waves designating a direction of a user input with the directional input unit (or another input unit of a terminal), or the like.

This disclosure also relates to [1] various methods of constructing various directional input units which operate in different mechanisms, [2] various methods of fabricating the directional input units which may respond to various static or dynamic features of a user input, [3] various methods of acquiring each of multiple (user) sub-inputs included in a single user input (or multiple concurrent user inputs) using the directional input units, or the like. This disclosure also relates to [1] various methods of allowing a user to select which operation(s) to run in response to a user input(s), [2] various methods of interacting with a user or of informing a user about which operation a user has selected or is selecting, which operation is to be run once a terminal powers on or once a terminal wakes up, or the like.

Based thereon, various directional input units of this disclosure may provide a user with various conveniences and benefits. More particularly, this disclosure explains various seamless operations which can be offered by such directional input units and which may be attributed (1) to their versatility of receiving a single user input (or multiple concurrent user inputs) and (2) to their efficiency in acquiring such (user) sub-inputs of different types or nature.

Other exemplary aspects, embodiments, and examples of various directional input units adapted to various hardware or software elements of mobile communication terminals and related methods are disclosed below, along with appended figures.

BACKGROUND

When a user wants to run operations with prior art mobile communication devices such as mobile phones or smartphones, a user has to provide multiple user inputs, where a number of such inputs required depends on features of individual devices.

When a device does not require a user authentication for waking up, a user has to provide at least two user inputs. In one example where a device is (or has been) in a powered-off state (therefore, its display unit is or has been turned off), a user provides a $1^{st}$ user input to power on a device, and a device may then power on and turn on a display unit, while displaying an unlock screen displaying multiple graphical user interfaces (GUIs) thereon. When a user provides a $2^{nd}$ user input by manipulating one of such GUIs, a device may run a desired operation in response to the $2^{nd}$ user input. In another example where a device is (or has been) in a powered-on state (i.e., the device is or has been powered on) but a display unit is (or has been) in an off-state (i.e., the display unit is or has been turned off), a user provides a $1^{st}$ user input to a device, and a device may then turn its display unit on (i.e., a wake-up operation), while displaying the GUIs thereon. When a user provides a $2^{nd}$ user input by manipulating one of the GUIs, a device may then run a desired operation in response to the $2^{nd}$ user input. It is appreciated in both examples that, when a device is in a lock mode after switching to a powered-on state or to an on-state, a user may even have to provide an additional user input to switch from a lock mode to an unlock mode.

It then follows that, whenever a prior art mobile communication device is in its powered-off state or off-state, a user has to provide at least two user inputs anyway to run any desired operation. In addition, a user has to provide such user inputs in a certain time gap (i.e., sequentially), for an operation of turning on a display unit and another operation of selecting a desired operation to run have to be performed in a sequential manner. That is, a user cannot select an operation to run unless a device provides a user with a home screen.

When a device requires a user authentication before turning on a display unit or before advancing to an unlock mode, a user may have to supply more than two user inputs. For example, when a device is in its powered-on state and its display unit is in its off-state, a user has to provide a $1^{st}$ user input to run a user authentication operation. In one example where a device turns on its display unit in response to the $1^{st}$ user input, the device may show a lock screen in a lock mode when a user fails such authenticating, or may instead show an unlock (or home) screen when a user passes such authenticating. In another example where a device turns on its display unit only when a user passes such authenticating, a device may remain turned off when a user fails such authenticating, but may turn on its display unit when a user passes such authenticating.

Most prior art mobile communication devices used to require a user to provide two separate user inputs to this end, where one user input is used to turn on a display unit and to switch a device to a lock mode, whereas another user input is used to receive authentication information. However, more advanced devices require only one user input to authenticate a user as well as turning on a display unit either concurrently or sequentially (i.e., in series). Once a device authenticates a current user and advances to an unlock mode, a user may then provide a $2^{nd}$ user input to select and to run an operation of his or her choice.

Recently, some prior art mobile communication devices have adopted another line of input units which typically include a $1^{st}$ sensor (e.g., a fingerprint sensor) for acquiring an authenticating (user) sub-input which is used to authenticate a user, a $2^{nd}$ sensor (e.g., a tactile sensor) for acquiring an activation (user) sub-input which is used to turn on a display unit, and a $3^{rd}$ sensor (e.g., a force transducer) for monitoring a magnitude of force which is exerted on an input unit. Based on such a magnitude, a terminal may determine which one of multiple pre-selected operations to run. Therefore, in response to a single user input, this prior art device may run a $1^{st}$ operation (i.e., a user authentication operation), may run a $2^{nd}$ operation (i.e., a turning-on operation), and may also run a $3^{rd}$ operation which is desired by a user.

As described above, various prior art mobile communication devices require a user to provide at least two user inputs to run a desired operation (e.g., checking emails, taking pictures, making phone calls, or the like) when the devices are (or have been) in the powered-off state or off-state. Even when some newer devices may allow a user to provide a single user input to turn on a display unit, to authenticate himself or herself, and to even select and run a desired operation, a user can only select the desired operation from only a few pre-selected operations, for it is typically difficult for a user to precisely provide the user input with different magnitudes.

Therefore, there is an impending need for a mobile communication terminal which can turn on its display unit, which can authenticate a user, and which can run at least one desired operation, all in response to a single user input. There also exists an impending need for a mobile communication which can enable a user to readily select the desired operation from a pool of at least two, at least three, or at least four pre-selected operations, without having to worry about preciseness in providing the user input. Accordingly, a user may enjoy seamless operations of running the desired operation, without having to provide any additional user input [1] after the terminal is powered on or [2] after the display unit is turned on.

SUMMARY

Various mobile communication terminals of this disclosure provide a user with capability of enhanced seamless operations by incorporating at least "four main features" which may be "independent" of each other or which may be "interdependent" upon each other, based on configurational or operational characteristics of a terminal or on such characteristics of various hardware or software elements of a directional input unit of a terminal.

The "first main feature" of this disclosure is to provide a terminal with at least one "directional input unit" which may include a sensor capable of acquiring directional information of a user input. Because a user can readily manipulate a direction of a user input, a user may provide a directional input unit with a user input in one of multiple directions, thereby selecting and running one of multiple pre-selected operations.

That is, as long as a user can readily differentiate such different directions and provide a single user input (or multiple concurrent user inputs) in one of such directions, a user can readily select one of multiple pre-selected operations and then render a terminal run the selected operation, while or immediately after a terminal switches [1] from a powered-off state to a powered-on state (i.e., "powering on"), or [2] from an off-state to an on-state (i.e., "turning on" or "waking up"), where the selected operation is neither an operation of turning on a display unit nor an operation of authenticating a user. Accordingly, a user may enjoy running a desired operation in addition to turning on a display unit or to authenticating a user in either of [1] or [2] as described above, all in response to a single user input (or multiple concurrent user inputs).

The "second main feature" of this disclosure is to configure the directional input unit to "differentiate directions" in a "2-D" plane or in a "3-D" space. When a sensor of a directional input unit can differentiate directions in a 2-D plane, a user may provide a single user input (or multiple concurrent user inputs) in one of at least two different directions (e.g., up-down, left-right, or the like), in one of at least three different direction (e.g., up-left-right, up-down-horizontal, or the like), or in one of at least four different directions (e.g., up-down-left-right, upper left-upper right-lower left-lower right, or the like). Accordingly, by readily manipulating such directions, a user may easily select one of two, three, four, five, six, seven, or more pre-selected operations. In response thereto, a terminal may then run the selected operation. It is appreciated that the 2-D plane may be defined [1] parallel to a surface of a display unit of a terminal, [2] parallel to a rear surface of a terminal, [3] parallel to a side or an edge of a terminal, or [4] at a preset angle with respect to the surface, side, or edge.

When a sensor of a directional input unit can differentiate directions in a 3-D space, a user may manipulate a direction of a user input not only horizontally but also vertically. Accordingly, this configuration provides a user with greater flexibility in providing a user input in a greater number of directions. As a result, a user may select one of four, five, six, seven, eight, or more pre-selected operations. In response thereto, a terminal may then run the selected operation.

The "third main feature" of this disclosure is to provide a terminal with a directional input unit which can monitor a "static feature" or a "dynamic feature" of a single user input and to acquire directional information from the feature. As long as a user can readily differentiate such features and provide a single user input (or multiple concurrent user inputs) while incorporating one of such features to the user input, a user can readily select one of multiple pre-selected operations and then render a terminal run the selected operation while or immediately after a terminal switches [1] from a powered-off state to a powered-on state or [2] from an off-state to an on-state.

The "fourth main feature" of this disclosure is to provide a terminal with at least one "notice unit" capable of assisting a user in selecting which direction he or she has to provide a single user input (or multiple concurrent user inputs) for running one of multiple pre-selected operations. For example, a notice unit may generate a visual signal, an audible signal, or a tactile signal, and may inform a user [1] in which direction a user may provide a terminal with a user input, [2] which pre-selected operations can be run by providing a user input in a certain direction, [3] in which direction a user is providing (or has provided) a user input, [4] which pre-selected operation is to be run by a user input which a user is providing (or has provided), or the like.

A user may then readily determine whether or not he or she is providing (or has provided) a correct user input to select and run a desired operation, whether or not a terminal is going to run an operation intended by a user while or immediately after a terminal switches [1] from a powered-off state to a powered-on state or [2] from an off-state to an on-state. As a result, a terminal may enhance the efficiency of such seamless operations by minimizing user mistakes.

When a terminal provides a visual notice signal, a terminal may do so by driving a designated notice unit. In the alternative, a terminal may provide a visual notice signal using its display unit, where the display unit may then be deemed to serve as a notice unit as well. Similarly, when a terminal provides an audible notice signal, a terminal may do so by driving a designated notice unit. In the alternative, a terminal may provide an audible notice signal using its speaker, where the speaker may then be deemed to serve as a notice unit as well. In addition, when a terminal provides a tactile notice signal, a terminal may do so by driving a designated notice unit. In the alternative, a terminal may provide a tactile notice signal using its vibrator, where the vibrator may then be deemed to serve as a notice unit as well.

When a mobile communication terminal displays graphical user interfaces (GUIs) on a display unit and allow a user to run various operations by manipulating such GUIs, an "additional main feature" of this disclosure is to allow a user to run such operations by providing user inputs directly to a "directional input unit," instead of having to manually touch or press such GUIs. In other words, when a user desires to run a certain operation while a terminal is in its on-state, a user may select a GUI designated to such an operation with the directional input unit, without having to travel over a screen of a terminal with his or her fingers.

Various objectives, advantages, and benefits of various directional input units of various mobile communication terminals of this disclosure and related methods of providing and using such input units will be described below, starting with definitions of terms and phrases to be used throughout this disclosure.

It is appreciated throughout this disclosure that various numerals disposed between square brackets "[" and "]" such as, e.g., [1] or [2], mean that they are alternatives to each other. Therefore, "examples of devices include [1] a plate, [2] a cup, or the like" means that a device may be a plate, a cup, or other equivalents of the plate or the cup.

1. Definitions 1-1. Accessible Hardware or Software Elements

Each mobile communication terminal may include multiple hardware elements and multiple software elements therein. Among those elements, when a terminal may allow a user to neither directly drive nor directly modify a certain hardware or software element for operational or security reasons, this element is to be referred to as a "non-accessible" hardware or software element within the scope of this disclosure. A microprocessor, a wireless transmitter, a wireless receiver, a firmware, and a kernel are typical examples of such non-accessible hardware or software elements. In addition, a software element which is stored not in an accessible user space of a terminal but in a protected kernel space of the terminal is another example of the non-accessible elements.

When a manufacturer of a terminal allows a user to directly drive a certain hardware or software element with a user input, however, this element is referred to as an "accessible" hardware or software element of a terminal. For example, an input member which includes at least one input unit, a memory member which includes at least one memory unit, a software application (or "app"), or an O/S with which a user can run various operations are typical examples which include at least one of the accessible software or hardware elements therein. When a terminal provides a user with various user interfaces (e.g., a graphical user interface, a text-based interface, or the like), various hardware or software elements which are operationally coupled to the interfaces are other examples of such accessible hardware or software elements, for a user may directly drive such elements by simply manipulating such user interfaces.

In this regard, when a terminal grants a user with a certain access authority in a certain mode of operation, the user may

[1] access all accessible hardware or software elements, or [2] access not all but only some of the accessible hardware or software elements. In each of the above [1] and [2], the terminal may also grant the user [3] to drive an entire "portion" of a certain accessible hardware or software element, or [4] to drive not the entire portion but only a restricted "portion" of a certain accessible hardware or software element. In the case of [4], a user may drive the certain accessible hardware or software element in a restricted "extent" such that the user may drive only some but not all portions of the element or may drive the element not with all available options but only with restricted "options."

Accordingly, a terminal may grant a user to switch from a current mode to a new mode upon receiving a proper user input which includes a mode-switching (user) sub-input. The terminal may then grant a user [1] to "access" at least one accessible hardware or software element, [2] to "drive" the element, [3] to "run" a certain operation by driving such an element, [4] to "perform" a certain function by driving the element, or the like, based on the access authority which the terminal grants to the user in the new mode. In contrary, a terminal may deny a user [5] from switching from a current mode to a new mode, e.g., when the terminal does not authorize a user input. In this case, [5-1] the user may get stuck in the current mode or [5-2] the terminal may switch to the off-state or the powered-off state. In the case of [5-1], the terminal may keep allowing the user to drive those hardware or software elements which are accessible in the current mode but may continue to block the user from driving other hardware or software elements which may only be accessible in the new mode.

It is appreciated that a user can "access" or "drive" at least one accessible hardware or software element only when a terminal grants the user with proper access authorities in a certain mode but that, even in such a mode, the user cannot access or drive non-accessible hardware or software elements. In this regard, when a terminal or user is said to access or to drive a certain hardware or software element, it is presumed that the hardware or software element is an "accessible" hardware or software element, unless otherwise specified. It is further appreciated that "to 'drive' an element" is (1) to be synonymous with "to 'drive' at least one accessible hardware or software element" and (2) to collectively include "to 'drive' at least one accessible hardware element" and/or "to 'execute' at least one accessible software element" hereinafter.

1-2. States and Modes (of Operation)

A mobile communication terminal of this disclosure can be in a powered-off state or in a powered-on state. As used herein, the "powered-off state" means a state in which the terminal is powered off and, therefore, is not communicable. To the contrary, the "powered-on state" means a state in which the terminal is powered on and, therefore, is communicable. It is appreciated that, when a terminal is "communicable," the terminal can transmit information to a $3^{rd}$ party or receive information from a $3^{rd}$ party, either through wire or wirelessly.

A mobile communication terminal of this disclosure includes at least one display unit which in turn can be either in an off-state or in an on-state. As used herein, the "off-state" means a state in which the display unit is turned off, whereas the "on-state" means a state in which the display unit is turned on. In this context, when a terminal is in its on-state, a terminal has already been its powered-on state. However, when a terminal is in its off-state, a terminal may be either in the powered-off state or in the powered-on state.

It is appreciated that the "off-state" of a display unit may be referred to as an "inactive state" of a terminal and that an "on-state" of a display unit may be referred to as an "active state" of a terminal. For simplicity of illustration, however, a terminal may be said to be in an "on-state" or "off-state," respectively, when the terminal is in the active state and inactive state.

A terminal may only display on its display unit "routine data" such as, e.g., a date, a time, a clock, a stopwatch, a temperature, a weather, a wireless connection, an armed alarm, a battery charge level, an arrival of a new email or message, an incoming call, a notice of an upcoming event, a status of a hardware or software element of a terminal, or the like. In particularly, when a terminal includes an input unit which is provided as a GUI or a soft button and when the terminal displays such GUI or soft button while keeping the rest of the display unit turned off, such GUI and soft button are also deemed to be routine data.

In general, such routine data refer to those data [1] which can be obtained without having to run any operation in response to a user input, or [2] which is not related to any user interface which is in turn provided as a hard button or as a soft button. When a display unit displays only routine data thereon, the display unit is deemed to be "turned off" and to be in an "off-state" within the scope of this disclosure.

The above illustrations of this Section apply to a terminal with a display member which includes a single display unit. However, when a display member of a terminal may include multiple display units such as, e.g., a "major display unit" and at least one "minor display unit" which is smaller than the major display unit, a display unit is deemed to be "turned off" and to be in an "off-state" within the scope of this disclosure, as long as the major display unit is turned off and in its off-state, even when the minor display unit is turned on and in its on-state. In addition, when a terminal incorporates a single display unit which defines a "major section" and at least one "minor section" which is smaller than the major section, the display unit is deemed to be "turned off" and to be in an "off-state" when the major section is turned off and in an off-state, even when the minor section displays only routine data or other user interfaces.

In other cases, a terminal may display on its display unit some routine data along with other information which are not routine data. In this case, a display unit is deemed to be "turned off" and to be in an "off-state" within the scope of this disclosure, when a terminal keeps "at least 80% of the pixels" of a display unit turned off. This also applies to the major display unit as well as to the major section.

As used herein, a "lock mode (of operation)" or simply a "lock mode" refers to a mode of operation in which a terminal allows a user to drive the least number (including zero) of accessible hardware or software elements of a terminal. As a result, a user can run the least number (including zero) of operations in the lock mode. In contrary, an "unlock mode (of operation)" or simply an "unlock mode" refers to a mode of operation in which a terminal allows a user to drive the greatest number of accessible hardware or software elements of a terminal. As a result, a user can run the greatest number of operations in the unlock mode.

One example is where a user can manipulate all GUIs displayed on an unlock (or home) screen in an unlock mode, whereas a user can only manipulate at most a few GUIs in a lock mode, for a lock screen displayed on a display unit in the lock mode only includes the few GUIs. As a result, a user can run a greater number of operations in an unlock mode, whereas he or she can only run only a few operations in a lock mode. When a lock screen does not include any GUI, then a user cannot run any operation in a lock mode.

A terminal may also define at least one intermediate mode in addition to the lock mode and the unlock mode. As used herein, an "intermediate mode (of operation)" or simply an "intermediate mode" refers to a mode of operation which a terminal allows a user to drive a certain number of accessible hardware or software elements of a terminal, where the certain number is greater than the number of such accessible elements drivable in the lock mode and smaller than the number of such accessible elements drivable in the unlock mode.

1-3. Concurrent and Sequential

As used herein, "concurrence" is synonymous with "simultaneity," and refers to an occurrence, a happening, or an existence of multiple operations (or steps) at the same time. Similarly, "concurrent" or "concurrently" is synonymous with "simultaneous" or "simultaneously," respectively. Thus, a user is deemed to provide multiple user inputs concurrently when such user inputs are provided to one or more input units at the same time. Accordingly, when a user provides multiple user inputs concurrently, the user is deemed to provide the user inputs in such a way that there exists at least one common clock cycle of a processor of the terminal in which the user provides such multiple user inputs. In other words, such multiple user inputs overlap each other in at least one common clock cycle, and such multiple user inputs are not completely separated by any temporal gap therebetween.

Similarly, a terminal is deemed to run multiple operations (or their steps) concurrently, when the terminal runs the operations (or steps) at the same time. Accordingly, when a terminal runs multiple operations (or steps) concurrently, the terminal is deemed to run such operations (or steps) in such a way that there exists at least one common clock cycle of a processor of a terminal in which the terminal runs both of such operations (or steps). That is, such multiple operations (or steps) overlap each other in at least one common clock cycle, and such multiple operations (or steps) are not completely separated by any temporal gap therebetween.

FIG. 1A is a schematic diagram of exemplary concurrent operations (or steps) which are presented along clock cycles of a processor of a mobile communication terminal. In the panel (A) of FIG. 1A, a processor of a terminal (or just simply a terminal) runs the operation (or step) $A_1$, starting from a clock cycle 003 and ending at a clock cycle 010 (i.e., a duration of 8 clock cycles). In addition, the terminal runs the operation (or step) $A_2$, starting from a clock cycle 009 and ending at a clock cycle 019 (i.e., a duration of 11 clock cycles). According to the above definition, this terminal is deemed to "concurrently" run the operations (or steps) $A_1$ and $A_2$, for both of the operations (or steps) overlap each other in two common clock cycles 009 and 010.

In the panel (B) of FIG. 1A, a terminal similarly runs the operation (or step) $B_1$, starting from a clock cycle 003 and ending at a clock cycle 020 (i.e., a duration of 18 clock cycles), and the terminal also runs the operation (or step) $B_2$, starting from a clock cycle 020 and ending at a clock cycle 30 (i.e., a duration of 11 clock cycles). By the above definition, this terminal is deemed to "concurrently" run the operations (or steps) $B_1$ and $B_2$, for both operations (or steps) $B_1$ and $B_2$ overlap each other in a single common clock cycle 020.

In the panel (C) of FIG. 1A, a terminal runs the operation (or step) $C_1$, starting and ending at a clock cycle 023 (i.e., one clock cycle), and the terminal also runs the operation (or step) $C_2$, starting from a clock cycle 003 and ending at a clock cycle 090 (i.e., 88 clock cycles). This terminal is deemed to "concurrently" run the operations (or steps) $C_1$ and $C_2$, because both operations (or steps) overlap each other in the single common clock cycle 023, even though the operation (or step) $C_1$ lasts only a tiny portion of the operation (or step) $C_2$.

In the panel (D) of the figure, a terminal runs the operation (or step) $D_1$, starting at a clock cycle 005 and ending at a clock cycle 014 (i.e., 10 clock cycles), runs the operation (or step) $D_2$, starting from a clock cycle 012 and ending at a clock cycle 022 (i.e., 11 clock cycles), and runs another operation (or step) $D_3$, starting from a clock cycle 016 and ending at a clock cycle 1,015 (i.e., 1,000 clock cycles). Therefore, the terminal is deemed to [1] "concurrently" run the operations (or steps) $D_1$ and $D_2$, for they overlap each other in the common clock cycles 12, 13, and 14, and [2] "concurrently" run the operations (or steps) $D_2$ and $D_3$, because they overlap each other in the common clock cycles 16 to 22. However, the terminal is not deemed to "concurrently" run the operations (or steps) $D_1$ and $D_3$, for they do not overlap each other in any common clock cycle. Rather, the operations (or steps) $D_1$ and $D_3$ are separated by a temporal gap which corresponds to the clock cycle 15.

It is appreciated, however, that the concurrency among at least three operations (or steps) is defined such that a terminal is deemed to run such operations (or steps) concurrently as far as there is no temporal gap during a period which starts from a beginning of the earliest-beginning operation (or step) and which ends at an ending of the last-ending operation (or step). Based on this definition, a terminal of the panel (D) of FIG. 1A is deemed to "concurrently" run three operations (or steps) $D_1$, $D_2$, and $D_3$, because a terminal runs the three operations (or steps) for a period which begins with the beginning of $D_1$ and which end with the ending of $D_3$ and because there is no single clock cycle during the period in which a terminal does not run any of $D_1$, $D_2$, and $D_3$.

As used herein, a "sequence" refers to a certain order in which a terminal runs multiple operations (or steps) one at a time or one after another. Similarly, "sequentially" means that a terminal runs the operations (or steps) in a preset order one at a time, with at least one temporal gap between such multiple operations (or steps). As used herein, "sequentially" is synonymous with "one at a time," "consecutively," or "successively." Therefore, a terminal is deemed to sequentially run the operations (or steps) $D_1$ and $D_3$ of the panel (D) of FIG. 1A, with at least one temporal gap therebetween.

1-4. Display Unit and Display Surface

A mobile communication terminal includes a display member which in turn includes at least one display unit which in turn defines at least one "displace surface" for displaying a "static image (e.g., a picture)" or a "dynamic image (e.g., a video clip)" thereon, where the image may be in black-and-white, in color, a combination thereof, or the like. Accordingly, a display unit may display on its display surface static images of, e.g., one or more [1] characters, [2] words, [3] texts, [4] drawings, [5] pictures or [6] other static images of objects or persons. A display unit may similarly display dynamic images such as, e.g., [1] video games, [2] video clips, or [3] dynamic images of characters, words, texts, drawings, cartoons, objects or persons, or the like.

A terminal may store such static or dynamic images therein and display such images one by one, may receive such images from an external source such as, e.g., an external device, a portable device, another terminal, a website, or the like. In the latter cases, a terminal may display such images [1] only after acquiring them, [2] concurrently with acquiring them, or the like. It is appreciated that a "display surface" refers to a "portion" of a display unit which is a hardware element of a main system of a terminal. Because a user may drive a display unit to display such static or dynamic images, a display unit may be deemed as one of the accessible hardware element of a main system as well.

A single display surface may define a single "segment" where the display surface then becomes identical to the display segment. However, when a display surface defines "multiple segments" thereon, a display unit may be able to display different static or dynamic images on different segments concurrently or sequentially.

When a terminal may include a display member which in turn includes multiple display units, such display units may have the same shapes, sizes, or functions. Alternatively, such display units may have different shapes, sizes or functions, and may be incorporated in the same or different locations of a terminal. In the latter example, one display unit may be used as a "major display unit," while another display unit may serve as a "minor display unit" or a supplemental display unit. It then follows that each of such multiple display units may include display surfaces of which shapes and sizes may be identical (or similar) to each other or different from each other.

As will be explained below, various notice units of this disclosure may serve as one of multiple display units, where such notice units may have the same, similar or different capability of displaying the static or dynamic images in color, in a certain resolution, or the like. Because a notice unit may serve to provide a visual notice signals to a user, the notice unit [1] may be smaller than a display unit, [2] may display simple static or dynamic images than a display unit, or the like. When desirable, a single display unit may use a portion of its display surface as a notice unit as well. Alternatively, a display unit may serve as the notice unit as well.

When a terminal includes multiple display units, the terminal may drive each of such multiple display units [1] concurrently, [2] sequentially, [3] temporarily independent of each other, or the like. For example, a terminal may [1] turn on a $1^{st}$ display unit whenever a $2^{nd}$ display unit is turned on, [2] turn off a $1^{st}$ display unit whenever a $2^{nd}$ display unit is turned on, [3] turn on or off at least two display units in a certain sequence, or [4] turn on or off each display unit independently. As will be explained in the following Section, a terminal may recruit a display unit to constantly display routine data as defined above. In addition, a terminal [1] may recruit the same software element to drive each of multiple display units, or [2] may recruit different software elements to drive each of such display units.

In contrary to such examples where a terminal includes at least one display unit, a terminal may not include any display unit therein. Such a terminal may instead be configured to be releasably coupled to an external display device which is a separate device from the terminal. With this arrangement, a terminal of this disclosure may be provided in a more compact shape and size. Of course, a terminal which includes at least one display unit may also be configured to operationally couple with an external display device to supplement a display unit of a main system of a terminal.

1-5. Screen

As used herein, a "screen" refers to an image which a terminal displays on a "display surface" of a display unit. The screen [1] may be in a black-and-white mode or a color mode, [2] may be in a 2-D mode or a 3-D mode, or [3] may provide a 2-D image, a 3-D image, a hologram image, or the like. It is appreciated that the screen may be static (i.e., not changing over time) or dynamic (i.e., changing over time). In this context, a screen may include a single "window" or multiple windows in each of which a user may run different (software) elements of a main system of a terminal.

When or after a display unit is turned on (i.e., a terminal is in its on-state), a screen becomes available on a display surface of a display unit, and a user may be able to see the screen on the display surface. Therefore, a screen may be an image of whatever is displayed on the display surface, and such a screen may include [1] one or more static images of characters, words, texts, drawings, pictures or static images of objects or persons, [2] dynamic images of a video game, or [3] dynamic images such as video clips or other dynamic images of objects or persons. Depending upon its content, the screen may include at least one advertisement, a content, a warning, an instruction, or the like. Accordingly, a screen may also include an "unlock (or home) screen" which is displayed in an unlock mode, a "lock screen" which is displayed in a lock mode, and an "intermediate screen" which is displayed in an intermediate mode.

1-6. User Input

As used herein, a "user input" refers to an input which is provided to at least one input unit of a terminal by a user who directly or indirectly manipulates at least one portion of the input unit. A user may provide the user input with his or her body part(s) or with a non-user object such as a stylus, a pen, or the like. For simplicity of illustration, when "a user provides" a user input to at least one input unit of a terminal, it collectively refers that a user may [1] use "at least one body part of the user," [2] use "at least one non-user object which can be recognized by an input unit" of a terminal, [3] allow a terminal to obtain biometric information of a user, [4] allow a user to obtain electromagnetic waves or acoustic waves related to user, or the like.

In one example, a user may "directly manipulate" at least a portion of an input unit of a mobile communication terminal. In one case, a user may directly provide a user input by "moving" at least one movable portion of the input unit or by "touching or contacting" at least a portion of the input unit [1] with a user body part, [2] a non-user object, or the like. In the case of such moving, a user may move the movable portion for a preset period (of time) or for another period of his choice. In the case of such contacting, a user may [1] maintain a contact between the portion of the input unit and a user body part (or a non-user object) for a preset period of time, or [2] maintain a contact while moving the body part or non-user object and, therefore, changing a position of such a contact.

In another example, a user may "indirectly provide" a user input, e.g., by "providing electromagnetic waves or acoustic waves" to an input unit of a mobile communication terminal, without having to directly manipulate a portion of the input unit. In one case, a user may emit to the input unit [1] electromagnetic waves which carry information related to a user input such as, e.g., an image of a user, wave characteristics (e.g., amplitudes, frequencies, phase angles, or phase lags) or other information, or [2] acoustic waves which carry information related to a user input such as, e.g., a user voice, a sound generated by a user body part, or the like. Therefore, when an input unit acquires an image of a user for authenticating a face, an iris, or a retina, such an image is deemed as a user input. Similarly, when an input unit acquires a voice of a user for voice authentication, the voice is deemed as a user input.

As used herein, a "user input" includes "at least one (user) sub-input" therein. When a user supplies a user input to an input unit, an input unit is to "receive" a user input, and a sensor of the input unit is to "acquire" a (user) sub-input from a user input. Therefore, when a user input includes only one (user) sub-input therein, the user input corresponds to the (user) sub-input. Conversely, when a user input includes therein multiple (user) sub-inputs, a single input unit or multiple input units receive the user input, while a single sensor or multiple sensors (of a single input unit or multiple input units) acquire the (user) sub-inputs therefrom. For simplicity of illustration, a "user input" and a "(user) sub-input" are collectively referred to as the user input throughout this disclosure, unless otherwise specified. In addition, a "(user) sub-input" may be abbreviated as a "sub-input."

Depending on configurational and operational characteristics of an input unit, a user may provide various types of user inputs. A user may provide some of such user inputs by his or her direct manipulation of the input unit, whereas a user may provide others of such user inputs not by such direct manipulation of the input unit but by indirectly providing various user inputs to the input unit.

A user input of this disclosure may be classified based upon its type or nature. A "$1^{st}$ type user input" relates to a "mechanical user input" which is provided to at least a portion of an input unit by directly manipulating the portion. Examples of the $1^{st}$ type user input includes, e.g., "moving" (e.g., pressing, pushing, pulling, translating, sliding, rotating, pivoting, or otherwise moving) at least a portion of the input unit, "touching (or contacting)" the portion, and a combination thereof.

Examples of the $1^{st}$ type user input may also include "mechanical biometric information" of the user, where examples of such $1^{st}$ type user input may include a blood pressure or a heart rate measured in a certain position of the user, a blood flow rate measured similarly, other cardiovascular information, a breathing rate in rest or during exercise, a respiratory flow rate, other respiratory information, or other biometric information related to skeletal or muscular body parts. As defined above, such mechanical user inputs include therein at least one mechanical (user) sub-input.

The $1^{st}$ type user input further relates to a "static feature" or a "dynamic feature" of the mechanical user input. Examples of this $1^{st}$ type user input include, e.g., a force associated with a movement or a contact of at least a portion of an input unit (a scalar or a vector), a velocity of the movement (a scalar or a vector), an acceleration of such a movement (a scalar or a vector), a displacement of the portion due to the movement (a scalar or a vector), a direction of the force, velocity, acceleration or movement, a direction of the contact, a duration of the above, a number of applications thereof, a temporal overlap therebetween, a temporal gap therebetween, or the like. The $1^{st}$ type user input may also include a "mechanical property" of a user body part or that of a non-user object which is used to provide the $1^{st}$ type user input to the portion of the input unit, where examples of such $1^{st}$ type user input may include various mechanical properties such as, e.g., an elasticity, a roughness, various moduli, or the like. An amplitude or a frequency of a force exerted onto a sensor of an input unit is an example of this $1^{st}$ type user input.

A "$2^{nd}$ type user input" relates to an "electrical user input" which is an "electrical signal" provided to at least a portion of an input unit capable of receiving the $2^{nd}$ type user input and acquiring an electrical (user) sub-input therefrom. For example, a user may use a certain pen, a wearable device as explained above, or other portable devices to generate and provide a certain direct current (DC) or alternating current (AC) electrical signal to the input unit, may use another terminal to generate and provide the electrical signal, or the like. A user may also provide "electrical biometric information" of his body part as the $2^{nd}$ type user input, where these user inputs may include, e.g., an electrocardiogram (ECG), an electromyogram (EMG), an electroencephalogram (EEG), or any other electrical signals measured in a certain position of the body.

The $2^{nd}$ type user input further relates to a "static feature" or a "dynamic feature" of the electrical user input. Examples of this $2^{nd}$ type user input may include an electrical current or voltage, its magnitude, its phase angle or phase lag, its frequency, its wave-length, its flux (a scalar or a vector), or the like. The $2^{nd}$ type user input may also include an "electrical property" of a user body part or a non-user object which is used to provide the $2^{nd}$ type user input to a proper portion of the input unit, where examples of the $2^{nd}$ type user input may include various electrical properties such as resistivity of the body part or object, its conductivity, its capacitance, its permittivity, its dielectric property, its thermoelectricity, or the like, where such properties may be measured in a constant electric or magnetic field or where such properties or their changes may be measured in a varying electric or magnetic field. A fingerprint of a user monitored by a capacitive sensor of a capacitive input unit is an example of this $2^{nd}$ type user input.

A "$3^{rd}$ type user input" relates to an "magnetic user input" which is a "magnetic signal" provided to at least a portion of an input unit capable of receiving the $3^{rd}$ type user input and acquiring a magnetic (user) sub-input therefrom. For example, a user may use a certain pen, a wearable device as explained above, or other portable devices to generate and provide a certain direct current (DC) or alternating current (AC) magnetic signal to the input unit, may use another terminal for generating and providing the magnetic signal, or the like. A user may also provide various "magnetic biometric information" of his or her body part as the $3^{rd}$ type user input, where the $3^{rd}$ type user inputs may similarly include, e.g., a magnetocardiogram (MCG), a magnetomyogram (MMG), a magnetoencephalogram (MEG), or any other magnetic signals measured in a certain position of the body.

The $3^{rd}$ type user input may also relate to a "static feature" or a "dynamic feature" of the magnetic user input. Examples of this $3^{rd}$ type user input may include a magnitude of its magnetic B-field or H-field, its direction, a number of magnetic poles therein, its phase angle or phase lag, its frequency, its wave-length, its flux (a scalar or a vector), or the like. The $3^{rd}$ type user input may also include a "magnetic property" of a user body part or a non-user object which is employed to provide the $3^{rd}$ type magnetic user input to the portion of the input unit, where the $3^{rd}$ type user input may include various magnetic properties such as, e.g., a magnetic polarity, a magnetic permeability, a magnetic susceptibility, or the like, where such properties may be measured in a constant electric or magnetic field or where such properties or changes in such properties may be measured in a varying electric or magnetic field.

A "$4^{th}$ type user input" relates to an "electromagnetic user input" which is "electromagnetic waves" emitted to at least a portion of an input unit capable of receiving the $4^{th}$ type user input and acquiring an electromagnetic (user) sub-input included therein. For example, a user may use a certain pen, a wearable device (e.g., a watch, a ring, a necklace, a bracelet, a lens, or glasses), or other portable devices to emit such electromagnetic waves to the input unit, may use another mobile communication terminal to emit such waves, or the like. In addition, the user may provide an "image of a body part" such as a face, an iris, a retina or another body part, or an "image of a non-user object" to the input unit, where such images may be provided to the input unit in a range of the visible electromagnetic waves, UV rays, IR rays, or other electromagnetic waves of specific frequency ranges. It is appreciated that the $4^{th}$ type user input provided as such images may include still images, video clips, or a combination thereof, and that the $4^{th}$ type user input may correspond to as an "optical user input" as well, particularly when such $4^{th}$ type user inputs employ visible light rays.

The $4^{th}$ type user input may also relate to a "static feature" or a "dynamic feature" of the electromagnetic user input. Examples of this $4^{th}$ type user input may include a magnitude of such waves, their phase angle, their phase lag, their wave-length, their frequency, their flux (a scalar or a vector), or the like. When the $4^{th}$ type user input relates to the above images, examples of this $4^{th}$ type user input may include a color (e.g., its hue, value, and intensity) of such images, their contrast, their sizes, contents included in such images, arrangement of such images, orientation of such images, or the like. As defined above, this $4^{th}$ type electromagnetic user input includes therein at least one electromagnetic (user) sub-input.

A "$5^{th}$ type user input" relates to an "acoustic user input" which is "acoustic waves" emitted to at least a portion of an input unit capable of receiving the $5^{th}$ type user input and acquiring an acoustic (user) sub-input included therein. For example, a user may use a certain pen, a wearable device (e.g., a watch, a band, a ring, a necklace, a bracelet, an earring, a lens, a nail, a glove, a helmet, a hat, a belt, a goggle, glasses, or a shoe), or other devices portably worn by a user and to emit such acoustic waves to the input unit, or may use another mobile communication terminal to emit such waves. In addition, the user may provide the input unit with his or her "voice" or a "body sound" using his or her body parts such as, e.g., clapping, finger snaps, or the like. The user may also provide a "non-user sound" to the input unit, where such sounds may be provided to the input unit in a range of audible sound waves, ultrasonic waves or other acoustic waves of specific frequency ranges.

The $5^{th}$ type user input may also relate to a "static feature" or a "dynamic feature" of the acoustic user input. Examples of this $5^{th}$ type user input may include a magnitude of such waves, their phase angle, their phase lag, their wave-length, their frequency, their flux (a scalar or a vector), or the like. When the $5^{th}$ type user input relates to the above voice or body sound, examples of this $5^{th}$ type user input may include a duration, a tone, an envelope, a location of a source thereof, or the like. As defined above, this $5^{th}$ type acoustic user input includes therein at least one acoustic (user) sub-input.

In addition to the above, the user input may also include temporal changes of any the above user inputs such as, e.g., a change in a movement pattern over time, a temporal change in an intensity of force exerted to the input unit over time, or the like. The user input may further include spatial changes of the above user inputs such as, e.g., a change in positions of contact between the user's body part and an input unit, a change in distribution of force applied to a certain area of an input unit, or the like.

1-7. Single User Input

Like the definition of "concurrent" provided in Section 1-3, a "single concurrent effort" is (1) synonymous with a "single simultaneous effort" and (2) abbreviated as a "single effort," unless otherwise specified. Accordingly, a "single effort" or a "single concurrent effort" includes [1] one effort exercised by a user, or [2] multiple (identical or different) efforts exercised by a user at the same time. In other words, for multiple efforts to be concurrent, there exists at least one common clock cycle of a processor of a terminal in which a user exercises the multiple efforts and, therefore, such multiple efforts overlap each other in at least one common clock cycle. When a user exercises more than two efforts, concurrency of such efforts may be determined based on the definition of concurrency as provided in Section 1-3, and as exemplified in FIG. 1A.

Unless otherwise specified, a "user input" is synonymous with a "single user input" throughout this disclosure. Accordingly, a "user input" or a "single user input" means an input which a user provides to at least a portion of at least one input unit of a mobile communication terminal, when a user provides at least one of the $1^{st}$, $2^{nd}$, $3^{rd}$, $4^{th}$, and/or $5^{th}$ type user inputs to the portion of the input unit by exercising a "single effort" through the direct manipulation, indirect manipulation or other manipulations of at least a portion of the input unit as will be explained in detail below. That is, when a user provides multiple user inputs concurrently by exercising a single effort, such user inputs are deemed as a single user input. In contrary, when a user exercises multiple efforts to provide multiple user inputs not concurrently (i.e., sequentially), such user inputs do not qualify as a single user input.

Therefore, each of a single $1^{st}$ type user input and a single $3^{rd}$ user input qualifies as a (single) user input provided to an input unit by a (single) concurrent effort by a user. In addition, [1] two $1^{st}$ type user inputs qualify as a (single) user input, when a user provides both user inputs by a (single) concurrent effort, [2] three $5^{th}$ type user inputs qualify as a (single) user input, when a user provides such three user inputs by a (single) concurrent effort, and [3] one $1^{st}$ type user input and three $4^{th}$ type user inputs can also qualify as a (single) user input, as far as a user provides such four user inputs by a (single) concurrent effort.

Put in different contexts, a user may press a $1^{st}$ input unit with his finger and move his finger over the $1^{st}$ input unit. If the user moves his finger while maintaining such pressing (e.g., without detaching the finger from the input unit), such pressing and moving qualify as a single (concurrent) effort by the user, for the user exercises such pressing and moving over at least one common clock cycle of a processor of a terminal. However, when there exists a temporal gap between such pressing and moving (e.g., pressing, detaching, and then moving), such pressing and moving may not quality as the single (concurrent) effort, unless the temporal gap is less than 1.5, 1.0, 0.5, or 0.3 second, which will be explained in greater below in conjunction with a definition of "multiple quick efforts" which is to be provided in Section 1-8.

In another example, a user may touch a $2^{nd}$ input unit and provide an image of his face to a $3^{rd}$ input unit (e.g., by staring at a camera). When the user provides the image while maintaining the touching, such touching and providing qualify as a single (concurrent) effort as far as there exists at least one common clock cycle in which the user exercises such touching and providing at the same time. In other words, such touching and providing are a single concurrent effort, for there is no temporal gap between such touching and providing.

In another example, a user may press a $1^{st}$ input unit with a $1^{st}$ finger and touch a $4^{th}$ input unit with a $2^{nd}$ finger. Such pressing and touching can also qualify as a single (concurrent) effort by the user, as far as there exists at least one common clock cycle in which the user performs such pressing and touching, or as far as there is no temporal gap between such pressing and touching.

It is to be understood that a user lives in a world counted by the seconds, hours, days, weeks, months, years, and decades, whereas a terminal or its processor operates in another world of nano- or pico-seconds. Based on the foregoing, definitions about "concurrence" and "sequence" regarding various operations (or steps) run by a processor of a terminal may need to be modified when such operations (or steps) are used in conjunction with a user input, particularly in conjunction with an effort which is exercised by a user input and which takes a certain amount of time. For example, a user cannot provide a user input or a (user) sub-input to a terminal instantaneously (e.g., within one or several clock cycles), but can at best provide the user input or (user) sub-input over a certain period of time such as, e.g., within 0.1 second to 1.0 second, which would easily amount to several millions of clock cycles of a processor.

To illustrate such characteristics, FIG. 1B describes a schematic diagram of exemplary concurrent operations (or steps) presented along clock cycles of a processor of a mobile communication terminal in view of a user input. In the panel (A) of FIG. 1B, a terminal or its processor (simply a terminal) runs the operation (or step) $A_1$ during the clock cycles from 004 to 013, and also runs the operation (or step) $A_2$ during the clock cycles from 009 to 019. By the above definition, this terminal is deemed to "concurrently" run the operations (or steps) $A_1$ and $A_2$, because both steps overlap each other in five common clock cycles 009 and 013. In addition, a user provides a user input ($UI_1$) during the clock cycles from 003 to 1,000,003 (now shown in the figure). Because the period of providing $UI_1$ includes the periods of running the operations (or steps) $A_1$ and $A_2$, a terminal is deemed to run such operations $A_1$ and $A_2$ concurrently in view of the user input $UI_1$.

In the panel (B) of FIG. 4, a terminal runs the operation (or step) $B_1$ at a clock cycle 023, and also runs another operation (or step) $B_2$ during the clock cycles from 014 to 029. Thus, this terminal is deemed to "concurrently" run the operations (or steps) $B_1$ and $B_2$. When a user provides a user input ($UI_2$) during the clock cycles from 003 to 1,000,003, a terminal is deemed to run such operations $B_1$ and $B_2$ concurrently in view of the user input $UI_2$, for the period of providing $UI_2$ includes the periods of running the operations (or steps) $B_1$ and $B_2$.

In the panel (C) of the figure, a terminal runs the operation (or step) $C_1$ from a clock cycle 006 to a clock cycle 014, runs the operation (or step) $C_2$ from a clock cycle 014 to a clock cycle 022, and runs another operation (or step) $C_3$ from a clock cycle 020 to a clock cycle 032. Therefore, the terminal is deemed to [1] "concurrently" run the operations (or steps) $C_1$ and $C_2$, and [2] "concurrently" run the operations (or steps) $C_2$ and $C_3$. However, the terminal is deemed to not "concurrently" run the operations (or steps) $C_1$ and $C_3$, for they do not overlap each other in any common clock cycle.

When a user provides a user input ($UI_3$) during the clock cycles from 003 to 1,000,003, the period of providing $UI_3$ includes the periods of running the operations (or steps) $C_1$, $C_2$, and/or $C_3$. Accordingly, a terminal may be deemed to concurrently run the operations $C_1$ and $C_2$ in view of the user input $UI_3$, to concurrently run the operations $C_2$ and $C_3$ in view of the user input $UI_3$, to concurrently run the operations $C_3$ and $C_1$ in view of the user input $UI_3$, and to concurrently run all of such operations $C_1$, $C_2$, and $C_3$ in view of the user input $UI_3$, It is appreciated that a user may exercise a single effort in various ways. In one example, a user may exercise an "active single effort" by performing an active action or a voluntary action in providing a single user input to an input unit, where examples of such active single efforts may include [1] mechanical, electrical, magnetic, or optical manipulation of at least a portion of an input unit through an active action of a user, [2] providing images or voices to an input unit through an active action of a user (e.g., voluntarily staring at a camera to provide an image or actively talking to a speaker), or the like.

In another example, a user may exercise a "passive single effort" or an "inactive single effort" by passively or involuntarily providing a single user input to an input unit. For example, a terminal may receive a single user input and acquire at least one (user) sub-input therefrom even when a user does not actively or voluntarily take any action. Therefore, when a terminal obtains an image of an eye of a user who is not actively staring at a camera of a terminal and processes the image as a user input, a user may be deemed to exercise a passive single effort to provide a single user input to the terminal. Similarly, when a terminal obtains a user voice while he or she is talking to another person and uses such voice as a user input without user's knowing, a user may also be deemed to exercise an inactive single effort. In addition, when a terminal obtains environmental sounds without requiring a user to record such sounds, and uses such sounds as a user input, a user may further be deemed to exercise a passive single effort. Within the scope of this disclosure, a "single effort" is defined to collectively include not only to an "active single effort" but also a "passive single effort" therein.

1-8. Multiple Quick Efforts

As defined in Section 1-7, a "user input" or a "single user input" means an input which a user provides to at least one input unit of a terminal by exercising a "single effort." However, a user may repeat an identical "quick effort" more than once to provide a certain user input, where examples of such repeated efforts may include quick double clicks, double taps, triple clicks, triple taps, or the like. By definition, such multiple clicks or taps are separated from each other by temporal gaps and, therefore, such quick clicks or quick taps may not qualify as a single user input.

In reality, however, a user repeats such multiple quick clicks (or taps) to provide a terminal with a single preset user input, and a terminal may recognize such multiple quick efforts as a single preset user input such that, e.g., a terminal receives a user input for running a $1^{st}$ operation in response to a single tap, but receives a different user input for running a $2^{nd}$ operation in response to double taps. In such cases, the "multiple quick efforts" are deemed to qualify as a "user input" or a "single user input" when a user repeats such efforts quickly, within a certain period of time such as 1.5, 1.0, 0.5, or 0.3 second. In addition, when a terminal may recognize a single user input when a user repeats such multiple efforts within 1.7, 2.0, 3.0 seconds, such multiple quick efforts are also deemed as a user input or a single user input, depending upon a control setting.

In contrary to such multiple quick clicks or taps which are repetitions of the same effort, multiple quick efforts may include different efforts exercised by a user, usually by using different body parts, by using different non-user objects, by applying different user inputs concurrently to different input units, or the like. For example, a user may manipulate a portion of a $1^{st}$ input unit once (e.g., a button), while speaking to a $2^{nd}$ input unit (e.g., a microphone) concurrently. Such touching and speaking can then qualify as a single user input, as far as the touching and speaking overlap in at least one common clock cycle. Even when a user touches the portion of the $1^{st}$ input unit and then speaks to the $2^{nd}$ input unit after a certain period (i.e., a temporal gap), such touching and speaking can also qualify as a single user input when the gap is less than 1.5, 1.0, 0.5, or 0.3 second.

In another example, a user may press a portion of a $3^{rd}$ input unit (e.g., a touch screen) once with a stylus (or a pointer), while staring at a $4^{th}$ input unit (e.g., a camera) concurrently. Such pressing and staring can qualify as a single user input as well. Even when a user presses the portion of the $3^{rd}$ input unit and then stares at the $4^{th}$ input unit after a certain period (i.e., a temporal gap), such pressing and staring may still qualify as a single user input when the gap is less than 1.5, 1.0, 0.5, or 0.3 second.

In yet another example, a user may exercise multiple efforts by repeating the same effort, while manipulating a static or dynamic feature of such efforts. Examples of such features may include, but not limited to, a length of the efforts, an extent (or strength) of the efforts, a direction thereof, a temporal gap between two neighboring efforts, a temporal overlap along two adjacent efforts, a number of the efforts, a sequence of the efforts, or the like. Therefore, while pressing a portion of an input unit, a user may press such a portion harder, may shift a direction of pressing, may repeat pressing without detaching a hand therefrom, or the like, thereby providing different and unique quick actions which a terminal may recognize as a different and unique single user input.

1-9. Multiple Concurrent User Inputs

Similar to the definition of the "concurrence" as provided in Section 1-3. "multiple concurrent user inputs" refer to those user inputs which are provided to a terminal by a user concurrently with each other, simultaneously with each other, or at the same time. Therefore, multiple concurrent user inputs [1] may be deemed as a "single user input" or [2] may cause the same result as the single user input, when the multiple user inputs are provided to a single or multiple input units in such a way that there exists at least one clock cycle of a processor of a terminal in which such multiple user inputs are provided to the terminal.

FIG. 1A of Section 1-3 may be utilized again to determine whether or not multiple user inputs may qualify as concurrent user inputs, by regarding various operations (or steps) shown FIG. 1A (e.g., $A_1$ and $A_2$, $B_1$ and $B_2$, $C_1$ and $C_2$, and $D_1$ to $D_3$) as individual user inputs. Then, in the panel (A), the user inputs, $A_1$ and $A_2$, qualify as the concurrent user inputs, for they overlap each other in two common clock cycles 009 and 010. Similarly, in the panel (B), the user inputs, $B_1$ and $B_2$, also qualify as the concurrent user inputs, for they overlap each other in a single common clock cycle 020.

In the panel (C), the user inputs, $C_1$ and $C_2$, qualify as the concurrent user input, for they overlap each other in the single common clock cycle 023, even though a user provides $C_2$ for a period which is extremely longer than that for $C_1$. In the panel (D), the user inputs, $D_1$ and $D_2$, qualify as the concurrent user inputs, and the user inputs, $D_2$ and $D_3$, also qualify as the concurrent user inputs. However, the user inputs, $D_1$ and $D_3$, do not qualify as the concurrent user inputs, for they are separated by a temporal gap which corresponds to the clock cycle 015.

Based upon such definitions, a user may provide multiple concurrent user inputs in various ways such as, e.g., [1] by providing multiple concurrent user inputs of the same type to a single input unit, [2] by providing multiple concurrent user inputs of the same type to at least two different input units, [3] by providing multiple concurrent user inputs of different types to a single input unit, [4] by providing multiple concurrent user inputs of different types to at least two different input units, or the like, where such user inputs may be one of the $1^{st}$, $2^{nd}$, $3^{rd}$, $4^{th}$, or $5^{th}$ type user input as described above. In addition, a user may provide such user inputs while employing one of the $1^{st}$ movement of a directional input unit, the $2^{nd}$ movement of such an input unit, the $3^{rd}$ movement with respect to such an input unit, or the $4^{th}$ movement with respect thereto. In other words, a user may provide such multiple concurrent user inputs as he or she sees fit, as long as a directional input unit or other input units allow such movement or maneuver of a user.

It is appreciated that a terminal may receive multiple user inputs not concurrently but sequentially, but may still concurrently acquire multiple (user) sub-inputs. For example, a user may detach his or her body part (or a non-user object) from a portion of a directional input unit after manipulating a $1^{st}$ portion of the input unit but before manipulating a $2^{nd}$ portion of the same or different input unit, thereby providing a $1^{st}$ user input and then, after a certain temporal gap, providing a $2^{nd}$ user input.

However, even when a terminal receives multiple sequential user inputs, a terminal may concurrently acquire multiple (user) sub-inputs therefrom, e.g., [1] when a terminal starts to acquire the (user) sub-inputs only when a terminal completes to receive all sequential user inputs, [2] when a terminal conditions acquisition of some (user) sub-inputs upon acquiring a certain (user) sub-input in a concurrent manner, or the like. Even though a terminal acquires multiple (user) sub-inputs concurrently, such user inputs are not deemed to be concurrent within the scope of this disclosure.

1-10. Simplified and Oversized User Inputs

As briefly discussed above, even when a user provides only a $1^{st}$ number of (user) sub-inputs, a terminal may be able to run a $2^{nd}$ number of operations during its powering on or waking up, where the $1^{st}$ and $2^{nd}$ numbers may not be necessarily identical to each other. In one example, a user may provide a single user input which may include $UI_{SEL}$ and one of $UI_{THEN}$ and $UI_{ACT}$. In response to such a user input, a terminal may then run such selecting, in addition to running both of such authenticating and turning on, e.g., by conditioning one of such authenticating or turning on upon the selecting, either concurrently or sequentially. In another example, a user may provide a single user input which includes only $UI_{SEL}$. However, a terminal may also run such selecting, turning on, and authenticating by conditioning both of such turning on and authenticating upon such selecting.

For simplicity of illustration, a user input exemplified in this paragraph is to be referred to as a "simplified user input" hereinafter in such a sense that a smaller number of (user) sub-inputs renders a terminal run a greater number of operations during or after powering on or waking up. This arrangement is generally beneficial to a user, for the user may render a terminal run all necessary operations necessary to power on or to wake up, by simply providing a user input which includes a reduced number of (user) sub-inputs. This arrangement is also beneficial to a manufacturer of terminal as well, for a manufacturer may cut down a manufacturing cost of a terminal by decreasing a number of hardware elements to be included in a terminal and may also fabricate a terminal in a more compact or portable configuration.

Conversely, even when a user provides a user input including therein a greater number of (user) sub-inputs, a terminal may run only a smaller number of operations during a powering on or waking up. In one example, a user may provide a single user input which includes all three of $UI_{SEL}$, $UI_{THEN}$, and $UI_{ACT}$, however, a terminal may perform only two of such selecting, authenticating, and turning on by conditioning one of such selecting or turning on upon such authenticating. That is, a terminal may be configured to forego and skip such turning on by [1] when a user fails the authenticating or [2] when a user provides $UI_{SEL}$ which is not listed in a matching list. In another example, a user may provide a single user input including all of $UI_{SEL}$, $UI_{THEN}$, and $UI_{ACT}$, however, a terminal may perform only one of such selecting, such authenticating, and such turning on by conditioning both of such selecting and such turning on upon such authenticating. That is, a terminal may not perform the selecting or turning on when a user fails the authenticating.

For illustration purposes, a user input exemplified in the preceding paragraph is referred to as an "oversized user input" hereinafter, in a sense that a greater number of (user) sub-inputs may cause a terminal to run a fewer number of operations during or after waking up. This arrangement is generally beneficial to a user, for the user may render a terminal run all necessary operations to wake up only when a certain condition is met, thereby reducing a chance of a false wake up, a chance of a false activation, or the like.

1-11. (User) Sub-Inputs

As used herein, a "(user) sub-input" or simply a "sub-input" is an element of a user input which causes an input unit to generate a "control signal." Therefore, a "(user) sub-input" or a "sub-input" is defined as a basic element of a user input. To acquire such (user) sub-inputs, an input unit includes at least one sensing element (i.e., a sensor), where configurational or operational characteristics of such a sensor may depend upon a nature of a (user) sub-input to monitor. Accordingly, when a $1^{st}$ input unit is to receive a mechanical, $1^{st}$ type user input, the $1^{st}$ input unit may preferably include a mechanical sensor capable of acquiring a mechanical (user) sub-input included in the user input. Alternatively, when a $2^{nd}$ input unit is to receive acoustic, $5^{th}$ type user input, the $2^{nd}$ input unit may preferably include an acoustic sensor capable of acquiring an acoustic (user) sub-input included in the user input.

A user input of this disclosure may include therein at least one of multiple (user) sub-inputs such as, e.g., [1] a selecting (user) sub-input ($UI_{SEL}$), [2] an activation (user) sub-input ($UI_{ACT}$), [3] an authentication (user) sub-input ($UI_{THEN}$), [4] a mode-switching (user) sub-input ($UI_{SWT}$), and [5] an auxiliary (user) sub-input ($UI_{AUX}$). In this context, when an input unit "receives a user input," it is presumed that a proper sensor (or a sensing element) of the input unit "acquires at least one (user) sub-input" from the user input.

In particular, when a user provides a user input to select an operation which is to be run by a terminal while or (immediately) after [1] switching from a powered-off state to a powered-on state or [2] switching from an off-state to an on-state, it is deemed that a user input includes $UI_{SEL}$, and that the user input may optionally include at least one of other (user) sub-inputs such as $UI_{ACT}$, $UI_{THEN}$, $UI_{SWT}$, and $UI_{AUX}$. Therefore, upon receiving (or in response to) a user input including $UI_{SEL}$, a terminal acquires $UI_{SEL}$ therefrom, and runs the selected operation which is selected from multiple pre-selected operations. As will be described below, however, a terminal may also run an operation which is not selected by a user while or (immediately after) one of the above [1] and [2] in response to a user input which does not include any $UI_{SEL}$ as well, e.g., when running the selected operation is conditioned upon other operations such as, an authentication operation, an activation operation, or the like.

It is appreciated that a user may preferably include a certain number of (user) sub-inputs in a single user input. In response to receiving such a user input or in response to acquiring such (user) sub-inputs, a terminal may run various operations. Therefore, a $1^{st}$ number of such (user) sub-inputs included in the user input is typically equal to a $2^{nd}$ number of operations which are to be run by a terminal in response to the user input.

It is appreciated, however, that the above $1^{st}$ number may not necessarily be the same as the above $2^{nd}$ number. In one case, a terminal may automatically run (or start to run) an authentication operation upon (or in response to) acquiring $UI_{SEL}$. In another case, a terminal may turn on (or start to turn on) a display unit in response (or upon) acquiring $UI_{SEL}$. In such cases, the $1^{st}$ number may be less than the $2^{nd}$ number. To the contrary, the $1^{st}$ number may be greater than the $2^{nd}$ number. In one case, a terminal may acquire $UI_{ACT}$, $UI_{THEN}$, and $UI_{SEL}$ from a single user input, and then may turn on a display unit and then run the selected operation only when a user passes the user authenticating. When a user fails the user authenticating, a terminal may stay in a powered-off state or in an off-state, without running any other operation. In this case, a terminal ends up running only one operation, despite acquiring three (user) sub-inputs.

It then follows that the above $1^{st}$ number may be equal to, greater than or less than the above $2^{nd}$ number. In addition, it then also follows that, even when the $1^{st}$ number is equal to the $2^{nd}$ number, the operations run by a terminal may not correspond to each of such (user) sub-inputs provided to a single or multiple input units.

1-11-1. Activation (User) Sub-Input ($UI_{ACT}$)

A $1^{st}$ of various exemplary (user) sub-inputs is [1] an "activation (user) sub-input ($UI_{ACT}$)," [2] an "activation sub-input ($UI_{ACT}$)," or [3] simply $UI_{ACT}$, all of which "activate" a terminal by causing the terminal to run an activation (or turning-on) operation and by causing the terminal to turn on its display unit in response to (receiving) the user input or to (acquiring) $UI_{ACT}$. For simplicity of illustration, an input unit for receiving a user input including $UI_{ACT}$ therein is to be referred to as an "activation input unit" hereinafter, whereas a sensor of such an activation input unit is to be referred to as an "activation sensor" hereinafter. It is appreciated that a terminal may include a (main) input unit and a separate activation input unit or that a single input unit may serve as receiving the user input including $UI_{ACT}$ and at least one more (user) sub-input.

When a terminal includes multiple display units, $UI_{ACT}$ may cause a terminal to turn on at least one or all display units. Because a terminal executes (or starts to execute) at least one unexecuted (or remaining) step of an operation of turning on a display unit once acquiring $UI_{ACT}$, the terminal (more particularly, a CPU unit, an O/S, or a software application) may neither run an activation operation nor turn on a display unit without $UI_{ACT}$.

An activation input unit may use any conventional activation sensor which can generate a control signal which in turn can be recognized by a terminal as $UI_{ACT}$ and which can cause a terminal to run an activation operation. Accordingly, the activation input unit may operate mechanically, electrically, optically or magnetically, while generating a mechanical, electrical, optical or magnetic control signal with its activation sensor in response to $UI_{ACT}$. It is appreciated that a terminal does not always require $UI_{ACT}$ to run an activation operation and to turn on a display unit, for an activation operation may be conditioned upon other operations. For example, a terminal may turn on a display unit whenever a user passes user authenticating, regardless of whether or not an input unit has received a user input including $UI_{ACT}$.

A user may provide $UI_{ACT}$ in various timings such as, e.g., [1] concurrently with at least one of $UI_{SEL}$, $UI_{THEN}$, $UI_{SWT}$, and $UI_{AUX}$, [2] when providing a single concurrent user input (e.g., by manipulating a single input unit or multiple input units concurrently), [3] when providing multiple non-concurrent user inputs (e.g., by sequentially manipulating multiple input units or by sequentially manipulating different portions of an input unit), or the like. A user may concurrently provide $UI_{ACT}$ along with at least one of $UI_{SWT}$, $UI_{SEL}$ or $UI_{THEN}$, e.g., by concurrently manipulating [1] a single input unit, [2] multiple input units, or [3] at least two parts of a single input unit.

1-11-2. Authentication (User) Sub-Input ($UI_{THEN}$)

A $2^{nd}$ exemplary (user) sub-input is [1] an "authentication (user) sub-input ($UI_{THEN}$)," [2] an "authentication sub-input ($UI_{THEN}$)" or [3] simply $UI_{THEN}$, all of which "authenticate" a user by causing a terminal to run at least one authentication operation in response to [1] (receiving) a user input or [2] (acquiring) $UI_{THEN}$. For simplicity of illustration, an input unit capable of receiving a user input which includes $UI_{THEN}$ therein is to be referred to as an "authentication input unit" hereinafter, while a sensor of the authentication input unit is to be referred to as an "authentication sensor" hereinafter. It is appreciated that a terminal may include a (main) input unit and a separate authentication input unit or that a single input unit may serve as receiving a user input including $UI_{THEN}$ and at least one more (user) sub-input.

When a terminal includes multiple input units assigned to user authentication, $UI_{THEN}$ may cause a terminal to drive at least one (or all) of such input units. Because the terminal executes (or starts to execute) at least one unexecuted (or remaining step) of an authentication operation once acquiring $UI_{THEN}$, the terminal (i.e., a CPU unit, an O/S, or a software application) may not run any authentication operation without $UI_{THEN}$.

An authentication input unit may employ any conventional authentication sensor which can generate a control signal which in turn can be recognized by a terminal as $UI_{THEN}$ and which can cause a terminal to run at least one authentication operation. Accordingly, the authentication input unit may operate mechanically, electrically, optically or magnetically, while generating various mechanical, electrical, optical or magnetic control signals with its authentication sensor in response to $UI_{THEN}$. It is appreciated that a terminal does not always require $UI_{THEN}$ to run an authentication operation, particularly when an authentication operation is conditioned upon other operations. For example, even when a terminal does not receive a user input including $UI_{THEN}$ therein, the terminal may run an authentication operation and authenticate a current user, [1] whenever a terminal is to switch states or modes in response to acquiring $UI_{SWT}$, [2] whenever a user attempts to switch to a new mode or to a new state, [3] following a preset execution sequence of an O/S or a software application, or the like.

A terminal may use various user-related or user-irrelevant information as $UI_{THEN}$. For example, $UI_{THEN}$ may be, may correspond to, or may accompany at least one of following "biometric information" of a user such as, e.g., [1] an image of a body part (e.g., a fingerprint, a hand, a palm, a wrist, an iris, a retina, an eye, an ear, a nose, a face, another body part, blood vessels, a distribution pattern of such vessels, a blood flow rate, a blood flow pattern, or the like), [2] electrical (including resistive, conductive, or capacitive) signals representing or related to biometric information of a user, [3] optical or magnetic signals representing or related to biometric information of a user, [4] a user sound (including a voice, a finger snap, or a clap) or other sounds related to such biometric information, or [5] physiological features (e.g., body temperature, blood pressure, an ECG, a heart rate, other cardiovascular features, a breathing rate, breathing sound, other respiratory features, gastrointestinal features such as a movement of stomach or intestines, an EMG, an EEG, or other skeletal or muscular features). In addition, $UI_{THEN}$ may be, may correspond to, or may accompany at least one of the following "dynamic biometric information" of a user such as, e.g., [1] a displacement or a movement of a body part, [2] a velocity thereof, [3] an acceleration, [4] its position in a 2-D plane or in a 3-D space, [5] a gesture of a body part, or the like.

A terminal may use non-biometric information as $UI_{THEN}$ as well. For example, $UI_{THEN}$ may be, may correspond to, or may accompany information regarding a password or a pass code, a non-user image, a non-user sound, a non-user light, non-user acoustic or electromagnetic waves, or the like. A terminal may also use its own static or dynamic feature as $UI_{THEN}$. For example, a terminal may monitor a displacement or a movement of its part, its velocity or an acceleration, its position, a number of movements, a sequence of the movements, a duration of the movements, its orientation (e.g., facing up or down, tilted at an angle, or the like), or any other related information, and use such features as $UI_{THEN}$, and authenticate a user based thereon. As far as there exists mutual agreement between a terminal and a user, any information may be recruited as $UI_{THEN}$.

A user may provide $UI_{THEN}$ through various manipulations such as, e.g., [1] by manipulating a single portion of an authentication input unit, [2] by manipulating multiple portions of a single authentication input unit, or [3] by manipulating at least two portions of at least two authentication input units, where such manipulating in [2] or [3] may be concurrent, sequential or a combination thereof. A user may provide $UI_{THEN}$ in various timings such as, e.g., concurrently with [1] providing either $UI_{SEL}$ or $UI_{ACT}$, [2] providing both of $UI_{SEL}$ and $UI_{ACT}$, [3] providing all of such $UI_{SEL}$, $UI_{ACT}$, and $UI_{SWT}$, or the like. To this end, a user may [1] include multiple (user) sub-inputs into a single user input and provide that user input to a single input unit, [2] include multiple (user) sub-inputs into multiple user inputs and provide the user inputs to a single input unit either concurrently or sequentially, [3] include multiple sub-inputs in multiple user inputs and provide them to multiple input units either concurrently or sequentially, or the like.

A user may exercise an "active single effort" by performing a voluntary action to provide $UI_{THEN}$ to an input unit, where examples of such voluntary actions may include [1] swiping a finger over an authentication input unit or pressing such an input unit with a finger to provide $UI_{THEN}$ about a fingerprint, [2] staring at a camera to provide $UI_{THEN}$ about an image of an iris, a retina, or a face, [3] talking to a microphone to provide $UI_{THEN}$ about a user's voice, or the like. A user may exercise "multiple active quick efforts" by performing multiple voluntary actions to provide $UI_{THEN}$ as well.

In the alternative, a terminal may acquire at least one $UI_{THEN}$ on its own without necessarily requiring a user to take an active action. Accordingly, a terminal may take an image of an eye of a user, may obtain a user voice, or may record environmental sounds, and then acquire $UI_{THEN}$ from the image, voice, or sounds, regardless of whether or not [1] a user voluntarily stares at a camera, [2] a user speaks only to a terminal, without talking to a $3^{rd}$ person on the other line, or the like. In such cases, a user may be deemed to exercise a "passive single effort" by performing an involuntary action to provide $UI_{THEN}$ to an input unit Once an input unit of a terminal receives a (single) user input from a user, a sensor of the input unit acquires $UI_{THEN}$ therefrom. In response thereto, a terminal (i.e., its processor, its O/S or its software application) may then start to execute program codes of an authentication application, and determines whether or not a current user may pass the user authenticating. More particularly, a terminal may (1) execute "comparing steps" of the authentication application by comparing $UI_{THEN}$ with biometric information of a user which is pre-stored in the terminal, and (2) execute "determining steps" of the authentication application by determining whether a current user passes (i.e., a "pass") or fails (i.e., a "fail") the user authenticating.

1-11-3. Selecting (User) Sub-Input ($UI_{SEL}$)

A $3^{rd}$ exemplary (user) sub-input is [1] a "selecting (user) sub-input ($UI_{SEL}$)," [2] a "selecting sub-input ($UI_{SEL}$)" or [3] simply $UI_{SEL}$, all of which cause a terminal to "select" at least one operation from a set of multiple pre-selected operations. Upon acquiring $UI_{SEL}$, a terminal (i.e., a CPU member, an O/S, or a software application) may locate or may identify at least one operation (i.e., "selects") from a set of multiple pre-selected operations based upon $UI_{SEL}$, where a user desires a terminal to run the selected operation upon or (immediately) after a terminal may switch [1] from a powered-off state to a powered-on state or [2] from an off-state to an on-state. Because a terminal may execute (or start to execute) at least one unexecuted (or remaining) step of a selecting operation once acquiring $UI_{SEL}$, a terminal may not run any selecting operation without $UI_{SEL}$.

For simplicity of illustration, an input unit capable of receiving a user input which includes $UI_{SEL}$ therein is to be referred to as a "selecting input unit" hereinafter, while a sensor of the selecting input unit is to be referred to as a "selecting sensor" hereinafter. It is appreciated that a terminal may include a (main) input unit as well as a separate selecting input unit, or that a single input unit may serve as receiving the user input including $UI_{SEL}$ and at least one more (user) sub-input.

A terminal selects the selected operation based on $UI_{SEL}$ by referring to a "matching list" which includes all pre-selected operations which have been pre-selected by a user or by a terminal. More particularly and as used herein, a "matching list" means a database which may include [1] a list of matchings (or assignments) between multiple pre-selected operations and multiple $UI_{SEL}$'s, or [2] another list of matchings (or assignments) between multiple $UI_{SEL}$'s and multiple control signals. In other words, once a terminal acquires $UI_{SEL}$ from a user input, a terminal may identify [1] at least one pre-selected operation which matches the acquired $UI_{SEL}$, or [2] at least one control signal which matches the acquired $UI_{SEL}$.

That is, upon acquiring $UI_{SEL}$, a terminal matches the acquired $UI_{SEL}$ with each of such pre-selected operations, and then locates at least one pre-selected operation which matches $UI_{SEL}$. Because $UI_{SEL}$'s and pre-selected operations are already listed in the matching list, a step of selecting a correct entry (i.e., at least one pre-selected operation which is intended by a user to run while or after a terminal powers on or wakes up) from the matching list based on another entry (i.e., one of $UI_{SEL}$'s provided by a user and acquired by an input unit) amounts to a simple matching step or a locating step. Accordingly, the step of selecting a correct entry from the matching list which is filled only with existing information may be different from determining or deciding steps which are typically involved in, e.g., an authentication operation where a terminal compares pre-stored authentication information with $UI_{THEN}$ which is provided by a user, [1] for $UI_{THEN}$ may not be a correct sub-input, [2] for $UI_{THEN}$ may not match pre-existing authentication information stored in a terminal, or the like.

A user may provide different selecting (user) sub-inputs ($UI_{SEL}$'s) by manipulating, e.g., [1] a type, a nature or a pattern of a "$1^{st}$ movement" of at least one (movable) portion of a directional input unit, [2] a type, a nature or a pattern of a "$2^{nd}$ movement" of at least one body part of a user with respect to at least one portion of such a directional input unit, while a user maintains a mechanical, electrical, magnetic or optical contact between his or her body part and the portion of the directional input unit, [3] a type, a nature or a pattern of a "$3^{rd}$ movement" of at least one non-user object with respect to at least one portion of the directional input unit, while maintaining a mechanical, electrical, magnetic or optical contact between the non-user object and the portion of such an input unit, [4] a type, a nature or a pattern of a "$4^{th}$ movement" of at least one body part or non-user object with respect to at least one portion of a directional input unit, where such a body part or non-user object is positioned away from a directional input unit at a certain distance, or the like. In addition, a terminal may acquire $UI_{SEL}$ from [1] an extent, a magnitude or an amplitude of at least one of the $1^{st}$, $2^{nd}$, $3^{rd}$ or $4^{th}$ movement as described above, [2] a direction of at least one of the $1^{st}$, $2^{nd}$, $3^{rd}$ or $4^{th}$ movement, [3] a sequence of at least two of such movements where such two movements may be different from each other or may be a repetition of the same movement, [4] any static or dynamic feature of such movements or those features related to such movements, or the like.

A user may provide $UI_{SEL}$ to a directional input unit with a single user input which may optionally include other (user) sub-inputs. Alternatively, a user may provide such $UI_{SEL}$ to a directional input unit by supplying multiple concurrent or sequential user inputs to a single portion of a directional input unit or to multiple portions of the same input unit, where at least one of the user inputs may accompany $UI_{SEL}$ therein. Alternatively, a user may provide $UI_{SEL}$ to a directional input unit while supplying multiple concurrent or sequential user inputs to multiple input units, where at least one of the user inputs includes $UI_{SEL}$ therein, and where a directional input unit may receive the user input including $UI_{SEL}$. When a user provides multiple concurrent user inputs, it may not matter into which user input $UI_{SEL}$ is to be included, for a terminal can acquire not only $UI_{SEL}$ but also another (user) sub-input concurrently with each other. However, when a user provides multiple sequential user inputs, a user may include $UI_{SEL}$ into a $1^{st}$ user input in order to guarantee seamless operations.

Upon or (immediately) after acquiring $UI_{SEL}$, a proper input unit (such as a directional input unit of this disclosure) may generate a control signal and send the signal to a terminal. The terminal may then run (or starts to run) a "selecting operation" while or (immediately) after a terminal may power on or may wake up. Although a terminal typically requires $UI_{SEL}$ to select an operation intended by a user from a set of multiple pre-selected operations while (or immediately) after powering up or waking up, a terminal does not always require $UI_{SEL}$ to select the intended operation, particularly when a terminal may guess a user's intention using various prior art algorithms based on, e.g., big data, artificial intelligence, or the like.

1-11-4. Mode-Switching (User) Sub-Input ($UI_{SWT}$)

A $4^{th}$ exemplary (user) sub-input is [1] a "mode-switching (user) sub-input ($UI_{SWT}$)," [2] a "mode-switching sub-input ($UI_{SWT}$)" or [3] simply $UI_{SWT}$, all of which "switch" a mode of operation by causing a terminal [1] to advance to one mode from an off-state or a powered-off state, or [2] to switch from a current mode to a new mode in response [1] to (receiving) a user input or [2] to (acquiring) $UI_{SWT}$. Because a terminal may execute (or start to execute) at least one unexecuted (or remaining) step of a mode-switching operation once acquiring $UI_{SWT}$, a terminal (more particularly, a CPU member, an O/S, or a software application) may not run any mode-switching operation without $UI_{SWT}$.

It is appreciated that an input unit capable of receiving a user input including $UI_{SWT}$ therein is referred to as a "mode-switching input unit" hereinafter, while a sensor of the mode-switching input unit is to be referred to as a "mode-switching sensor" hereinafter. In addition, to "switch modes" or "mode switching" collectively refers to any of the following mode switching such as, e.g., [1] to "advance" to a certain state or mode from its "powered-off state," [2] to "advance" to a certain state or mode from its "off-state," [3] to "switch" from a current mode to a new mode while in an "on-state" (i.e., when a terminal is communicable and not completely powered off, and a display unit is or has been turned on), [4] to "advance" to an off-state from one mode (i.e., in the on-state), or [5] to "advance" to a powered-off state from one mode (i.e., in the on-state).

A user may provide $UI_{SWT}$ to a mode-switching input unit with a single user input which may optionally include other (user) sub-inputs therein. Alternatively, a user may provide $UI_{SWT}$ to an input unit while supplying multiple concurrent or sequential user inputs to one portion of the input unit or to multiple portions of the same input unit, where at least one of the user inputs may include $UI_{SWT}$ therein. Alternatively, a user may provide $UI_{SWT}$ concurrently or sequentially to multiple input units, where at least one of such user inputs includes $UI_{SWT}$ and where at least one of the input units serves as a mode-switching input unit. When a user provides multiple concurrent user inputs, it does not matter in which user input $UI_{SWT}$ is to be included, for a terminal can acquire not only $UI_{SWT}$ but also another sub-input concurrently with each other. However, when a user provides multiple user inputs sequentially, a user may include $UI_{SWT}$ in a $1^{st}$ user input, particularly when a user desires to seamlessly switch modes along with, e.g., turning on a display unit, running user authenticating, or the like.

Upon or after acquiring $UI_{SWT}$, an mode-switching sensor of the input unit may generate a control signal and send the control signal to another unit of the terminal. The terminal may execute (or start to execute) at least one remaining (or unexecuted) step of the above selecting step, and may run (or start to run) the remaining steps of a "mode-switching operation."

1-12. Run an Operation

It is a terminal [1] which "drives" various hardware or software element and [2] which "runs" various operations. More particularly, driving an O/S, at least one (software) application, or a CPU member of a terminal leads to running at least one operation. For simplicity of illustration, "an O/S, a (software) application, or a CPU member of a terminal" is to be referred to as a "terminal" in this disclosure. Accordingly, a terminal may run an operation by driving at least one portion of a CPU member, an O/S, or a (software) application. Similarly, a phrase "run an operation" is synonymous with "run at least one operation" or "run at least one pre-determined operation."

To "run an operation" typically includes therein at least one of multiple steps such as, e.g., [1] at least one step of retrieving data which have been pre-stored in a terminal, [2] at least one step of retrieving a system setting or a user preference related to running an operation, [3] at least one step of preparing at least one hardware element ready to run an operation (e.g., erasing a volatile or non-volatile memory unit, getting electrical power supply ready, or the like), [4] at least one step of supplying electrical power to a hardware element, [5] at least one step of driving the element (e.g., manipulating a hardware element or executing computer instructions of a software element to perform a function), [6] at least one step of storing data obtained from driving the element, [7] at least one step of storing, utilizing, or erasing results obtained from such driving, or the like.

To this end, a terminal may employ one or more arrangements such as, e.g., [1] a terminal may retrieve data (or results) from a memory unit, [2] a terminal may clear a memory unit before driving a hardware or software element, [3] a terminal may supply electrical power to at least one hardware element, thereby rendering the element ready to run an operation, [4] a terminal may drive at least one software element [4-1] by executing a set of computer instructions or [4-2] by dividing the computer instructions to two or more sections and executing such sections sequentially, concurrently or in a combination thereof, or the like. Regardless of such differences, an "operation" may be deemed to "have not been completed" as far as a terminal may not proceed to execute any unexecuted or remaining steps of a (software) application which are required to "run" a certain operation.

Once receiving a user input or in response to the user input, a terminal may drive (or start to drive) at least one hardware or software element, and may run (or start to run) at least one operation. Alternatively, a terminal may drive at least one $1^{st}$ hardware or software element in response to receiving a $1^{st}$ user input, and may then run a $2^{nd}$ operation automatically (or on its own), even without receiving a $2^{nd}$ user input to run the $2^{nd}$ operation, where an example may include a terminal which drives a $2^{nd}$ element and runs a $2^{nd}$ operation upon obtaining a certain outcome from running a $1^{st}$ operation with a $1^{st}$ element. This arrangement is referred to as driving a $2^{nd}$ element and running a $2^{nd}$ operation "conditioned upon" driving a $1^{st}$ element and running a $1^{st}$ operation.

In this disclosure, a terminal may drive a hardware or software element [1] upon receiving (or in response to) a user input and/or [2] in response to (or upon) acquiring at least one (user) sub-input. For example, a terminal may [1] "run a selecting operation" in response to $UI_{SEL}$, [2] "run an activation operation" in response to $UI_{ACT}$, [3] "run an authentication operation" in response to $UI_{THEN}$, [4] "run a mode-switching operation" in response to $UI_{SWT}$, or the like. Because a single user input may include more than one (user) sub-input, a terminal may also drive multiple elements, and may run multiple operations upon receiving (or in response to) a single user input, where such multiple elements or operations may be identical to or different from each other.

1-12-1. Run an Activation Operation

As used herein, an "activation operation" means an operation to switch (or to start to switch) a terminal from an off-state to an on-state. Accordingly, an "activation operation" also means an operation to switch (or to start to switch) a display unit from an off-state to an on-state, and is synonymous with [1] an "operation of turning on a display unit" while (or when) a display unit is (or has been) turned off, or [2] an "operation of switching a display unit from an off state to an on state."

By the same token and as used herein, to "run an activation operation" is synonymous with to "run an operation of turning on a display unit" while (or when) a display unit is (or has been) turned off. Thus, to run an activation operation is synonymous with "turning on a display unit" or simply "turning on."

"Running an activation operation" or "turning on a display unit" may include one or more of multiple steps such as, e.g., [1] at least one step of acquiring $UI_{ACT}$ along with other (user) sub-inputs when desirable, [2] closing an electrical switch of a display unit or otherwise rendering the display unit ready to be turned on, [3] supplying electric current to a display unit, or the like. Because a display unit has to display something once being turned on, "running an activation operation" or "turning on" may also include one of [4] selecting a default screen to be displayed on a display unit when a display unit is turned on from an off-state, [5] displaying a new screen on a display unit or replacing or overlaying a current screen with a new screen when a display unit has been turned on, or the like.

A terminal may also employ different arrangements for providing such screens. For example, a terminal may [1] render a screen ready while a display unit is turned off so that a display unit displays a pre-selected screen concurrently with (or immediately after) being turned on, [2] select a certain screen to be displayed on a display unit only after acquiring $UI_{ACT}$, [3] receive a screen to be displayed from an external device or source (such as, e.g., a website or a cloud), [4] change the screen randomly or in a certain order, or the like.

Regardless of the differences in detailed configurations, however, an "activation operation" is deemed to have not been completed while (or as long as) a display unit remains (or is) turned off. In other words, one or multiple unexecuted (or remaining) steps of an "activation operation" have not been executed while (or as long as) a display unit is or remains turned off. Therefore, while a display unit is in its off state (i.e., remains turned off), an "activation operation" and a "turning on" is deemed to have not been completed.

A terminal may synchronize "timings" between such turning on and other operations to be run by the terminal. Such timings related to turning on a display unit are referred to as "turning-on timings" hereinafter. Examples of such turning-on timings may include running an activation operation [1] "concurrently with" receiving a user input including $UI_{ACT}$ therein; [2] "concurrently with" receiving another user input which does not include $UI_{ACT}$ therein; [3] "immediately after" receiving the user input of [1] or [2], where the "immediately" is defined above, [4] after receiving the user input of [1] or [2] but "before" a user provides another user input, [5] concurrently with running an authentication operation (e.g., upon determining whether a user passes such authenticating), [6] immediately after running an authentication operation, or the like.

1-12-2. Run an Authentication Operation

As used herein, to "run at least one authentication operation" or simply to "run an authentication operation" is synonymous with "user authenticating" or "authenticating" hereinafter. As also used herein, an "authentication operation" refers to an operation with which a terminal checks or determines [1] whether or not a current user is an authorized user, [2] whether or not a current user may have access authority to drive a certain hardware or software element of a main system of a terminal, [3] whether or not a current user may run a certain operation, [4] whether or not a current user may use certain options while driving a certain hardware or software element, or the like. To this end, a terminal compares acquired $UI_{THEN}$ of a current user with authentication information which has been stored in the terminal (i.e., a pre-stored $UI_{THEN}$).

"Running an authentication operation" or "authenticating" may typically include therein at least one of multiple steps such as, e.g., [1] at least one step of getting an authentication input unit and its authentication sensor ready, [2] at least one step of receiving a user input using the input unit, [3] at least one step of acquiring $UI_{THEN}$ from the user input using the authentication sensor, [4] at least one step of "comparing" the acquired $UI_{THEN}$ with the pre-stored $UI_{THEN}$ or other authentication information [5] at least one step of "determining" whether a user passes (i.e., a "pass") or fails (i.e., a "fail") the user authenticating, [6] at least one step of terminating an authentication operation, or the like. When desirable, such "authenticating" may also include at least one step of temporarily or permanently storing results" involved in the above steps [1] to [6] in an available memory unit. For example, a terminal may store [1] the acquired $UI_{THEN}$, [2] differences between the acquired $UI_{THEN}$ and pre-stored $UI_{THEN}$, or [3] an outcome such as the "pass" or the "fail", where such [1] to [3] may be in the form of texts, files, or folders, and where such [1] to [3] are to be collectively referred to as "results" as defined above.

A terminal may run only a single authentication operation or may instead run multiple different authentication operations either concurrently or sequentially. A terminal may include multiple authentication sensors to run a fingerprint authentication operation, a face authentication operation, a hand (or palm) authentication operation, an iris (or retina) authentication operation, a voice authentication operation, an authentication operation based on a pattern of a blood vessel(s) or other physiological features, or the like.

A terminal may employ different arrangements to run authentication operations such that, e.g., a terminal may [1] render at least one authentication sensor ready when a terminal turns (or starts to turn) on a display unit, [2] render (or start to render) the authentication sensor ready while a display unit remains turned off, [3] render the authentication sensor ready upon (or in response to) acquiring $UI_{THEN}$ or another sub-input, [4] render the authentication sensor ready only after acquiring $UI_{THEN}$, or the like. A terminal may then use $UI_{THEN}$ for the user authenticating or may extract other information for authenticating from the user input.

Regardless of such differences in detailed arrangements, however, an "authentication operation" is deemed to have not been completed until [1] a terminal receives a user input, [2] a terminal acquires $UI_{THEN}$, [3] a terminal acquires another (user) sub-input, or the like. In addition, when a terminal is to run an authentication operation concurrently with turning on a display unit, an "authentication operation" is deemed to have not been completed [4] as long as a display unit remains turned off. That is, at least one unexecuted (or remaining) step of an authentication operation may not be executed at all [1] until a terminal receives a user input or acquires $UI_{THEN}$ (or other sub-inputs), [2] while a display unit remains turned off, or the like. Therefore, until a terminal acquires $UI_{THEN}$ (or other sub-inputs) or while a display unit remains turned off, an authentication operation is deemed to have not been completed.

Once acquiring $UI_{THEN}$, a terminal executes (or starts to execute) at least one unexecuted (or remaining) step of an authentication operation so that a terminal may run at least one authentication operation which has not been completed. As a result, execution of such steps may lead to performing at least one specific function which is assigned to the authentication operation.

Various biometric or non-biometric information may be used as $UI_{THEN}$. Examples of such biometric information which may be used as $UI_{THEN}$ may include an image of a body part (e.g., a fingerprint, a hand, a palm, a wrist, an iris, a retina, an eye, an ear, a nose, a face, other body parts, blood vessels, or their distribution pattern) which may be captured by various image acquisition units of a terminal such as, e.g., a camera or a scanner. Further examples of such biometric information may include electric or magnetic features related to the body part, where a pattern of electrical conductance of a body part is one example, and where further details thereof have been described above.

Other examples of the biometric information may include, e.g., a sound (including a voice of a user or that of a non-user), various physiological features of a user (or a non-user) such as, e.g., cardiovascular features (an average blood pressure, a blood pressure measured at a certain location, or a heart rate), respiratory features (a breathing rate, or a breathing sound), gastrointestinal features (a movement of stomach or intestines, or the like), other physiological features of a user, or a user's other physiological conditions. A terminal may also incorporate various conventional sensors to monitor the above biometric information such as, e.g., a pressure sensor, a thermometer, or a flow rate sensor.

Other examples of biometric information may also include user's dynamic biometric information such as, e.g., a displacement (or a movement of) a body part, a velocity thereof, its acceleration, its position in a 2-D plane or a 3-D space, a gesture, or the like. In addition, other conventional non-biometric information may be used for authenticating a current user, where examples of such non-biometric information may include, but not limited to, a password, a pass code, a pass gesture, a movement pattern, or the like.

1-12-3. Run a Selecting Operation

As used herein, to "run at least one selecting operation" or simply to "run a selecting operation" is synonymous with "selecting an operation" or "selecting" hereinafter. In addition, such "selecting" refers to an operation [1] with which a terminal checks whether or not an acquired $UI_{SEL}$ is one of pre-selected $UI_{SEL}$'s (e.g., whether or not the acquired $UI_{SEL}$ is listed in a column or a low of a matching list), [2] in which a terminal locates at least one operation from a matching list (e.g., identify a selected operation as the one which matches the acquired $UI_{SEL}$), or the like. When a terminal identifies which one of such multiple pre-selected operations is the selected operation, a terminal then runs the selected operation while or (immediately) after powering on or waking up.

It is appreciated that to "run at least one selecting operation" or simply to "run a selecting operation" as defined in the preceding paragraph is different from to "run at least one selected operation" or simply to "run a selected operation" in their meanings as well as in their timings. First of all, the purpose of running a selecting operation is to select at least one operation which a user desires a terminal to run while or (immediately) after powering on or waking up, whereas the purpose of running a selected operation is to perform a specific function which can be attained from such running. In addition, because a terminal can run a selected operation only after the same terminal has already completed to run a selecting operation, a terminal can only run a selecting operation first, and then can run a selected operation. Details of such selecting is provided in the following Section.

A terminal may run a selecting operation in various timings, particularly with respect to [1] running an activation operation or [2] running an authentication operation. As a result, a terminal can run a selecting operation in one of various "selecting timings" examples of which may include [1] "concurrently with" receiving a user input which includes $UI_{SEL}$ therein, [2] "concurrently with" receiving a user input which does not include $UI_{SEL}$, [3] "concurrently with" acquiring $UI_{SEL}$, [4] "immediately after" such receiving or acquiring of the [1], [2], or [3] of this paragraph, where the "immediately" has been defined above, [5] after such receiving or acquiring of the [1], [2], or [3] of this paragraph, but "before" a user provides another user input, [6] within a certain period of time after such receiving or acquiring of the [1], [2], or [3] of this paragraph, [7] concurrently with, (immediately) after, or within a certain period of time after turning on a display unit, [8] concurrently with, (immediately) after, or within a certain period of time after running an authentication operation, [9] concurrently with, (immediately) after, or within a certain period of time after a terminal switches from a powered-off state to a powered-on state (i.e., powering on), concurrently with, (immediately) after, or within a certain period of time after a terminal switches from an off-state to an on-state (i.e., waking up), or the like.

"Running a selecting operation" or "selecting" is generally preceded by the steps of receiving a user input and acquiring $UI_{SEL}$ therefrom. As a result, such selecting may typically include at least one of following steps such as, e.g., [1] at least one step of receiving a user input with a proper input unit, [2] at least one step of acquiring $UI_{SEL}$ from the user input using a selecting sensor, [3] at least one step of locating a memory unit (or sector) in which a matching list is stored, [4] at least one step of "identifying" whether or not the acquired $UI_{SEL}$ is listed in the matching list, [5] at least one step of "selecting" which one of multiple pre-stored operations matches the acquired $UI_{SEL}$, [6] at least one step of notifying a user which $UI_{SEL}$ he or she has provided, [7] at least one step of notifying a user whether or not the acquired $UI_{SEL}$ is a qualified selecting sub-input, or the like. When desirable, such "selecting" may also include at least one step of temporarily or permanently storing "results" involved in the above steps [1] to [7] in an available memory unit.

From time to time, a user may make a mistake of providing a terminal with $UI_{SEL}$ which cannot be recognized by a terminal. An example of this case is when a user selects and provides a certain $UI_{SEL}$ which is not listed in a matching list which includes a set of multiple pre-selected operations. This "selection failure" may happen [1] when a terminal fails to acquire $UI_{SEL}$ at all due to a short contact time, [2] when a terminal receives a user input which, however, does not include $UI_{SEL}$ which is listed in the matching list, or the like.

When this selection failure happens, a terminal [1] may keep a display unit turned off when the display unit has been turned off, [2] may turn off a display unit when the display unit has been turned on, [3] may turn on a display unit in a lock mode when the display unit has been turned off, [4] may keep a display unit turned on but stay in a lock mode when the display unit has been turned on and when a terminal has been in a lock mode, or [5] may keep a display unit turned on but also switch itself to a lock mode when a display unit has been turned on and when a terminal has been in an unlock mode.

When a selection failure happens but a user passes the authentication, a terminal [1] may turn on a display unit in an unlock mode or may switch to an unlock mode so that a user may select which operation to run from multiple GUIs displayed on a display unit, or [2] may keep a display unit turned on in an unlock mode when the display unit is (or has been) turned on. A terminal may optionally [1] drive a notice unit for providing a visual notice signal of asking a user to supply another $UI_{SEL}$, [2] display a lock screen such that a user may select which operation to run in a lock mode when the lock mode allows a user to select a limited number of operations (e.g., when a terminal displays a few or several GUIs on a lock screen in a lock mode), [3] display a home screen so that a user may select which operation to run in an unlock mode from a menu of icons, or the like. In the alternative, a terminal may do nothing [1] while keeping its display unit turned off, [2] while keeping a display unit turned on, [3] while keeping a display unit turned on and displaying a lock (or home) screen thereon, or the like.

When a terminal is in a powered-on state but a display unit is (or has been) in its off-state, a terminal may turn on a display unit concurrently with or (immediately) after starting to run a selecting operation. In addition, a terminal may also run an authentication operation while keeping a display unit turned off or turning on such a display unit. Alternatively, a terminal may keep its display unit turned off while running a selecting operation. In the latter arrangement, a terminal may turn on a display unit when a terminal finishes running a selecting operation. As a result, a user may feel that [1] a terminal turns on and starts to run an operation which he or she desires to run or [2] a terminal starts to run or finishes running a selecting operation and then a display unit is turned on.

Therefore, the terminal may not require any $UI_{ACT}$ to turn on a display unit, for such turning on is conditioned upon results obtained from running a selecting operation. In other words, the terminal may only require $UI_{SEL}$ not only to turn on a display unit but also to run a selecting operation. As a result, a user input including only a single (user) sub-input, $UI_{SEL}$, may be sufficient for a terminal to not only run such a selecting operation to but also turn on its display unit. Details of such arrangements are provided below.

1-12-4. Run a Selected Operation

In running a selecting operation, a terminal matches the acquired $UI_{SEL}$ with multiple pre-selected operations which is listed in a matching list. In finding a match, a terminal determines which operation a user intends to run while or (immediately) after a terminal powers on or wakes up. To this end, a user (or a terminal) may "select in advance" (i.e., "pre-select") a set of multiple operations which a terminal can run by driving at least one hardware or software element. As used herein, such operations listed in the matching list are referred to as "pre-selected multiple operations" or simply "pre-selected operations" hereinafter. It is appreciated that such matching between multiple (user) sub-inputs (i.e., $UI_{SEL}$'s) and multiple pre-selected operations may be a 1-to-1, m-to-1, 1-to-n, or m-to-n matching.

It is needless to mention that such pre-selected operations are those which a terminal may run using various hardware or software elements incorporated thereinto or using other hardware or software elements included in an external device (including an add-on, portable, or wearable device) which in turn may releasably couple with a terminal. Therefore, a user can pre-select virtually any operations which a terminal can run and put such pre-selected operations into such a set of multiple pre-selected operations, into a matching list, or the like. Once a user (or a terminal) selects at least one entry from a matching list which includes multiple pre-selected operations, the operation selected in such a way according to $UI_{SEL}$ is referred to as a "selected operation" hereinafter. In other words, a selected operation is the one included in the matching list and selected form the matching list based upon $UI_{SEL}$ which is provided by a user through a (selecting) user input.

In one example, the pre-selected operations may be one of such operations for [1] taking pictures, [2] recording video clips or sounds, [3] displaying such pictures, [4] playing such video clips or audible sounds, [5] storing, retrieving, deleting or transmitting such pictures, video clips or sounds, [6] monitoring or assessing certain preset situations or emergency situations, [7] storing, retrieving, deleting or sending information about such situations, [8] assessing a location, [9] storing, retrieving, deleting or sending information about the location, [10] monitoring, storing, retrieving, deleting or sending information of health conditions, [11] authenticating a user, [12] making a phone call, [13] connecting to wireless communication network such as, e.g., an internet, a bluetooth, or a near field communication (NFC) or disconnecting therefrom, [14] running a messenger service, [15] running a short message service (SMS), [16] running a social networking service (SNS), [17] receiving, composing, or sending an email, [18] scheduling events, [19] running a navigator, [20] running a clock or a timer, [21] running a dictionary service, [22] creating, editing, storing, retrieving, deleting or sending a document or data, [23] switching a mode of operation, [24] accessing, retrieving, storing or deleting data which are stored in a terminal, [25] displaying a screen which was the last or the latest screen (e.g., other than a home or menu screen) before a terminal was powered off or before its display unit was turned off, [26] accessing or running the last or the latest software application which was driven by a terminal before having being powered off or turned off, or the like.

The pre-selected operations may also include [27] connecting to a network of an internet-of-things (IoT), [28] connecting to an electric or electro-mechanical appliance included in an IoT network, [29] connecting to a control system of a vehicle or a building, [30] manipulating an electric or electro-mechanical unit of a vehicle (or a building) such as, e.g., unlocking (or locking) a door or a window of a vehicle (or a building), opening (or closing) a door or a window of a vehicle (or a building), or turning on or off an engine or a motor of a vehicle, [31] connecting to a robot and manipulating at least one electric or electro-mechanical unit of the robot, [32] manipulating (e.g., setting, changing or storing) a control panel of a terminal, a vehicle, a drone, a robot, or the like, [33] displaying a lock screen, home screen, or another default screen on a display unit, [34] displaying a content or an advertisement on a display unit on its screen, [35] switching to a voice (or a gesture) command mode, [36] manipulating (e.g., taking off, flying, or landing) a drone or another flying object, [37] loading a software application capable of running at least one operation for performing one of the above [1] to [36] of this paragraph, or the like.

It is appreciated that, as used herein, a "vehicle" collectively refers to an article with which a user can travel on land, in the air, or on water. Accordingly, examples of the vehicle may include an automobile with an internal combustion engine or an electrical motor, a motor bicycle, a bicycle, a train, an airplane, a helicopter, a drone, or the like. In addition, a "vehicle" collectively refers to another article which is not primarily used to travel (i.e., transportation) but to perform works. Therefore, examples of the vehicle may also include a bulldozer, a truck, a crane, or the like.

In another example, such pre-selected operations may be various operations which are related to electronic commerce, electronic payment systems, or financial transactions.

Accordingly, such pre-selected operations may include various operations for [1] accessing a gateway or a platform for an e-commerce, [2] receiving or presenting a checkout form or a payment form, [3] accessing a payment provider or a payment gateway, [4] presenting an order, [5] presenting personal financial information or its equivalent, [6] transmitting personal financial information or its equivalent, [7] running at least one authentication operation for any of the above [1] to [6] of this paragraph, or the like.

It therefore follows that such pre-selected operations may be any operations which can be run by a terminal. For example, a manufacturer or a distributor of a terminal or a provider of a wireless communication service may install various hardware and software elements into a terminal such that the terminal may run any of the above pre-selected operations of this Section. After purchase, a user may download (software) applications or may attach to a terminal an external device which may in turn include certain hardware and software elements therein. As a result, a terminal or a user may include all of such operations into a set of multiple pre-selected operations (i.e., a "matching list") and may list all of such operations in a column or a row of the matching list. However, a terminal (or a user) may form a small matching list by including therein only a certain number of operations which he or she frequently uses when a terminal powers on or wakes up, when a terminal advances to an unlock mode, while a terminal is in a lock mode or an unlock mode, or the like.

A terminal may also allow a user to modify the matching list by [1] adding new operations which a user wants to run while or (immediately) after powering on or waking up, [2] deleting pre-existing operations which a user does not use as frequently as before, [3] changing an order of such operations in the matching list, [4] adding or deleting conditioning requirements in such a way that a terminal runs an operation $O_2$ only when a terminal runs an operation $O_1$, or only when a terminal completes to run operation $O_1$, or the like. When desirable, a terminal may monitor a usage of a user and may then adaptively modify such a set of pre-selected operations or such a matching list from time to time.

In another example, a terminal may drive various hardware or software elements and run each pre-selected operation included in a matching list. To this end, a terminal may include, e.g., [1] a picture taking application such as a camera driver), [2] a video or audio recording application such as a video camera driver or an audio recorder driver, [3] a picture displaying or editing application such as an image viewer and a driver thereof, [4] a sound playing or editing application, [5] a visual or audio data (such as, e.g., pictures, video clips, texts, or audio files) processing (such as, e.g., creating, storing, retrieving, editing, deleting, receiving or transmitting) application, [6] a situation (e.g., an emergency or accident) monitoring or assessing application, [7] a situation data processing ("processing" is the same as the one in [5]) application, [8] a location monitoring or handling application, [9] a health monitoring application, [10] a health-related data processing application, [11] a user authenticating application, [12] an authentication-related data processing application, [13] a wireless or wired communication (e.g., an internet, a bluetooth, or a near field communication) or calling application, [14] a messenger service application, [15] a SMS application, [16] an email processing application, [17] an SNS application, [18] an event scheduling application, [19] a navigation application, [20] a clock or timer application, [21] a dictionary application, [22] a document processing application, [23] a mode switching application, [24] an access authority providing, [25] a data processing application, [26] the last (or latest) screen displaying application, [27] the last (or latest) software application executing application, or the like.

Such a terminal may also include [28] an application for connecting to a network of IoT, [29] an application for connecting to an appliance through an IoT network, [30] an application for connecting to a control system of a vehicle or building, [31] an application for manipulating an electric or electro-mechanical unit of a vehicle (or a building) such as, e.g., unlocking (or locking) a door or window of a vehicle (or a building), opening (or closing) a door or window of a vehicle (or a building), or turning on or off an engine or motor of a vehicle, [32] an application for connecting to a robot and manipulating an electric or electro-mechanical unit of the robot, [33] an application for manipulating (e.g., setting, changing or storing) a control panel of a terminal, a vehicle, a drone, a robot, or the like.

Such a terminal may further include [34] an application for displaying a lock screen, home screen, or another default screen on a display unit, [35] an application for displaying a content or an advertisement on a display unit on its screen, [36] an application for switching to a voice (or a gesture) command mode, [37] an application for manipulating (e.g., taking off, flying, landing, or the like) a drone or another flying object, [38] an application for loading a software application capable of running at least one operation for performing one of the above [1] to [37] of this paragraph, or the like.

It is appreciated that various (software) applications of the preceding paragraph may be downloaded onto a terminal before a terminal may run a selected operation. Alternatively, an application which is to run a selected operation may be stored external to a terminal such as, e.g., in an external device which may releasably and operationally couple with a terminal. In addition, a (software) application for running a pre-selected operation may be downloaded from an external source such as, e.g., a website.

It is also appreciated that an operation of turning on a display unit (i.e., a turning on operation) and an operation of authenticating a user (i.e., an authentication operation) are not deemed as the pre-selected operations when a terminal is to run such a turning on operation or authenticating operation concurrently with or (immediately) after a terminal powers on or wakes up. However, [1] when a terminal is to run a turning operation once the terminal powers on or [2] when a terminal is to run a $2^{nd}$ authentication operation once the terminal runs a $1^{st}$ authentication operation, such operations are deemed to belong to such multiple pre-selected operations.

It is appreciated that an operating system (O/S) of a terminal may include therein at least one of such (software) applications of this Section. Accordingly, a manufacturer of a terminal or an O/S developer may readily include such applications into an O/S. Alternatively, a manufacturer or a developer may allow a user to incorporate the (software) application into the O/S as well.

1-12-5. Run a Mode-Switching Operation

As used herein, to "run at least one mode-switching operation" or simply to "run a mode-switching operation" is synonymous with [1] "switching modes," [2] "mode switching," or [3] simply "switching." As described above, such "mode switching" is an operation which causes a terminal to switch from a current mode (or state) to a new mode (or state). It is appreciated that an on-state is implicitly included in the current or new mode, for any lock mode, any intermediate mode, and any unlock mode are in the on-state. Similarly, a powered-on state is also implicitly included in the current or new mode, for any lock mode, any intermediate mode, and any unlock mode are in the powered-on state.

A "mode switching" or running a mode-switching operation may include multiple steps therein. For example, a mode switching may include the steps of, e.g., [1] starting to run a mode-switching operation, [2] selecting at least one new mode based upon $UI_{SWT}$ from a matching list of multiple pre-defined modes defined in a certain hierarchy, [3] taking an action when $UI_{SWT}$ does not match any of multiple modes listed in the matching list, [4] switching from a current mode to a new mode, and [5] completing to run a mode-switching operation.

In general, a terminal may run various mode-switching operations in various ways. For simplicity of illustration, various mode-switching operations may be classified based upon several factors such as, e.g., [1] whether a terminal is (or has been) in a powered-off state or powered-on state before such mode switching, [2] whether a terminal is (or has been) in an off-state or on-state before such mode switching, [3] whether a terminal runs an authentication operation in conjunction with (e.g., before, concurrently or after) such mode switching, or the like.

In one example, when a terminal in its off-state receives a user input including $UI_{SWT}$, a terminal advances to a new mode based upon $UI_{SWT}$, where the new mode is selected from a matching list, and where the matching list may match each of multiple modes defined in a certain hierarchy with each of multiple $UI_{SWT}$'s acquired by a terminal. As used herein, such mode of switching to a new mode is to be referred to as a "$1^{st}$ type switching modes" or "$1^{st}$ type mode switching" hereinafter.

When a terminal employs user authentication, a terminal may advance to different modes depending upon an outcome from such authentication. In one case, a terminal may advance to an unlock mode and may display an unlock (or home) screen when a user passes the user authenticating. When a user fails the authentication, a terminal [1] may advance to a lock mode (or a different default mode) and display a lock screen (or a default screen), or [2] may remain in the off-state, without displaying any screen on a display unit.

In this case, a terminal may first acquire $UI_{THEN}$ from a user input, and then acquire $UI_{SWT}$ only when a user passes such authentication. Alternatively, a terminal may acquire $UI_{THEN}$ and $UI_{SWT}$ concurrently, regardless of whether or not a user may pass the authenticating.

In another case, a terminal in an on-state may receive a user input including $UI_{SWT}$. A terminal may then switch from a current mode to a new mode by, e.g., selecting the new mode from the matching list based upon $UI_{SWT}$. As used herein, such mode switching of switching a new mode from a current mode is to be referred to as a "$2^{nd}$ type switching modes" or "$2^{nd}$ type mode switching" hereinafter.

When a terminal employs a user authentication, a terminal may switch to a new mode depending upon an outcome from such user authenticating. In one case, a terminal may switch to an unlock mode and display an unlock (or home) screen when a user passes the user authenticating. When a user fails such authenticating, however, a terminal [1] may switch to a lock mode (or a different default mode) and display a lock screen (or a different default screen), [2] may remain in the lock mode while displaying a lock screen when a current mode is a lock mode, or [3] may switch to an off-state by turning off its display unit. Alternatively, a terminal may first acquire $UI_{THEN}$ from a user input, and may then acquire $UI_{SWT}$ only when a user passes such authenticating. In the alternative, a terminal may acquire $UI_{THEN}$ and $UI_{SWT}$ concurrently, regardless of whether or not a user may pass the authenticating.

1-12-6. External Device

A mobile communication terminal may operatively couple with an "external device" such as, e.g., [1] an "add-on device," [2] a "portable device," or [3] a "wearable device." In one example, an external device may include therein at least one hardware or software element which is not included in the terminal. A terminal may couple with the external device and recruit the element of the external device, thereby running an additional operation which the terminal cannot run by itself (i.e., without coupling to the external device). In an opposite example, an external device may include at least one hardware or software element which is also included in the terminal. A terminal may then couple with the external device and recruit the element of the external device, thereby complementing the element of a terminal with the element of the external device. More particularly, an external device may include any of various (software) applications of Section 1-12-4 in such a way that a user may run an operation with the application when a terminal operationally couples with the external device.

More particularly, an external device may be fabricated as an "add-on device" which may be releasably coupled to a terminal and uncoupled therefrom. Therefore, an add-on device may be fabricated as [1] a protector of a terminal, [2] its holder, [3] its case, or [4] its cover which may enclose at least a portion of a terminal. In addition, an add-on device may be fabricated as [5] a "USB-type memory" (with or without including a driver therein), [6] an "external memory chip (or card)" which may couple with a terminal and which may (or may) not include a driver, [7] a "portable memory chip (or card)" such as, e.g., a USIM card or a SIM card, which may releasably couple or uncouple with a terminal, and which may (or may not) include a driver, [8] any other prior art memory chip (or device) which may include a space for storing data therein and which may (or may not) include a driver, or the like.

An external device may also be fabricated as a "wearable device" which a user may wear on a user's body part. Therefore, a wearable device may be fabricated as [1] a watch, [2] a wrist-band, [3] an arm band, [4] a glove, [5] a ring, [6] a goggle, [7] an eye glass, [8] a helmet, [9] a hat, [10] a belt, [11] a necklace, [12] a bracelet, [13] an earring, [14] an artificial nail, [15] an artificial tooth, [16] a shoe, [17] a pendant, [18] a brooch, [19] other ornaments, or [20] any other devices which may be portably worn by a user.

Moreover, an external device may be fabricated as a "portable device" which a user may readily carry with him or her. Therefore, a portable device may be fabricated as [1] a bag, [2] a backpack, [3] a handbag, [4] a brief case, [5] a luggage, or the like.

1-13. Input Units

As used herein, an "input unit" refers to a hardware element of a terminal capable of receiving at least one user input therewith. More particularly, an input unit receives at least one of the above $1^{st}$ to $5^{th}$ type user inputs. A terminal may recruit any prior art mechanical, electrical, magnetic, and/or optical device as an input unit, as long as [1] the device can receive at least one of the above user inputs, or [2] the device can include at least one prior art sensor capable of acquiring at least one (user) sub-input which is included in the user input.

When an input unit is designated to receive $UI_{SEL}$, the input unit is referred to as a "selecting input unit" which includes at least one "selecting sensor" therein. When an input unit is designated to receive $UI_{ACT}$, the input unit is referred to as an "activation input unit" which includes at least one "activation sensor" therein. When an input unit is designated to receive $UI_{THEN}$, the input unit is referred to as an "authentication input unit" which includes at least one "authentication sensor" therein. When an input unit is designated to receive $UI_{SWT}$, the input unit is referred to as an "mode-switching input unit" which includes at least one "mode-switching sensor" therein. A terminal may also include an additional input unit which can receive a user input which includes therein other (user) sub-inputs for running operations other than the above selecting, activation, authentication, or mode-switching operations. Such an input unit is referred to as an "auxiliary input unit" which includes therein at least one "auxiliary sensor" capable of acquiring an "auxiliary (user) sub-input ($UI_{AUX}$)."

An input unit may directly receive a user input, may directly acquire a sub-input, or may receive a user input and thereafter acquire one or more sub-inputs by extracting at least one sub-input from the user input with the sensor. In other words, a terminal may receive a user input and acquire a sub-input therefrom concurrently or sequentially, depending upon a presence or an absence of any temporal overlap therebetween. Alternatively, a $1^{st}$ input unit may only receive a user input and, thereafter, a $2^{nd}$ input unit may acquire one or more sub-inputs by extracting the sub-inputs from the user input.

A sensor of an input unit acquires at least one (user) sub-input from at least one user input and, therefore, an input unit may generally include as many sensors as a number of sub-inputs included in a user input. Of course, an input unit may include a smaller number of sensors than a number of sub-inputs included in the user input, e.g., [1] when a terminal runs more than one operation in response to acquiring a single sub-input, [2] when a terminal runs a $2^{nd}$ operation which is conditioned upon an outcome from running a $1^{st}$ operation, or the like.

When a terminal acquires multiple sub-inputs using multiple input units, each input unit may be equipped with one or more sensors as well. It is appreciated that an input unit may acquire such sub-units in a 1-to-1 matching, a 1-to-n matching, a m-to-1 matching or a m-to-n matching, where 'm' and 'n' are integers and where 'm' may be greater than, equal to or less than 'n' as well.

Depending upon a nature or a type of an input unit or upon a number of user inputs required to run operations by a terminal, an input unit may receive a user input(s) when a user directly or indirectly manipulate at least a portion of the input unit. For example, a terminal only includes a single input unit and receives [1] multiple user inputs of the same or similar types, [2] multiple user inputs of different types, or [3] both of such user inputs of [1] and [2] in a combination. Alternatively, a terminal may include multiple input units of the same or different types and, accordingly, may receive different types of user inputs or acquire different types of sub-inputs either concurrently, sequentially or in a combination with different input units.

It is appreciated that any hardware element of a terminal capable of receiving any of such $1^{st}$ type to $5^{th}$ type user input may serve as an input unit and, therefore, may qualify as an input unit of this disclosure. Accordingly, when a terminal includes a touch screen, a gyroscope, or a force transducer, each of such hardware elements may serve as a separate input unit, where the touch screen acquires $UI_{THEN}$, a gyroscope acquires $UI_{SWT}$ from a position of a user, a movement thereof, or a gesture thereof, or where a force transducer acquires $UI_{ACT}$ from a magnitude of a force associated with a user input. Such sensors may instead acquire sub-inputs differently or such sensors may acquire the sub-inputs from measured values of the above position, movement, force, or the like.

A terminal may recruit various prior art input units examples of which may include, but not be limited to those described in U.S. Pat. No. 5,463,388 (assigned to AT&T), U.S. Pat. No. 7,479,949 (assigned to Apple, Inc.), U.S. Pat. No. 8,392,340 (assigned to Apple, Inc.), U.S. Pat. No. 8,542,206 (assigned to Apple, Inc.), U.S. Pat. No. 8,279,182 (assigned to Samsung), U.S. Pat. No. 8,554,275 (assigned to LG), or the like. Other prior art input units may also be implemented into various terminals of this disclosure as well.

1-14. (Software) Application

As used herein, a "software element" of a terminal collectively refers to [1] an O/S, or [2] a (software) application, and the software element is synonymous with an "accessible software element." A software element typically refers to a set of computer instructions or programs. As used herein, a "(software) application" or simply an "application" refers to one of software elements of a terminal, and also means a set of computer instructions or programs designed [1] to run a certain operation, or [2] to perform a specific function. It is appreciated that a (software) application may be driven by a CPU member, by an O/S, or by another application, and that driving a (software) application leads to [1] running a certain operation or [2] performing a specific function. It is also appreciated that driving a (software) application may accompany driving at least one hardware element.

As used herein, a "(software) application" is deemed to not include an "O/S" and, therefore, to be different from the O/S. A manufacturer or a distributor of a terminal may implement at least one (software) application into a terminal before sale. Alternatively, a user may download at least one application into a terminal after purchase. An O/S or an already-implemented application may also download a new "application" from various sources such as, e.g., an external memory device, a website, or the like.

An application may provide a user with various options such that the user may select different options in driving the application to run different operations or to perform different functions. Therefore, when a terminal grants a user with access authority to drive a certain application, a terminal may also allow a user to use all available options or to use only certain selected options, depending upon a mode in which a user operates a terminal, access authority granted thereto, or the like.

1-15. Perform a (Specific) Function

A terminal is referred to "perform a (specific) function" or, more particularly, a (specific) function results from "running an operation" which typically corresponds to executing at least one portion of an O/S or at least one software application. In other words, performing a specific function by "running an operation" may require at least one software application, at least one hardware element of a terminal, or the like.

2. Objectives

Objectives to be achieved by various mobile communication terminals of this disclosure are summarized below. It is appreciated that following objectives are exemplary only and, thus, not intended to confine any application or scope of such terminals. It is also appreciated that various features of the mobile communication terminals, their units, and their hardware or software elements in this Section 2 are focused upon providing seamless operations to a user. It is further appreciated that various directional input units and their hardware or software elements may be configured to embody one or more of the following objectives.

2-1. Directional Input Units and Seamless Operations

A first objective as well as one exemplary aspect of various directional input units and related methods of this disclosure is to provide a user with mobile communication terminals offering diverse and optimum seamless operations. In one exemplary embodiment of this first objective, a terminal with a directional input unit allows a user to enjoy seamless operations which are particularly beneficial to a user who wants to run at least one desired or selected operation while or (Immediately) after powering on or turning on, by exercising a "single effort" (e.g., performing a single active action or a single voluntary action).

In one example of this embodiment, a user may provide a single user input (or multiple concurrent user inputs) for turning on a display unit and for selecting and running at least one desired operation. In another example, a user may also provide a single user input (or multiple concurrent user inputs) for turning on a display unit, for running at least one authentication operation, and for selecting and running at least one desired operation. To this end, a directional input unit receives a (single) user input (or multiple concurrent user inputs) which accompanies therewith a selecting (user) sub-input ($UI_{SEL}$) and at least one optional (user) sub-input such as, e.g., an activation (user) sub-input ($UI_{ACT}$) or an authentication (user) sub-input ($UI_{THEN}$). In other words, a directional input unit may acquire a single sub-input, $UI_{SEL}$, or may concurrently acquire multiple (user) sub-inputs one of which is $UI_{SEL}$.

Upon receiving the user input and acquiring (user) sub-inputs, a terminal selects and runs (or starts to select and to run) an operation which is selected by a user from a set of multiple operations (e.g., a matching list) which are pre-selected by a user (or a terminal) in one of the selecting timings as defined above. Accordingly, while or (immediately) after such powering on or such waking up, a user may enjoy seamless operations to the fullest extent such as, e.g., by turning on a display unit, by authenticating himself or herself, by selecting and running at least one selected operation which is selected from a matching list, all in response to a single user input or with multiple concurrent user inputs.

In another exemplary embodiment of this first objective, a directional input unit receives a single user input or multiple concurrent user inputs, and concurrently acquires multiple (user) sub-inputs. But a terminal may start or finish such operations initiated by such (user) sub-inputs at different instances. That is, a terminal may [1] run (or start to run) an operation to turn on a display unit, [2] run (or start to run) at least one authentication operation, [3] run a selecting operation from a set of multiple pre-selected operations, or [4] run (at least) one selected operation which is selected from a matching list after running the selecting operation, in different "timings" such as, e.g., [1] concurrently with each other (i.e., with at least one temporal overlap therebetween), [2] sequentially (i.e., consecutively or one at a time, not with a temporal overlap but with at least one temporal gap therebetween), or the like. A terminal may complete (or finish) such turning on, authenticating, selecting, or running a selected operation at different instances as well. As a result, a terminal may finish the turning on, authenticating, selecting or running a selected operation, [1] concurrently with each other or [2] sequentially.

To put it differently, regardless of the starting instances or finishing instances of such turning on, authenticating, and selecting, such operations are respectively initiated in response to acquisition of $UI_{ACT}$, $UI_{THEN}$, and $UI_{SEL}$, where $UI_{SEL}$ and at least one of $UI_{ACT}$ and $UI_{THEN}$ (or all of $UI_{ACT}$, $UI_{THEN}$, and $UI_{SEL}$) are concurrently acquired by a directional input unit. When a terminal includes a directional input unit and an additional non-directional input unit, the former may acquire $UI_{SEL}$, while the latter may receive at least one of $UI_{ACT}$ and $UI_{THEN}$.

Therefore, various directional input units throughout this disclosure allow a user to run an application of his or her choice (e.g., a messenger application, an email application, an application for viewing a gallery of pictures, or the like) while or (immediately) after such powering on or turning on, optionally along with such turning on or authenticating. More particularly, the terminal may do so in response to a single effort (e.g., a single user input) or in response to multiple concurrent efforts (e.g., multiple concurrent user inputs), where such multiple user inputs are provided to a terminal concurrently with each other by a single effort. As a result, a user can enjoy seamless operations only with a single effort.

2-2. Directional Input Units and User Sub-Inputs

A second objective and another exemplary aspect of various directional input units and their related methods of this disclosure is to provide a terminal with a single user input (or multiple concurrent user inputs) which accompanies therein at least two (user) sub-inputs. Examples of such sub-inputs may include, e.g., [1] $UI_{SEL}$, [2] $UI_{ACT}$, [3] $UI_{THEN}$, [4] $UI_{SWT}$, [5] $UI_{AUX}$, or the like. More particularly, a single user input (or multiple concurrent user inputs) may accompany therein a sub-set of multiple sub-inputs, where examples of the sub-inputs paired together in a sub-set may include, e.g., [1] $UI_{SEL}$ and $UI_{ACT}$, [2] $UI_{SEL}$ and $UI_{ACT}$ (and optionally $UI_{THEN}$), [3] $UI_{SEL}$ and $UI_{THEN}$, or [4] $UI_{SEL}$ and $UI_{THEN}$ (and optionally $UI_{ACT}$). A user may then determine which set of such (user) sub-inputs he or she desires to provide to a terminal which is [1] in its powered-off state, [2] in its powered-on state but in an off-state, or [3] even in its powered-on state and in its on-state. Once a user provides such sub-inputs, a terminal may also run the selecting, turning on, or authenticating, concurrently or sequentially, thereby allowing a user to render run the selected operation while or (immediately) after such powering on or waking up, simply by exercising a single effort and by providing a single user input (or multiple concurrent user inputs).

In one exemplary embodiment of this second objective, a directional input unit may generate different control signals based upon such (user) sub-inputs, and send such control signals to a terminal. A terminal (or a CPU member) may run such selecting (in response to $UI_{SEL}$), while optionally running at least one of such turning on (in response to $UI_{ACT}$) or such authenticating (in response to $UI_{THEN}$), either concurrently or sequentially. More particularly, a terminal may run such selecting in various "selecting timings" as described above. When a terminal needs to authenticate a user, a terminal may run such selecting [1] only when a user passes such authenticating, [2] regardless of whether or not a user passes such authenticating, [3] regardless of whether or not a terminal runs such turning on before or after running an authentication operation, or the like.

In another exemplary embodiment of this second objective, a directional input unit may generate the control signals concurrently or sequentially, where such control signals may represent or result from a sub-set of (user) sub-inputs such as, e.g., [1] $UI_{SEL}$ and $UI_{ACT}$, [2] $UI_{SEL}$, $UI_{ACT}$ (and optionally $UI_{THEN}$), [3] $UI_{SEL}$ and $UI_{THEN}$, [4] $UI_{SEL}$, $UI_{THEN}$ (and optionally $UI_{ACT}$), or [5] other combinations. A terminal may receive the control signals either concurrently or sequentially, and may [1] turn on (or start to turn on) its display unit, [2] authenticate (or start to authenticate) a current user by running at least one authentication operation, [3] select (or start to select) an operation from a matching list of multiple operations pre-selected by a user (or by a terminal), or [4] run (or start to run) at least one selected operation which a user desires to run while or (immediately) powering on or waking up. A terminal may run at least two of such selecting, turning on, authenticating, or running a selected operation [1] concurrently with each other, [2] running another of such operations (immediately) after running one of such operations, or [3] running another of such operations within a certain period after running one of such operations.

A terminal may select and run the selected operation in one of various "selecting timings" as defined above, where some of such "selecting timings" may include, e.g., [1] concurrently with, (immediately) after, or within a certain period after such turning on, [2] concurrently with, (immediately) after, or within a certain period after a terminal switches from one state (or mode) to another state (or mode), [3] concurrently with, (immediately) after, or within a certain period after such authenticating, [4] concurrently with, (immediately) after, or within a certain period after such authenticating followed by such turning on, [5] concurrently with, (immediately) after, or within a certain period after such turning on which is followed by the authenticating, or [6] concurrently with, (immediately) after, or within a certain period after such authenticating which is followed by mode-switching from one state (or mode) to another state (or mode). Accordingly, a directional input unit and a terminal which incorporates the input unit enables a user to enjoy seamless operations of selecting a desired operation and running the selected operation while or (immediately) after powering on or waking up, while a user may only have to exercise a single effort such as, e.g., simply by providing a single user input (or multiple concurrent user inputs).

2-3. Type-1 Directional Input Units—Movable Portions

A third objective and another exemplary aspect of this disclosure is to construct a directional input unit which includes at least one portion which a user can move in a certain manner in a certain direction. More particularly, such a directional input unit can generate [1] a single control signal or [2] multiple control signals concurrently, sequentially (i.e., one after another) or in a combination thereof, in response to at least one movement which is caused by a user when he or she manipulates the movable portion of the directional input unit.

In one exemplary embodiment of this third objective, a directional input unit may generate at least one control signal in response to various features of the movement. For example, such features may include [1] a static or dynamic pattern of movement of at least one movable portion of a directional input unit, where the movement may be in a 2-D area or in a 3-D space, [2] a movement sequence of the movable portion, where the sequence may be a temporal or spatial sequence or a combination thereof, [3] a direction of a movement of the movable portion, or the like.

In another exemplary embodiment of this third objective, a directional input unit generates at least one control signals in response to (or upon) [1] receiving a user input or [2] acquiring $UI_{SEL}$ therefrom. Based on the control signal (and, therefore, $UI_{SEL}$), a terminal may select which operation a user desires to run from a set of multiple pre-selected operations, and may then run the selected operation while or (immediately) after powering on or waking up. A terminal may synchronize such selecting with other operations such as, e.g., [1] such turning-on in response to $UI_{ACT}$, [2] such authenticating in response to $UI_{THEN}$, [3] another operation in response to $UI_{AUX}$, or the like. A terminal may run such operations by, e.g., receiving a single user input (or multiple concurrent user inputs) accompanying therewith or including therein [1] $UI_{SEL}$, optionally along with at least one of $UI_{ACT}$ or $UI_{THEN}$, [2] $UI_{SEL}$ and only one of $UI_{ACT}$ or $UI_{THEN}$, or the like. Alternatively, a terminal may receive a $1^{st}$ user input which includes $UI_{SEL}$, and may also receive a $2^{nd}$ user input which includes at least one of $UI_{ACT}$, $UI_{THEN}$, $UI_{AUX}$. It is to be understood, however, that a user provides at least one $UI_{SEL}$ to a directional input unit in order to guarantee optimum seamless operations.

In another exemplary embodiment of this third objective, a directional input unit and its movable portion which moves in response to various user inputs may be fabricated as a unitary article by mechanically or electrically coupling one to the other. It is to be understood, therefore, that the movable part is physically or operationally coupled to the directional input unit. Alternatively, a movable portion may be provided as an article which is separate from a directional input unit but which is operationally coupled to the input unit. In this configuration, the movable portion may movably couple with a directional input unit mechanically, electrically or magnetically. Alternatively, an entire portion of a directional input unit may be fabricated to move in response to such user inputs.

Therefore, a user may enjoy seamless operations with a terminal including such a directional input unit which enables a user to run a selected operation after a terminal powers on or wakes up, while simply exercising a single effort or providing a single user input (or multiple concurrent user inputs), thereby optionally turning on (or starting to turn on) a display unit or optionally authenticating (or starting to authenticate) a current user. It is needless to mention that such a terminal had better run as many of such operations as possible with a single user input or with the least number of concurrent user inputs for guaranteeing optimum seamless operations.

2-4. Type-2 Directional Input Units—Moving Body Parts

A fourth objective as well as another exemplary aspect of this disclosure is to construct a directional input unit which can generate [1] a single control signal or [2] multiple control signals concurrently, sequentially (i.e., one after another) or in combination thereof, in response to at least one movement of at least one body part of a user with respect to at least one stationary or movable portion of a directional input unit. It is appreciated that such a body part of a user (i.e., a user body part) may be [1] the body part which contacts or presses at least a portion of a directional input unit (i.e., a "contacting body part" which may or may not actively press such an input unit), or [2] the body part which is positioned away from a directional input unit at a certain distance (i.e., a "non-contacting body part" which does not contact the input unit and which does not press the input unit), or the like.

In one exemplary embodiment of this fourth objective, a directional input unit may generate [1] a single control signal or [2] multiple control signals in response to various features of the movements of a user body part with respect to a directional input unit. Examples of such features may include [1] a static or dynamic pattern of a movement of a user body part with respect to a directional input unit, where a movement may be in a 2-D area or in a 3-D space, [2] a sequence of a movement of a user body part, where the sequence may be a temporal sequence, a spatial sequence, or their combination, [3] a direction of a movement of a user body part where a direction may be curvilinear (i.e., straight or curved), and where a direction is a 2-D or 3-D direction, [4] a static or dynamic feature of a movement of a user body part, or the like. Accordingly, a user gesture which may be captured by a camera of a terminal or which may be recognized by another sensor such as a prior art motion sensor or a gyroscopic sensor is an example of the movement of the non-contacting body part. In contrary, a movement pattern of a user's finger which contacts or presses a directional input unit is an example of the movement of the contacting body part.

In another exemplary embodiment of this fourth objective, a directional input unit may generate a single control signal or multiple control signals in response to [1] receiving a user input or [2] acquiring $UI_{SEL}$. In response to the control signal, a terminal may select which one or multiple operations from a matching list including multiple pre-selected operations, where a user wants to run the "selected operation(s) while or (immediately) after the terminal powers on or wakes up. Thereafter, a terminal may run the selected operation as explained in Section 2-3. A terminal may synchronize such selecting with other operations as described in Section 2-3. A terminal may run such other operations by receiving a single user input (or multiple concurrent user inputs) including therein various sub-inputs as explained in section 2-3, thereby guaranteeing a user with optimum seamless operations.

The type-2 directional input unit may be constructed differently from the type-1 directional input units. In one example and unlike the type-1 directional input unit, the type-2 directional input unit may preferentially (or solely) monitor a movement of a user body part and, therefore, the type-2 input unit does not necessarily require a movable portion. That is, the type-2 directional input unit may not include a portion which moves in response to a user input. In another example, the type-2 directional input unit may include at least one movable portion which moves in response to a user input, or an entire directional input unit may instead move in response to a user input, where the movable portion of this example may not be constructed to acquire $UI_{SEL}$, and where the movable portion of this example may rather be configured [1] to acquire other sub-inputs, [2] to acquire the $2^{nd}$ $UI_{SEL}$ when a $1^{st}$ $UI_{SEL}$ is acquired by another directional input unit, or the like.

In addition, a user [1] may move multiple body parts with respect to a single portion of a directional input unit or [2] may concurrently move multiple body parts with respect to multiple portions of a directional input unit. As briefly discussed in Section 1-9, such movements of multiple body parts to a single portion or multiple portions of a directional input unit may be deemed as a single effort which also leads to a single user input as long as a user provides such concurrent movements [1] without detaching all of the body parts from such a portion(s) of the directional input unit while providing all of such multiple movements, [2] without detaching all of the body parts from such a portion(s) of the directional input unit until completing to provide all multiple movements, or [3] where each of such movements overlaps at least a part of at least one of other movements.

In another exemplary embodiment of this fourth objective, a directional input unit may include therein at least one movable portion when it is desirable or efficient for a user to combine a movement(s) of a user body part with the movable portion. This directional input unit may be regarded as a combination of the type-1 directional input unit and type-2 directional input unit. In other words, a directional input unit of this configuration may be to acquire $UI_{SEL}$ in response to [1] a movement(s) of at least one contacting body part with respect to at least one portion of a directional input unit (i.e., the body part is contacting, touching or pressing such a portion of the input unit), where the movement(s) provides the input unit with a user input(s) which may include $UI_{SEL}$, or [2] a movement(s) of at least one non-contacting user body part with respect to the portion of the input unit.

To offer optimum seamless operations, a terminal may run the selected operation while or (immediately) after [1] powering up, [2] waking up, or [3] advancing to an unlock mode, a lock mode, or another intermediate mode, when a user exercises a "single effort" and provides a "single user input" (or multiple concurrent user inputs) to a terminal. A terminal may also run the selected operation in one of various "timings, while performing at least one of turning on a display unit or running at least one authentication operation, [1] in response to (e.g., concurrently with, immediately after, within a certain period of time after, or the like) receiving a single user input or multiple concurrent user inputs, [2] in response to acquiring at least two user sub-inputs one of which is $UI_{SEL}$, [3] in response to acquiring at least two user sub-inputs one of which is $UI_{SEL}$, or the like. To guarantee optimum seamless operations, a terminal may also perform such selecting, turning on, or authenticating, [1] concurrently with each other, or [2] sequentially or one after another, while including at least one temporal gap, all in response to a single effort by a user (e.g., a single user input or multiple concurrent user inputs).

Accordingly, a user of a terminal which includes the directional input unit may enjoy seamless operations and may run a selected operation of his or her choice, simply by providing a terminal with a single user input (or a minimal number of multiple concurrent user inputs), while he or she can optionally turn on (or start to turn on) a display unit or optionally run (or start to run) at least one authentication operation, even [1] when a terminal is (or has been) powered off, [2] a display unit was (or has been) turned off in a powered-on state, [3] a terminal is (or has been) in its on-state, or the like.

2-5. Type-3 Directional Input Units—Moving Objects

A fifth objective as well as another exemplary aspect of this disclosure is to construct a directional input unit capable of generating different or unique control signals concurrently, sequentially, or in a combination thereof, in response to a single movement (or multiple concurrent movements) of at least one "contacting non-user object" which is contacting (with or without necessarily pressing or pushing) at least one portion of a directional input unit or another input unit of a terminal.

In one exemplary embodiment of this fifth objective, a directional input unit may generate a single control signal or multiple control signals in response to various features of a movement of a non-user object. Examples of various features may include [1] a static pattern or a dynamic pattern of a movement of a contacting non-user object with respect to a directional input unit, where a movement may be in a 2-D area or in a 3-D space, [2] a sequence of a movement of the object, where the sequence may be a temporal sequence, a spatial sequence, or a combination thereof, [3] a direction of a movement of the object, [4] a static feature or a dynamic feature of a movement of the object which will be described in detail below, or the like.

In another exemplary embodiment of this fifth objective, a user may use various prior art objects as the above contacting non-user object, as long as a terminal or its directional input unit may monitor a movement of such non-user object with respect to a directional input unit. Therefore, a "$1^{st}$ class contacting non-user object" may include those which may be manipulated by a user such as, e.g., a stylus, a pen, a pointer, a customized pen, or another object a movement of which may be recognizable by a directional input unit. A "$2^{nd}$ class contacting non-user object" may include those which may be releasably held by a user such as, e.g., those of the $1^{st}$ class, a pencil, an object releasably coupling to a finger, a finger, an artificial finger nail, or another object a movement of which may be recognizable by a directional input unit (or a terminal). A "$3^{rd}$ class of the contacting non-user object" may include those which may releasably or fixedly couple to a user and readily recognized by a terminal such as, e.g., an object held by a coupler which is coupled to a user, an object wearable or carried by a user, or the like. Another class of such contacting non-user objects may include those of which an image may be taken and recognizable by a directional input unit (or a terminal), or the like. It is appreciated in the last two classes that such objects may contact a stationary or movable portion of a directional input unit for delivering a single user input along with at least two (user) sub-inputs one of which is $UI_{SEL}$.

In another exemplary embodiment of this fifth objective, a user may manipulate a contacting non-user object in various ways to provide $UI_{SEL}$ to a terminal. In one example, a user may provide $UI_{SEL}$ to a directional input unit by mechanically contacting the object with at least one stationary or movable portion of a directional input unit by, e.g., [1] touching or contacting the non-user object with the portion (without necessarily applying force to the portion), [2] pressing, pushing, pulling or otherwise applying force to the portion, [3] varying various static or dynamic features of such manipulations (e.g., such touching, contacting, pressing, pushing, pulling, or the like), where examples of such features may include, [3-1] a period of such manipulations, [3-2] a number of such manipulations, [3-3] a sequence of such manipulations, [3-4] a direction of such manipulation, [3-5] a speed of such manipulation, or the like.

In another example, a user may provide a directional input unit with $UI_{SEL}$ by electrically contacting or coupling the object with at least one stationary or movable portion of the input unit. Accordingly, the object which is disposed on or adjacent to the input unit may be supplied with electric voltage or electric current, and may cause changes in electrical property of the portion of the directional input unit. Such changes may be caused with or without making any mechanical contact with the portion of a directional input unit, and the input unit (or terminal) may acquire $UI_{SEL}$ from such changes.

In another example, a user may provide a directional input unit with $UI_{SEL}$ by touching or pressing at least one stationary or movable portion of the input unit with an object which is [1] electrically charged, [2] conductive, or [3] capacitive, by disposing the object on or adjacent to the portion of the directional input unit. Such touching or contacting may cause changes in electrical property of the portion of the input unit, where the changes may be caused with or without making any mechanical contact with the portion of the input unit. The directional input unit (or terminal) may acquire $UI_{SEL}$ from such changes.

In another example, a user may provide a directional input unit with $UI_{SEL}$ by touching or pressing at least one stationary or movable portion of the input unit with an object which has at least one magnetic pole therein or which is magnetized. Accordingly, the magnetic object which is disposed on or adjacent to the input unit may cause (or induce) changes in magnetic or electrical property of the portion of the input unit. Such touching or contacting may cause changes in electrical or magnetic property of the portion of the input unit, with or without making any mechanical contact with the portion of the input unit. The directional input unit (or a terminal) may then acquire $UI_{SEL}$ from such changes. Alternatively, the object may be magnetized when supplied with electric voltage or current.

A directional input unit may generate a control signal in direct response to $UI_{SEL}$, [1] concurrently with receiving a user input including $UI_{SEL}$, or [2] concurrently with acquiring $UI_{SEL}$. Alternatively, a directional input unit may generate such control signals [3-1] (immediately) after or within a certain period [3-2] after acquiring $UI_{SEL}$ or [4] receiving a user input which includes therein $UI_{SEL}$. Based thereupon, a terminal may select an operation which a user wants to run from a matching list, and then run the selected operation in one of the timings described above. A terminal may also synchronize such selecting with other operations such as, e.g., such turning on or such authenticating as described above. A terminal may also run such other operations after receiving various user inputs or acquiring such (user) sub-inputs as described in the type-1 directional input unit.

Various directional input units of this fifth objective are generally similar or identical to the type-1 directional input unit, but such directional input units of this fifth objective may also be configured differently therefrom. In one example, a directional input unit may not include any movable portion, for not the movable portion but the moving object provides a user input and $UI_{SEL}$ to a terminal. A directional input unit may also include a camera or other hardware or software elements capable of acquiring an image of a certain object, and then analyzing the image to acquire $UI_{SEL}$ [1] from the object on the image, [2] from a movement of the object on the image, or the like. Of course, the input may recruit a pre-existing camera of a terminal or a pre-existing image analyzing application of a terminal as well. Alternatively, a user may download his or her own applications to this end.

Therefore, a terminal incorporating such a directional input unit enables a user to enjoy seamless operations such as, e.g., running a selected operation while or (immediately) after a terminal powers on, wakes up, or switches from a mode in an on-state to another mode, and turning on its display unit, simply by exercising a single effort, thereby providing only a single user input or multiple concurrent user inputs. A terminal may synchronize an authentication operation with such selecting or such turning on, when it is desirable to prevent an unauthorized user from using a terminal. Other detailed objectives and advantages of these $3^{rd}$ directional input units are similar or identical to those of the type-1 or type-2 directional input units.

2-6. Type-4 Directional Input Units—Waves

A sixth objective as well as another exemplary aspect of this disclosure is to construct a directional input unit capable of generating a control signal in response to receiving electromagnetic waves or acoustic waves either concurrently, sequentially or in a combination. Such waves may be irradiated by a user or by a device carried or worn by a user such as, e.g., an add-on device described above. A directional input unit (or a terminal) may receive such waves as a user input, may acquire at least one (user) sub-input (including $UI_{SEL}$) therefrom, and may run at least one of various operations as described above and below.

In one exemplary embodiment of this sixth objective, a user may incorporate $UI_{SEL}$ into a user input transmitted to a terminal in the form of electromagnetic waves. A directional input unit (or a terminal) may receive such waves as a user input, acquire $UI_{SEL}$ therefrom, and select and run at least one selected operation which may be selected from a matching list, i.e., a set of multiple pre-selected operations which are selected by a terminal or a user. Such electromagnetic waves may carry various features therewith, where examples of such various features may include, but not limited to, [1] an amplitude, [2] a frequency or wavelength, [3] a phase angle, [4] a phase lag, [5] a duration of emission, [6] a signal or a code carried by such waves, or the like, and a directional input unit may regard each of such features as $UI_{SEL}$. Such electromagnetic waves may also carry various images therewith, where examples of such images may include, but not limited to, [1] an image of a user, [2] an image of a user body part, [3] an image of a contacting or non-contacting non-user object, [4] an image representing a certain signal or code, or the like. A directional input unit (or a terminal) may receive such waves as a user input, may acquire at least one (user) sub-input therefrom (including $UI_{SEL}$), and may run at least one of various operations as described above and below.

In another exemplary embodiment of this sixth objective, a user may incorporate $UI_{SEL}$ into a user input which is transmitted to a terminal in the form of acoustic waves. A directional input unit (or a terminal) may receive the user input, acquire $UI_{SEL}$ therefrom, run a selecting operation, and then run at least one selected operation which is selected from a matching list. The acoustic waves may also carry various features therewith, where examples of such features may include, but not limited to, [1] an amplitude, [2] a frequency, [3] a wavelength, [4] a phase angle, [5] a phase lag, [6] a duration of emission, [7] a signal or a code carried by such waves, or the like, and a directional input unit may regard each of such features as $UI_{SEL}$. Such acoustic waves may carry certain sounds representing $UI_{SEL}$, where examples of such sounds may include, but not limited to, [1] a sound of a user, [2] a sound made by a user body part, [3] a sound made by a non-user object, [4] a sound made by a user body part and a non-user object, [5] a sound made by an environment, [6] a sound made by a terminal, or the like. In addition, such acoustic waves may be in an audible frequency range or, may instead be in an inaudible frequency range when desirable.

2-7. Matching Selecting (User) Sub-Inputs and Operations

A seventh objective as well as another exemplary aspect of this disclosure is to construct a directional input unit which can concurrently acquire multiple (user) sub-inputs at least one of which is $UI_{SEL}$. A terminal may run a selecting operation desired by a user to be run by a terminal while or (immediately) after powering on or turning on, e.g., by setting a matching list which matches each of multiple $UI_{SEL}$'s with each of multiple pre-selected operations, by identifying which one of such pre-selected operations matches the acquired $UI_{SEL}$, and then by running the selected operation. To this end, a terminal may pre-match (or pre-assign) multiple $UI_{SEL}$'s with (or to) multiple operations, thereby forming a matching list which may be referred to whenever a terminal acquires $UI_{SEL}$ from a user input.

In one exemplary embodiment of this seventh objective, a directional input unit concurrently acquires at least two (user) sub-inputs, where one is $UI_{SEL}$, where another may be either $UI_{ACT}$ or $UI_{THEN}$, and where the input unit generates control signals matching such sub-inputs. In response to such control signals, a terminal runs an activation operation or an authentication operation, followed by running a selecting operation to select at least one of such pre-selected operations from a matching list [1a] concurrently with, [1b] (immediately) after, or [1c] within a certain period after various instances such as, e.g., [2a] receiving a single user input or multiple concurrent user inputs, [2b] acquiring $UI_{SEL}$, [2c] acquiring $UI_{ACT}$ or $UI_{THEN}$, [2d] turning on (or starting to turn on) a display unit, or [2e] running (or starting to run) an authentication operation. The above arrangements also apply to a terminal which includes multiple input units which receive at least two concurrent user inputs, where a directional input unit is the one which acquires $UI_{SEL}$.

In another exemplary embodiment of this seventh objective, a directional input unit may receive a single user input which includes $UI_{SEL}$, $UI_{ACT}$, and $UI_{THEN}$. The input unit then generates three different control signals which may cause a terminal to run a turning on operation, a user authentication operation, and a selecting operation, in response thereto. Thereafter, a terminal may run the selected operation which corresponds to an operation matched to such $UI_{SEL}$.

In another exemplary embodiment of this seventh objective, a terminal may run a selecting operation [1a] concurrently with, [1b] (immediately) after, or [1c] within a certain period after [2a] receiving a user input which includes $UI_{SEL}$, [2b] acquiring $UI_{SEL}$, [2c] turning on (or starting to turn on) a display unit when a display unit is (or has been) turned off, [2d] running (or starting to run) an authentication operation when user authentication is required, or the like. It is appreciated that running a selecting operation is a prerequisite for running a selected operation, for a terminal cannot run a selected operation until it locates which operation in a set of multiple pre-selected operations may be the one which a user desires to run when a terminal powers on, wakes up, or advances to a powered-on state, an on-state, or another mode.

In another exemplary embodiment of this seventh objective, after a terminal runs a selecting operation and selects which operation to run from a set of multiple pre-selected operations, a terminal may run a selected operation concurrently with, (immediately) after or within a certain period after [1] turning on (or starting to turn on) a display unit when a display unit has been turned off, or [2] running (or starting to run) an authentication operation when user authentication is required. In addition to those enumerated in Section 1-12-4, further examples of such pre-selected operations may include, but not limited to, e.g., [1] an operation to decide which mode of operation a terminal is to switch, where examples of such modes may include, e.g., a lock mode, an unlock mode, or an intermediate mode granted with different access authorities, [2] an operation to switch from one mode granted with less access authority to another mode with more access authority (or vice versa), [3] an authentication operation when a terminal may not be set up to (or may not be able to) run an authentication operation upon receiving a user input or when a user desires to run a $2^{nd}$ additional authentication operation even when a terminal runs (or has run) a $1^{st}$ authentication operation, [4] any other operations which a user desires to run in one of various timings as described above and below, [5] any other operations which a user wants to run by accessing an external hardware element or software element necessary to run the operation.

More particularly, those pre-selected operations which a user wants to run after a terminal powers on, wakes up, or switches states (or modes) may be classified into several different types, primarily depending on where (software) applications to run such pre-selected operations reside. For example, when a (software) application to run a selected operation resides inside a terminal, the operation is abbreviated as a "$1^{st}$-type pre-selected operation." In another example, when a (software) application to run a selected operation does not reside in a terminal (i.e., when the application resides in an external device), the operation is referred to as a "$2^{nd}$-type pre-selected operation." In another example, when a (software) application to run a selected operations may reside neither in a terminal nor in an external device, but may be accessible via an internet, such an operation is referred to as a "$3^{rd}$-type pre-selected operation."

Accordingly, a user of a mobile communication terminal including a directional input unit may enjoy seamless operations, e.g., by providing the input unit with a single user input (or multiple concurrent user inputs). More particularly, such seamless operations include running a selected operation which is selected from a matching list. To this end, a user may select multiple operations which he or she desires to run while or (immediately) after powering on, waking up, or switching to a new state (or mode), and may then assign each $UI_{SEL}$ to at least one of the pre-selected operations, thereby setting up a matching list. Thereafter, a terminal may match an acquired $UI_{SEL}$ with at least one of multiple pre-selected operations in a matching list. It is appreciated that, when a user provides multiple $UI_{SEL}$'s, each of such $UI_{SEL}$'s may be acquired concurrently with each other or one at a time by a directional input unit. Upon acquiring $UI_{SEL}$, a directional input unit may generate a control signal and send the signal to a terminal which then runs a certain selected operation which is matched with (or assigned to) such $UI_{SEL}$.

It is, therefore, appreciated that a terminal is provided with a "matching list" which is a list of such matchings or assignments between at least one of multiple $UI_{SEL}$'s and each of multiple operations which are pre-selected by a terminal (or a user) and at least one of which is to be run by a terminal after powering on, waking up, or switching to a new state (or mode). The matching list may also be set up, maintained, or modified by various ways. For example, a user (or a terminal) may modify such a list so that, e.g., a user may add a new operation to the matching list or delete an already existing operation therefrom.

Depending upon a detailed structure, the number of such pre-selected operations included in the matching list may be the same as the number of $UI_{SEL}$'s. Accordingly, each pre-selected operation may be matched with (or assigned to) each $UI_{SEL}$, where such a matching is to be referred to as a "one-to-one matching" or a "1-to-1 matching."

Alternatively, the matching list may include the $1^{st}$ number of such pre-selected operations and the $2^{nd}$ number of $UI_{SEL}$'s, where a $1^{st}$ number is different from a $2^{nd}$ number. In this arrangement, a terminal may assign at least two $UI_{SEL}$'s to a single pre-selected operation, or may instead match a single $UI_{SEL}$ to at least two pre-selected operations, where this arrangement may be referred to as a "1-to-n matching," a "n-to-1 matching." In addition, a terminal may assign at least two $UI_{SEL}$'s to at least two pre-selected operation, where such may be referred to as an "m-to-n matching" hereinafter, where m and n are integers and where m may be greater than, equal to, or less that n. Therefore, a user may render a terminal run at least two pre-selected operations either concurrently or sequentially after powering on or waking up, by simply providing a single $UI_{SEL}$, or a user may render a terminal run a single pre-selected operation by providing at least two $UI_{SEL}$'s. Of course, when a number of such pre-selected operations is the same as a number of $UI_{SEL}$'s, a terminal may use the "m-to-n" matching when some pre-selected operations are matched to a fewer number of $UI_{SEL}$'s, while some $UI_{SEL}$'s are matched to a fewer number of such pre-selected operations so that a total number of $UI_{SEL}$'s may be the same as a total number of such pre-selected operations. Because a user can run the selected operation by applying at least two different $UI_{SEL}$'s, this arrangement offers a user with such benefits that [1] a user who is not authorized cannot easily run the selected operation, [2] a terminal can reduce a chance of accidentally running the selected operation unless a user precisely provides such $UI_{SEL}$ for that selected operation, or the like. Alternatively, this arrangement offers a user with such benefits that a user may run at least two selected operations by simply providing a single $UI_{SEL}$.

2-8. Directional Input Units and Sensors

A eighth objective which is another exemplary aspect of this disclosure is to construct a directional input unit which may generate multiple, different or unique control signals either [1] concurrently, [2] sequentially, or [3] in a combination thereof, in response to at least one user input which may include therein $UI_{SEL}$ along with at least one of other sub-inputs such as $UI_{ACT}$, $UI_{THEN}$, $UI_{SWT}$, or $UI_{AUX}$. When a terminal includes a "matching list," a terminal may determine which one of multiple pre-selected operation to run after powering on, waking up, or switching to a new state (or mode).

When a terminal receives the control signal from a directional input unit, a terminal drives a certain hardware or software element for running at least one selected operation which may be assigned to or may match $UI_{SEL}$. Depending on detailed structure or configuration of a terminal, a control signal may directly drive the hardware or software element to run the selected operation. When desirable, a terminal may generate a control signal in response to $UI_{SEL}$, instead of configuring the directional input unit to do so.

In one exemplary embodiment of this eighth objective, a directional input unit may include at least two sensors, where a $1^{st}$ sensor may acquire $UI_{SEL}$, while a $2^{nd}$ sensor may acquire $UI_{ACT}$ or $UI_{THEN}$. In response to the sub-inputs, each sensor generates a unique or distinct control signal which can be recognized by a terminal. In general, such sensors are positioned in, on or around a directional input unit as a unitary element of the input unit. Alternatively, such sensors may be incorporated into another portion of a terminal but communicate with a directional input unit wirelessly or through wire. To this end, such sensors may be provided as a separate element and, therefore, may not be deemed as a part of a directional input unit. In addition, such sensors may be provided as (or included in) an add-on device which can releasably couple with a directional input unit or another portion of a terminal.

In another exemplary embodiment of this eighth objective, a terminal may incorporate a $3^{rd}$ number of sensors into a directional input unit but may be able to acquire a $4^{th}$ number of sub-inputs, where the $4^{th}$ number may be greater than the $3^{rd}$ number. That is, a terminal may acquire more $UI_{SEL}$'s using a fewer number of sensors such that, e.g., one sensor acquires only one $1^{st}$ $UI_{SEL}$ (e.g., a position of a movable portion), and that a terminal acquires therefrom at least one $2^{nd}$ temporal or spatial feature such as, e.g., [1] a velocity of a stationary portion or a movable portion of a directional input unit, [2] an acceleration of the portion, [3] a distance of a movement, [4] a total displacement, or the like. Conversely, a terminal may acquire a fewer $UI_{SEL}$'s using a greater number of sensors. This configuration may be employed to increase accuracy through, e.g., a redundant measurement of a certain static or dynamic feature of a user input, or the like. In addition, a terminal may recruit a software element in such a way that the software element analyzes a certain static or dynamic feature of a movement, and then acquires at least one additional feature therefrom, e.g., through a numerical integration, differentiation, interpolation, or the like. That is, a terminal or its directional input unit may not have to incorporate a certain number of prior art sensors in order to acquire the certain number of $UI_{SEL}$'s.

In either embodiment, a user of a mobile communication terminal including a directional input unit may enjoy seamless operations such as running a selecting operation upon powering, waking up or mode switching, by simply providing a single user input (or multiple concurrent user inputs), mainly due to multiple sensors which are implemented into the input unit. In addition, a terminal (or a user) may adjust a matching between multiple pre-selected operations (or multiple control signals) and multiple $UI_{SEL}$'s such as in, e.g., a 1-to-1 matching, a 2-to-1 (or 3-to-1) matching, a 1-to-2 (or 1-to-3) matching, an m-to-n matching or the like. Therefore, a terminal may run multiple pre-selected operations while or (immediately) after powering on or waking up.

2-9. Detailed Configuration (1)

A ninth objective as well as another exemplary aspect of this disclosure is to construct a directional input unit capable of acquiring multiple (user) sub-inputs concurrently, thereby providing seamless operations to a user of a mobile communication terminal. In one example, when a user provides multiple (user) sub-inputs such as, e.g., $UI_{SEL}$ and $UI_{ACT}$, a terminal may turn on a display unit, run a selecting operation, and seamlessly run at least one selected operation which matches $UI_{SEL}$. In another example, when a user provides $UI_{SEL}$ and $UI_{THEN}$, a terminal may run an authentication operation and a selecting operation seamlessly. When a user passes the authenticating, a terminal may seamlessly run a selected operation which is selected by a user. When a user fails the authenticating, however, a terminal may [1] keep its display unit turned off, [2] advance to a lock mode, [3] remain in a lock mode when a terminal was (or has been) in the lock mode, or [4] run a default operation which is different from the selected operation. It is appreciated in both examples that a user may also provide multiple $UI_{SEL}$'s concurrently or sequentially.

As described above, in response to a single user input including $UI_{SEL}$ or multiple concurrent user inputs one of which includes $UI_{SEL}$, a terminal may run at least two operations in response to the user input(s) in various "synchronization schemes" as follows. For example, a terminal turns on a display unit (in response to $UI_{ACT}$), runs a selecting operation (in response to $UI_{SEL}$), and then also runs at least one selected operation (based on $UI_{SEL}$). In another example, a terminal runs an authentication operation (in response to $UI_{THEN}$) and runs a selecting operation (in response to $UI_{SEL}$). When a user passes the authenticating, a terminal may then run at least one selected operation (based $UI_{SEL}$). But when a user fails the authenticating, a terminal may keep its display unit turned off, advance to a lock mode, or the like, as described above. Alternatively, a terminal may run a selecting operation only when a user passes such authenticating. In another example, a terminal may turn on a display unit (in response to $UI_{ACT}$), run an authentication operation (in response to $UI_{THEN}$), and also run a selecting operation (in response to $UI_{SEL}$), where a terminal may perform such turning on, authenticating, and selecting concurrently or sequentially (with or without a temporal gap therebetween, without a temporal overlap therebetween). Thereafter, a terminal may run at least one selected operation (based on $UI_{SEL}$).

It is appreciated that a single directional input unit may receive a single user input or multiple concurrent user inputs or that multiple directional input units may receive multiple concurrent user inputs provided by a single user, e.g., when a user touches or presses multiple input units concurrently with each other such as, e.g., [1] maintaining a temporal overlap therebetween, or [2] without having to detach his or her body part (or a non-user object) from all of such multiple input units, i.e., a user may detach one body part from one of such multiple input units as long as a user keeps his or her body part (or a non-user object) contacting or pressing at least another of such multiple input units. Once locating a matching list which match multiple $UI_{SEL}$'s with multiple pre-selected operations in a 1-to-1, 1-to-n, m-to-1 or m-to-n matching, a terminal may start to run a selecting operation, and finish to run such a selecting operation.

In a hardware level, running a turning on operation (i.e., turning on) typically includes the steps such as, e.g., rendering a display unit ready, receiving $UI_{ACT}$, closing a switch, supplying electric power thereto, or the like. Running an authentication operation (i.e., authenticating) similarly includes the steps such as, e.g., activating an authentication sensor, driving a hardware or software element for user authenticating, acquiring $UI_{THEN}$ or another authentication information, comparing $UI_{THEN}$ or authentication information with stored authentication information, determining whether $UI_{THEN}$ or information matches the stored information, or the like. Running a selecting operation also includes the steps such as, e.g., retrieving the matching list, acquiring $UI_{SEL}$, driving a selecting software element for such selecting, locating [1] a control signal or [2] at least one of the pre-selected operations from the matching list, or the like. It is appreciated that it usually takes different amount of time in [1] activating different hardware elements, [2] executing different software elements, [3] acquiring different sub-inputs using different sensors, or the like. Such a terminal may also spend different amounts of time in loading different software elements, in executing such software applications or relevant portions of an O/S, or the like. Therefore, in a hardware or software level, a terminal is more likely to start or to complete at least two of such selecting, turning on, or authenticating in different instances, even when a directional input unit concurrently acquires $UI_{SEL}$ and at least one of $UI_{ACT}$ and $UI_{THEN}$. By the same token, even when a terminal runs (or starts to run) such selecting, turning on, and authenticating in different instances, a terminal may finish at least two of such selecting, turning on, and authenticating in the same instance.

When a terminal includes an O/S or a (software) element of different types, the terminal may execute various steps of such operations in different sequences, regardless of when to start to run such turning on, selecting, or authenticating. For example, an O/S may execute only one step at a time when it is a single tasking system, while another O/S may execute multiple steps concurrently when it is a multiple-tasking system. Accordingly, even when an O/S drives a certain hardware element in certain timings, the nature of an O/S also determines when or whether a terminal can drive a certain hardware or software element concurrently or sequentially.

Accordingly, a terminal may synchronize various operations according to different schemes. For example, a terminal or, more particularly, a directional input unit (or at least two input units one of which is a directional input unit) may receive a single user input or multiple concurrent user inputs and may acquire multiple (user) sub-inputs in an at least substantial concurrency. However, a terminal may run (or start to run) such turning-on, authenticating, and selecting [1] concurrently with each other, [2] sequentially (i.e., one after another, with a temporal gap therebetween), or the like. In addition, a terminal may complete or finish (or start to complete or finish) running at least two of such operations [1] concurrently with each other, [2] sequentially, or the like. As a result, a user may still enjoy seamless operations, although various operations initiated by concurrently-obtained (user) sub-inputs may start or finish in different instances.

2-10. Detailed Configuration (2)

A tenth objective as well as another exemplary aspect of this disclosure is to construct a directional input unit capable of acquiring multiple (user) sub-inputs concurrently, thereby providing seamless operations to a user of a mobile communication terminal. To this end, a terminal recruits hardware or software elements in various arrangements to receive a single user input including multiple (user) sub-inputs (such as, e.g., $UI_{SEL}$, $UI_{THEN}$, $UI_{ACT}$, or $UI_{SWI}$) or to receive multiple concurrent user inputs each of which or all of which may include at least one of such (user) sub-inputs.

In one exemplary embodiment of this tenth objective, a terminal may recruit at least one hardware or software element to run a selecting operation, to run a turning on operation, to run at least one user authentication operation, or the like. More particularly, to run such multiple operations, a terminal may recruit different portions of the same (or different) hardware element, different portions of the same (or different) software element, or the like. In another example, a terminal may recruit a certain hardware or software element in order to turn on its display unit or to run an authentication operation, while recruiting the same (or different) hardware element, or the same (or different) software element to run a selecting operation. Once identifying which one of multiple pre-selected operations to run from the result of running the selecting operation, a terminal may run at least one selected operation, while assigning the same, similar or different access authorities to such a hardware or software element, whereby a user may or may not drive a certain hardware or software element, depending upon his or her access authorities granted to the user by a terminal in a certain mode of operation.

In another exemplary embodiment of this tenth objective, recruiting a certain hardware or software element or assigning suitable access authorities may also be synchronized with various timings as described above and below in conjunction with running a selecting operation, turning on a display unit, running an authentication operation, or the like. More particularly, a terminal may perform such recruiting (or starting to recruit) or such assigning (or starting to assign) in various timings such as, e.g., [1] before running (or starting to run) at least one of such operations enumerated in this paragraph, [2] concurrently with running (or starting to run) at least one of such operations, [3] (immediately) after running (or starting to run) at least one of such operations, [4] within a certain period after running (or starting to run) at least one of such operations, or the like. A terminal may perform such recruiting (or starting to recruit) or such assigning (or starting to assign) in various timings such as, e.g., [1] before finishing (or starting to finish) at least one of such operations, [2] concurrently with finishing (or starting to finish) at least one of such operations, [3] (immediately) after finishing (or starting to finish) at least one of such operations, or [4] within a certain period after finishing (or starting to finish) at least one of the operations.

2-11. Waking-Up and Running a Selected Operation with a Single (User) Sub-Input

An eleventh objective and another exemplary aspect of the disclosure is to fabricate a mobile communication terminal which runs a selecting operation concurrently with or (immediately) after performing [1] turning on a display unit or authenticating a user, or [2] both of such turning on and such authenticating, all in response to a single user input which accompanies therewith only $UI_{SEL}$ or multiple (user) sub-inputs one of which is $UI_{SEL}$. To this end, a terminal may condition either or both of such turning on and such authenticating upon $UI_{SEL}$ (or vice versa).

In a $1^{st}$ exemplary embodiment of this eleventh objective and when a terminal does not use any authentication operation, a user may provide a single user input to a directional input unit, where the user input only includes $UI_{SEL}$. A directional input unit may include a single sensor capable of acquiring $UI_{SEL}$ from the user input and generating at least one control signal. Upon receiving the control signal, a terminal confirms acquisition of $UI_{SEL}$ which may warrant that a user desires [1] to power on a terminal from its powered-off state, [2] to wake up a terminal from its off-state, or [3] to switch to a new state (or mode). Once a terminal powers on, wakes up, or switches to a new state (or mode), a terminal runs the selected operation.

As described above, a terminal may condition such turning on or such authenticating upon [1] such selecting or [2] running at least one selected operation which is designated by $UI_{SEL}$ and which is also selected from a matching list (or vice versa). Therefore, a terminal may run a selecting operation [1] (immediately) before, [2] concurrently with, [3] (immediately) after, or [4] within a certain period after such turning on or authenticating. Accordingly, a directional input unit may need a single sensor therein, and a user may need to provide a single user input which may in turn include a single $UI_{SEL}$. That is, it is deemed that a terminal may "condition" such turning on "upon" $UI_{SEL}$ (or vice versa). A terminal may improve an efficiency or reliability of this arrangement by configuring that a directional input unit may acquire $UI_{SEL}$ [1] only when a user moves a movable portion of a directional input unit, [2] only when a user moves a user body part (or a non-user object) beyond a certain distance or angle, while maintaining a contact with the input unit, or the like, thereby preventing an accidental acquisition of incorrect $UI_{SEL}$.

In a $2^{nd}$ exemplary embodiment of this eleventh objective when a terminal employs user authenticating, a user may provide a directional input unit with a single user input which may include only a single $UI_{THEN}$ therein. A directional input unit may include a single authentication sensor for acquiring $UI_{THEN}$, where an authentication sensor may recognize multiple $UI_{THEN}$'s or authentication information such as, e.g., different fingerprints of multiple fingers, different images of a same iris acquired in different angles or directions, dynamic patterns of blood pressures of the same user measured in different fingers or different positions along a same or different arm or leg, or the like. To this end, a directional input unit may include multiple sensors. A terminal may also match multiple $UI_{THEN}$'s with multiple pre-selected operations.

When a user supplies a user input including a single $UI_{THEN}$, a directional input unit may acquire such $UI_{THEN}$ and determine whether or not a current user is presenting an authentic fingerprint and, when he or she does, the input unit may also decide which one of multiple pre-selected fingers a user is presenting. Based thereon, a terminal may determine which one of multiple pre-selected operations a user desires to run after a terminal powers on, wakes up, or switches to a new state (or mode). In other words, a terminal of this example not only authenticates a user but also runs a selecting operation so as to determine which one of multiple pre-selected operations a user wants to run after such powering on, waking up, or mode switching.

A terminal may wake up in many different ways such as, e.g., turning on a display unit while executing steps necessary for such turning on, or keeping a display unit turned off while executing such steps. Alternatively, a terminal may turn on a display unit and display a lock (or home) screen thereon, depending upon an outcome obtained from such user authenticating. Regardless of such differences in detailed logistics of powering on or waking up in this $2^{nd}$ embodiment, it is deemed that a terminal of this embodiment may "condition" both of such turning on and such selecting "upon" a single $UI_{THEN}$.

In a $3^{rd}$ exemplary embodiment of this eleventh objective when a terminal employs at least one authentication operation, a user may provide a single user input to a directional input unit, where a user input includes only a single $UI_{THEN}$. A directional input unit may include a single authentication sensor for acquiring $UI_{THEN}$. However, an authentication sensor of this embodiment may acquire multiple $UI_{THEN}$'s in different pre-selected areas of the sensor such as, e.g., in a center area of the sensor, in its right-upper corner, in its right-lower corner, in its left-upper corner, in its left-lower corner, or the like. A terminal of this $3^{rd}$ embodiment may match such multiple areas of a sensor with multiple $UI_{THEN}$'s and, accordingly, may match each of such multiple areas of the sensor with each of such multiple pre-selected operations which a user desires to run after a terminal may power on, wake up, or switch to a new modes. Accordingly, when a user supplies a user input including a single $UI_{THEN}$ to a certain area of the sensor, a directional input unit may determine whether a current user is presenting an authentic fingerprint and determine which area from a set of multiple pre-selected areas of the sensor acquires $UI_{THEN}$ as well. Based thereupon, a terminal may authenticate a user as well as run a selected operation which a user has selected from a set of multiple authentication information.

A terminal may wake up in various ways, e.g., turning on a display unit while executing such steps described in the preceding paragraph or keeping a display unit turned off while executing such steps. In the alternative, a terminal may turn on a display unit, and then display a lock (or home) screen depending on an outcome which is obtained from the authenticating. Regardless of such differences in their detailed logistics, it is deemed that a terminal of this $3^{rd}$ embodiment may "condition" both of such turning on and such selecting "upon" $UI_{THEN}$.

It is appreciated in the above $2^{nd}$ and $3^{rd}$ embodiments that a terminal is deemed to "condition" such turning on and such authenticating "upon" $UI_{SEL}$ (i.e., $UI_{THEN}$). It is true that a terminal may include a single authenticating sensor and that the sensor acquires $UI_{THEN}$. However, a user should select at least one of multiple pre-selected fingers for such authenticating in the $2^{nd}$ embodiment, whereas a user has to select at least one of multiple pre-selected areas of a sensor in the $3^{rd}$ embodiment. In this context, the terminals in such $2^{nd}$ and $3^{rd}$ embodiments may be deemed to require a user to make a selection which finger or which image a user provides to a terminal or which area of a sensor a user may utilize when providing a single sub-input or multiple concurrent sub-inputs. Therefore, such terminals may be deemed to condition other wake-up operations upon a selecting operation.

In general, a terminal [1] may run (or start to run) such selecting, authenticating, or turning on in response to various (user) sub-inputs in different timings, [2] may finish (or start to finish) such operations in different timings based upon a nature of an O/S or a (software) application. For example, when a terminal includes a single tasking O/S, driving a hardware or software element is typically performed sequentially (i.e., one after another). Therefore, according to a source code of the O/S or a (software) application, a terminal which concurrently acquires multiple (user) sub-inputs may start to run, run, start to finish, or finish such selecting, authenticating or turning on in various timings, in various orders, or the like.

However, when a terminal includes a multiple-tasking O/S, the terminal may run such selecting, turning on, or authenticating concurrently with each other. Accordingly, a terminal which concurrently acquires multiple (user) sub-inputs may start to run, run, start to finish, or finish the above operations concurrently with each other. In other words, because various terminals of this disclosure may include a single tasking O/S or a multiple-tasking O/S, an exact instance (or order) of starting to run, running, starting to finish, or finishing two or more operations may depend on such a nature of the O/S.

Accordingly, it is appreciated that, regardless of the detailed functionality of an O/S and whether an O/S is a single- or multiple-tasking program, an O/S may be deemed to "concurrently" run a selecting operation and at least one of an authentication operation and a turning on operation, [1] when an O/S runs (or starts to run) such operations at the same instance, or [2] when an O/S runs the operations in such a way that the O/S does not run (or does not start to run) all of such operations at the same instance but that the O/S starts to run the last of such operations before the O/S finishes to run the first of such operations. That is, concurrently running at least two operations means that an O/S runs at least two operations while defining therebetween at least one temporal overlap. In contrary, sequentially running at least two operations does not define any temporal overlap between such operations. Rather, the O/S runs a $1^{st}$ operation and, upon or only after finishing the $1^{st}$ operation, it starts to run a $2^{nd}$ operation.

2-12. Notice Units to Assist User

A twelfth objective and another exemplary aspect of this disclosure is to incorporate at least one "notice unit" into a mobile communication terminal, whereby a notice unit may provide a user with [1] a "visual notice signal," [2] an "audible notice signal," or [3] a "tactile notice signal" regarding details of [1] $UI_{SEL}$ provided by a user, [2] multiple $UI_{SEL}$'s which a user may choose, [3] at least two pre-selected operations included in a matching list, [4] all pre-selected operations in the matching list, [5] matching or assigning between such $UI_{SEL}$'s and such pre-selected operations, and the like. Therefore, a user may confirm $UI_{SEL}$ which he or she provides (or has to provide), or may take a remedial action when he or she has provided wrong $UI_{SEL}$ to a directional input unit.

A terminal may provide such notice signals using pre-existing hardware elements such as, e.g., [1] a display unit (for visual notice signals), [2] a speaker (for audible notice signals), [3] a vibrator (for tactile notice signals), and the like. Alternatively, a terminal may include a "notice unit" which is a unit separate from the display unit, speaker, or vibrator, which generates such notice signals, and which provides a user with such notice signals.

A notice unit may be disposed in various locations on or around a terminal. For example, a notice unit may be disposed adjacent to or around a directional input unit in such a way that a user may readily confirm [1] which $UI_{SEL}$ a user has to provide to run a certain selected operation, [2] which $UI_{SEL}$ a user has provided and which operation is to be selected as the selected operation, [3] which pre-selected operation has been selected as the selected operation, or the like. In another example, a notice unit may be disposed away from a directional input unit, but in a location which is convenient for a user to confirm various notice signals. When a notice unit generates an audible or tactile notice signals, an exact location of a notice unit with respect to such input units may not be material, as far as a user may readily hear the audible notice signals or a user may feel the tactile notice signals.

2-13. Use Applications

A thirteenth objective which is another exemplary aspect of this disclosure is to construct various directional input units by incorporating the directional input units into prior art mobile communication devices and by converting such prior art devices into the mobile communication terminals of this disclosure. For example, such directional input units or at least some portions thereof may be incorporated into [1] prior art smart-phones, [2] prior art mobile-phones, [3] prior art mobile pads, [4] prior art personal digital assistants, [5] prior art web pads, [6] other prior art wireless communication devices, or the like, where such prior art devices are equipped with wireless communication capabilities, and where such devices may also include at least a minimum number of hardware or software elements for running a certain operation as well.

In another example, various directional input units or their portions may also be incorporated into other prior art mobile communication devices such as, e.g., a laptop computer, a PDA, a mobile pad, or other portable devices. In addition, various directional input units or their portions may further be incorporated into other prior art electric articles or other prior art articles including electrical controller (including a computer, a control panel, or a controller) of [1] an automobile, [2] an industrial or personal robot, [3] a drone, or other stationary or mobile articles which are equipped with such capabilities. It is appreciated in this example that such electric controller with the directional input unit [1] may be disposed inside or on such articles or [2] may be incorporated into an external device therefor.

In yet another example, such directional input units may be implemented into control systems of other electric or electro-mechanical devices, where examples of such devices may include, e.g., [1] a transportation vehicle such as a manual or electric bicycle, a motor cycle with an engine or an electrical motor, an automobile with an internal combustion engine, an electric automobile, an airplane, a helicopter, a drone, a boat, a vessel, or the like, [2] a non-transportation equipment such as a bulldozer, a truck, a crane, or other heavy equipment. In addition, such directional input units may be implemented into [3] other prior art data processing devices for various purposes such as, e.g., processing, storing or retrieving various data or information, [4] into other prior art wireless or wired communication devices which are incorporated into such vehicles or equipment of the [1] or [2] of this paragraph, or the like. In one specific example, a directional input unit may be implemented into a control system of an automobile and allow a driver to manipulate a CPU member or an O/S of the control system, thereby driving a hardware or software element of the automobile. In another specific example, one of such various terminals or its directional input unit of this disclosure may releasably couple with an automobile in such a way that a driver may manipulate the directional input unit of such a terminal to manipulate operations of the automobile. Such directional input units or terminals of this disclosure may further be implemented into other prior art devices, vehicles, or equipment of this disclosure for the similar or related purposes.

2-14. User Applications

A fourteenth objective or another exemplary aspect of this disclosure is to fabricate a mobile communication terminal equipped with a directional input unit which not only guarantees seamless operations but also meets different needs of different users. For example, a directional input unit can acquire $UI_{SEL}$ or concurrently acquire $UI_{SEL}$ and at least one another (user) sub-input which is included in a single user input or in multiple concurrent user inputs, and each of which is matched to a certain operation of a terminal. Accordingly, once acquiring $UI_{SEL}$, a terminal can run an operation desired by a user while or (immediately) after powering on, waking up, or switching to a new state (or mode).

In one example, a user may exercise a single effort to a directional input unit such as, e.g., providing a single user input or concurrently supplying multiple user inputs, while a terminal is in a powered-off state, an off-state, or a certain mode. A directional input unit may receive a user input, acquire at least two sub-inputs, and then send at least two control signals to a terminal. Upon receiving such control signals, a terminal runs at least two operations, where one operation is to power on a terminal, to wake up a terminal, or to switch to a new state (or mode), and where another operation is loading a certain (e.g., messenger, email, SNS, SMS, or navigation) application selected based on the acquired $UI_{SEL}$. Alternatively, one of the operations may be an authentication operation, while another may be loading a certain application to run the selected operation intended by a user. Therefore, a user can enjoy seamless operations such as (1) powering on a terminal, waking up a terminal, or switching to a new state (or mode), (2) selecting a desired application from a matching list based on $UI_{SEL}$, and (3) running the selected operation seamlessly, simply by providing a single user input (or multiple concurrent user inputs) to a terminal, when [1] a terminal is (or has been) powered off, [2] its display unit is (or has been) turned off, or [3] a terminal is (or has been) operating in a certain current mode.

Therefore and in one case, a user may exercise a single effort to a directional input unit as described above. In response thereto, a directional input unit may acquire $UI_{ACT}$, $UI_{THEN}$, and $UI_{SEL}$, and then send three control signals to a terminal which may then turn on a display unit, authenticate a user and, when a user passes such authenticating, run a selecting operation. Once completing the selecting operation, a terminal may proceed to run the selected operation, without requiring a user to provide any additional user input to load a (software) application and to run the selected operation.

In another case, a directional input unit may acquire $UI_{ACT}$, $UI_{THEN}$, and two $UI_{SEL}$'s, and then send four control signals to a terminal which may then turn on a display unit, authenticate a user and, when a user passes such authenticating, run two selecting operations. Once completing the selecting operation, a terminal may proceed to run the $1^{st}$ selected operation and then to run the $2^{nd}$ selected operation, without requiring a user to provide any additional user input to load a (software) application and to run the $1^{st}$ and $2^{nd}$ selected operations. It is appreciated that a terminal may provide multiple windows on a display unit such that a user may concurrently run such $1^{st}$ and $2^{nd}$ selected operations. A terminal may instead allow a user to run such $1^{st}$ and $2^{nd}$ selected operations sequentially such that, when a user finishes to run the $1^{st}$ operation, a terminal may automatically load a (software) application and then run the $2^{nd}$ selected operation, without requiring a user to provide any additional user input therefor.

In another case, a user may exercise a single effort to a directional input unit as described above, while hoping that he or she wants to take a picture immediately after powering on or waking up a terminal. However, a user may not remember in which direction a user has to push a movable portion of a directional input unit in order to generate a control signal which is matched to an operation of loading a camera. In this case, a terminal may provide a user with visual notice signals and inform the user which direction is assigned to a camera loading operation. Accordingly, a user may enjoy seamless operations by providing a proper $UI_{SEL}$ to a terminal.

2-15. User Advantages

A fifteenth objective which is another exemplary aspect of this disclosure is to construct a directional input unit capable of generating multiple unique control signals either concurrently, sequentially, or in their combinations, in response to a single user input (or multiple concurrent user inputs). More particularly, even when a terminal is completely powered off or its display unit has been turned off, a user may readily power on a terminal or turn on the display unit, and may additionally run his or her desired operation in a lock or unlock mode, by simply providing a single user input (or multiple user inputs concurrently) to a directional input unit. Therefore, such a terminal equipped with one of various directional input unit of this disclosure can guarantee a user with optimum seamless operations.

Various directional input units may receive a user input which also includes $UI_{SEL}$, $UI_{ACT}$, $UI_{THEN}$, or the like in such a way that such seamless operations also include a user authentication based on a fingerprint, an iris, a retina, a face, or the like. In addition, such directional input units may also receive a user input which includes additional and different (user) sub-inputs. In other words, various directional input units of this disclosure can provide more and more seamless operations as such input units are equipped with more and more sensors each of which may acquire an additional (user) sub-input.

For example, a directional input unit can be expanded to receive a user input and to concurrently acquire, e.g., at least two different (user) sub-inputs (e.g., $UI_{SEL}$ and $UI_{ACT}$, or $UI_{SEL}$ and $UI_{THEN}$), at least three different (user) sub-inputs (e.g., a set of $UI_{SEL}$, $UI_{ACT}$, and $UI_{THEN1}$, another set of $UI_{SEL}$, $UI_{ACT}$, and $UI_{THEN2}$, or yet another set of $UI_{SEL}$, $UI_{THEN1}$, and $UI_{THEN2}$), where $UI_{THEN1}$ and $UI_{THEN2}$ represent different authentication sub-inputs for different authentication operations A directional input unit may acquire at least four different (user) sub-inputs as well such as, e.g., a set of $UI_{SEL}$, $UI_{ACT}$, $UI_{THEN1}$, and $UI_{THEN2}$, another set of $UI_{SEL}$, $UI_{ACT}$, $UI_{THEN}$, and $UI_{AUX}$, or yet another set of $UI_{SEL1}$, $UI_{SEL2}$, $UI_{ACT}$, and $UI_{THEN}$, where $UI_{SEL1}$ and $UI_{SEL2}$ denote sub-inputs for two different selecting operations each of which selects an operation which a user desires to run concurrently or sequentially when a terminal wakes up or advances to an unlock mode (or another mode).

Due to the foregoing, a user of a mobile communication terminal implemented with the directional input unit of this disclosure only has to exercise a single effort in order to run a selecting operation and, therefore, to run at least one selected operation while or (immediately) after a terminal powers on, wakes up, or switches to a new state (or mode). Because a directional input unit may differentiate user inputs applied in different directions, a terminal equipped with the directional input unit of this disclosure may allow a user to select and run a desired operation from a set of three, four or more pre-selected operations, thereby offering a vast selection options of operations.

3. Additional Objectives

Various directional input units for mobile communication terminals disclosed heretofore and hereinafter receive a single user input (or multiple concurrent user inputs) which may include therein or accompany therewith at least one selecting (user) sub-input ($UI_{SEL}$), optionally along with at least one (user) sub-input such as, e.g., an authentication (user) sub-input ($UI_{THEN}$), an activation (user) sub-input ($UI_{ACT}$), a mode-switching (user) sub-input ($UI_{SWT}$), or the like. From a single user input, various directional input units can acquire $UI_{SEL}$, whereas other (user) sub-inputs may be acquired [1] by the same directional input unit, [2] by another directional input unit, or [3] by a non-directional input unit.

Accordingly and in another exemplary aspect, a mobile communication terminal includes at least one display unit and may switch between an off-state and an on-state. The terminal is not completely powered off in both states, while the display unit is turned off in the off-state but turned on in the on-state. The terminal further includes at least one directional input unit which receives a single user input from a user and which includes a $1^{st}$ sensor for acquiring a $1^{st}$ direction of the single user input (e.g., a direction in which a user applies the single user input). Upon (or after) receiving the single user input in the off-state, the terminal may select at least one selected operation from a set of multiple pre-selected operations either [1a] based on the $1^{st}$ direction or [1b] determined by the $1^{st}$ direction, and may run the selected operation either [2a] upon or [2b] (immediately) after the terminal switches from the off-state to the on-state in response to the single user input, where the selected operation is neither an operation of turning on a display unit nor a user authentication operation. Therefore, the terminal may seamlessly run the selected operation in response to the single user input and may also run an operation of turning on the display unit or authenticating the user in response to the same single user input.

Alternatively, one of such multiple pre-selected operations may be selected from a $1^{st}$ group consisting of a $1^{st}$ operation of taking a picture, a $2^{nd}$ operation of recording a video clip, a $3^{rd}$ operation of recording a user voice, a non-user voice or a non-human sound, a $4^{th}$ operation of connecting to a wireless network for communication, a $5^{th}$ operation of connecting to a global or local website, a $6^{th}$ operation of receiving, reading, writing or sending emails, a $7^{th}$ operation of making or receiving phone calls or reviewing a call history, an $8^{th}$ operation of reading, writing, receiving, editing, or sending short messages, a $9^{th}$ operation of reading, writing, receiving, editing, sending, or responding to messages via a social networking service, a $10^{th}$ operation of accessing or retrieving data stored in a terminal or an external device or storing data thereinto, an $11^{th}$ operation of connecting to an external device, a $12^{th}$ operation of connecting to an IoT network, a combination of at least two of the above, or the like. Accordingly, a terminal can seamlessly run the selected operation in response to the single user input, as well as run at least one of an operation of turning on the display unit and an operation of authenticating the user. A terminal may also select the selected operation from a $2^{nd}$ group or $3^{rd}$ group of such multiple pre-selected operations as will be described below.

In such a terminal, the first direction may be [D1] not completely vertical to a long axis of the terminal, when the input unit is disposed on a front or rear surface thereof or on a side edge thereof, [D2] at least partially parallel with the long axis, when the input unit is disposed on the front or rear surface or on the side, [D3] not completely vertical to the long axis, when the input unit is not disposed on one of a top or bottom edge of the terminal, [D4] at least partially parallel with the long axis, when the input unit is not disposed on the top or bottom edge thereof, [D5] not completely parallel with the long axis, when the input unit is disposed on the top or bottom edge of thereof, [D6] at least partially vertical to the long axis, when the input unit is disposed on the front or rear surface or on the side, or [D7] at least partially perpendicular or transverse to a second direction from which the input unit acquires other sub-inputs for authenticating the user or turning on the display unit.

In such a terminal, when at least a portion of the force is applied to the first sensor by the user along the first direction, the terminal may acquire at least one (user) sub-input from the force associated with the user input. In the alternative, when a user contacts or touches a directional input unit, a terminal may acquire at least one (user) sub-input from a type, a nature, a static feature, or a dynamic feature of a $1^{st}$ contact which is formed between the first sensor and a user body part. The user may hold his or her body part steady such that the $1^{st}$ contact does not change its dynamic feature over time. Alternatively, the user may move the user body part in the $1^{st}$ direction while maintaining the $1^{st}$ contact, thereby moving the $1^{st}$ contact in the $1^{st}$ direction as well. In another alternative, a terminal may acquire at least one (user) sub-input from a type, a nature, a static feature, or a dynamic feature of a $2^{nd}$ contact which may be formed between the first sensor and at least one non-user object (manipulated by a user). The user may hold the non-user object steady so that the $2^{nd}$ contact does not change its dynamic feature over time. Alternatively, the user may move the object along the $1^{st}$ direction, while maintaining the $2^{nd}$ contact, thereby moving the $2^{nd}$ contact in the $1^{st}$ direction as well.

In this terminal, the force may cause a $1^{st}$ movement of at least one movable portion of the $1^{st}$ sensor, whereby the $1^{st}$ direction is a direction of the $1^{st}$ movement. Instead, the user may generate a $2^{nd}$ movement of the user body part with respect to at least one stationary portion of the $1^{st}$ sensor, where the $2^{nd}$ direction is a direction of the $2^{nd}$ movement. Alternatively, the user may generate a $3^{rd}$ movement of the non-user object with respect to at least one stationary portion of the first sensor, where the $3^{rd}$ direction is a direction of the third movement.

In this terminal, the directional input unit may acquire $UI_{ACT}$ or $UI_{THEN}$, whereby the terminal can run at least one operation of turning on the display unit or authenticating a user, respectively, in response to $UI_{ACT}$ Or $UI_{TNEN}$, upon (or after) the terminal switches from the off-state to the on-state in response to the single user input.

In another exemplary aspect, another mobile communication terminal similarly includes at least one display unit and switches between the off-state and on-state as defined above. In one example, the terminal includes at least one directional input unit which includes a $1^{st}$ sensor for receiving a force as a single user input applied to the $1^{st}$ sensor by a user in a $1^{st}$ direction which corresponds to one such [D1] to [D7] as described above. In another example, the directional input unit includes a $1^{st}$ sensor for monitoring a contact with at least one user body part as a single user input. The user then moves the body part and, accordingly, a position of the contact also moves in a $1^{st}$ direction which is one of the above [D1] to [D7]. In another example, the directional input unit includes a $1^{st}$ sensor for monitoring a contact with at least one non-user object as the single user input, where the user moves the object in a $1^{st}$ direction and, therefore, the contact also moves in the $1^{st}$ direction which is one of the above [D1] to [D7]. Accordingly, upon (or after) receiving the single user input in the off-state, the terminal selects at least one selected operation from a set of multiple pre-selected operations [1] based on or [2] determined by the $1^{st}$ direction, and runs the selected operation upon (or after) the terminal switches from the off-state to the on-state in response to the single user input.

In one case, the selected operation may not be the operation of turning on the display unit or authenticating the user. Therefore, the terminal seamlessly runs the selected operation in response to the single user input and runs the operation of turning on the display unit or authenticating the user. In another case, one of multiple pre-selected operations is selected from a $2^{nd}$ group which consists of a $1^{st}$ operation of taking a picture, a $2^{nd}$ operation of recording a video clip, a $3^{rd}$ operation of recording a voice of a user, a voice of a non-user sound or a non-human sound, a $4^{th}$ operation of connecting to a wireless communication network, a $5^{th}$ operation of connecting to a website, a $6^{th}$ operation of viewing or sending an email, a $7^{th}$ operation of making or receiving a phone call, an $8^{th}$ operation of viewing or sending a short message, a $9^{th}$ operation of viewing or sending a message through a SNS, a $10^{th}$ operation of accessing or retrieving data stored in the terminal or an external device or storing such data thereinto, an $11^{th}$ operation of connecting to an external device, a $12^{th}$ operation of opening or closing a door of a room, a building or an automobile, a $13^{th}$ operation of turning on or off an engine or a motor of an automobile or other transportation vehicles, or a combination thereof. As a result, the terminal seamlessly runs the selected operation in response to the single user input and also runs an operation of turning on the display unit or authenticating the user. Alternatively, the terminal may select the operation from the $1^{st}$ group or a $3^{rd}$ group of multiple pre-selected operations as has been explained above and below.

In such a terminal, the directional input unit acquires $UI_{ACT}$ or $UI_{THEN}$, whereby the terminal runs the operation of turning on the display unit or authenticating the user, respectively, in response to $UI_{ACT}$ and $UI_{THEN}$ upon or (immediately) after the terminal switches to the on-state in response to the single user input.

In another exemplary aspect, a mobile communication terminal includes at least one display unit and switches between the off-state and the on-state. The terminal includes at least one directional input unit for receiving a single user input from a user in the off-state, where the directional input unit includes at least one $1^{st}$ sensor and $2^{nd}$ sensor, where the $1^{st}$ sensor acquires $UI_{SEL}$ from the single user input based on a $1^{st}$ direction in which the user input is applied thereto, and where the $2^{nd}$ sensor acquires $UI_{ACT}$ also from the single user input. The terminal acquires $UI_{SEL}$ and runs a selected operation which is matched to $UI_{SEL}$ upon or (immediately)

after the terminal switches from the off-state to the on-state in response to $UI_{ACT}$, where the selected operation is related to neither turning on the display unit nor authenticating the user. The selected operation may instead be selected from the $1^{st}$ or $2^{nd}$ group as described above. Therefore, the terminal seamlessly runs the selected operation [1] in response to the single user input and also in response to turning on the display unit or [2] concurrently with turning on a display unit simply by receiving the single user input.

In another exemplary aspect, a mobile communication terminal includes at least one display unit and switches between the off-state and the on-state. The terminal includes at least one directional input unit for receiving a single user input from a user in the off-state. The terminal includes at least one $1^{st}$ sensor and at least one $3^{rd}$ sensor, where the $1^{st}$ sensor acquires $UI_{SEL}$ from the single user input based upon a direction along which the single user input is applied to the input unit, while the $3^{rd}$ sensor acquires $UI_{THEN}$ also from the same single user input. The terminal receives $UI_{SEL}$ and then runs a selected operation matching $UI_{SEL}$ upon or (immediately) after the terminal switches to the on-state in response to $UI_{ACT}$.

In one case, the selected operation is related to neither turning on a display unit nor authenticating a user. In another case, the selected operation is selected from the $1^{st}$ or $2^{nd}$ group as enumerated above. Accordingly, the terminal seamlessly runs the selected operation in response to the single user input and authenticating a user in the response to the single user input. Alternatively, the terminal seamlessly runs the selected operation concurrently with authenticating the user simply by receiving the single user input.

In another exemplary aspect, a mobile communication terminal includes a display unit and switches between an off-state and an on-state as described above. A terminal also includes a directional input unit which receives a single user input from a user in the off-state and which includes a sensor capable of acquiring a 2-D direction of the single user input or a 3-D direction thereof from the single user input. The terminal senses the spatial direction and runs at least one selected operation which is matched (or assigned) to the spatial direction upon (or after) switching from the off-state to the on-state, where the selected operation is not related to turning on the display unit or to authenticating a user, or where the selected operations may be selected from the above $1^{st}$ or $2^{nd}$ group.

Therefore, the terminal seamlessly runs the selected operation in response to the single user input as well as running at least one operation of turning on the display unit or authenticating the user also in the response to the single user input. Alternatively, the terminal seamlessly runs the selected operation concurrently with at least one operation of turning on the display unit or authenticating the user, simply by receiving the single user input.

In such a terminal, the above direction may be one of a $1^{st}$ movement direction, a $2^{nd}$ movement direction, and a $3^{rd}$ movement direction, where the $1^{st}$ movement direction is a movement direction of the sensor in response to the single user input, where the $2^{nd}$ movement direction corresponds to a direction of a movement of a body part of a user causing the user input on the sensor, and where the $3^{rd}$ movement direction is a direction of movement of a non-user object causing the user input on the sensor.

In this terminal, the above spatial direction may be one of a $1^{st}$ movement direction, a $2^{nd}$ movement direction, and a $3^{rd}$ movement direction, where the $1^{st}$ movement direction is a direction of a movement of a movable portion of the input unit in response to the user input, where the $2^{nd}$ movement direction is a movement direction of a user body part causing the user input on a stationary portion of the input unit, while the $3^{rd}$ movement direction is a movement direction of a non-user object causing the user input on one of the portions of the input unit.

In another exemplary aspect, a mobile communication terminal includes a directional input unit and a display unit and switches between the off- and on-states as defined above, where the input unit receives a single user input in the off-state from a user. The directional input unit also includes a $1^{st}$ sensor and at least one of a $2^{nd}$ sensor and a $3^{rd}$ sensor, where the $1^{st}$ sensor senses a $1^{st}$ direction of the single user input, the $2^{nd}$ sensor acquires $UI_{ACT}$ also from the single user input, and where the $3^{rd}$ sensor acquires $UI_{THEN}$ also from the single user input. The terminal runs at least one operation of turning on the display unit or authenticating the user, respectively, in response to $UI_{ACT}$ and $UI_{THEN}$. The terminal runs a selecting operation based upon the $1^{st}$ direction, and runs the selected operation while or (immediately) after the terminal switches from the off-state to the on-state, where the selected operation is neither the turning on nor authenticating operation. Therefore, the terminal may seamlessly run the selected operation in response to the single user input and may also run at least one operation of turning on the display unit and authenticating the user in response to the single user input as well.

In such a terminal, the single user input may be a force, a $1^{st}$ contact, or a $2^{nd}$ contact, where the force is applied to the $1^{st}$ sensor by the user in the $1^{st}$ direction, where the $1^{st}$ contact is formed between the $1^{st}$ sensor and at least one user body part, and the user moves the body part in the $1^{st}$ direction, thereby also moving the $1^{st}$ contact in the $1^{st}$ direction, and where the $2^{nd}$ contact is formed between the $1^{st}$ sensor and at least one non-user object, and the user moves the object in the $1^{st}$ direction, thereby moving the $2^{nd}$ contact along the $1^{st}$ direction as well.

In another exemplary aspect, a mobile communication terminal may include at least one directional input unit, where the terminal includes a display unit and switches between the off-state and the on-state, where the terminal is in the off-state, and where the input unit receives a single user input from a user when the terminal is in off-state. The directional input unit includes a $1^{st}$ sensor and at least one of a $2^{nd}$ sensor and a $3^{rd}$ sensor, where the $1^{st}$ sensor acquires $UI_{SEL}$ from the single user input, where the $2^{nd}$ sensor acquires $UI_{ACT}$ from the single user input, while the $3^{rd}$ sensor acquires $UI_{THEN}$ also from the single user input. The terminal runs an operation of turning on the display unit or another operation of authenticating the user in response to $UI_{ACT}$ or $UI_{THEN}$, respectively, while or (immediately) after the terminal switches to the on-state. The terminal may select an operation based on $UI_{SEL}$, and may also run the selected operation while or (immediately) after the terminal switches from the off-state to the on-state. The selected operation matches $UI_{SEL}$, and the selected operation is neither the operation of turning the display unit nor the operation of authenticating the user. Accordingly, the terminal seamlessly runs the selected operation in response to the single user input as well as runs one of the operations of turning on the display unit and authenticating the user also in response to the single user input.

It is appreciated in the preceding seven exemplary aspects of this Section that such directional input units or their sensors may sense at least one static or dynamic feature of various user inputs and that such units or sensors may acquire $UI_{SEL}$'s from at least one of such features or, alternatively, may acquire at least one of $UI_{ACT}$ or $UI_{THEN}$ from at least one of such features. Examples of such static or dynamic features of various user inputs have been described hereinabove and will be provided hereinafter. In addition, various terminals may include (software) elements which can run various operations for driving various (hardware) elements of the terminal to perform various tasks as have been explained.

It is also appreciated in the preceding seven exemplary aspects of this Section that various terminals including the directional input units may run a selecting operation, along with at least one of an activation operation and an authentication operation when the terminal receives a single user input or multiple concurrent user inputs while the terminal is (or has been) in its powered-off state. In this aspect, various terminals of the above seven exemplary aspects may be modified according thereto. In addition, other terminals to be provided below in this Section may run a selecting operation, along with at least one of an activation operation and an authentication operation as well, when the terminal receives the single user input or multiple concurrent user inputs while the terminal is (or has been) in its powered-off state.

In another exemplary aspect, a mobile communication terminal includes a display unit and switches between the off-state and the on-state. The terminal also includes at least one directional input unit which can sense a $1^{st}$ direction and a $2^{nd}$ direction from a single user input which a user provides to the input unit by manipulating at least a portion of the input unit in the off-state. In general, the $1^{st}$ direction is different from the $2^{nd}$ direction. In one case, the input unit concurrently acquires the $1^{st}$ and $2^{nd}$ sub-inputs from the $1^{st}$ and $2^{nd}$ directions, respectively. In another case, the input unit concurrently and respectively acquires the $1^{st}$ and $2^{nd}$ sub-inputs from the $1^{st}$ and $2^{nd}$ directions. In either of such cases, the terminal runs different operations in response to the different sub-inputs while or (immediately) after switching to the on-state or switching to a new mode.

In this terminal, the user may perform such manipulating, e.g., by concurrently moving the portion of the input unit in the $1^{st}$ and $2^{nd}$ directions, where the $2^{nd}$ direction may be perpendicular or transverse to the $1^{st}$ direction. In the alternative, one of such directions may be straight but another may be curved, or the like.

Alternatively and in such a terminal, the user may perform such manipulating, e.g., by contacting or touching the portion the input unit with at least one user body part or non-user object along the $2^{nd}$ direction and by concurrently moving a position of such contacting or touching in the $1^{st}$ direction. The $1^{st}$ direction may be parallel with or transverse to a surface of the portion of the input unit.

In such a terminal, a user may provide the user input using a user body part (or a non-user object). In response to the $2^{nd}$ sub-input, the terminal may run an operation of authenticating a user based on $1^{st}$ user information or run another operation of turning on the display unit. In response to the $1^{st}$ sub-input, the terminal may run at least one selected operation which is selected from a $3^{rd}$ group of multiple pre-selected operations which include, e.g., an operation of loading a camera, an operation of loading a video camera, an operation of viewing a picture, an operation of playing a video clip, an operation of loading a sound recorder, an operation of playing a sound, an operation of connecting to one of a wired communication network and a wireless communication network, an operation of connecting to a website, an operation of viewing, editing, writing, sending, deleting or storing emails, an operation of making or receiving a phone call, an operation of composing, viewing, editing, sending, deleting or storing short messages, an operation of composing, viewing, editing, sending, responding, deleting, or storing a message in a SNS, an operation of accessing or retrieving data stored an external device, an operation of storing data into the external device or the terminal, an operation of connecting to the external device, an operation of accessing a phone book or an address book, an operation of loading a dictionary or a scheduler, an operation of loading a navigator, an operation of sending emergency messages, an operation of connecting to an IoT network, an operation of unlocking, opening, closing or locking a door (or a window) of an automobile (or a building), an operation of authenticating a user based on a second user information which is different from the first user information, an operation of advancing to a certain mode operation, a combination thereof, or the like.

It is appreciated that the above "$1^{st}$ direction" may be replaced by a $1^{st}$ static (or dynamic) feature which may be related to such manipulating. The above "$2^{nd}$ direction" may be replaced by a $2^{nd}$ static (or dynamic) feature of such manipulating as well. In addition, the terminal may include software elements which can run various operations for driving various hardware elements of the terminal to perform various tasks as explained in this aspect.

In another exemplary aspect, a mobile communication terminal includes a display unit and switches between the off-state and the on-state, where such a unit and such states are identical to those defined above. The terminal also includes at least one directional input unit which acquires a $1^{st}$ sub-input and a $2^{nd}$ sub-input when a user provides a single user input thereto by moving at least one portion of the input unit in the off-state. In one case, the input unit may monitor a $1^{st}$ direction of the single user input, and acquire a $1^{st}$ sub-input from the $1^{st}$ direction, whereas the input unit may sense a $2^{nd}$ direction of the user input and acquire a $2^{nd}$ sub-input from the $2^{nd}$ direction of the single user input concurrently with acquiring the $1^{st}$ sub-input. In another case, the input unit may sense a $2^{nd}$ direction of the user input concurrently with sensing the $1^{st}$ direction and acquire a $2^{nd}$ sub-input from the $2^{nd}$ direction. In either of such cases, the $1^{st}$ and $2^{nd}$ directions are different from each other, and the terminal runs different operations in response to the different sub-inputs while or (immediately) after switching to the on-state or to a new mode.

It is appreciated that the "$1^{st}$ direction" may be replaced by a $1^{st}$ static (or dynamic) feature of such moving and that the "$2^{nd}$ direction" may also be replaced by a $2^{nd}$ static (or dynamic) feature of such moving. The terminal may include various software elements which can run various operations in order to drive various hardware elements of the terminal to perform various tasks as have been explained in this aspect.

In another exemplary aspect, a mobile communication terminal includes a display unit and switches between the off-state and the on-state, where such a unit and such states are identical to those defined above. The directional input unit acquires a $1^{st}$ sub-input and a $2^{nd}$ sub-input when a user provides a single user input to the input unit by moving at least a portion of the input unit in the off-state. In one case, the input unit concurrently senses a $1^{st}$ direction as well as a $2^{nd}$ different direction from the single user input, thereby acquiring the $1^{st}$ and $2^{nd}$ sub-inputs from the $1^{st}$ and $2^{nd}$ directions, respectively. In another case, the input unit senses a $1^{st}$ direction and a $2^{nd}$ different direction from the single user input, thereby acquiring the $1^{st}$ and $2^{nd}$ sub-inputs concurrently and respectively from the $1^{st}$ and $2^{nd}$ directions. In both of such cases, the terminal runs different operations in response to the different sub-inputs while or (immediately) after switching to the on-state or to a new mode.

In such a terminal, the $2^{nd}$ direction may be perpendicular or transverse to the $1^{st}$ direction. One of the directions may be straight but another of the directions may be curved. The user may provide the user input by a user body part (or a non-user object). In response to the $2^{nd}$ sub-input, the terminal may run an authentication operation or a turning on operation. In response to the $1^{st}$ sub-input, the terminal may run at least one of such pre-selected operations of the above $1^{st}$, $2^{nd}$ or $3^{rd}$ group.

It is appreciated that the "$1^{st}$ direction" may be replaced by a $1^{st}$ static (or dynamic) feature of such moving and that the "$2^{nd}$ direction" may also be replaced by a $2^{nd}$ static (or dynamic) feature of such moving. The terminal may include various software elements which can run various operations to drive various hardware elements of the terminal to perform various tasks as have been explained in this aspect.

In another exemplary aspect, a mobile communication terminal includes a display unit and switches between the off-state and the on-state, where such a unit and such states are identical to those defined above. The directional input unit acquires a $2^{nd}$ sub-input when a user provides a single user input thereto by contacting at least one portion of the input unit in the off-state. In one case, the input unit senses a $1^{st}$ direction of moving a position of such contacting caused by the user concurrently with the contacting, and acquires a $1^{st}$ sub-input from the $1^{st}$ direction. In another case, the input unit instead senses a $1^{st}$ direction of moving the position of such contacting caused by the user, and then acquires a $1^{st}$ sub-input from the $1^{st}$ direction concurrently with acquiring the $2^{nd}$ sub-input. The terminal runs different operations in response to such contacting and the $1^{st}$ sub-inputs while or (immediately) after switching to the on-state or to a new mode.

In such a terminal, the $1^{st}$ direction may be parallel with or transverse to a surface of the portion of the input unit. The user may provide the user input with a user body part (or a non-user object). In response to such contacting, the terminal runs at least one of an operation of authenticating the user and turning on the display unit. In response to the $1^{st}$ sub-input, the terminal may also run at least one of various pre-selected operations which belong to the above $1^{st}$, $2^{nd}$ or $3^{rd}$ group.

It is appreciated that the "$1^{st}$ direction" may be replaced by a $1^{st}$ static (or dynamic) feature of such moving and that the "$2^{nd}$ direction" may be replaced by a $2^{nd}$ static (or dynamic) feature of such contacting. In addition, the terminal may include software elements which run various operations for driving various hardware elements of the terminal to perform various tasks as have been explained in this aspect.

In another exemplary aspect, a mobile communication terminal includes a display unit and switches between the off-state and the on-state, where such a unit and such states are identical to those defined above. The directional input unit is substantially flush with a surface or a side of the terminal, and acquires a $1^{st}$ sub-input and a $2^{nd}$ sub-input when a user provides a single user input to the input unit by manipulating at least one portion of the input unit in the off-state. In one case, the input unit may sense a $1^{st}$ direction and a $2^{nd}$ direction concurrently with each other, where the $1^{st}$ direction forms a $1^{st}$ angle with the surface or side, where the $2^{nd}$ direction forms a $2^{nd}$ angle with the surface or side, while the $2^{nd}$ angle is different from the $1^{st}$ angle. Therefore, the terminal acquires the $1^{st}$ and $2^{nd}$ sub-inputs from the $1^{st}$ and $2^{nd}$ directions, respectively. In another case, the input unit may sense a $1^{st}$ direction which forms a $1^{st}$ angle with the surface or the side and a $2^{nd}$ direction which forms a $2^{nd}$ and different angle with the surface or the side from the user input, thereby acquiring the $1^{st}$ and $2^{nd}$ sub-inputs concurrently and respectively from the $1^{st}$ and $2^{nd}$ directions. In either of such cases, the terminal runs different operations in response to such different sub-inputs while or (immediately) after switching to the on-state or to a new mode.

In such a terminal, the surface may be a front surface or a rear surface, while the side may include a top side, a bottom side, a left side, a right side, or the like. The user may perform such manipulating by moving such a portion in the $1^{st}$ and $2^{nd}$ directions concurrently or sequentially. The $2^{nd}$ direction may be perpendicular or transverse to the $1^{st}$ direction. Alternatively, one of such directions may be straight, whereas another may be curved. The user may perform such manipulating by contacting the portion of the input unit with a user body part (or a non-user object) in the $2^{nd}$ direction and by moving a position of such contacting in the $1^{st}$ direction concurrently with such contacting. The user may also provide the user input with a user body part (or a non-user object).

In response to the $2^{nd}$ sub-input, the terminal runs at least one of an operation of authenticating the user and another operation turning on the display unit. In response to the $1^{st}$ sub-input, the terminal also runs at least one operation which belongs to the above $1^{st}$, $2^{nd}$ or $3^{rd}$ groups of multiple pre-selected operations.

It is noted that the above "$1^{st}$ direction" may be replaced by a $1^{st}$ static (or dynamic) feature of such manipulating. The above "$2^{nd}$ direction" may also be replaced by a $2^{nd}$ static (or dynamic) feature of such manipulating. In addition, the terminal may include software elements capable of running various operations for driving various hardware elements of the terminal to perform various tasks as have been explained in this aspect.

In another exemplary aspect, a mobile communication terminal includes a display unit and switches between the off-state and the on-state, where such a unit and such states are identical to those defined above. The directional input unit is substantially flush with the above surface or side of the terminal, and acquires a $1^{st}$ sub-input and a $2^{nd}$ sub-input when a user provides a single user input to the input unit by pressing at least one portion of the input unit in the off-state. In one case, the input unit concurrently senses a $1^{st}$ direction which is at least partly parallel with the surface or side, and a $2^{nd}$ direction which is substantially vertical to the surface or the side and, thus, is different from the $1^{st}$ direction, thereby acquiring the $1^{st}$ and $2^{nd}$ sub-inputs, respectively, from the $1^{st}$ and $2^{nd}$ directions. In another case, the input unit senses a $1^{st}$ direction which is at least partly parallel with the surface or side and a $2^{nd}$ direction which is at least partly vertical to the surface or side and, therefore, is different from the $1^{st}$ direction, thereby acquiring such $1^{st}$ and $2^{nd}$ sub-inputs concurrently and respectively from the $1^{st}$ and $2^{nd}$ directions. In either of such cases, the terminal runs different operations in response to such different sub-inputs while or (immediately) after switching to the on-state or to a new mode.

In such a terminal, the surface and side are similar or identical to those of the previous exemplary aspect. The $2^{nd}$ direction may be perpendicular or transverse to the $1^{st}$ direction. One of such directions may be straight, while another of such directions may be curved. The user may provide the single user input with a user body part (or a non-user object). In response to the $2^{nd}$ sub-input, the terminal may run at least one authentication operation or a turning on operation. In response to the $1^{st}$ sub-input, the terminal may run at least one selected operation which is selected from various pre-selected operations of the above $1^{st}$, $2^{nd}$ or $3^{rd}$ group.

It is appreciated that the "$1^{st}$ direction" may be replaced by a $1^{st}$ static or dynamic feature of such pressing and that the "$2^{nd}$ direction" may be replaced by a $2^{nd}$ static or dynamic feature of such pressing. The terminal may include software elements which can run various operations in order to drive various hardware elements of the terminal to perform various tasks as have been explained in this aspect.

In another exemplary aspect, a mobile communication terminal includes a display unit and switches between the off-state and the on-state, where such a unit and such states are identical to those defined above. The directional input unit is substantially flush with the above surface or side of the terminal, and acquires a $1^{st}$ sub-input and a $2^{nd}$ sub-input when a user provides a single user input to the input unit in the off-state, e.g., by contacting at least one portion of the input unit with a user body part (or a non-user object) and moving a position of such contacting on or over the input unit. In one case, the input unit senses a $1^{st}$ direction of such moving which forms a $1^{st}$ angle with the surface or the side and concurrently senses such contacting, thereby acquiring the $1^{st}$ and $2^{nd}$ sub-inputs from the $1^{st}$ direction and such contacting, respectively. In another case, the input unit senses a $1^{st}$ direction of such moving which forms a $1^{st}$ angle with the surface or side and senses such contacting, thereby acquiring the $1^{st}$ sub-input and $2^{nd}$ sub-input concurrently and respectively from the $1^{st}$ direction and such contacting. In either case, the terminal runs different operations in response to such different sub-inputs while or (immediately) after switching to the on-state or to a new mode.

In such a terminal, the surface or the side are similar or identical to those of the preceding exemplary aspect. The $1^{st}$ direction may be at least partly parallel with the top surface of the input unit on which the user forms such contacting and moves the position thereof. In response to the $2^{nd}$ sub-input, the terminal may run at least one operation of authenticating the user and turning on the display unit. In addition, in response to the $1^{st}$ sub-input, the terminal runs at least one selected operation which is selected from multiple pre-selected operations examples of which are identical to those of the $1^{st}$, $2^{nd}$ or $3^{rd}$ group as explained above.

It is appreciated that the "$1^{st}$ direction" may be replaced by a $1^{st}$ static or dynamic feature of such moving and that the "$2^{nd}$ direction" may be replaced by a $2^{nd}$ static or dynamic feature of such contacting. The terminal may include various software elements which can run various operations for driving various hardware elements of the terminal to perform various tasks as have been explained in this aspect.

In another exemplary aspect, a mobile communication terminal may define a top surface, a rear surface, and multiple side surfaces formed between the top surface and rear surface, and include at least one display unit which in turn has a screen disposed on the top surface. The terminal includes at least one directional input unit which is disposed on one of the above surfaces, where the input unit receives a single user input from a user in an off-state, when the user provides the user input by moving at least a portion of the input unit in both of a $1^{st}$ direction and a $2^{nd}$ direction which is different from the $1^{st}$ direction, where the input unit concurrently acquires such $1^{st}$ and $2^{nd}$ directions from the user input, where the terminal runs, based upon the $2^{nd}$ direction, at least one default operation which is one of an authentication operation and an activation operation, and where the terminal also runs, based upon the $1^{st}$ direction, at least one selected operation which is different from the default operation and which is selected from multiple pre-selected operations. As a result, the terminal provides seamless operations of running the default operation as well as running the selected operation in response to the single user input, without requiring an additional user input.

In such a terminal, the $1^{st}$ and $2^{nd}$ directions may be at least partly perpendicular to each other. Such moving may include pressing, pushing, translating, sliding, swiveling, pivoting, rotating, or deforming. When the input unit is disposed on the top surface, the $2^{nd}$ direction is at least partially perpendicular to the top surface and, therefore, the $1^{st}$ direction is at least partially parallel with the top surface. When the input unit is disposed on the rear surface of the terminal, the $2^{nd}$ direction is at least partially perpendicular to the rear surface, and the $1^{st}$ direction is at least partially parallel with the rear surface. When the input unit is disposed on a left side surface or a right side-surface of the terminal, the $2^{nd}$ direction is at least partially perpendicular to a longitudinal axis of the terminal, and the $1^{st}$ direction is at least partially parallel with the longitudinal axis. When the input unit is disposed on a top side surface or a bottom side surface thereof, the $2^{nd}$ direction is at least partially parallel with a longitudinal axis of the terminal, and the $1^{st}$ direction is at least partially perpendicular to the longitudinal axis.

In this terminal, the input unit may include a stationary element and a press-ID element. The stationary element does not move in response to the single user input, but the press-ID element may move toward the stationary element in the $1^{st}$ direction in response to the single user input and forms an electrical connection or an optical connection with the stationary element. The terminal identifies the selected operation based on a position of one of such connections.

Such a terminal may also run the selected operation concurrently with running the default operation described above, running the selected operation after starting to run the default operation but before completing to run the default operation, or running the default operation first and followed by running the selected operation. The user may move the portion of the input unit with a body part of the user or a non-user object.

In another exemplary aspect, a mobile communication terminal includes a display unit and switches between the off-state and the on-state. The terminal may include at least one directional input unit capable of receiving a single user input in the off-state from a user, where the user may provide the single user input by moving at least one portion of the input unit. The input unit concurrently acquires a $1^{st}$ direction and a $2^{nd}$ direction of such moving, where the $1^{st}$ direction is different from and at least partially transverse to the $2^{nd}$ direction. The terminal runs, in response to the $2^{nd}$ direction, at least one default operation which includes at least one of an activation operation and an authentication operation using a $1^{st}$ user information. The terminal also runs, in response to the $1^{st}$ direction, at least one selected operation which is different from the default operation. As a result, the terminal can run both of the default operation and the selected operation in response to the single user input, without requiring an additional user input.

In another exemplary aspect, a mobile communication terminal includes a display unit with a screen, and at least one directional input unit which receives a single user input from a user in the off-state, and when a user provides the single user input by contacting at least a portion of the input unit with a body part of the user or with a non-user object and also by changing a position of the contacting in a $1^{st}$ curvilinear direction and along a $1^{st}$ curvilinear path. The input unit concurrently acquires such contacting and one of the $1^{st}$ direction and $1^{st}$ path from the single user input. The terminal runs, based up such contacting, a default operation which is at least one of an activation operation and an authentication operation. The terminal also runs, based on one of the $1^{st}$ direction and $1^{st}$ path, at least one selected operation which is different from the default operation and which is selected from multiple pre-selected operations. As a result, the terminal provides seamless operations of running the default operation as well as the selected operation in response to the single user input, seamlessly, i.e., without requiring an additional user input.

In this terminal, the input unit defines an exposed top surface, where the $1^{st}$ direction and $1^{st}$ path are defined on the top surface. The $1^{st}$ path may be a straight line, a plurality of straight lines, a curve, and a combination thereof. The input unit may include a touch screen-type input unit. The terminal may perform one of running the selected operation concurrently with running the default operation, running the selected operation after starting to run the default operation but before finishing to run the default operation, or running the default operation followed by running the selected operation.

In another exemplary aspect, a mobile communication terminal includes a display unit and switches between the off-state and on-state, and includes a top surface, a rear surface, and multiple side surfaces. The terminal also includes at least one input unit which may be disposed at least partially flush with one of such surfaces and which may receive a single user input in the off-state when a user provides the input unit with the single user input by contacting at least one portion of the input unit with an applicator which is a user body part or a non-user object and by changing a position of such contacting by moving the applicator while maintaining such contacting. The input unit concurrently acquires a $1^{st}$ sub-input from such changing as well as a $2^{nd}$ sub-input from such contacting. In response to the $2^{nd}$ sub-input, the terminal runs an authentication operation using a $1^{st}$ user information and at least one of an activation operation. In response to the $1^{st}$ sub-input, the terminal runs at least one selected operation which is neither the activation operation not the authentication operation. As a result, the terminal can run multiple operations in response to the single user input, without requiring an additional user input from the user.

In such a terminal, the $1^{st}$ direction may be at least partially parallel with one of such surfaces. The input unit may include a touch screen-type input unit capable of sensing the $1^{st}$ direction.

In another exemplary aspect, a mobile communication terminal includes a display unit and switches between the off-state and the on-state. The terminal may include at least one input unit capable of receiving a single user input in the off-state when a user provides the user input by manipulating at least one portion of the input unit. The input unit may sense a $1^{st}$ direction as well as a $2^{nd}$ direction of the user input and may concurrently acquire a $1^{st}$ sub-input as well as a $2^{nd}$ sub-input based upon the $1^{st}$ and $2^{nd}$ directions, respectively, where the $1^{st}$ direction is different from the $2^{nd}$ direction and may be at least partially transverse to the $2^{nd}$ direction. In response to the $2^{nd}$ sub-input, the terminal may run at least one of an authentication operation using $1^{st}$ user information and an activation operation. In response to the $1^{st}$ sub-input, the terminal runs at least one selected operation, where the selected operation is neither the activation operation not the authentication operation. As a result, the terminal is capable of running multiple different operations in response to the single user input, without requiring an additional user input.

In such a terminal, the user performs such manipulating by moving the portion of the directional input unit in the $1^{st}$ and $2^{nd}$ directions, where the moving includes at least one of pressing, pushing, sliding, swiveling, translating, pivoting, and rotating. The $2^{nd}$ direction is perpendicular to the $1^{st}$ direction or one of the directions may be straight, while another direction may be curved. When the $1^{st}$ sub-input is the $1^{st}$ direction, the input unit may include a stationary element and a press-ID element, where the stationary element does not move in response to the single user input, while the press-ID element moves in response to the single user input toward the stationary element in the $1^{st}$ direction until the press-ID element forms electrical or optical connections with the stationary element. The terminal then identifies the selected operation from multiple pre-selected operations based upon a position of the connection and runs the selected operation while or (immediately) after the terminal switches to the on-state or to a new mode. The user may perform such manipulating by contacting the portion with a user body part (or a non-user object) and concurrently moving a position of the contacting in the $1^{st}$ direction. The input unit may include a touch screen-type input unit capable of sensing the $1^{st}$ direction.

In all of the preceding exemplary aspects of this Section, a terminal may run at least one selected operation which is selected from multiple pre-selected operations examples of which are identical or similar to those of the $1^{st}$, $2^{nd}$ or $3^{rd}$ group as explained above. It is appreciated that the "$1^{st}$ direction" may be replaced by a $1^{st}$ static or dynamic feature of such pressing, moving or manipulating, and that the "$2^{nd}$ direction" may be replaced by a $2^{nd}$ static or dynamic feature of such contacting. The terminal may further include software elements which can run various operations for driving various hardware elements of the terminal to perform various tasks as have been explained in this aspect.

In another exemplary aspect, a method is provided for running at least one default operation and at least one selected operation using a mobile communication terminal while or (immediately) after the terminal switches to the on-state or to a new mode, where the terminal includes at least one display unit. The method includes the steps of receiving a single user input from a user; concurrently sensing a $1^{st}$ direction and a $2^{nd}$ direction of the user input, where the $1^{st}$ and $2^{nd}$ directions are different from each other; acquiring a $1^{st}$ sub-input and a $2^{nd}$ sub-input from the $1^{st}$ direction and $2^{nd}$ direction, respectively; running the default operation based upon the $2^{nd}$ sub-input during or (immediately) after such switching, where the default operation is at least one of an operation of turning on the display unit and an operation of authenticating a user based on $1^{st}$ user information; and running the selected operation based on the $1^{st}$ sub-input during or (immediately) after such switching, where the selected operation is different from the default operation and is selected from one of the $1^{st}$, $2^{nd}$ or $3^{rd}$ group of multiple pre-selected operations as described above. It is appreciated that such concurrent sensing and such acquiring may also be replaced by the steps of sensing a $1^{st}$ direction and a $2^{nd}$ direction of the user input, where the $1^{st}$ and $2^{nd}$ directions are different from each other; and concurrently acquiring the $1^{st}$ and $2^{nd}$ sub-inputs from the $1^{st}$ and $2^{nd}$ directions, respectively;

The method may also include one of the steps of running the default operation concurrently with the selected operation; and running the default operation and then running the selected operation. The method may further include one of the steps of: displaying results obtained from running the selected operation on the display unit; and displaying such results on the display unit only when the user passes the authenticating.

The running the default operation may include one of the steps of: running the turning on operation concurrently with running the authentication operation; running the authentication operation and thereafter running the turning on operation; and running the authentication operation and thereafter running the turning on operation only when the user passes the authenticating. The running the default operation may also include at least one of the steps of: displaying a lock screen before the terminal finishes to run the authentication operation; keeping displaying the lock screen when the user fails the authenticating; and replacing the lock screen with an unlock screen when the user passes the authenticating. In addition, the running the default operation may include at least one of the steps of: keeping the display unit turned off before the terminal finishes to run the authentication operation; displaying an unlock screen when the user passes the authentication operation; keeping the display unit still turned off when the user fails the authenticating; and displaying a lock screen when the user fails the authenticating but when the user keeps providing the user input for a period longer than a threshold period.

The sensing the $1^{st}$ and $2^{nd}$ directions may include the steps of: treating the user input as a vector; decomposing the user input vector into two vector components; acquiring at least one feature of one of the components as the $1^{st}$ direction; and acquiring at least one feature of another of the components as the $2^{nd}$ direction, where the feature may be a direction defined in a 2-D plane or in a 3-D space, a magnitude, a velocity, an acceleration, or a temporal length.

Such decomposing may include the step of: denoting the vector as a sum of two vector components in one of a Cartesian coordinate system, a cylindrical or spherical coordinate system, and another orthogonal coordinate system. The acquiring the $1^{st}$ and $2^{nd}$ directions may include one of the steps of: selecting the $1^{st}$ direction to be transverse (or perpendicular) to the $2^{nd}$ direction; and selecting one of the $1^{st}$ and $2^{nd}$ directions to be straight, while selecting another of such directions to be curved. The method may also include at least one of the steps of: sending a user a notice signal which represents the $1^{st}$ signal acquired by the terminal; and sending a user another notice signal representing the selected operation.

In another exemplary aspect, a method is provided for running the default and selected operations using the terminal while or (immediately) after switching of the terminal from the off-state to the on-state or after switching from a current mode to a new mode, where the terminal also includes at least one display unit and input unit. The method may include one of the steps of: sensing pressing of a portion of the input unit by a user; and sensing moving of a portion of the input unit caused by a user input. The method also includes the steps of: acquiring at least one $1^{st}$ feature of such pressing (or moving) in a $1^{st}$ direction; also acquiring at least one $2^{nd}$ feature of such pressing (or moving) in a $2^{nd}$ direction concurrently with the acquiring the $1^{st}$ feature, where the $2^{nd}$ direction is different from the $1^{st}$ direction; running the default operation based upon the $2^{nd}$ feature while or (immediately) after such switching, where the default operation may be one of a turning on operation and an authentication operation based upon $1^{st}$ user information; and running the selected operation based on the $1^{st}$ feature while or (immediately) after such switching, where the selected operation is different from the default operation and where the selected operation is selected from one of the $1^{st}$, $2^{nd}$ or $3^{rd}$ group of multiple pre-selected operations as defined above.

In this method, such acquiring the feature may include at least one of the steps of: acquiring a force causing such pressing (or moving); acquiring a velocity of the portion caused by such pressing (or moving); acquiring a momentum of the portion caused by such pressing (or moving); acquiring an acceleration of such a portion caused by such pressing (or moving); a displacement of the portion caused by such pressing (or moving); acquiring a magnitude of one of such a force, velocity, momentum, acceleration, or displacement; acquiring a direction of one of the force, velocity, momentum, acceleration, and displacement; and acquiring a temporal duration of one of the force, velocity, momentum, acceleration, and displacement.

In this method, the acquiring the $1^{st}$ and $2^{nd}$ directions may include one of the steps of: selecting the $1^{st}$ direction to be transverse or perpendicular to the $2^{nd}$ direction; and selecting one of the directions to be straight, while selecting another of the directions to be curved. Such acquiring the $1^{st}$ and $2^{nd}$ directions may include the step of: selecting two orthogonal directions from a Cartesian coordinate system, a cylindrical coordinate system or a spherical coordinate system as the $1^{st}$ and $2^{nd}$ directions.

The method may further include one of the steps of: running the default operation concurrently with the selected operation; and running the default operation and then running the selected operation. The method may further include one of the steps of: displaying results obtained from running the selected operation on the display unit; and displaying such results on the display unit only when the user passes the authenticating. The method may further include at least one of the steps of: sending a user a notice signal representing the $1^{st}$ signal acquired by the terminal; and sending a user another notice signal representing the selected operation.

In such a method, such running the default operation may include one of the steps of: running the turning on operation concurrently with running the authentication operation; running the authentication operation and thereafter running the turning on operation; and running the authentication operation and thereafter running the turning on operation only when the user passes the authenticating. Such running the default operation may include at least one of the steps of: displaying a lock screen before a terminal finishes to run the authentication operation; keeping displaying the lock screen when the user fails the authenticating; and replacing the lock screen with an unlock screen when the user passes the authenticating. Such running the default operation may also include at least one of the steps of: keeping the display unit turned off before the terminal finishes to run the authentication operation; displaying an unlock screen when the user passes the authenticating; keeping the display unit turned off when the user fails the authenticating; and displaying a lock screen when the user fails the authenticating but when the user keeps providing such a user input for a period longer than a threshold period.

In another exemplary aspect, a method is provided for running default and selected operations using a terminal while or (immediately) after the terminal switches to the on-state or to a new mode as defined above, where the terminal also includes at least one display unit and input unit. The method may include the steps of: sensing contacting between a portion of the input unit and a user body part (or a non-user object); acquiring at least one $2^{nd}$ feature of such contacting; acquiring at least one $1^{st}$ feature related to moving positions of such contacting concurrently with such acquiring the $2^{nd}$ feature; running the default operation based upon the $2^{nd}$ feature during or (immediately) after the switching, where the default operation is one of a turning on operation and an authentication operation based on $1^{st}$ user information; and running the selected operation based upon the $1^{st}$ feature during or (immediately) after such switching, where the selected operation is different from the default operation and is selected from the $1^{st}$, $2^{nd}$ or $3^{rd}$ group of multiple pre-selected operations as described above.

In this method, such acquiring the feature may include at least one of the steps of: acquiring a force related to such contacting (or moving); acquiring a velocity of such moving; acquiring an acceleration of such moving; acquiring a displacement caused by such moving; acquiring a magnitude of such force, velocity, acceleration, or displacement; acquiring a direction of such force, velocity, acceleration, or displacement; and acquiring a temporal duration of one of the force, velocity, acceleration, and displacement.

Such a method may include one of the steps of: running the default operation concurrently with the selected operation; and running the default operation and then running the selected operation. The method may further include one of the steps of: displaying results obtained from running the selected operation on the display unit; and displaying such results on the display unit only when the user passes the authenticating. The method may further include at least one of the steps of: sending a user a notice signal representing the first signal acquired by the terminal; and sending a user another notice signal representing the selected operation.

In such a method, such running the default operation may include one of the steps of: running the turning on operation concurrently with running the authentication operation; running the authentication operation and thereafter running the turning on operation; and running the authentication operation and thereafter running the turning on operation only when the user passes the authenticating. Such running the default operation may include at least one of the steps of: displaying a lock screen before a terminal finishes to run the authentication operation; keeping displaying the lock screen when the user fails the authenticating; and replacing the lock screen with an unlock screen when the user passes the authenticating. Such running the default operation may include at least one of the steps of: keeping the display unit turned off before the terminal finishes to run the authentication operation; displaying an unlock screen when the user passes the authenticating; keeping the display unit turned off when the user fails the authenticating; and displaying a lock screen when the user fails the authenticating but when the user keeps providing the user input for a period longer than a threshold period.

In another exemplary aspect, a method is provided for running the default operation as well as the selected operation using the mobile communication terminal which includes the display unit and the input unit. Such a method includes the steps of: keeping the terminal in the off-state; receiving a single user input applied to at least a portion of the input unit during such keeping; sensing the user input moving the portion of the input unit; acquiring at least one $1^{st}$ feature of such moving by sensing the $1^{st}$ feature in a $1^{st}$ direction; concurrently acquiring at least one $2^{nd}$ feature of such moving by sensing the $2^{nd}$ feature in a $2^{nd}$ direction, where the $2^{nd}$ direction is different from the $1^{st}$ direction; running the default operation in response to the $2^{nd}$ feature, where the default operation includes at least one of a turning on operation and authentication operation; and running the selected operation in response to the $1^{st}$ feature, where the selected operation is not the default operation. As a result, the terminal provides the user with seamless operations of running the default operation as well as the selected operation in response to the single user input, seamlessly, i.e., without requiring an additional user input.

Such a method may further include one of the steps of: displaying results on the display unit after running the selected operation; and displaying the results on the display unit only when the user passes such authenticating, or the like.

In such a method, such acquiring the features may include the step of: acquiring a force associated with such moving, a velocity or a momentum of such moving, an acceleration of such moving, a displacement caused by such moving, a magnitude of the force, velocity, acceleration, or displacement, a 2-D or 3-D direction of the force, velocity, acceleration, or displacement, or a temporal duration, velocity, acceleration, or displacement. In such a method, such acquiring in such directions may include one of the steps of: setting the $1^{st}$ direction to be at least partially perpendicular or transverse to the $2^{nd}$ direction, setting one of the $1^{st}$ and $2^{nd}$ directions to be straight or linear but another of the directions to be curved, setting the $1^{st}$ direction to be at least partially parallel or lateral with a front (or rear) surface of the display unit, setting the $2^{nd}$ direction to be at least partially perpendicular or transverse to the front (or rear) surface, setting the $1^{st}$ direction to be at least partially parallel with a longitudinal axis of the display unit, or setting the $2^{nd}$ direction to be at least partially perpendicular to the longitudinal axis, or the like. In this method, such moving may include at least one of the steps of: translating the portion of the input unit in the $1^{st}$ direction; pivoting the portion of the input unit in the $1^{st}$ direction; and rotating the portion of the input unit in the $1^{st}$ direction.

In another exemplary aspect, a method is provided for running at least one selected operation using a mobile communication terminal including the display unit and the input unit, where the selected operation is neither an activation operation nor an authentication operation. The method may include the steps of: keeping the terminal in the off-state; receiving a single user input applied to at least a portion of the input unit by a user body part (or a non-user object) during such keeping; sensing a movement of the portion in response to the user input; acquiring at least one $1^{st}$ feature of the movement sensed in a $1^{st}$ direction; selecting the selected operation from a set of multiple pre-selected operations based on the $1^{st}$ feature; running the selected operation; and then displaying results on the display unit after running the selected operation, whereby such a terminal provides a seamless operation of running the selected operation in response to the single user input, without requiring an additional user input an additional user input. In such a method, such running the selected operation includes the step of: running at least one operation from the $1^{st}$, $2^{nd}$ or $3^{rd}$ group of multiple pre-selected operations as described above.

In another exemplary aspect, a method is provided for running at least one selected operation using a mobile communication terminal including the display unit and the input unit, where the selected operation is neither an activation operation nor an authentication operation. The method may include the steps of: keeping the terminal in the off-state; receiving a single user input applied to at least a portion of the input unit by at least one applicator which is a user body part (or a non-user object) during such keeping; sensing a contact between the portion and the above applicator in response to the user input; acquiring at least one $1^{st}$ feature from a movement of the applicator on the input unit sensed in a $1^{st}$ direction; selecting the selected operation from a set of multiple pre-selected operations based on the $1^{st}$ feature; running the selected operation; and displaying results on the display unit after running the selected operation, whereby the terminal provides a seamless operation of running the selected operation in response to the single user input and without having to require an additional user input. In this method, such running the selected operation includes the step of: running at least one operation from the $1^{st}$, $2^{nd}$ or $3^{rd}$ group of multiple pre-selected operations as described above.

In another exemplary aspect, a method is provided for running at least one selected operation using a mobile communication terminal including the display unit and the input unit, where the selected operation is neither an activation operation nor an authentication operation based on $1^{st}$ user information. The method may include the steps of: keeping the terminal in the off-state; receiving a single user input applied to at least a portion of the input unit by a user body part (or a non-user object) during such keeping; acquiring the $1^{st}$ information from the user input; sensing a movement of the portion in response to the user input; acquiring at least one $1^{st}$ feature of the movement sensed in a $1^{st}$ direction concurrently with such acquiring the $1^{st}$ user information; running the authentication operation in response to the $1^{st}$ user information; running the selected operation in response to the $1^{st}$ feature; and displaying results on the display unit after running the selected operation, whereby the terminal provides seamless operations of running the authentication operation and running the selected operation in response to the single user input and seamlessly, i.e., without requiring an additional user input. In this method, such running the selected operation includes the step: of running at least one operation from the $1^{st}$, $2^{nd}$ or $3^{rd}$ group of multiple pre-selected operations as described above.

In another exemplary aspect, a method is provided for running at least one selected operation using a mobile communication terminal including the display unit and the input unit, where the selected operation is neither an activation operation nor an authentication operation based on $1^{st}$ user information. The method may include the steps of: keeping the terminal in the off-state; receiving a single user input applied to at least a portion of the input unit by at least one applicator which is a user body part (or a non-user object) during such keeping; acquiring the $1^{st}$ user information from the user input; sensing a contact formed between the portion and the applicator in response to the user input; acquiring at least one $1^{st}$ feature from a movement of the applicator on the input unit sensed in a $1^{st}$ direction; running the authentication operation based on the $1^{st}$ user information; running the selected operation in response to the $1^{st}$ feature; and displaying results on the display unit after running the selected operation, whereby the terminal provides seamless operations of running the selected operation and running the authentication operation in response to the single user input, without requiring an additional user input. In this method, such running the selected operation includes the step of running at least one operation from the $1^{st}$, $2^{nd}$ or $3^{rd}$ group of multiple pre-selected operations as described above.

In another exemplary aspect, a mobile communication terminal includes a display unit and a directional input unit. The display unit can be turned off in an off-state but turned on in an on-state. The directional input unit can receive one of a first user input and a second user input when one of the user inputs is provided to at least a portion of said directional input unit respectively in a first direction and a second direction which is different from said first direction. When the terminal receives one of such user inputs when said display unit is in the off-state, the terminal runs an activation operation of turning on the display unit in response to the received user input, without having to receive any additional user input from a user. The terminal also runs one of a first selected operation and a second selected operation when the received user input is the first and second user inputs, respectively, without having to receive the additional user input from the user, where the first selected operation is different from the second selected operation. As a result, such a terminal can seamlessly run the activation operation as well as one of the first and second selected operations in response to one of such first and second user inputs, without having to receive any additional user input from the user.

In such a terminal, the terminal may also seamlessly run an authentication in response to either user input, without having to receive any additional user input from the user. When the terminal includes a top surface and a bottom surface, the first and second directions may be two different curvilinear directions defined on one of said surfaces. When the terminal includes a top edge, a side edge, and a bottom edge, the first and second directions may be two different curvilinear directions defined on one of such edges. The directional input unit may include a button at least a portion of which is movable by the user in such directions.

In such a terminal, each of such first and second selected operations may be one of a picture taking operation, a video recording operation, an audio recording operation, an image viewing or editing operation, an audio or sound playing operation, a location monitoring operation, a health monitoring operation, a calling operation, a wireless communication operation, a messenger service operation, a short message service (SMS) operation, an email processing operation, a social network service operation, an event scheduling operation, a navigation operation, an operation for connecting to a network of IoT, an operation for connecting to an appliance through the IoT network, an operation for connecting to a control system of a vehicle or a building, an operation for manipulating an electric unit or an electro-mechanical unit of the vehicle or building, an operation of connecting to a robot, an operation of manipulating an electric unit and an electro-mechanical unit of said robot, or the like. One of the first and second selected operations may be an authentication operation for authenticating a current user as well.

In another exemplary aspect, a mobile communication terminal includes a display unit and a directional input unit. The display unit can be turned off in an off-state but turned on in an on-state. The directional input unit can receive one of a first user input and a second user input when one of the user inputs is provided by a user when the user moves at least one user body part on or over the directional input unit respectively in a first direction and a second direction which is different from the first direction while the user is contacting the input unit. When the terminal receives one of the user inputs when the display unit is in the off-state, the terminal runs an activation operation of turning on the display unit in response to the received user input, without having to receive any additional user input from a user. The terminal also runs one of a first selected operation and a second selected operation when the received user input is respectively the first user input and second user input, without having to receive any additional user input from the user, where the second selected operation is different from the first selected operation. Thus, the terminal can seamlessly run the activation operation as well as one of the first and second selected operations in response to one of the first and second user inputs, without having to receive any additional user input from the user.

In such a terminal, the terminal may therefore seamlessly run an authentication in response to either user input, without having to receive the additional user input from the user. When the terminal includes a top surface and a bottom surface, the first and second directions may be two different curvilinear directions defined on one of such surfaces. When the terminal includes a top edge, a side edge, and a bottom edge, the first and second directions may be two different curvilinear directions defined on one of the edges. The directional input unit may include a touch screen over which the user moves his or her body part while maintaining such contacting.

In such a terminal, each of such first and second selected operations may be one of a picture taking operation, a video recording operation, an audio recording operation, an image viewing or editing operation, an audio or sound playing operation, a location monitoring operation, a health monitoring operation, a calling operation, a wireless communication operation, a messenger service operation, a short message service (SMS) operation, an email processing operation, a social network service operation, an event scheduling operation, a navigation operation, an operation for connecting to a network of IoT, an operation for connecting to an appliance through the IoT network, an operation for connecting to a control system of a vehicle or a building, an operation for manipulating an electric unit or an electro-mechanical unit of the vehicle or building, an operation of connecting to a robot, an operation of manipulating an electric unit and an electro-mechanical unit of said robot, or the like. One of the first and second selected operations may be an authentication operation for authenticating a current user as well.

In another exemplary aspect, a mobile communication terminal includes a display unit and a directional input unit. The display unit can be turned off in an off-state but turned on in an on-state. The directional input unit can receive one of a first user input and a second user input when one of the user inputs is provided to at least a portion of said directional input unit respectively in a first direction and a second direction which is different from said first direction. When the terminal receives one of such user inputs when said display unit is in the off-state, the terminal runs an authentication operation of authenticating a user in response to the received user input, without having to receive any additional user input from the user. When said user passes the user authenticating, the terminal runs one of a first selected operation and a second selected operation when the received user input is the first and second user inputs, respectively, without having to receive any additional user input from the user, where the first selected operation is different from the second selected operation. As a result, the terminal can seamlessly run the authentication operation as well as one of such first and second selected operations in response to one of the first and second user inputs, without having to receive any additional user input from the user.

In this terminal, when the terminal includes a top surface and a bottom surface, the first and second directions may be two different curvilinear directions defined on one of said surfaces. When the terminal includes a top edge, a side edge, and a bottom edge, the first and second directions may be two different curvilinear directions defined on one of such edges. The directional input unit may include a button at least a portion of which is movable by the user in such directions.

In such a terminal, each of such first and second selected operations may be one of a picture taking operation, a video recording operation, an audio recording operation, an image viewing or editing operation, an audio or sound playing operation, a location monitoring operation, a health monitoring operation, a calling operation, a wireless communication operation, a messenger service operation, a short message service (SMS) operation, an email processing operation, a social network service operation, an event scheduling operation, a navigation operation, an operation for connecting to a network of IoT, an operation for connecting to an appliance through the IoT network, an operation for connecting to a control system of a vehicle or a building, an operation for manipulating an electric unit or an electro-mechanical unit of the vehicle or building, an operation of connecting to a robot, an operation of manipulating an electric unit and an electro-mechanical unit of said robot, or the like.

Unless otherwise defined or specified in this disclosure, all technical or scientific terms used herein carry the same meaning as commonly understood by one of ordinary skill in the relevant art to which such directional input units of various mobile communication terminals, methods of manufacturing and using such input units, and hardware or software elements used in such input units and terminals belong. Although different structures, methods, and elements which may be equivalent or similar to those described in this disclosure may be used in practicing the directional input units and terminals, methods, and elements, this disclosure provides further exemplary configurations, operations, and methods below.

It is to be understood that all publications, patent applications, patents, or other references mentioned herein are incorporated herein by reference in their entirety. In case of conflict, this disclosure, including definitions as provided above, will control. In addition, various configurations, operations, methods, hardware elements or software elements described hereinafter are only illustrative and not intended to be limiting the scope of various directional input units and mobile communication terminals incorporating such directional input units.

BRIEF DESCRIPTION OF THE DRAWINGS

FIG. 12 is a vertical view of an exemplary touch-ID element according to the sixth exemplary aspect of this disclosure;

FIGS. 13A to 13D show schematic views of exemplary notice units incorporated on or around a touch screen-type display unit according to the seventh exemplary aspect of this disclosure;

FIGS. 14A to 14G are schematic views of exemplary notice units coupled to exemplary directional input units according to the eighth exemplary aspect of this disclosure;

FIGS. 16A to 16D are schematic drawings of exemplary long axes of various directional input units.

DETAILED DESCRIPTION

Figure 1A:
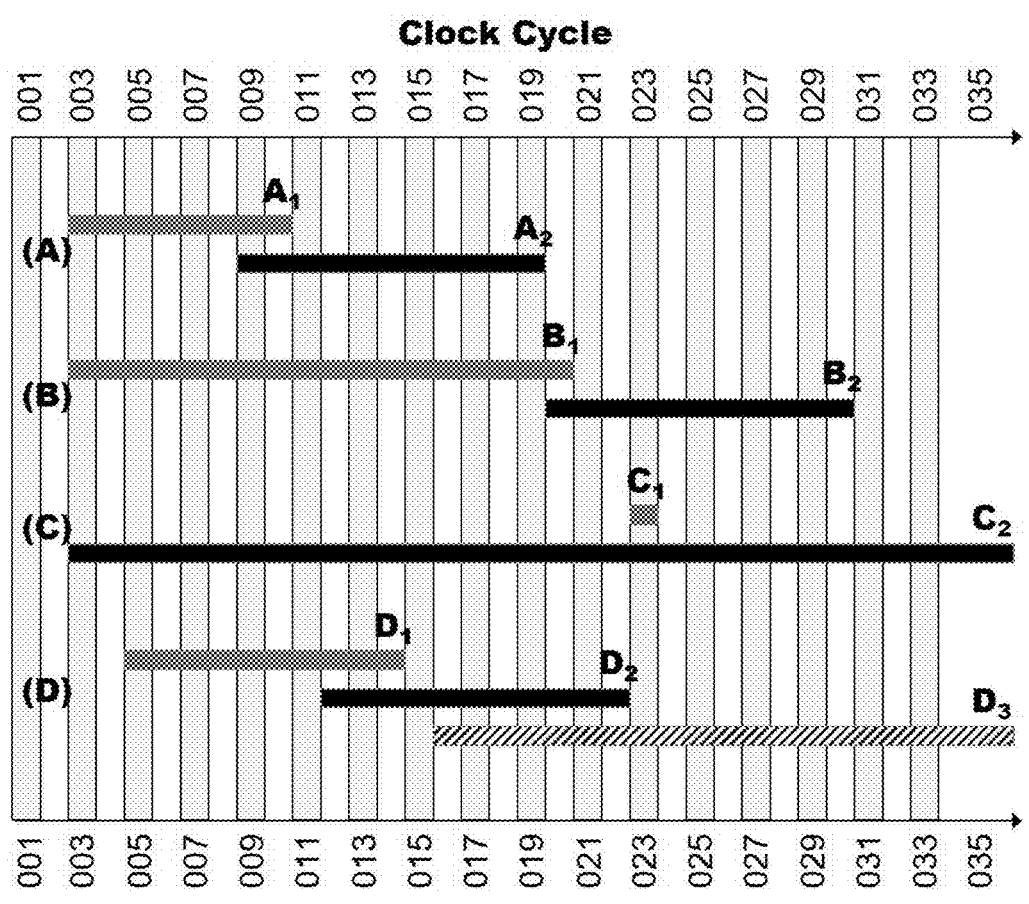
FIG. 1A is a schematic diagram of exemplary concurrent operations (or steps) which are presented along clock cycles of a processor of a mobile communication terminal.
Figure 1B:
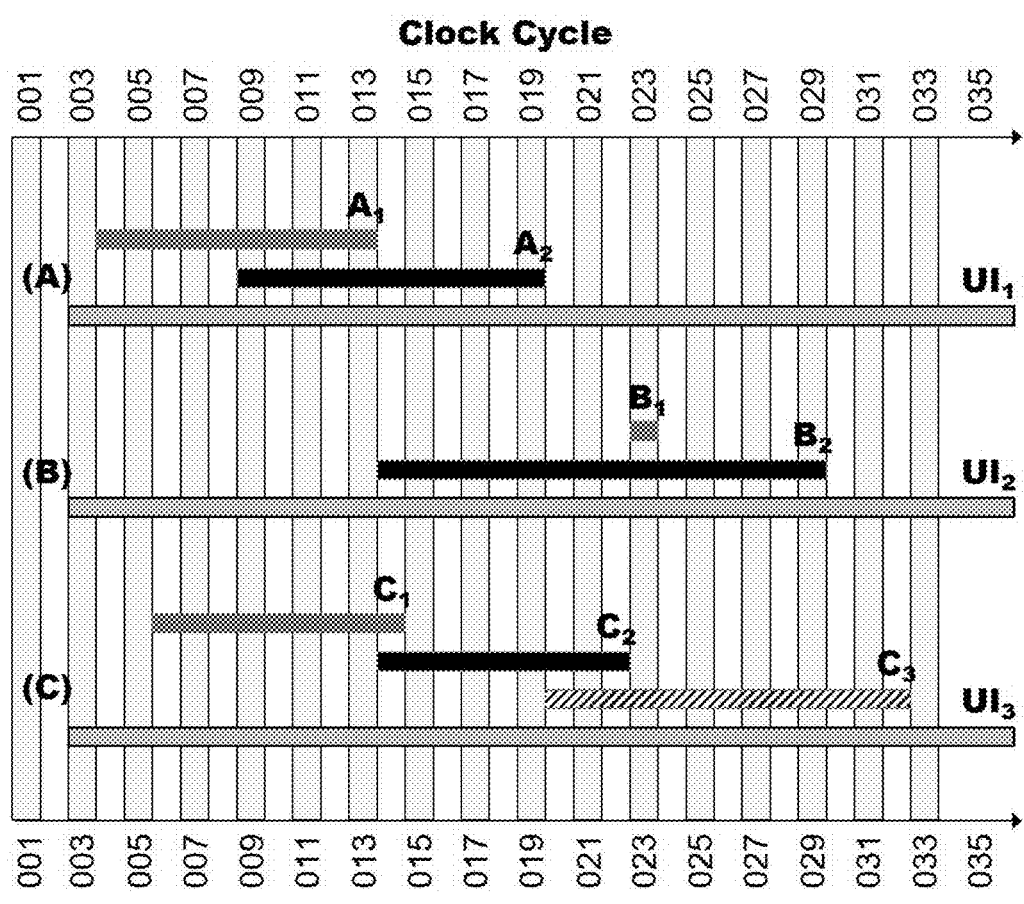
FIG. 1B describes a schematic diagram of exemplary concurrent operations (or steps) presented along clock cycles of a processor of a mobile communication terminal in view of a user input.

This disclosure relates to various directional input units capable of concurrently acquiring multiple (user) sub-inputs from a single effort by a user, thereby allowing a user to run multiple different operations when a terminal powers on from a powered-off state, when a terminal wakes up from an off-state, or when a terminal switches to a new state or a new mode. In addition, this disclosure relates to various mobile communication terminals which are incorporated with various directional input units and, therefore, which can provide optimum seamless operations to a user of such terminals.

Various mobile communication terminals of this disclosure offer a user with benefits of enhanced capability in seamless operations through at least "four main features" which may be "independent" of each other or which may be "interdependent" upon each other, based on configurational or operational characteristics of a terminal or upon such characteristics of various hardware or software elements of a directional input unit of a terminal.

The "first main feature" of this disclosure is to provide a terminal with at least one "directional input unit" which includes a sensor for acquiring directional information of a user input. Because a user can readily manipulate a direction of the user's own input, he or she can also readily provide the input unit with various user inputs in multiple directions, thereby selecting and running one of multiple pre-selected operations while or (immediately) after powering on the terminal, turning on its display unit, or switching the terminal to a new mode of operation.

That is, as long as a user can readily differentiate such different directions and provide a single user input (or multiple concurrent user inputs) in one of such directions to a terminal, a user can readily select one of multiple pre-selected operations, and then render a terminal run the selected operation, while or immediately after the terminal switches [1] from a powered-off state to a powered-on state (i.e., "powering on"), [2] from an off-state to an on-state (i.e., "turning on" or "waking up"), [3] from a current mode to a new mode (i.e., "switching modes"), or the like, where the selected operation is neither an operation of turning on the display unit nor an operation of authenticating the user. As a result, a user may enjoy running a desired operation in addition to turning on a display unit or to authenticating a user in either of [1], [2], or [3] as described above, all in response to a single user input (or multiple concurrent user inputs), and without requiring the user to provide an additional user input after such powering on, such waking up, or such switching modes.

The "second main feature" of this disclosure is attributed to such a directional input unit which can "differentiate directions" in a "2-D" plane or in a "3-D" space. When a sensor of the input unit can differentiate directions in a 2-D plane, a user may provide a single user input (or multiple concurrent user inputs) in one of at least two different directions (e.g., up-down, or left-right), in one of at least three different direction (e.g., up-left-right, or up-down-horizontal), or in one of at least four different directions (e.g., up-down-left-right, or upper left-upper right-lower left-lower right). Accordingly, by readily manipulating such directions, a user may easily select one of two, three, four, five, six, seven, or more pre-selected operations, simply by manipulating a direction of the user input which he or she provides to the directional input unit. In response thereto, a terminal may then run the selected operation. It is appreciated that the 2-D plane may be defined [1] parallel to a surface of a display unit of a terminal, [2] parallel to a rear surface of a terminal, [3] parallel to a side or an edge of a terminal, or [4] at a preset angle with respect to the surface, side, or edge.

When a sensor of a directional input unit can differentiate directions in a 3-D space, a user may manipulate a direction of a user input not only horizontally but also vertically. Accordingly, this configuration provides a user with greater flexibility in providing a user input in a greater number of directions. As a result, a user may select one operation from four, five, six, seven, eight, or more pre-selected operations. In response thereto, a terminal may then run the selected operation. It is appreciated that the 2-D plane or the 3-D space may be defined in any prior art coordinate system and that such a coordinate system may be set up by defining a terminal or a directional input unit as its center (or origin) or as a point thereof.

The "third main feature" of this disclosure is to provide a terminal with a directional input unit which can monitor a "static feature" or a "dynamic feature" of a single user input, and to acquire directional information from the feature. As long as a user can readily differentiate such static or dynamic features and provide a single user input (or multiple concurrent user inputs) while incorporating one of such features to the user input, a user can readily select one of multiple pre-selected operations, and then render a terminal run the selected operation while or (immediately) after such [1] powering on, [2] waking up or turning on, [3] or switching modes.

The "fourth main feature" of this disclosure is to provide a terminal with at least one "notice unit" capable of assisting a user in selecting which direction he or she has to provide a single user input (or multiple concurrent user inputs) for running one of multiple pre-selected operations. For example, a notice unit may generate a visual signal, an audible signal, or a tactile signal, and may inform a user [1]

in which direction a user may provide a terminal with a user input which includes a desired selecting (user) sub-input (i.e., $UI_{SEL}$), [2] which $UI_{SEL}$ a user has provided (or is providing), [3] a matching between multiple $UI_{SEL}$'s and multiple pre-selected operations in a matching list, [4] which pre-selected operation is to be run by $UI_{SEL}$ which a user has provided (or is providing), or the like. A user may then readily determine whether or not he or she is providing (or has provided) a single user input with correct $UI_{SEL}$ for selecting and running a desired selected operation, whether or not a terminal is going to run an operation which is intended by a user while or (immediately) after the terminal powers on, wakes up, or switches modes. As a result, a terminal may enhance the efficiency of such seamless operations by minimizing user mistakes or errors.

A terminal may provide a visual notice signal by driving a designated notice unit. Alternatively, a terminal may provide a visual notice signal using its display unit, where the display unit may then be deemed to serve as a display unit as well as a notice unit. A terminal may also provide an audible notice signal by driving a designated notice unit, or may provide the audible notice signal using its speaker, where the speaker may then be deemed to serve as a speaker as well as a notice unit. In addition, a terminal may provide a tactile notice signal by driving a designated notice unit, or may provide the tactile notice signal using its vibrator, where such a vibrator may then be deemed to serve as a vibrator as well as a notice unit.

When a mobile communication terminal displays graphical user interfaces (GUIs) on a display unit and allow a user to run various operations by manipulating such GUIs, an "additional main feature" of this disclosure is to allow a user to run such operations by providing user inputs directly to a "directional input unit," instead of requiring a user to manually touch or press such GUIs. As a result, when a user wants to run a certain operation while a terminal is in its on-state, a user may provide a user input to a terminal, not by directly manipulating a GUI designated to such an operation, but by manipulating the directional input unit. As a result, a user does not have to move his or her fingers all over a screen of a display unit of a terminal.

Disclosed heretofore and to be disclosed hereinafter relate to exemplary aspects, embodiments, and examples of various directional input units and mobile communication terminals which include such directional input units and which, as a result, can provide optimum seamless operations to the user. This disclosure typically relates to various configurations of such directional input units, various methods of constructing or using the directional input units and such terminals, and various hardware and software elements of the directional input units to embody such seamless operations.

It is appreciated that this disclosure is provided with reference to accompanying drawings and text, in which such exemplary aspects, embodiments or examples only represent different forms. However, such terminals and various methods related thereto may also be embodied in many other different configurations, structures, methods, processes, or sequences in such a way that they should not be limited to various exemplary aspects and embodiments as set forth hereinabove and hereinafter. Rather, such exemplary aspects and embodiments described herein are provided so that this disclosure will be thorough and complete, and fully convey the scope of such terminals, methods, processes or sequences to one of ordinary skill in the relevant art.

It is appreciated that, unless otherwise specified, various systems, units, elements, portions, or parts of various mobile communication terminals are not typically drawn to proportions or scales in the accompanying figures for ease of illustration. It is also appreciated that such systems, units, elements, portions, or parts of the mobile communication terminals as well as their operations, steps, and sequences designated by the same numerals in the accompanying figures represent the same, similar or functional equivalent systems, units, elements, portions, parts, operations, steps, and sequences, respectively.

Reference is made to accompanying drawings which show, by way of illustration, various exemplary aspects or embodiments in which various mobile communication terminals may be constructed and various methods related to such terminals may be practiced. It is appreciated that numerals appearing between parentheses "(" and ")" such as, e.g., (10) or (60), in this disclosure represent those systems, units, elements, portions, or parts which appear in the drawings.

It is appreciated that various exemplary aspects and embodiments of such mobile communication terminals of this disclosure, although different, are not necessarily mutually exclusive. That is, a particular feature, structure, operation, function, method, sequence or characteristic of such terminals described herein in connection with one exemplary aspect or embodiment may also be implemented into another aspect or embodiment of this disclosure, within the extent of not contradicting each other, and without departing from a spirit and a scope of such terminals throughout this disclosure, subject to a certain modification, addition or omission each of which becomes apparent based on detailed contexts.

It is also appreciated that an arrangement or a position of each system, unit, element, portion, or part of various exemplary aspects or embodiments of this disclosure may also be modified to certain extents without departing from the spirits and scopes of other exemplary terminals of this disclosure. Accordingly, the following detailed description is not to be taken to limit the scope of various terminals for providing various directional input units while ensuring the enhanced seamless capabilities provided by such terminals. The scope of such terminals and methods are defined only by appended claims that should be appropriately interpreted in a full range of equivalents to which such claims are entitled. In the drawings, like reference numerals identify like or similar elements or functions through the several views.

Hereinafter, exemplary aspects and embodiments of various mobile communication terminals of this disclosure will be explained in detail in both hardware and software perspectives and with reference to the accompanying drawings so that those skilled in the art can easily understand and use such terminals, can manufacture such terminals, and can perform such sequences of various operations and steps for such terminals, or the like.

4. Configuration 1—Concurrent Turning on

In the first exemplary aspect of this disclosure which corresponds to the $1^{st}$ Configuration of this disclosure, an exemplary mobile communication terminal may include at least one CPU member, input member, output member, memory member, and other optional members. The output member includes at least one display unit capable of generating visual signals as well as at least one speaker capable of generating audible signals. The input member [1] may include at least one main input unit and at least one directional input unit, or [2] may include a main input unit which also serves as a directional input unit and, therefore, which may also be referred to as a directional input unit.

4-1. Configuration 1—Overall

In one exemplary embodiment of the first exemplary aspect of this disclosure, a mobile communication terminal includes various hardware and software elements. Such software elements may generally be embedded into various hardware elements of a terminal or, alternatively, may be provided as separate computer programs or (software) applications. When desirable, some software elements may be provided not inside a terminal but inside an external device as described above.

Figure 2A:
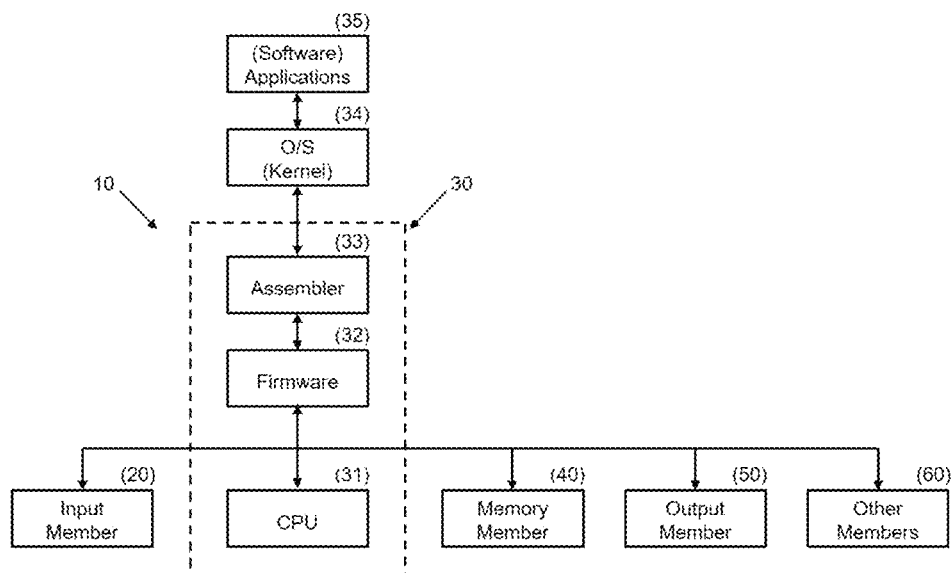
FIG. 2A is a block diagram of an exemplary mobile communication terminal according to the first exemplary aspect of this disclosure.

FIG. 2A is a block diagram of an exemplary mobile communication terminal according to the first exemplary aspect of this disclosure. More particularly, FIG. 2A represents a mobile communication terminal depicted in a context of multiple abstract layers, where the terminal (10) includes at least one CPU (31), at least one firmware (32) (optional), at least one assembler (33) (optional), at least one input member (20), at least one memory member (40), at least one output member (50), at least one operating system (or an O/S) which may include at least one kernel (34) (optional), at least one (software) application (35), other optional members (60), or the like.

Various lines which connect such members or units of FIG. 2A show "paths" of physical or operational coupling between various members or units such as, e.g., paths of command signals, paths of data transfer, paths of manipulation, or the like. It is appreciated that such paths of FIG. 2A are only exemplary and that many other members or units may be physically or operationally connected by additional paths which are nevertheless not included in the figure. For example, the CPU (31) and the O/S (34) may drive other members or units of FIG. 2A. Not all paths are included in this figure, however, for simplicity of illustration, and further paths among such members or units of the figure will to be explained in greater detail below.

A CPU (i.e., a central processing unit) (31) generally refers to an electronic circuitry carrying out instructions of a computer program by performing basic arithmetic, logical, control, and/or I/O operations as specified by such instructions. The CPU (31) [1] may be fabricated as a microprocessor, [2] may be incorporated into a microcontroller, [3] may be formed as a system-on-a-chip (SoC) which may also include therein a memory part, a peripheral interface, or the like.

A firmware (32) is a kind of prior art software or prior art (software) application which may provide control, data monitoring, or data manipulation to many engineered parts (or portions) of various hardware elements of a terminal (10). The firmware (32) may be incorporated into various prior art parts of a terminal such as, e.g., an input unit, a touch screen, a camera, a display panel, or the like. An assembler (33) is another type of software or (software) application creating an object code, e.g., by translating combinations of various mnemonics and syntax for operations and by addressing modes into their numerical equivalents. The assembler (33) may also calculate a constant expression and resolve a symbolic name for memory locations, and may store tedious calculations and manual address updates after program modifications.

An O/S (34) refers to a "system software" which can manage various hardware or software elements and other elements of a terminal (10). The O/S (34) provides common services to computer programs. In other words, every computer program, except the firmware (32), may require the O/S (34) to run operations and to perform their intended functions. In addition, the O/S (34) with time-sharing features may schedule tasks for efficient use of the terminal (10), and may include an accounting software for cost allocation of processor time, mass storage, printing, or other resources. The O/S (34) may also serve as an intermediary between various software and hardware elements for performing various functions such as, e.g., memory allocation, I/O (input-output) hardware functions, or the like.

In relation to the O/S (34), a kernel is also a computer program which may have a complete control over (almost) everything which may be processed or executed in a terminal (10). In this context, the kernel may be deemed as a central core of the O/S (34). Therefore, the kernel is usually the first program loaded on a startup of a terminal (10), and then manages the remainder of the startup such as, e.g., I/O requests by various software elements, translating them into data processing instructions for the CPU (31), or the like. The kernel is responsible for managing a memory member (40) and for managing and communicating with various prior art computing peripheries such as, e.g., a printer, an external speaker, and an external monitor. The kernel may also manage and communicate with other external electrical devices to which a terminal may operatively couple either by wire or wirelessly, where examples of such devices may include, but not limited to, an electrical device included in an IoT network, another terminal, another computer, a vehicle or an automobile, a motor cycle, a robot, a drone, a weapon with at least minimum electrical circuits, or the like.

A kernel may connect various software elements of a terminal (10) (including software applications). Critical codes of the kernel are usually loaded into a protected sector of memory, thereby preventing such codes from being overwritten by other, less frequently used parts of the O/S (34) or various applications residing therein. The kernel typically performs its tasks (e.g., executing programs and handling interrupts) in a "kernel space," whereas everything a user normally performs (e.g., writing text in a text editor or executing programs in a GUI) is done in a "user space," thereby preventing interference between the user data and kernel data and resulting diminished performance and instability. When a process makes request of the kernel, the request is called a "system call." Various kernel designs differ in how they may manage the system calls and resources.

Figure 2B:
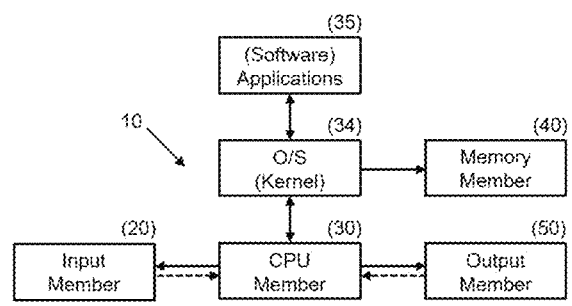
FIG. 2B shows a block diagram of a terminal including a CPU member.

FIG. 2B shows a block diagram of a terminal which includes a CPU member. For illustration purposes, a "CPU member" (30) may collectively refer to the CPU (31), the firmware (32), and the assembler (33), as encircled by a dotted line in FIG. 2A. It is appreciated that such hardware and software elements of the CPU member (30) may be identical or similar to those commonly found in prior art mobile communication devices such as, e.g., mobile phones or smart-phones and, therefore, other features of such elements are omitted herein.

As a result and as exemplified in FIG. 2B, a terminal (10) includes at least one CPU member (30), at least one O/S (34), at least one (software) application (35), at least one input member (20), at least one output member (50), at least one memory member (40), or the like. Although not included in FIG. 2B, a terminal (10) may also include other optional members which are omitted for simplicity of illustration.

Still referring to FIG. 2B, a memory member (40) may include at least one prior art non-volatile memory element or at least one volatile memory element. A terminal (10) may also releasably couple with and uncouple from an external memory device or card (e.g., an add-on device) in such a way that the CPU member (30) or O/S (34) may drive the memory member (40) as well as the add-on, external memory device, and may store various data into one or both of such memory member (40) and external memory device.

In addition, other members may be similarly configured such that they can releasably couple with an external device. For example, when a terminal runs a DNA authentication operation, an additional input member may be added to a terminal to perform DNA analysis. Other members of the terminal (10) such as, e.g., the input member (20) and the output member (50) may be similar or identical to those commonly found in conventional mobile phones or smartphones and, accordingly, detailed configurations or operational characteristics of such members (20), (50) are omitted herein for simplicity of illustration.

4-2. Configuration 1—Directional Input Unit

In another exemplary embodiment of the first exemplary aspect of this disclosure, the mobile communication terminal includes a directional input unit which may be one of multiple input units of the input member (20) or which may be the only input unit of the input member (20). The directional input unit may be fabricated in many different forms such as, e.g., [1] a $1^{st}$ hard button which can be pressed and displaced, [2] a $2^{nd}$ hard button which can be pressed or touched (without pressing) but which does not move, [3] a soft button which may be provided as a GUI, or the like, where such buttons may not necessarily have round shapes but may rather be provided in any shape or size, and where the directional input units with such buttons are collectively referred to as a "button-type directional input unit" hereinafter.

Accordingly and in one example, a directional input unit is fabricated as a unit an entire (or at least a) portion of which may move between a "rest position" (or a "rest state") and at least one "biased position" (or "biased state"). When a user applies force (i.e., a user input) to a button-type directional input unit, the input unit moves in response to the user input force, while generating at least one control signal and then delivering such control signal to a terminal. Thereafter, a terminal may run a selecting operation and identify at least one pre-selected operation from a matching list based on the control signal. To this end, the directional input unit may generate at least one control signal which corresponds to a certain selecting (user) sub-input and which is caused by a certain movement of an entire (or at least a) portion of the directional input unit.

As described above, a directional input unit or a portion thereof may move in response to force applied thereto by a user (i.e., a user input). To generate various control signals, a directional input unit not only receives the user input but also acquires a selecting (user) sub-input (i.e., $UI_{SEL}$) [1] from the force applied thereto by a user, [2] from various static or dynamic features of the force, [3] from the movement of the input unit, [4] from various static or dynamic features of the movement, or the like. It is appreciated that "Structure 1" and "Structure 2" of such directional input units which will be described below belong to this category of directional input units.

In another example, a directional input unit is provided as a stationary unit which does not move in response to force applied by a user (i.e., a user input) but which may sense the force or other static or dynamic features of such force. In addition, a directional input unit may not necessarily require a user to supply a force, for such a directional input unit may incorporate a sensor which may receive a user input of contacting or touching by a user, not a force exerted thereto.

Accordingly, when a user applies force (i.e., a pressing user input) to a directional input unit or when a user contacts or touches (i.e., non-pressing user input) the input unit, a sensor of the input unit senses application of a user input by, e.g., [1] sensing the input force, [2] sensing a contact by a user, or [3] monitoring a presence of a user, while generating at least one control signal and then sending the control signal to a terminal. Based on a matching list which provides a matching between multiple control signals (or multiple $UI_{SEL}$'s) with multiple pre-selected operations pre-selected by a user (or a terminal), a terminal may run a selecting operation and identify at least one operation which matches $UI_{SEL}$ (i.e., at least one "selected operation"). A terminal may then run the selected operation during or (immediately) after such powering on, waking up, or switching modes.

To generate distinct or unique control signals, a directional input unit may not only receive the user input but also acquire multiple sub-inputs directly [1] from the force applied by a user, [2] from a movement caused by the force, [3] from a contact with a user body part (or a non-user object), or [4] from various static or dynamic features of such force, movement, contact. It is appreciated that "Structure 3" as described below belongs to this category of directional input units.

In another example, a directional input unit may be provided in a different configuration such as, e.g., an input unit which can be incorporated into a touch screen-type input member. For example, a touch screen receives a user input in the form of a contact, a touch, a press, or the like, while [1] monitoring force associated with the press, touch or contact, [2] monitoring a contact between the touch screen and a user body part (or a non-user object), or the like. A touch screen may also monitor a time-varying trajectory of such contact, touch, or press, i.e., a movement of such contact, touch, press, or the like. When desirable, a conventional touch screen may include at least one additional sensor which may be implemented [1] over a top layer of a touch screen, [2] into the top layer, [3] underneath the top layer, [4] around the touch screen, or [5] other positions over, below, around, or inside at least a portion of the touch screen, depending upon detailed configurational or operational characteristics of the sensor.

In addition, a directional input unit may also be fabricated in various shapes, sizes, or arrangements, as long as the directional input unit may receive a user input and may acquire $UI_{SEL}$ therefrom, with or without moving at least a portion thereof in response to the user input. After acquiring $UI_{SEL}$, the directional input unit may also generate at least one unique control signal in response thereto.

4-3. Configuration 1—Operations and Sequences

In another exemplary embodiment of the first exemplary aspect of this disclosure, a directional input unit may be implemented into a mobile communication terminal in different configurations and arrangements.

Figure 3:
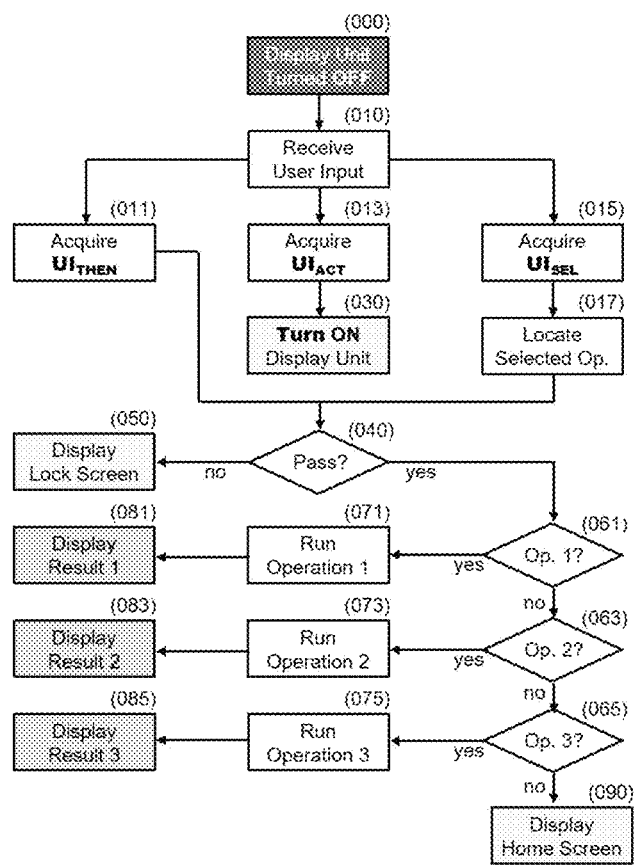
FIG. 3 depicts an exemplary operational sequence of a mobile communication terminal which incorporates a directional input unit.

FIG. 3 depicts an exemplary operational sequence of a mobile communication terminal which incorporates a directional input unit such that a terminal may run a selecting operation in response to a user input, and then run at least one selected operation while or (immediately) after a terminal powers on, wakes up, or switches modes.

For example, a mobile communication terminal is in a powered-on state and in an off-state (i.e., its display unit has been or is turned off) (step 000). A user supplies a single user input (or multiple concurrent user inputs) to an input member of a terminal, preferably to a directional input unit (step 010). In response thereto, a directional input unit receives a user input, and concurrently acquires multiple (user) sub-inputs from the user input such as, e.g., at least one authentication user sub-input ($UI_{THEN}$) (step 011), at least one activation user sub-input ($UI_{ACT}$) (step 013), and at least one selecting user sub-input ($UI_{SEL}$) (step 015). After concurrently acquiring the multiple (user) sub-inputs, a terminal may concurrently or sequentially run (or start to run) multiple operations such as, e.g., an operation of turning on a display unit (i.e., "turning on" in response to $UI_{ACT}$), an operation of authenticating a user (i.e., "authenticating" in response to $UI_{THEN}$), and an operation of selecting at least one operation desired by a user (i.e., "selecting" in response to $UI_{SEL}$). Based upon a source code of an O/S or a nature of a kernel, however, a terminal may [1] concurrently run (or start to run) two of turning on, authenticating, and selecting, while starting to perform the last one of such operations thereafter, [2] run (or start to run) one of such operations first and then concurrently run (or start to run) the remaining two operations, [3] may run (or start to run) all of such operations sequentially, without any temporal overlap therebetween.

Referring to (step 030), a terminal turns on a display unit or, more particularly, the terminal may start to turn on a display unit in different instances such as, e.g., [1] concurrently with (i.e., upon or in response to), [2] (immediately) after, or [3] within a certain period after receiving a user input or acquiring $UI_{ACT}$. Therefore, an exact instance in which a user sees a screen on a display unit may differ, depending on a type of a display unit or a (software) application for the turning on operation. In addition, even when a display unit is turned on, a terminal may display various screens such as, e.g., a lock screen, a home screen or other default screens. Once a display unit is turned on (step 030) in response to $UI_{ACT}$, a terminal may keep the display unit in this on-state, [1] until the terminal turns off a display unit according to a preset protocol, [2] until a user provides an additional user input to turn off the display unit, [3] until a user provides another user input which may cause the terminal to turn off its display unit, or the like. Alternatively, a terminal may turn off a display unit [1] when a user does not provide any additional user input within a certain period, [2] when a user fails the authenticating, or the like.

Referring to (step 017), a terminal runs (or starts to run) a selecting operation. In other words, a terminal may start to select (or identify) at least one (selected) operation to run while or (Immediately) after a terminal powers on, wakes up, or switches modes. To this end, a terminal may consult a "matching list" which matches multiple $UI_{SEL}$'s with multiple pre-selected operations which are selected and incorporated in the matching list by a user (or a terminal). For example, once acquiring $UI_{SEL}$ in (step 015), a terminal identifies $UI_{SEL}$ in the matching list, and locates at least one operation which is assigned or matched to $UI_{SEL}$ (i.e., at least one "selected operation") from a set of multiple pre-selected operations which had been entered into the matching list. After selecting the selected operation, a terminal may run (or start to run) the selected operation and display results obtained from running the selected operation, without requiring a user to provide any additional user input in order to run the selected operation after the terminal powers on, wakes up, or switches modes.

When a terminal requires user authenticating (step 011), however, a terminal may wait for an outcome from the authenticating, and then starts to run the selected operation when a user passes such authenticating. It is appreciated that "running a selecting operation" and "running a selected operation" refer to different operations. That is, "running a selecting operation" refers to running an operation in order to select or locate an operation which is matched to a certain $UI_{SEL}$ and, therefore, which a user wants a terminal to run while or (immediately) after a terminal powers on, wakes up, or switch modes. In contrary, "running a selected operation" rather refers to actually running at least one (selected) operation as has been selected by such running a selecting operation. It then follows that a terminal can run a selected operation only after a terminal completes to run a selecting operation and only after a terminal may select or locate which one of a set of multiple pre-selected operations may correspond to the operation which a user intends to run during or (immediately) after such powering on, waking up, or switching modes.

As is the case with the above "turning on," a terminal may run (or start to run) a selecting operation in various selecting timings as defined in Section 1-12-3. Therefore, an exact instance when a terminal starts to run the selecting operation or when a terminal actually finishes to run the selecting operation may differ, depending on a type of a directional input unit or a (software) application for such running a selecting operation.

Referring to (step 040), a terminal runs (or starts to run) at least one authentication operation of authenticating a user. A terminal may run an authentication operation in various "authenticating timings" such as, e.g., [1-1] concurrently with receiving a user input or acquiring $UI_{ACT}$, [1-2] (immediately) thereafter, i.e., (immediately) after receiving a user input or acquiring $UI_{ACT}$, or [1-3] within a certain period thereafter. A terminal may run (or start to run) at least one authentication operation [2-1] concurrently with running (or starting to run) such turning on, [2-2] (immediately) thereafter, i.e., (immediately) after the turning on, [2-3] within a certain period thereafter, or the like. A terminal may run (or start to run) at least one authentication operation [3-1] concurrently with running (or starting to run) such selecting, [3-2] (immediately) thereafter, i.e., (immediately) after such selecting, or [3-3] within a certain period thereafter. Therefore, an exact instance when a terminal starts to run or finishes to run an authentication operation may differ, depending on a type or a mechanism of an authentication sensor or a (software) application for such running a selecting operation.

It is appreciated that a terminal may run one or multiple authentication operations sequentially (e.g., one at a time and without any temporal overlap) or concurrently with each other. Multiple authentication operations may authenticate an identical biometric feature of a user or may authenticate different biometric features of a user. In addition, a user may spend different periods of time when the user provides his or her fingerprint, an image of an iris or a retina, a voice, or the like. In addition, a terminal may recruit different authentication sensors (or hardware elements) for such user authenticating, where the sensors may operate under different mechanisms, may have different response time, or the like. Accordingly, exact instances (or clock cycles) when a terminal may start or finish running each authentication operation may differ.

Still referring to (step 040), after acquiring $UI_{THEN}$ from a user input in (step 011), a terminal compares $UI_{THEN}$ with pre-stored authentication information of an authorized user, which corresponds to the "comparing step" as described above. A terminal then determines whether $UI_{THEN}$ or other authentication information included in a user input matches the pre-stored authentication or information (i.e., a "pass" or "yes") or not (i.e., a "fail" or "no"), where this step corresponds to the "determining step" as described above. When a user fails such authenticating, a terminal may [1] switch to a lock mode and display a lock screen (step 050), [2] keep a display unit turned off, [3] keep a display unit turned off but turn on a display unit when a user continues to provide a user input for a period longer than a preset threshold period. When a user passes the authenticating, a terminal may switch to an unlock mode, and then display a home screen (between steps 040 and 061). Concurrently therewith, (immediately) after, or within a certain period after confirming that a user passes such authenticating, a terminal may start to run a selected operation in an unlock mode (step 061). Although not included in FIG. 3, even when a user fails such user authenticating, a terminal may also start to run a selected operation in a lock mode [1] when desirable, [2] when a current user is authorized to run the selected operation in the lock mode, or the like.

As described above, different hardware or software elements react differently, even though an input unit may receive a user input(s) and concurrently acquire different (user) sub-inputs. Therefore, a display unit may be turned on before a terminal finishes the user authenticating. In such a case, a terminal displays a lock screen and then replaces the lock screen with a home screen after the user passes the authenticating. Conversely, when a terminal finishes the user authenticating before a display unit is turned on, a terminal may display a lock screen or may keep a display unit turned off when a user fails such authenticating. When a user passes such authenticating, a terminal may turn on a display unit and display an unlock screen thereon, without having to display a lock screen before the home screen.

Referring to (step 061), when a terminal authenticates a current user through such comparing and determining steps, a terminal may not have finished to run a selecting operation. In such a case, a terminal may wait until it finishes to run the selecting operation and to identify which one of multiple pre-selected operations of the matching list corresponds to the acquired $UI_{SEL}$. Upon finishing to run the selecting operation and identifying the selected operation, a terminal may proceed to run the selected operation (step 061). When a terminal has finished to run the selecting operation before the terminal finishes to run an authentication operation, and when a user passes such authenticating, a terminal proceeds to run the selected operation as well (step 061).

In the sequence exemplified in FIG. 3, a terminal checks whether $UI_{SEL}$ corresponds to "Operation 1" which is one of such pre-selected operations. Because a terminal has already identified the selected operation which matches $UI_{SEL}$ from the matching list, a terminal may only need to check whether or not Operation 1 matches the selected operation. When the answer is "yes" (i.e., matching the selected operation), a terminal then runs Operation 1 (step 071). Upon finishing running Operation 1, a terminal displays results obtained from Operation 1 on the display unit (step 081).

FIGS. 4A to 4D show exemplary screens which a terminal displays after running the selected operation, where each terminal (10) includes a directional input unit (22) and a display unit (52). For example and as exemplified in FIG. 4A, a terminal (10) includes a directional input unit (22) which is formed as a hard button and disposed below a display unit (52). The display unit (52) is also turned off (i.e., in an off-state), until a terminal (10) may finish to run a selecting operation and to run a selected operation.

Figure 4A:
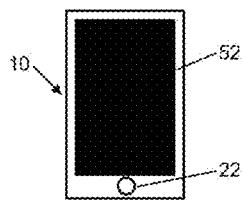
FIGS. 4A to 4D show exemplary screens which a terminal displays after running the selected operation.
Figure 4B:
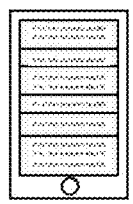

Referring to FIG. 4B, a user provides a user input to a directional input unit (22), while moving his or her finger upwardly, where the upward movement corresponds to $UI_{SEL-U}$. A terminal (10) receives a user input, and then acquires $UI_{SEL-U}$ as well as $UI_{THEN}$. A terminal (10) runs an authentication operation (step 040) upon acquiring $UI_{THEN}$. Once a user passes the authenticating, a terminal (10) proceed to run a selecting operation based on $UI_{SEL-U}$. After a terminal finishes running the selecting operation, a terminal identifies that the acquired $UI_{SEL-U}$ corresponds to an email application which also corresponds to "Operation 1" in the matching list (step 061). A terminal (10) loads an email application, and then runs an email operation which corresponds to the application selected by the acquired $UI_{SEL-U}$ (i.e., the selected operation) (step 071). Thereafter, a terminal (10) may display an inbox of the email application on a display unit (52) (step 081). It is appreciated that, when a user fails the authentication, a terminal (10) may keep its display unit (52) turned off or may turn on a display unit (52) while displaying a lock screen thereon.

Figure 4C:
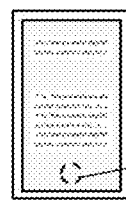

Referring back, when $UI_{SEL}$ does not match Operation 1 and the answer is "no" in (step 061) (i.e., mismatching between the selected operation and $UI_{SEL}$), a terminal advances to (step 063) to check whether $UI_{SEL}$ matches Operation 2. As shown in FIG. 4C, when Operation 2 matches the selected operation, a terminal then runs a selected operation which is a messenger application, and displays new messages on a display unit (52).

It is appreciated that a terminal (10) of FIG. 4C also includes a directional input unit (22) and a display unit (52) but that the directional input unit (22) is provided to a user as a GUI which is displayed on the display unit (52). In this respect, the input unit (22) of FIG. 4C may be viewed as a soft button. It is also appreciated that the soft button or GUI (22) may only disappear on a display unit (52) when a display unit (52) is turned off. Alternatively, a terminal may provide the soft button or GUI (22) on a display unit (52), while the rest of the display unit (52) is turned off in such a way that the majority of the display unit (52) is turned off but that a user can see the soft button or GUI (22) thereon. In such a case, the GUI may be deemed as one of the routine data and, therefore, the display unit (52) may also be deemed in its off-state.

Figure 4D:
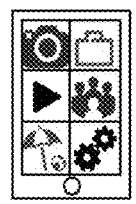

When the answer is again "no" in (step 063), a terminal advances to (step 065) to check whether $UI_{SEL}$ matches Operation 3. As depicted in FIG. 4D, when Operation 3 matches $UI_{SEL}$, a terminal runs a selected operation which is an operation of loading a gallery, and displays pictures or scanned images on the display unit (52). When there are more pre-selected operations to run, a terminal may repeat this comparison until it finds an additional selected operation which matches additional $UI_{SEL}$, i.e., an additional operation from such pre-selected operations which a user wants to run when a terminal powers on, wakes up, or changes modes.

Referring to (step 090), when a user passes the authenticating but when an acquired $UI_{SEL}$ may not match any of the pre-selected Operations 1, 2, and 3, a terminal may display a home screen. A user may then select an operation he or she wants to run from a home screen, apply an additional user input to a GUI or an icon which represents the operation, and run the operation. Because a user fails to provide a correct $UI_{SEL}$ to a terminal in this case, he or she has to provide an additional user input(s) which includes a correct $UI_{SEL}$, thereby failing to enjoy the seamless operations. Alternatively, a terminal may send an alarm to a user in order to inform that an acquired $UI_{SEL}$ does not match any of multiple pre-selected operations and, therefore, that a user needs to provide a correct $UI_{SEL}$. In another alternative, a terminal may turn off a display unit and then go back to a sleep mode.

As described above, various hardware or software elements may have different response times and operating times such that a display unit has already been turned on even before a terminal finishes running a selecting operation. In this case, a terminal may display a lock screen or default screen, and keep displaying the screen until such selecting is completed. A terminal may optionally display a visual notice signal that a user has provided a certain $UI_{SEL}$ or that a certain selected operation is to be run. Alternatively, a terminal may keep displaying the lock or default screen until it completes to run a selecting operation and then run at least one selected operation. Thereafter, a terminal may replace the previous screen with a screen directly displaying results obtained from running the selected operation.

In another example, a display unit may not have been turned on when a terminal finishes running a selecting operation. In this case, upon turning on a display unit, a terminal may display a lock screen or other default screens and continue to display the screen until a terminal completes running at least one selected operation, while optionally displaying a visual notice signal on the display unit as described above. Alternatively, a display unit may not have been turned on when a terminal finishes running a selecting operation and then finishes running at least one selected operation. In this case, upon turning on a display unit, a terminal may display outcomes or results from running the selected operation such as, e.g., displaying an inbox of an email application, showing pictures or video clips stored in a gallery, or the like.

4-4. Configuration 1—Hardware Elements and Variations

In another exemplary embodiment of the first exemplary aspect of this disclosure, a directional input unit may receive a single user input or multiple (concurrent or sequential) user inputs, and concurrently acquire multiple (user) sub-inputs, while recruiting various hardware elements of a terminal. It is appreciated that, in the latter case, a terminal may concurrently receive multiple user inputs as well as concurrently acquire multiple (user) inputs. Alternatively, a terminal may sequentially acquire multiple user inputs but may concurrently acquire multiple (user) inputs as described above.

In one example of this exemplary embodiment, a terminal may not only receive a user input but also acquire (user) sub-inputs in various arrangements. More particularly, a terminal may include a single directional input unit, or may include multiple input units at least one of which may be a directional input unit. A terminal (or its directional input unit) may acquire multiple (user) sub-inputs concurrently with each other from a single user input or multiple concurrent user inputs. In addition, regardless of a number of such directional input units or other input units, a user may manipulate a single movable or stationary portion of a directional input unit for providing multiple sub-inputs concurrently, or may concurrently manipulate multiple portions of the directional input unit and provide multiple concurrent sub-inputs. Followings describe exemplary arrangements of this example.

In one arrangement, a terminal includes only one input unit which is a directional input unit which receives a single user input including multiple (user) sub-inputs, where a user manipulates a single portion of the input unit, or where a user manipulates a single user body part with respect to the input unit. Therefore, the input unit may concurrently acquire multiple (user) sub-inputs from the user input. In another arrangement, a terminal similarly includes only one input unit which is a directional input unit which receives a single user input including multiple (user) sub-inputs, where a user may concurrently manipulate multiple portions of a directional input unit or where a user may concurrently manipulate multiple body parts with respect to the input unit. Therefore, a directional input unit still concurrently acquires multiple (user) sub-inputs.

In yet another arrangement, a terminal may include multiple input units at least one of which is a directional input unit, and may receive multiple user inputs each of which includes at least one (user) sub-input, where a directional input unit receives a user input which includes $UI_{SEL}$. When a user manipulates a single portion or multiple portions of at least two of such input units concurrently, a terminal may concurrently acquire multiple (user) sub-inputs therefrom.

In each of the above arrangements, a terminal receives a single user input or multiple (concurrent or sequential) user inputs, and concurrently acquires multiple (user) sub-inputs one of which is $UI_{SEL}$, while not requiring a user to provide any non-concurrent, additional user input thereafter. In addition, a terminal does not run any operation to make determinations for such concurrent acquisition of multiple (user) sub-inputs.

In another arrangement, a terminal similarly includes only a single input unit which is a directional input unit which in turn includes multiple sensors and receives multiple concurrent user inputs each including at least one (user) sub-input. A user may concurrently manipulate a single portion of a directional input unit or a single or multiple body parts with respect to the input unit. Therefore, a directional input unit still concurrently acquires multiple (user) sub-inputs. In the alternative, a user manipulates multiple portions of a directional input unit or multiple body parts with respect to the input unit sequentially (i.e., without a temporal overlap therebetween), whereby a directional input unit receives a series of multiple user inputs and may acquire a series of multiple (user) sub-inputs.

In another example of this exemplary embodiment, a directional input unit may include various sensors (or hardware elements) depending upon needs from a user or from its use. In other words, a directional input unit needs to include only those sensors capable of acquiring necessary $UI_{SEL}$'s. Therefore, a directional input unit may typically need to include a certain number of sensors when it is required to acquire the same number of different $UI_{SEL}$'s.

In one arrangement, a directional input unit may include a $1^{st}$ sensor for acquiring $UI_{SEL}$ and a $2^{nd}$ sensor for acquiring one of $UI_{ACT}$ and $UI_{THEN}$. Accordingly, the input unit may concurrently acquire $UI_{SEL}$ and one of $UI_{ACT}$ and $UI_{THEN}$ in response to a single user input. In another arrangement, a directional input unit includes a $1^{st}$ sensor for acquiring $UI_{SEL}$, a $2^{nd}$ sensor for acquiring $UI_{ACT}$, and a $3^{rd}$ sensor for acquiring $UI_{THEN}$. The input unit may concurrently acquire such three (user) sub-inputs in response to a single user input. It is appreciated that a terminal may include a directional input unit as well as a non-directional input unit such that a $1^{st}$ sensor for $UI_{SEL}$ is incorporated into the former input unit, but that a $2^{nd}$ or $3^{rd}$ sensor is included in the latter input unit.

When a user manipulates such input units concurrently, a terminal may receive a single or multiple user inputs concurrently and may also acquire two or three (user) sub-inputs concurrently as well. It is also appreciated that a terminal may include a directional input unit as well as an add-on input unit incorporated in an external device such that a $1^{st}$ sensor for $UI_{SEL}$ is incorporated into a directional input unit, whereas a $2^{nd}$ or $3^{rd}$ sensor is included in the latter input unit. Alternatively, an add-on unit may include the $1^{st}$ sensor for $UI_{SEL}$, whereas a $2^{nd}$ or $3^{rd}$ sensor may be incorporated into a directional input unit or an add-on input unit.

In another arrangement, a directional input unit may incorporate a $1^{st}$ number of sensors in order to acquire a $2^{nd}$ number of $UI_{SEL}$'s supplied thereto, where a $1^{st}$ number may be greater than a $2^{nd}$ number, where such an "redundant arrangement" offers a user with a benefit of improving an accuracy of a directional input unit. For example, a terminal may include multiple identical or different fingerprint authentication sensors into multiple portions of the input unit. Conversely, a directional input unit may include a $2^{nd}$ number of sensors in order to acquire a $1^{st}$ number of $UI_{SEL}$'s, where a terminal (or a directional input unit) may indirectly estimate or predict at least one $UI_{SEL}$ which may not be directly sensed thereby. Indirectly estimating an application of a force by a user (e.g., $UI_{ACT}$) based on a movement of at least a portion of a directional input unit may be an example of this "simplified arrangement" or indirect sensing arrangement.

In another example, a directional input unit may be disposed into various portions of a mobile communication terminal, e.g., on a front surface of a terminal, along a side of a terminal, on at least two identical or different sides thereof, on a back surface of a terminal, or the like. FIGS. 5A to 5K show various directional input units incorporated into various exemplary locations of a mobile communication terminal.

Figure 5A:
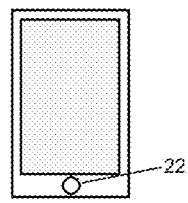
FIGS. 5A to 5K show various directional input units which are incorporated into various exemplary locations of a mobile communication terminal.
Figure 5B:
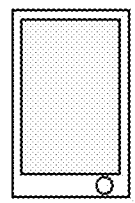
Figure 5C:
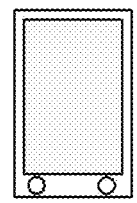

Referring to FIGS. 5A to 5C, a directional input unit is incorporated on various locations of a front surface of a terminal (when placing a terminal with its front surface up). For example, a directional input unit (22) is placed in a center of a lower end of a front surface (see FIG. 5A), in (or adjacent) a right (or left) corner of a lower end of a front surface (see FIG. 5B), in a center (or a corner) of an upper end thereof, in (or adjacent) a right (or left) corner of its upper end, in a center of its right (or left) side, in (or near) an upper (or lower) portion of the side, or the like.

In addition, a terminal may incorporate multiple input units at least one of which is a directional input unit. For example and as exemplified in FIG. 5C, a terminal may include two input units, where one of such input units is a directional input unit, where another of such input units may be a power button, and where both of such input units are disposed in each corner of a lower portion of a side of a front surface. Of course such input units may be disposed in different sides, different surfaces, or the like.

Figure 5D:
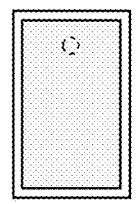
Figure 5E:
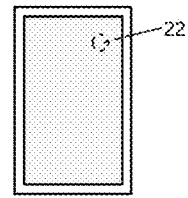
Figure 5F:
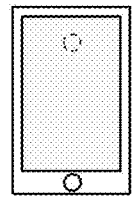

Referring to FIGS. 5D to 5F, a directional input unit (22) is implemented into various locations of a rear surface of a terminal (when placing a terminal with its front surface up). For example, a directional input unit is disposed in a center of a lower end of a rear surface, in (or adjacent to) a right (or left) corner of such a lower end, in a center of a upper end of a rear surface (see FIG. 5D), in (or adjacent to) a right (or left) corner of a upper end thereof (see FIG. 5E), in a center of a right or left side thereof, in (or adjacent to) a upper (or lower) part of a side thereof, in at least two of such locations, in a combination of at least one of the above examples of this paragraph and at least one of such examples of the preceding paragraph (see FIG. 5F), or the like.

Figure 5G:
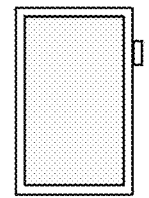
Figure 5H:
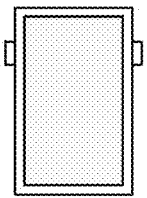
Figure 5I:
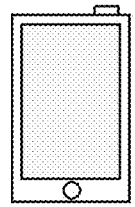

Referring to FIGS. 5G to 5I, a directional input unit (22) is implemented into various portions of an edge (or a side) of a terminal (when placing a terminal with its front surface up). For example, a directional input unit may be disposed along a right (or left) edge of a terminal (see FIG. 5G), along a top (or bottom) edge, in at least two portions along the same edge, in at least two portions along two adjacent edges, along at least two portions of opposing sides (see FIG. 5H), in a combination of at least one of such examples of this paragraph and at least one of such examples of the two preceding paragraphs (see FIG. 5I), or the like.

Figure 5J:
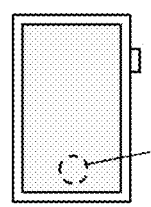
Figure 5K:
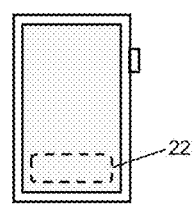

Referring to FIGS. 5J and 5K, a terminal includes a touch screen-type display unit and a directional input unit is provided as a GUI or a soft button which is displayed on the display unit. For example, a soft button or a GUI for a directional input unit (22) of FIG. 5J has a circular shape and disposed in a center of a lower portion of the display unit, while a directional input unit (22) of FIG. 5K has a rectangular shape and also disposed in the center of the lower portion of the display unit.

Depending upon the configuration and mechanism of such a touch screen, a display unit [1] may provide the soft button or GUI (22) in a fixed location, or [2] may change the position of such directional input units (22). When feasible, an entire (or at least a substantial) portion of the touch screen may be utilized as the directional input unit (22) as well.

In contrary to the above examples where a user provides all (user) sub-inputs to a single portion of a directional input unit, the input unit may include a $1^{st}$ portion capable of acquiring $UI_{SEL}$ and at least one $2^{nd}$ portion for acquiring other (user) sub-input such as, e.g., $UI_{THEN}$, $UI_{ACT}$, or $UI_{SWT}$. A user may provide $UI_{SEL}$ and at least one another (user) sub-input by, e.g., concurrently pressing, contacting, touching or otherwise manipulating at least one portion of a single input unit.

As used herein, such manipulations of the preceding paragraph by a user may be deemed to be a single user input, for [1] a terminal does not execute any step of making any determination while a terminal is acquiring such multiple (user) sub-inputs, [2] a user does not have to move such portions while a terminal is acquiring such multiple (user) sub-inputs, or the like. Other manipulations by a user which satisfy either [1] or [2] of this paragraph are also included in a definition of a single user input.

Alternatively, a user may provide a single user input by a manipulation of at least one portion of a directional input unit and then by adding an additional concurrent or continuing manipulation such, e.g., [1] continuing or holding the manipulation for (or beyond) a certain period, [2] sliding or moving such a portion of a directional input unit while continuing or holding such manipulation but without detaching a user body part from the portion of the directional input unit, or the like. A terminal may recognize the additional manipulation as [1] an additional (user) sub-input of the same user input, or [2] an additional user input which may include at least one additional (user) sub-input.

It is appreciated that [1] a manipulation of such holding or [2] a manipulation of such moving while such holding may also be deemed as a single user input, as long as such holding and moving satisfy the above [1] or [2] of the preceding paragraph. Alternatively, such holding and moving may be deemed as a single user input as long as such moving and such holding overlap each other in at least one clock cycle of a terminal (or its CPU member).

4-5. Configuration 1—Software Elements and Variations

In another exemplary embodiment of the first exemplary aspect of this disclosure, a directional input unit may receive a single user input or multiple (concurrent or sequential) user inputs, and concurrently acquire multiple (user) sub-inputs one of which is $UI_{SEL}$. To this end, a terminal may recruit various software elements thereof in various sequences.

In one example, a terminal displays various screens on its display unit depending on different arrangements. Once powering on, waking up, or switching modes, a terminal may display a lock screen when a terminal starts to operate in a lock mode, may instead display a home (or unlock) screen when a terminal starts to operate in an unlock mode, or may display a different default screen when a terminal starts to operate in an intermediate mode, where a terminal may grant the most access authority to an unlock mode but the least authority to a lock mode.

A terminal may display an identical lock, home or default screen when a terminal is to start in the lock, unlock or intermediate mode, respectively. A terminal may instead select a lock, home or default screen from multiple lock, unlock or default screens, respectively, and then display the screen when a terminal starts to operate in a respective mode.

Therefore, a terminal may display different lock, home or default screens whenever a terminal starts in the respective mode. In addition, a terminal may obtain a lock, unlock or default screen from those screens which have been pre-stored in its memory member, from an external memory unit, or from a website.

In another example, a terminal may run at least one authentication operation for authenticating a user using various prior art authentication algorithms which check various biometric features of a user, passwords, non-user information, or the like, as have been described above. In one case, a terminal completes turning on a display unit before completing to run an authentication operation. In this case, a terminal may display a lock screen on a display unit.

When a user fails such authenticating, a display unit may continue to display a lock screen or may turn off a display unit. When a user passes such authenticating, a display unit may [1] remove a lock screen and display a home screen, [2] replace a lock screen with a home (or unlock) screen, [3] overlay a home screen on top of a lock screen, or the like.

When a terminal runs a selecting operation, a terminal may [1] display a lock screen and then replace the lock screen with outcomes or results obtained by running a selecting operation or by running a selected operation, or [2] overlay such outcomes or results over the lock screen. However, when a terminal may complete such authenticating before completing to turn on a display unit, a terminal may continue to display a lock screen and then display the outcomes obtained from such authenticating. When a terminal runs a selecting operation, a terminal may not display a screen at all (i.e., keep a display unit turned off) and directly display results obtained from such selecting (i.e., results obtained from running a selecting operation or, when desirable, from running a selected operation).

In another example, a terminal may concurrently or sequentially run an activation operation and run a selecting operation. When a terminal may complete an activation operation (i.e., turning on) before completing to run a selecting operation, a terminal may display a lock screen while or after such turning on (or may instead keep a display unit turned off). Alternatively, a terminal may keep its display unit turned off until it completes to run a selecting operation. Upon completing running a selecting operation, a terminal may then [1] replace a lock screen by results obtained by running a selecting operation, [2] turn on a display unit and display the results obtained by running a selecting operation, [3] keep its display unit turned off until a terminal completes to run a selected operation, or the like. However, when a terminal fails to acquire $UI_{SEL}$ after running the selecting operation (e.g., due to an incorrect or undefined $UI_{SEL}$), a terminal may [1] continue to keep its display unit turned off, [2] turn off its display unit which has already been turned on, [3] continue to display a lock screen on a display unit, [4] replace a lock screen with a home screen when a terminal has already authenticated a user as an authorized user, or [5] overlay a home screen or other default screens over a lock screen.

When a terminal runs an authentication operation, a terminal may display a lock screen and replace a lock screen with an outcome which is obtained from such authenticating or from running a selecting operation. As a result, detailed sequences of such turning on (running an activation operation), such selecting (running a selecting operation) or such authenticating (running at least one authentication operation) may vary, depending on various needs of a user or various configurational or operational characteristics of a terminal, as have been described hereinabove and as will be provided hereinafter.

In another example, a terminal may concurrently or sequentially perform such turning on operation as well as selected operation, where a prerequisite for running the selected operation is that a terminal successfully finishes to run the selecting operation and that, as a result, a terminal successfully identifies at least one operation to run when a terminal powers on, wakes up, or switch modes, from a set of multiple pre-selected operation based on $UI_{SEL}$. When a terminal completes such turning on before it finishes to run the selected operation, a terminal may display a lock screen after such turning on (or may keep a display unit turned off). A terminal may instead keep its display unit turned off until it complete to run the selected operation. Upon completing running the selected operation, a terminal may [1] replace a lock screen with results obtained by running the selected operation, [2] turn on a display unit and display such results obtained from running the selected operation, or the like.

It is appreciated that a terminal may adopt a difference sequence of operations when a terminal has already authenticated a user before completing to run the selected operation. First of all and as described above, a terminal may display a home screen when a terminal fails to acquire $UI_{SEL}$ after running a selecting operation, for the user is anyway an authorized user who has not been careful in providing a correct $UI_{SEL}$ or one of pre-selected $UI_{SEL}$'s. A user may then provide an additional user input, e.g., to a desired GUI or icon which is displayed on a touch screen-type display unit and then run a desired, selected operation. As exemplified here and above, detailed sequences of such turning on, such selecting, or such authenticating may also vary, depending upon various needs of a user, configurational or operational characteristics of a terminal, or the like, as explained above and as will be provided hereinafter.

Still referring to FIG. 3, when a terminal receives a user input and also acquires $UI_{SEL}$ therefrom, a terminal may run (or start to run) a selecting operation as described in (step 017). Concurrently with or (immediately) after running the selecting operation, a terminal may turn on its display unit, run an authentication operation, or the like, while keeping its display unit turned off, or displaying at least one screen thereon, as described above.

It is appreciated that a terminal which operates according to an exemplary sequence of FIG. 3 may run at least one selected operation depending upon the outcome obtained from running an authentication, e.g., a terminal runs at least one selected operation after having completed running a selecting operation and having selected or located which operation to run from a set of multiple pre-selected operations, only when a user passes such authenticating. When a user fails such authenticating, however, a terminal may not run any selected operation. In this respect, a terminal exemplified in FIG. 3 may be deemed to condition the "running a selected operation" upon an outcome from running an authentication operation. In addition, a terminal may condition the "running (or starting to run) the selected operation" or such "turning on operation" upon different instances such as, e.g., [1] after a certain operation starts to run, [2] when a certain operation is completed, or the like. Following FIGS. 6A and 6B show other exemplary operational sequences where a terminal conditions the "running a selected operation" upon other timings or events.

Figure 6A:
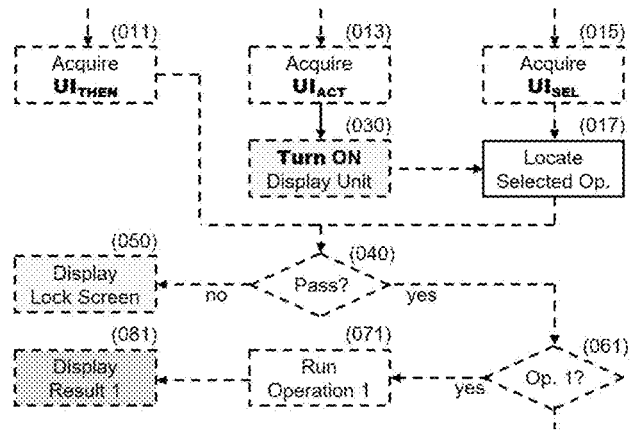
FIGS. 6A and 6B exemplify operational sequences of a mobile communication terminal which are variations of that of FIG. 3.

FIG. 6A shows an exemplary operational sequence of a mobile communication terminal which is a variation of that of FIG. 3, where a terminal still concurrently acquires multiple (user) sub-inputs, and where a user can run at least one selected operation when a terminal powers on, wakes up, or switches modes. As shown in FIG. 6A, a terminal (or a directional input unit) first concurrently acquires $UI_{THEN}$, $UI_{ACT}$, and $UI_{SEL}$ (steps 011, 013, and 015). In response to $UI_{ACT}$, a terminal turns on a display unit (step 030). Once a display unit is turned on, a terminal runs a selecting operation (step 017) to identify which operation a user desires to run in response to $UI_{SEL}$. That is, a terminal may condition such selecting upon such turning on. It is appreciated that a terminal may complete acquiring $UI_{SEL}$ before it finishes turning on a display unit. To this end, a terminal or its directional input unit may store $UI_{SEL}$ therein or in a memory member temporarily or permanently, and then retrieve $UI_{SEL}$ to run a selecting operation after it completes such turning on.

Figure 6B:
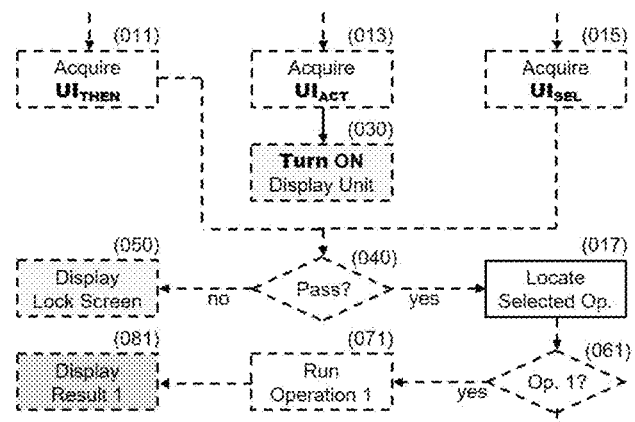

FIG. 6B shows another exemplary operational sequence of a terminal which is a variation of that of FIG. 3 as well, where a terminal still concurrently acquires multiple (user) sub-inputs and where a user runs a selected operation when a terminal powers on, wakes up, or switches modes. As shown in the figure, a terminal receives $UI_{THEN}$, $UI_{ACT}$, and $UI_{SEL}$ (steps 011, 013, and 015) concurrently, similar to that of FIG. 6A. However, a terminal first receives $UI_{SEL}$ but runs a selecting operation only after running (or completing) an authentication operation. That is, only after a terminal completes the authenticating, a terminal or a directional input unit locates which one of a matching list (e.g., a set of multiple pre-selected operations) to run when a terminal powers on, wakes up, or switches modes in response to $UI_{SEL}$. Therefore, a terminal or a directional input unit may have to store $UI_{SEL}$ therein or in a memory member temporarily or permanently.

In another example, other optional operations or steps may be added to the exemplary flow chart depicted in FIG. 3. In one case, various steps may be inserted to generate visual, audible, or tactile notice signals, and to inform a user of receiving a (single) user input or (multiple) (user) sub-inputs, where such a step may be added between [1] (step 010) and one of (steps 011, 013, or 015), [2] one of (steps 011, 030, or 017) and (step 040), [3] (step 013) and (step 030), [4] (step 015) and (step 017), or [5] (step 030) and (step 040). It is appreciated that such additional steps still do not require a user to provide any non-concurrent and additional user input, do not require a user to detach his or her body part (or non-user object) from a portion of a directional input unit while providing a single user input or multiple concurrent user inputs, or the like, and that such additional steps do not correspond to any step to make any determination, to run different operations based upon such a determination, or the like.

In another case, various steps may be added to render various hardware or software element ready before a terminal receives a user input, i.e., between (step 000) and (step 010). For example, a terminal may render a sensor to run an authentication operation ready upon or after sensing various preset events such as, e.g., [1] a presence of a user nearby, [2] a certain movement (e.g., a gesture) of a user body part which approaches a terminal, [3] a distance to a user which decreases or which is less than a threshold value, [4] a certain gesture of a user, or the like. Even though these additional step may make a determinations, such a step is performed after (step 000) but before (step 010), i.e., before a terminal receives a single user input, and before it acquires at least one (user) sub-input therefrom. Therefore, a terminal operating in a sequence with the additional step(s) may still concurrently acquire multiple different (user) sub-inputs from a single user input or multiple concurrent user inputs.

In another case, at least one more step may be added between (step 010) and one of (steps 011, 013 or 015) to generate visual, audible, or tactile notice signals, and to inform a user that [1] a terminal has received a user input(s), [2] a terminal has acquired a certain $UI_{SEL}$, [3] a terminal has received multiple (user) sub-inputs, or the like. Using such notice signals, a terminal may also inform a user that a terminal is about to run a certain selected operation based on $UI_{SEL}$. It is appreciated that the above additional steps still do not require a user to provide a non-concurrent additional user input, and do not require a user to detach his or her body part (or a non-user object) from a movable or stationary portion of a directional input unit. In addition, these additional steps do not require a terminal to make a determination and running operations based upon the determination.

Other steps may be also added to the exemplary sequence of FIGS. 3, 6A, and 6B, however, a terminal or a directional input unit may acquire $UI_{SEL}$ from a single user input or multiple concurrent user inputs. Therefore, as long as a terminal may concurrently acquire multiple (user) sub-inputs without requiring a user to detach his or her body part (or a non-user object) from a portion of a directional input unit, without having to make at least one determination, or without having to receive non-concurrent additional user inputs, such a terminal can operate according to a different sequence which may require [1] modifications of the exemplary sequence of FIG. 3, [2] additions of certain steps to the sequence, or [3] deletion of certain steps from the sequence.

Configurational or operational variations (or modifications) of various mobile communications terminals and their directional input units described in this first exemplary aspect may be interchangeable such that a certain feature of one example of this first aspect may also be applied to another example of the same aspect. Other configurational or operational features, variations or modifications of such terminals and input units of this first exemplary aspect [1] may apply to, [2] may be incorporated into, [3] may replace, [4] may be replaced by, or [5] may be combined with corresponding features of other exemplary aspects of this disclosure, subject to certain modifications, additions, omissions, or the like, each of which is apparent based on detailed context of this exemplary aspect or other exemplary aspects.

5. Configuration 2—Authenticating for Turning on

In the second exemplary aspect of this disclosure, an exemplary mobile communication terminal may include similar directional input unit as well as similar hardware and software elements as that of the first exemplary aspect of this disclosure. Therefore, a terminal includes at least one output member and at least one input member, where the output member may include at least one display unit capable of displaying visual signals thereon, and at least one speaker capable of generating sound signals, while an input member may include at least one directional input unit therein.

5-1. Configuration 2—Overall

In one exemplary embodiment of the second exemplary aspect of this disclosure, a mobile communication terminal includes various hardware elements and software elements. Accordingly, like the one exemplified in FIGS. 2A and 2B, a mobile communication terminal of this second aspect includes at least one CPU member (30), at least one input member (20), at least one memory member (40), at least one output member (50), or other optional members. More particularly, the input member may include a directional input unit as its sole input unit, or the input member may include at least two input units one of which is the directional input unit. It is appreciated that details of such members and units are similar or identical to those corresponding members of a terminal of the first aspect and, therefore, are omitted.

5-2. Configuration 2—Operation and Sequences

Figure 7:
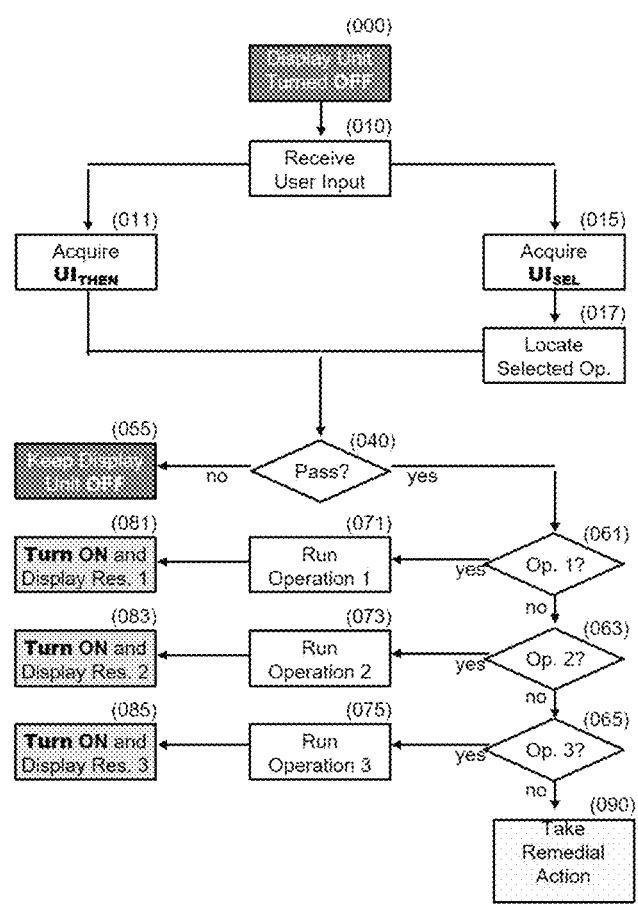
FIG. 7 shows exemplary operational sequences of a mobile communication terminal according to the second exemplary aspect of this disclosure.

In another exemplary embodiment of the second exemplary aspect of this disclosure, a directional input unit may be implemented into a mobile communication terminal in different configurations and arrangements. FIG. 7 shows exemplary operational sequences of a mobile communication terminal which operates according to this embodiment and which includes a directional input unit so that a user can run a selected operation when a terminal powers on, wakes up, or switches modes.

As shown in (step 000), a terminal is in its sleep mode or in its off-state. Upon receiving a single user input (or multiple concurrent user inputs) from a user (step 010), a directional input unit similarly acquires multiple (user) sub-inputs such as $UI_{THEN}$ and $UI_{SEL}$ concurrently (steps 011 and 015), but not $UI_{ACT}$. It is appreciated that a single user input (or multiple concurrent user inputs) includes therein other sub-inputs (e.g., $UI_{SWT}$) but does not include an activation (user) sub-input ($UI_{ACT}$), for a terminal of this second exemplary aspect conditions such turning on upon a user authentication operation. That is, a terminal may keep its display unit turned off when a user does not pass such authenticating, regardless of which one of multiple $UI_{SEL}$'s a user may provide to a directional input unit.

Of course, a directional input unit may be configured to acquire $UI_{ACT}$ for various purposes such as, e.g., for turning on a display unit in cases which are not directly related to such authenticating, for improving accuracy of operations through redundant arrangements, or the like. In addition, such turning on in this second aspect may be conditioned upon running a selecting operation such that, e.g., a terminal may turn on its display unit when it selects or locates which one of multiple pre-selected operations to run (i.e., when a terminal completes running a selecting operation), or when it finishes running the selected operation.

Still referring to FIG. 7, a terminal (or its directional input unit) may concurrently acquire $UI_{SEL}$ and $UI_{THEN}$ in various ways. For example, a terminal may acquire both $UI_{SEL}$ and $UI_{THEN}$ from a single user input. Accordingly, a terminal [1] does not require a user to detach his or her body part (or a non-user object) from a stationary or movable portion of a directional input unit, [2] does not require any non-concurrent additional user input from a user, or [3] does not perform any step of making a determination or a comparison, or the like.

It is appreciated that sliding, swiveling, or otherwise manipulating a certain portion of a directional input unit without detaching a user body part (or a non-user object) from the input unit during the manipulating is deemed to be a single user input within the scope of this disclosure. In addition, concurrently manipulating at least two portions of a single directional input unit without detaching a user body part (or a non-user object) from the directional input unit during such manipulating is similarly deemed as a single user input. Moreover, concurrent manipulation of at least two portions of multiple input units (at least one of which is a directional input unit) without detaching a user body part (or a non-user object) from a directional input unit during such manipulating is also deemed as the single user input. Furthermore, a user may provide such a single user input in a different manner which has been described hereinabove.

After concurrently acquiring $UI_{SEL}$ and $UI_{THEN}$, a terminal runs a selecting operation (step 017). As described above, a terminal consults a matching list which matches multiple $UI_{SEL}$'s with multiple pre-selected operations. Accordingly, the selecting operation is to select or identify at least one operation (from the matching list) which matches $UI_{SEL}$ provided by a user. A terminal may run (or start to run) a selecting operation in various selecting timings as described above. A terminal may run multiple authentication operations concurrently or sequentially as explained in the first exemplary aspect. It is appreciated that the matching list may be constructed based on a 1-to-1 matching between each of multiple $UI_{SEL}$'s and each of multiple $UI_{THEN}$'s, in a 1-to-n matching, in a m-to-1 matching, or in a m-to-n matching.

A terminal may then run (or start to run) an authentication operation (step 040) in various instances such as, e.g., concurrently with or (immediately) after such receiving or acquiring, or concurrently with or (immediately) after running a selecting operation. In one example, a terminal retrieves pre-stored authentication information, compares $UI_{THEN}$ with such information (i.e., a comparing step), and then determines whether $UI_{THEN}$ or another authentication information (which is included in or extracted from $UI_{THEN}$) may match the pre-stored information. As a result, a terminal generates an outcome of running an authentication operation as a "pass" (or "yes"), a "fail" (or "no"), or the like (i.e., a "determining step").

When a user fails the authenticating, a terminal keeps its display unit turned off (step 055). In the alternative, a terminal may automatically turn on a display unit and inform a user of the failure. A terminal may instead generate an audible or tactile notice signal to inform a user of the failure using a notice unit as will be described below. In the alternative, a terminal may turn on a display unit only when a user provides a user input [1] for a period longer than a threshold period, [2] with a force stronger than a threshold magnitude, [3] along a certain pre-selected path, or the like.

However, when a user passes such authenticating, a terminal advances to (step 061), and checks whether an operation which is located from the matching list based on $UI_{SEL}$ matches "Operation 1" which is one of such pre-selected operations included in the matching list. When the answer is "yes" (i.e., when $UI_{SEL}$ matches a selected operation), a terminal then runs Operation 1 (step 071). Thereafter, a terminal may display results obtained by running Operation 1 on a display unit (step 081). It is appreciated that a terminal may turn on its display unit (immediately) before or concurrently with the comparing step or a determining step, and display a lock screen on a display unit. Thereafter, a terminal replaces the lock screen with an outcome obtained from running Operation 1. Alternatively, a terminal may keep a display unit turned off, and then turn on the display unit when a terminal performs (or starts to perform) the comparison or determining step, while displaying a screen which informs a user that Operating 1 is being processed. In another alternative, a terminal may keep a display unit turned off, and may then turn on a display unit while displaying results which are obtained from running Operation 1.

When the answer is "no" (step 061), a terminal advances to (step 063) and checks whether or not an operation identified from the matching list based on $UI_{SEL}$ matches "Operation 2" which is another of such pre-selected operations. A terminal may keep a display unit in various states in this step as well. For example, a terminal may keep its display unit turned off until it completes to run Operation 2. A terminal may instead turn on a display unit and display a lock screen, with an optional message informing a user that Operation 2 is under progress. Once completing to run Operation 2, a terminal may then replace a lock screen with results obtained from running Operation 2. When $UI_{SEL}$ does not match Operation 2, a terminal may advance to (step 065) while repeating the above steps.

When $UI_{SEL}$ does not match Operation 3, a terminal advances to (step 090), and may take a remedial action, because a user has provided $UI_{SEL}$ which does not match any of the pre-selected operations included in the matching list. A terminal may take one or more remedial actions. For example, a terminal may keep a display unit turned off and do nothing or, alternatively, may inform a user of a failure in locating a matching operation by generating a visual, audible or tactile notice signal with a notice unit. Of course, a terminal may have to turn on a display unit in order to provide the visual notice signal.

Even though a user may not have provided a correct $UI_{SEL}$, the user has passed such authenticating anyway. Therefore, a terminal may turn on a display unit and display a lock screen, with or without delivering any notice signal. Alternatively, a terminal may turn on a display unit and start to operate in an unlock mode, as a current use has already been authenticated or when a user authenticating may not be necessary anymore. In such a case, a user who failed to run a desired operation during a powering-on or waking-up sequence of a terminal may manipulate a GUI or an icon displayed on a display unit, thereby manually running the desired operation by providing at least one additional user input.

As discussed above, a major difference between such terminals of the first and second exemplary aspects is that the terminals of the latter aspect conditions such "turning on a display unit" [1] upon an outcome obtained by running a user authentication operation, or [2] (optionally) upon selecting an operation desired by a current user when a terminal powers on, wakes up, or switches modes. Accordingly, a terminal of this second aspect does not need to acquire $UI_{ACT}$ in a single user input or multiple concurrent (user) sub-inputs.

5-3. Configuration 2—Hardware Elements and Variations

In another exemplary embodiment of the second exemplary aspect of this disclosure, a directional input unit may receive a single user input or multiple (concurrent or sequential) user inputs, and to concurrently acquire multiple (user) sub-inputs, while recruiting various hardware elements of a terminal. Followings are a few exemplary configurations and sequences of driving such hardware elements.

In one example of this exemplary embodiment, a terminal may receive a user input and concurrently acquire multiple (user) sub-inputs such as $UI_{SEL}$ and $UI_{THEN}$, but not necessarily $UI_{ACT}$. Accordingly, a directional input unit includes a $1^{st}$ sensor for acquiring $UI_{SEL}$ and a $2^{nd}$ sensor for acquiring $UI_{THEN}$, where such sensors may be incorporated into the input unit, while an authentication sensor may be optionally included in another input unit which may not be directional. When a terminal needs another (user) sub-input so as to run an additional operation, an additional sensor may be incorporated into a directional input unit or another input unit when available.

In another example of this exemplary embodiment, a directional input unit may receive a single or multiple user inputs, while concurrently acquiring at least two (user) sub-inputs. Of course where a terminal includes a $1^{st}$ directional input unit and a $2^{nd}$ non-directional input unit and where the $2^{nd}$ input unit acquires $UI_{THEN}$ and the $1^{st}$ input unit only acquires $UI_{SEL}$, such a configuration may be regarded as an exception to an example of the above paragraph. In the perspective of a terminal, however, a terminal still concurrently acquires multiple (user) sub-inputs as long as such $1^{st}$ and $2^{nd}$ input units are concurrently manipulated by a user. Accordingly, as long as a terminal recognizes a type or a nature of each of such multiple (user) sub-inputs, a content of each of such (user) sub-inputs, or a presence (or an absence) of such (user) sub-inputs in the received user input, a terminal (or its directional input unit) can concurrently acquire both $UI_{SEL}$ and $UI_{THEN}$. It then follows that a terminal may concurrently run (or start to run) a selecting operation and at least one authentication operation.

However, a terminal may not necessarily start to run a selecting operation and an authentication operation at the exactly same instance (e.g., the same clock cycle) for many reasons such that, e.g., different hardware elements for each operation may have a different period to be activated, or a different operation or execution period. In addition, a terminal may not necessarily finish to run a selecting operation and an authentication operation at the exactly identical instance (e.g., the same clock cycle) either. Accordingly, running a selecting operation and running an authentication operation may be completed at different instances (e.g., different clock cycles), even when a terminal may concurrently acquire both $UI_{SEL}$ and $UI_{THEN}$ at the same instance (e.g., the same clock cycle or overlapping in such a clock cycle).

In another example of this exemplary embodiment, a directional input unit includes at least one portion which is or which includes a sensor for acquiring $UI_{SEL}$. A directional input unit may also include at least one another portion which is or includes at least one sensor for acquiring $UI_{THEN}$ or other sub-inputs. A directional input unit may further include multiple portions with each of which a user may provide a user input or a (user) sub-input. Thus, a user may concurrently provide $UI_{SEL}$ to a $1^{st}$ portion and $UI_{THEN}$ to a $2^{nd}$ portion. Other configurations for enabling a user to concurrently provide multiple (user) sub-inputs and to provide a single user input of the $1^{st}$ type to the $5^{th}$ type have been described above and, therefore, are omitted here for illustration purposes.

Such directional input units may be incorporated into various locations on or around a terminal, where details are identical or similar to those of the terminal of the first exemplary aspect. In addition, when a display unit is a prior art touch screen, a terminal may provide the directional input unit thereon as a GUI or an icon, where details are identical or similar to those of the terminal of the first exemplary aspect.

5-4. Configuration 2—Software Elements and Variations

In another exemplary embodiment of the second exemplary aspect of this disclosure, a directional input unit may receive a single user input or multiple concurrent user inputs, or to concurrently acquire multiple (user) sub-inputs, while recruiting various software elements (e.g., software applications) of a terminal in various sequences.

In one example when a directional unit does not receive $UI_{THEN}$ at all, (step 011), (step 040) and (step 055) of FIG. 7 may be omitted. Accordingly, a terminal runs a selecting operation concurrently with or (immediately) after receiving a user input or acquiring $UI_{SEL}$. It is appreciated that, even without acquiring $UI_{THEN}$, a terminal may indirectly authenticate a user. For example, a terminal may set up a directional input unit in such a way that it may be tricky for an unauthorized user to provide a valid $UI_{SEL}$, unless he or she may precisely know how to manipulate the input unit. Accordingly, a terminal may require a user to provide $UI_{SEL}$ [1] only along a pre-selected path, [2] by pressing a portion of the input unit for a certain period of time, [3] by pressing a portion of the input unit with a certain body part but not with another body part, [4] by providing a certain gesture, or the like.

Figure 8:
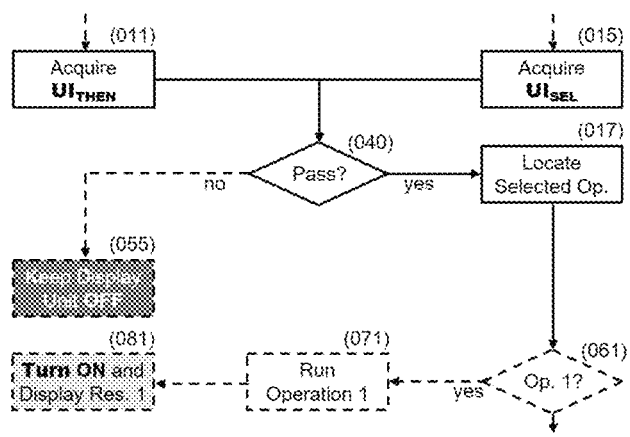
FIG. 8 is a variation of the operational sequences of FIG. 7.

In another example and as described in FIG. 8, a terminal may first acquire $UI_{SEL}$ but may only run (or start to run) a selecting operation after a terminal completes running at least one authentication operation. Therefore, a directional input unit (or a terminal) may locate or select at least one operation to run as the terminal powers on, wakes up, or switches modes, from a matching list based upon $UI_{SEL}$ after a user is authenticated. In other words, a terminal of this example conditions the "running a selecting operation" upon the "running at least one authentication operation" (or completing to run the authentication operation). Therefore, a directional input unit or a terminal may have to store $UI_{SEL}$ therein or in a memory member temporarily or permanently for a later use.

In another example, after locating which operation to run from a matching list, a terminal may run at least one selected operation and thereafter display results obtained from running such a selected operation. Accordingly, a terminal may display such results on a display unit concurrently with or after turning on a display unit. When desirable, a terminal may turn on a display unit before completing to run a selected operation while displaying a lock screen or a home screen on the display unit, and then replace this initial screen with such results. In the alternative, a terminal may turn on a display unit after completing to run the selected operation, whereby the terminal may not have to display a lock screen on a display unit while waiting for completing to run the selected operation.

In another example, other optional operations or steps may be added to an exemplary sequence of FIG. 8. In one case, a terminal may perform at least one step to generate an audible, visual, or tactile notice signal for informing a user of receiving a user input or acquiring (user) sub-inputs, where such step(s) may be inserted between [1] (step 010) and (step 011 or 013), [2] (step 011 or 017) and (step 040), or [3] (step 015) and (step 017), where such additional steps [1] do not require a user to detach a user body part (or a non-user object) from a portion of a directional input unit, [2] do not require a user to provide any non-concurrent additional user input to a terminal, or [3] do not correspond to any step for making a comparison or determination, and then running different operations based on such a determination.

In another example, a terminal may insert at least one step between (step 000) and (step 010), where such a step may be similar or identical to that described in conjunction with the first exemplary aspect such as, e.g., rendering an authentication sensor ready as described above. Such a step(s) may also be performed after (step 000) but before (step 010), therefore, a terminal performing such an additional step(s) can concurrently acquires at least two different (user) sub-inputs from a single user input.

In another example, a terminal may insert at least one step between (step 010) and (step 011 or 015) so as to generate an audible, visual, or tactile notice signal with a notice unit in order to inform a user of receiving a user input or acquiring such (user) sub-inputs. It is appreciated that those additional steps [1] do not require a user to detach a user body part from a portion of a directional input unit, [2] do not require a user to provide any non-concurrent additional user input, or [3] does not correspond to a step of making a determination so that a user still concurrently receives multiple (user) sub-inputs.

Further steps may be added to the sequence of FIG. 8, as long as a directional input unit (or a terminal) may acquire $UI_{SEL}$ from a single user input or one of multiple concurrent (user) sub-inputs, [1] as long as a directional input unit (or a terminal) may concurrently acquire multiple (user) sub-inputs where one of such sub-inputs is $UI_{SEL}$, [2] as long as a directional input unit (or a terminal) may not have to perform any additional determination or comparison step while the input unit (or a terminal) concurrently acquires all multiple (user) sub-inputs, or [3] as long as a directional input unit (or a terminal) may not require a non-concurrent additional user input while the input unit (or a terminal) acquires all of such multiple (user) sub-inputs. Therefore, other steps of the first or second exemplary aspect of this disclosure may also be implemented into the exemplary sequence of various terminals and directional input units of this second aspect. In addition, other operations such as, e.g., such turning on or such selecting may be conditioned upon such authenticating or vice versa.

Configurational or operational variations (or modifications) of such terminals described in various examples of this second exemplary aspect may be interchangeable such that certain features of one example of this second aspect may be applied to another example of the same aspect. Other configurational or operational features, their variations or modifications of this second exemplary aspect may also [1] apply to, [2] be incorporated into, [3] replace, [4] be replaced by, or [5] be combined with corresponding features of other exemplary aspects or embodiments of this disclosure as have been described above or as will be described below, subject to certain modifications, additions, or omissions, each of which may become apparent based on detailed context of this exemplary aspect or other exemplary aspects.

6. Configuration 3—No Authenticating

In the third exemplary aspect of this disclosure, an exemplary mobile communication terminal may include similar hardware and software elements as those of the first and second exemplary aspects of this disclosure, except that various terminals of this third aspect do not employ any user authenticating. Like those of the first and second aspects, an output member includes at least one display unit for generating visual signals as well as at least one speaker for generating sound signals, and an input member includes at least one directional input unit.

6-1. Configuration 3—Overall

In one exemplary embodiment as well as third exemplary aspect of this disclosure, a mobile communication terminal includes various hardware elements and software elements. Accordingly, like the one exemplified in FIGS. 2A and 2B, a mobile communication terminal of this third aspect includes at least one CPU member (30), at least one input member (20), at least one memory member (40), at least one output member (50), or other optional members, where an input member may include [1] a directional input unit as its sole input unit, or [2] at least two input units one of which is a directional input unit. It is appreciated that details of such members and units are similar or identical to those corresponding members of a terminal of the first aspect and, therefore, are omitted.

6-2. Configuration 3—Operation and Sequences

Figure 9:
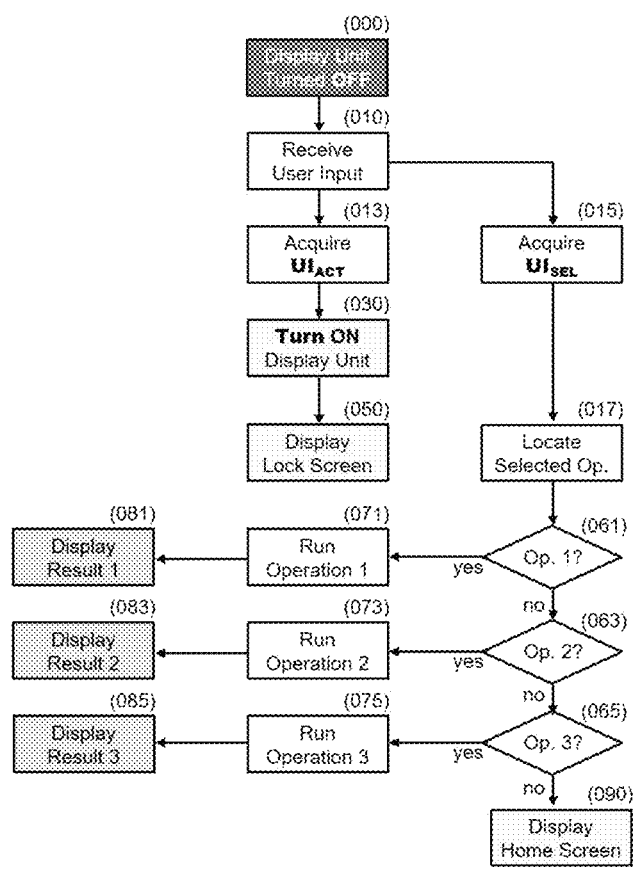
FIG. 9 exemplifies operational sequences of a mobile communication terminal of the third exemplary aspect.

In another exemplary embodiment of the third exemplary aspect of this disclosure, a directional input unit may be implemented into a mobile communication terminal in various configurations and arrangements which may be different from those of the first and second exemplary aspects. FIG. 9 exemplifies operational sequences of a mobile communication terminal of the third exemplary aspect, where the terminal includes a directional input unit in such a way that a user can render a terminal run at least one selected operation when the terminal may power on, wake up, or switches modes.

As depicted in (step 000), a terminal is in its off state. Upon receiving a single user input (or multiple concurrent user inputs) (step 010), a directional input unit may concurrently acquire at least two (user) sub-inputs such as, e.g., $UI_{ACT}$ and $UI_{SEL}$ (steps 013 and 015) but not $UI_{THEN}$. It is appreciated that a terminal of this embodiment does not employ user authentication and, therefore, that a user input does not have to include $UI_{THEN}$ therein. By concurrently acquiring both $UI_{ACT}$ and $UI_{SEL}$ from a single user input (or multiple concurrent use inputs), a terminal does not require a user to detach a user body part (or a non-user object) from a portion of a directional input unit during such acquiring, does not require a user to provide any non-concurrent additional user input during such acquiring, or the like. In addition, a terminal does not have to perform any determination step or a decision-making step while a terminal acquires $UI_{ACT}$ and $UI_{SEL}$.

A directional input unit may optionally acquire $UI_{THEN}$ for various purposes such as, e.g., for authenticating a user before a user may [1] access a memory member (or sector) of a terminal, [2] drive a hardware or software element of a terminal, or the like. However, these steps are only optional features, and following examples are directed to various sequences in which a terminal does not run any separate authentication operation.

Referring to (step 030), a terminal turns (or starts to) on a display unit concurrently with, (immediate) after or within a certain period after receiving a user input or acquiring $UI_{ACT}$ therefrom. Therefore, an exact instance (or a clock cycle) in which a user may be able to see any screen in a display unit may be different [1] from an instance of providing a user input with $UI_{ACT}$, [2] from an instance of acquiring $UI_{ACT}$, [3] from an instance of a terminal to drive (or start to drive) a display unit, or the like. A terminal then displays a lock screen on a display unit (step 050).

A terminal may then run a selecting operation (step 017) in one of various selecting timings as defined above. To identify at least one operation from a set of multiple pre-selected operations as included in a matching list, a terminal matches the acquired $UI_{SEL}$ with such pre-selected operations. When a terminal locates at least one selected operation from the matching list, a terminal then compares whether a selected operation is Operation 1 (step 61). If the answer is "yes," a terminal runs the selected Operation 1 (step 071), and then displays results obtained from Operation 1 on a display unit (step 081), while [1] replacing the lock screen with such results, or [2] overlaying such results on top of the lock screen. When the answer is "no," a terminal may advance to (step 063), where details of the rest of the steps are similar or identical to those of the first and second exemplary aspects and, therefore, are omitted here.

6-3. Configuration 3—Hardware Elements and Variations

In another exemplary embodiment of the third exemplary aspect of this disclosure, a directional input unit may receive a single user input or multiple concurrent user inputs, and concurrently acquire at least two (user) sub-inputs, while recruiting various hardware elements of a terminal.

In one example of this exemplary embodiment, a terminal concurrently acquires both $UI_{SEL}$ and $UI_{ACT}$ (from a single user input or multiple concurrent user inputs). However, a terminal may not receive a user input which includes $UI_{THEN}$ therein or may not acquire $UI_{THEN}$ even when a user input includes $UI_{THEN}$ therein. Therefore, a directional input unit includes a sensor capable of acquiring $UI_{SEL}$ and another sensor capable of acquiring $UI_{ACT}$, but does not necessarily include an authentication sensor. A directional input unit may optionally include at least one additional sensor for acquiring $UI_{THEN}$ or for acquiring $UI_{AUX}$ which may be incorporated into another directional input unit, into another non-directional input unit, or into an add-on unit which serves as an additional input unit. In this latter arrangement, a terminal may concurrently acquire both of $UI_{SEL}$ and $UI_{ACT}$ as well as $UI_{THEN}$ or $UI_{AUX}$ in order to guarantee optimum seamless operations.

In another example of this exemplary embodiment, a directional input unit may receive a single user input or multiple concurrent user inputs, while concurrently acquiring at least two sub-inputs with a single directional input unit or with multiple input units one of which is a directional input unit. As long as a terminal recognizes a type or a nature of at least one of such (user) sub-inputs, contents thereof, or a presence or an absence of acquired (user) sub-inputs, a terminal (or its directional input unit) may concurrently acquire $UI_{SEL}$ and $UI_{ACT}$, along with other optional (user) sub-inputs. It then follows that a terminal may concurrently run (or start to run) a selecting operation and an activation operation. However, a terminal may not concurrently start to run such an activation operation and selecting operation for many reasons such as, e.g., different hardware elements may require different activation periods. Therefore, a terminal may not finish acquiring such $UI_{SEL}$ and $UI_{ACT}$ or may not start to run a selecting operation and an activation operation at the exactly identical instance (e.g., the same clock cycle). By the same token, a terminal may not finish running an activation operation and selecting operation at the same instance for the similar reasons as well.

In another example of this exemplary embodiment, a directional input unit may include a portion which is or which includes a sensor for sensing $UI_{SEL}$ and at least one portion which may be or may include a sensor for sensing $UI_{ACT}$. A directional input unit may be included in various locations on a terminal, where such locations may be similar or identical to those of the terminals of the first or second exemplary aspect. Therefore, a directional input unit may be disposed on a front surface of a terminal (when positioning a terminal with its front surface up), on a rear surface thereof, or on a side edge thereof. When a display unit is a prior art touch screen, a terminal may provide a directional input unit on a display unit as a GUI or as an icon, where details of such input units are similar or identical to those of the terminals of the above first or second exemplary aspect and, therefore, are omitted here.

When a user provides all (user) sub-inputs to (a single portion of) a directional input unit or when a directional input unit includes a 1$^{st}$ portion for acquiring UI$_{SEL}$ and at least one 2$^{nd}$ portion for acquiring UI$_{ACT}$, a user may concurrently provide UI$_{SEL}$ and UI$_{ACT}$ as well as at least one another (user) sub-input as described above in conjunction with those terminals of the first or second aspect of this disclosure.

6-4. Configuration 3—Software Elements and Variations

In another exemplary embodiment of the third exemplary aspect of this disclosure, a directional input unit may receive a single user input or multiple concurrent user inputs and concurrently acquire at least two (user) sub-inputs, while recruiting various software elements of a terminal.

In one example and as exemplified in FIG. 9, a terminal turns on a display unit (step 030), and then displays a lock screen thereon. More particularly, when a terminal completes to turn on a display unit before completing to run a selecting operation, a terminal may display a lock screen as described in the first aspect. In another example, when a terminal completes to turn on a display unit before completing to run a selected operation, a terminal may display a lock screen on a display unit until it may finish to run a selected operation and may identify a selected operation from a matching list based on UI$_{SEL}$. Alternatively, a terminal may display a lock screen and display results obtained from running a selecting operation. To this end, a directional input unit may acquire all required (user) sub-inputs (e.g., UI$_{SEL}$ or UI$_{ACT}$, and optionally UI$_{THEN}$) concurrently, although a terminal may run (or start to run) such turning on or such selecting either concurrently or sequentially (without any temporal overlap therebetween, but optionally with a temporal gap therebetween).

In another example where a directional input unit (or a terminal) receives a single user input including UI$_{SEL}$, a terminal may run (or start to run) a selecting operation in one of various selecting timings.

Other optional operations or steps may be added to an exemplary sequence of FIG. 9. For example, at least one step may be inserted for generating visual, audible, or tactile notice signals for informing a user of receiving a user input or acquiring multiple concurrent (user) sub-inputs, where such step(s) may be inserted between [1] (step 010) and (step 013 or 015), [2] (step 030 or 017) and (step 040), [3] (step 013) and (step 030), [4] (step 015) and (step 017), [5] (step 030) and (step 040), or the like. It is appreciated that such additional steps [1] do not require a user to detach any body part (or a non-user object) from a stationary portion or a movable portion of a directional input unit while a terminal acquires UI$_{SEL}$ and UI$_{ACT}$, [2] do not require a user to provide any non-concurrent additional user input, or the like. In addition, such additional steps do not correspond to any step for making a comparison or determination and then for running different operations based on such a comparison or determination.

At least one more step may also be inserted between (step 000) and (step 010). For example, a terminal may render a sensor for running an activation operation ready upon or after sensing a preset event such as, e.g., [1] a presence of a user within a certain distance, [2] a certain movement of a user indicating that a user is approaching a terminal or going to provide a user input, or [3] a gesture of a user designated to render the sensor ready. Even though this additional step may make a determination or comparison, it is appreciated that such a step is performed after (step 000) but before (step 010), i.e., before receiving a single user input from a user. Therefore, a terminal including such additional step(s) still receives a single user input or multiple concurrent user inputs, while concurrently acquiring multiple different (user) sub-inputs.

Additional steps may also be inserted between (step 010) and (step 013 or 015) for making a visual, audible, or tactile notice signal for informing a user of receiving a user input or of acquiring multiple (user) sub-inputs. It is appreciated, however, that such additional steps do not require a user [1] to detach a body part from a portion of a directional input unit, [2] to provide any non-concurrent additional user input, or the like. In addition, such additional steps do not include a comparison or determination step and then running operations based upon such a determination, or the like. Accordingly, such a terminal may still be able to concurrently acquire multiple (user) sub-inputs.

It is appreciated that some examples of this third exemplary aspect relate to a terminal which turns a display unit on, displays a lock screen, and thereafter displays different images (e.g., results obtained by running a selecting operation, other results obtained by running a selected operation, a home screen, or the like). In addition to changing the already displayed images with new images when a terminal finishes to run a selecting operation or selected operation, a terminal may run at least one authentication operation and change such images based on the results of such authenticating when desirable. It is appreciated in this latter arrangement that a user may have to provide a non-concurrent, additional user input including UI$_{THEN}$ for such authenticating.

Configurational or operational variations (or modifications) of the mobile communication terminals described in various examples of this third exemplary aspect may be interchangeable such that certain features of one example of this third aspect may be applied to another example of this third aspect. Other configurational or operational features, their variations or modifications of this third exemplary aspect may also [1] apply to, [2] be incorporated into, [3] replace, [4] be replaced by, or [5] be combined with corresponding features of other exemplary aspects or embodiments provided in this disclosure, subject to certain modifications, additions, or omissions, each of which may become apparent based on detailed context of this exemplary aspect or other exemplary aspects.

7. Configuration 4—Type-1 Directional Input Unit

In the fourth exemplary aspect of this disclosure, an exemplary mobile communication terminal may include a directional input unit which includes "at least one movable portion" and which is to be referred to as a "type-1 directional input unit" hereinafter. A user may contact, touch, press or otherwise manipulate such a portion in a substantially horizontal direction (or laterally), by applying a user input force (or simply a force) which is at least substantially in a lateral or horizontal direction, with or without including an optional angular component, thereby providing a single user input which includes multiple (user) sub-inputs or thereby providing multiple concurrent user inputs which also include multiple (user) sub-inputs. This type-1 directional input unit may be implemented into any of such mobile communication terminals throughout this disclosure, unless otherwise conflicted.

It is appreciated that this type-1 directional input unit receives a user input which is embodied by a user input force, and that such force typically induces a movement of at least a (or an entire) portion of a directional input unit. However, this does not necessarily mean that a directional input unit has to include a movable portion at all. Rather, a type-1 directional input unit may include at least one portion which may deform to a certain extent. Alternatively, the type-1 directional input unit may not include any movable portion at all, as long as such an input unit may monitor a user input force or monitor at least one static or dynamic feature associated with such a user input force.

It is also appreciated that, as a directional input unit acquires more (user) sub-inputs, a terminal may provide a user with more seamless operations. Accordingly, a directional input unit (or an input member which may in turn include an additional non-directional input unit) may include as many sensors as possible to concurrently acquire as many (user) sub-inputs as possible, thereby running as many multiple seamless operations as possible. As a result, a terminal may also run (or start to run) as many operations as possible concurrently or sequentially, all in response to a single user input or multiple concurrent user inputs which include therein multiple (user) sub-inputs at least one of which is $UI_{SEL}$.

As will be provided in greater detail below, a type-1 directional input unit of this fourth exemplary aspect may typically include [1] at least one "press-ID element" for acquiring $UI_{SEL}$, optionally along with $UI_{ACT}$ or $UI_{THEN}$, [2] at least one "directional element" for acquiring $UI_{SEL}$, or the like. More particularly, a press-ID element of a type-1 directional input unit may serve as a movable portion of the directional input unit in such a way that a user may move a press-ID element and delivers $UI_{SEL}$ thereto.

7-1. Type-1 Directional Input Unit—Overall

Figure 10A:
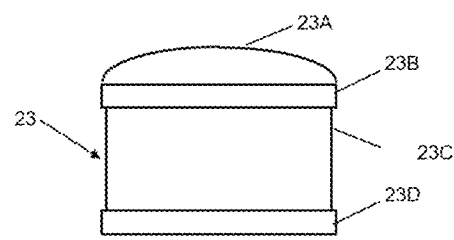
FIGS. 10A to 10E are cross-sectional and vertical views of an exemplary press-ID element according to the fourth exemplary aspect of this disclosure.
Figure 10B:
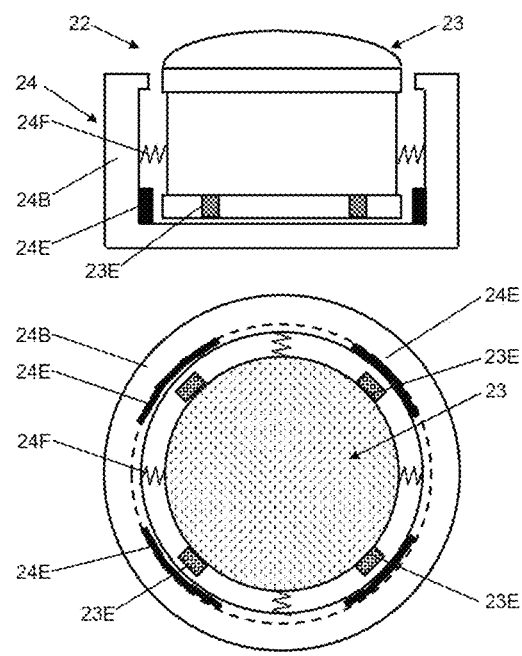

In one exemplary embodiment of this fourth exemplary aspect, a mobile communication terminal includes at least one directional input unit which receives a single user input or multiple concurrent user inputs, which is capable of acquiring three (user) sub-inputs from such a user input, and which generate three control signals each representing each (user) sub-input. FIGS. 10A and 10B exemplify a type-1 directional input unit which can concurrently acquire multiple (user) sub-inputs such as, e.g., $UI_{SEL}$, $UI_{ACT}$, and $UI_{THEN}$, along with other optional sub-inputs.

FIG. 10A is a cross-sectional view of an exemplary "press-ID element" capable of acquiring an activation (user) sub-input ($UI_{ACT}$) as well as an authentication (user) sub-input ($UI_{THEN}$). An exemplary press-ID element (23) is typically button-shaped and includes a layered structure which includes, e.g., a protective layer (23A), a detection ring (23B), a fingerprint sensor (23C), a tactile sensor (23D), or the like. A press-ID element (23) can acquire $UI_{SEL}$ when assembled into a directional input unit as will be described in detail in FIG. 10B below. It is appreciated that an exemplary press-ID element (23) described in FIG. 10A is specifically tailored to run a fingerprint authentication operation.

A protective layer (23A) provides a mechanical resistance such as, e.g., a scratch- or impact-resistance to a press-ID element (23) and, therefore, may include or may be made of sturdy materials such as, e.g., a sapphire crystal. A dimension of a protective layer depends upon that of a directional input unit, for a press-ID element (23) is to be movably disposed inside a body of a directional input unit. Any material with minimum mechanical strengths may be used to form a protective layer (23A), although at least partly transparent material may be favored to enhance performance of other layers of the element (23) or aesthetics of a directional input unit as a whole.

A detection ring (23B) serves to detect a presence or absence of a user within a certain distance therefrom, with a contact with a user or without any contact at all. This layer (23B) may include or may be made of metals or alloys such as, e.g., stainless-steel. Upon detecting a presence of a user, a detection ring (23B) may activate an authentication sensor (e.g., a fingerprint sensor), and render the sensor start to read a fingerprint (or start to acquire $UI_{THEN}$) disposed in a certain distance therefrom. Because the detecting ring (23B) serves to monitor an instance (or a clock cycle) when a directional input unit renders an authentication sensor ready, a directional input unit may not necessarily include this detection ring (23B) when a directional input unit may monitor the instance (or the clock cycle) using another sensor such as, e.g., [1] a prior art proximity sensor, [2] a prior art motion sensor, or the like. In addition, when a terminal authenticates a current user not based upon his or her fingerprint but based upon other biometric information such as, e.g., an iris or a retina, a voice, or the like, a directional input unit may not necessarily include such a detection ring (23B) either.

A fingerprint sensor (23C) serves to read a fingerprint ($UI_{THEN}$) based upon various prior art mechanisms such as, e.g., [1] obtaining an image of a fingerprint, [2] assessing a fingerprint based on changes in conductance around the sensor, or the like. For an optimum operation, the fingerprint sensor (23C) may need a resolution of, e.g., 500 nm, 400 nm, 300 nm, 200 nm, 150 nm, 100 nm, 75 nm, 50 nm, or the like. Similarly, depending on required resolution, the fingerprint sensor (23C) may have a resolution of, e.g., 100, 200, 300, 400, 500, 600, 700, 800, 900, or 1,000 pixels per inch. When desirable, a fingerprint sensor (23C) may read epidermal skin layers or (optionally) sub-epidermal skin layers. It is appreciated that such prior art fingerprint sensors which are specifically enumerated in this paragraph and which are also suited for this purposes are readily available and, accordingly, detailed configurational or operational characteristics of such sensors are omitted here.

Still referring to the fingerprint sensor (23C), a user may touch a press-ID element (23) without any pressing, any pushing or otherwise applying any user input force thereto. In other words, a user may literally contact or touch at least a portion of a press-ID element (23) without pressing or pushing it at all. A fingerprint sensor (23C) may still read a fingerprint and acquire $UI_{THEN}$ from a finger of a user who may only touch or contact the sensor (23C), e.g., by monitoring electric conductance of (or related to) a finger, by sensing temporal or spatial changes in such conductance, or the like.

In addition, even when a user places a finger close to a press-ID element (23) without contacting or touching it, some prior art fingerprint sensors (23C) may still be able to read a fingerprint, and acquire $UI_{THEN}$, e.g., by sensing electric conductance of (or related to) a finger, by sensing changes in such conductance, by acquiring an image of a finger from a distance, or the like. In other words, a press-ID element (23) of this exemplary aspect as well as a touch-ID element of a next exemplary aspect does not necessarily require an application of a force thereto, or does not necessarily require any contact or touch therewith.

A tactile sensor (23D) serves to sense application of an activation user input force applied thereon by a user or an activation (user) sub-input ($UI_{ACT}$). A press-ID element (23) may recruit various prior art tactile sensors (23D) such that a sensor (23D) moves when pushed or pressed, or that the sensor (23D) does not move in response to such a force but still monitors such a (user) sub-input.

When a user presses or pushes a press-ID element (23), a tactile sensor (23D) senses a force or a pressure applied thereto, and acquires $UI_{ACT}$, whether or not the press-ID element (23) (or a directional input unit) may move or deform. A tactile sensor (23D) may instead sense a displacement of a press-ID element (23) (or a directional input unit), and acquire $UI_{ACT}$ therefrom. A tactile sensor (23D) may be replaced by a motion sensor or a proximity sensor which may acquire $UI_{ACT}$ from a presence or absence of a user (or a user body part), from a movement of at least a portion of a press-ID element (23), or the like. More particularly, a tactile sensor (23D) may sense a touch or contact by a user, without having to monitor user input force or pressure applied thereon, without resulting in any movement or deformation, or the like. That is, a terminal may recruit other sensors to monitor $UI_{ACT}$ such as, e.g., by sensing a motion of a press-ID element, by acquiring and analyzing an image of a press-ID element and a body part of a user (or a non-user object), or the like.

It is appreciated that an exemplary press-ID elements (23) of FIG. 10A may include such layers (23B), (23C), (23D) in an order different from that of the figure. Therefore, a tactile sensor may be disposed directly under a protective layer or a fingerprint sensor may be disposed over a detection ring. It is also appreciated that some layers (23B), (23C), (23D) of FIG. 10A may be disposed concentrically with each other so that, e.g., a detection ring may enclose a tactile sensor therearound (or vice versa), a protective layer may be enclosed by a detection ring, or the like. In this concentric arrangement, one layer may enclose another layer at the same elevation in a height of a press-ID element, particularly when disposing such multiple layers proximate to each other does not pose any interference problem. When it does, however, such layers may be disposed at different elevations while maintaining their concentric arrangement. It is also appreciated that at least one of such layers (23B), (23C), (23D) of FIG. 9A may rather be implemented not into a press-ID element but into a directional element details of which are to be described below.

FIG. 10B shows an exemplary directional input unit capable of acquiring an activation (user) sub-input ($UI_{ACT}$), an authentication (user) sub-input ($UI_{THEN}$), a selecting (user) sub-input ($UI_{SEL}$), or the like. As in the figure, an exemplary directional input unit (22) includes a press-ID element (23) at least a substantial portion of which is enclosed by a directional element (24), where the former element (23) may acquire $UI_{ACT}$ and $UI_{THEN}$ as discussed in conjunction with FIG. 10A, whereas the latter element (24) acquires $UI_{SEL}$. A directional input unit (22) also includes at least one pair of opposing electrical contacts (23E), (24E) which are disposed in each of the elements (23), (24), at least one elastic element (24F) disposed between and abutting the elements (23), (24), or the like.

A press-ID element (23) in FIG. 10B is identical to that of FIG. 10A and also includes multiple electrical contacts (23E) which are disposed around its outer periphery, e.g., around an outer surface of a tactile sensor (23D). In this exemplary press-ID element (23), such electrical contacts (23E) are spaced apart from each other at equal distances or about equal angles. A press-ID element (23) is then disposed inside a directional element (24) while defining a gap therebetween. Therefore, a press-ID element (23) can move in response to a user input (or a user input force applied by a user) until a press-ID element (23) eventually abuts an inner surface of a directional element (24), thereby allowing a user to move the former element (23) to a certain extent.

A directional element (24) includes a stationary body (24B) which is shaped as an annular cylinder defining an open top and a closed bottom. As a result, the directional element (24) defines an internal cavity in which a press-ID element (23) movably sits. A directional element (24) also include at least one elastic element (24F) which is typically a compression spring and which couples with opposing surfaces of a press-ID element (23) and a directional element (24). An elastic element (24F) is also configured so that a press-ID element (23) in a "rest state" or a "rest position" thereof is disposed away from a directional element (24) and, as a result, does not contact a directional element (24) at all. However, as a user pushes or translates a press-ID element (23) away from its rest position, a press-ID element (23) moves or translates to a "biased state" or a "biased position" thereof, and then eventually makes a mechanical, electrical or optical contact with at least a portion of a directional element (24).

It is appreciated that an elastic element (24F) may be deemed to be in a "rest state" or a "rest position" thereof when a press-ID element (23) is in its rest state, while deemed to be in a "biased state" or a "biased position" thereof when a press-ID element (23) is in its biased state. An elastic element (24F) in its biased state may be compressed when such an element (24F) is a compression spring which is compressed from its resting length. Alternatively, the elastic element (24F) in its biased state may be extended when the elastic element (24F) is rather a tension spring which is stretched beyond its resting length. In either case, the elastic element (24F) in a biased state generates a recoil force which is typically proportional to such compression or stretching and which tends to regress itself to its rest state. Therefore, when a user ceases to apply a user input (i.e., a user input force applied by a user), an elastic element (24F) returns to its rest state due to its recoil force, while returning or recoiling a press-ID element (23) back to its rest state therealong.

A directional element (24) also includes multiple electrical contacts (24E) which are disposed along an edge of an inner periphery at equal distances (in a lateral direction) or about equal angles (in an angular direction), e.g., along an inner edge of a stationary body (24B). Such electrical contacts (24E) are disposed away from opposing electrical contacts (23E) at certain distances when a press-ID element (23) is in its rest state. Such contacts (24E) are also configured to electrically contact opposing electrical contacts (23E) when a press-ID element (23) is in its biased state. That is, when a press-ID element (23) is translated or otherwise pushed by a user input in a certain direction, the electrical contacts (23E), (24E) of such elements (23), (24) mechanically or electrically contact each other and form a closed electrical pathway. It is appreciated that a movable press-ID element (23) exemplified in FIG. 10B may move horizontally (in a lateral direction) with respect to a vertical axis of a directional input unit (22). Therefore, the electrical contacts (23E), (24E) may be positioned typically along vertical edges or surfaces of a press-ID element (23) and a directional element (24). However, when a movable press-ID element (23) moves up and down vertically, such electrical contacts (23E), (24E) may be positioned in such a configuration that they may be spaced away from each other when a press-ID element is in its rest state but that they contact each other when the press-ID element is in its biased state.

In operation, a manufacturer, a distributor or a user selects in advance multiple operations which a user may want a terminal to run when a terminal powers on, wakes up, or switches modes. That is, a manufacturer, a distributor, or a user of a terminal prepares a set of multiple pre-selected operations in a matching list, where examples of such pre-selected operations correspond to Operation 1, Operation 2, and Operation 3 in FIGS. 3, 7, and 9.

As a user provides a single user input (or multiple concurrent user inputs) to a terminal which is in its off-state, a user applies a user input by pressing a press-ID element (23) which is (or has been) in its rest position with respect to a directional element (24). Immediately before a user provides a single user input, he or she moves a finger toward a press-ID element (23). When a user's finger approaches a directional input unit (22) in a certain distance, a detection ring (23B) senses a presence of a user and activates a fingerprint sensor (23C) to be ready for acquiring $UI_{THEN}$. By contacting and pressing a press-ID element (23), a user provides a single user input to a directional input unit (22). More particularly, when a user pushes a press-ID element (23) at an angle, a horizontal component of a user input force translates or slides the press-ID element (23) toward a directional element (24) in a horizontal direction, whereas a vertical component of a user input force applies downwardly and presses a press-ID element (23).

While a user presses a press-ID element (23), a fingerprint sensor (23C) acquires $UI_{THEN}$, while a tactile sensor (23D) acquires $UI_{ACT}$. In addition, as a user slides a press-ID element (23), e.g., toward an upper-left quadrant or along a northwest direction, until a press-ID element (23) mechanically or electrically contacts a directional element (24), the electrical contacts (23E), (24E) of such elements (23), (24) which are disposed, e.g., in the same quadrant or in the same direction, come to contact each other. Based thereon, a directional input unit (22) acquires $UI_{SEL}$ and then generates a unique control signal which signifies the acquired $UI_{SEL}$. That is, a terminal may have matched or assigned $UI_{SEL-1}$, $UI_{SEL-2}$, $UI_{SEL-3}$, and $UI_{SEL-4}$ with such mechanical or electrical contacts formed in an upper-left quadrant, an upper-right quadrant, a lower-left quadrant, and a lower-right quadrant, respectively.

Therefore, a directional input unit (22) can concurrently acquire multiple (user) sub-inputs, $UI_{ACT}$, $UI_{THEN}$, and $UI_{SEL}$, without requiring a user to detach his or her body part from a press-ID element (23), without requiring a user to provide an additional non-concurrent user input to a directional input unit or another input unit of a terminal, without having to run any comparison or determination operation, or the like.

Upon acquiring such multiple (user) sub-inputs, a terminal or its directional input unit may generate as many control signals each representing each of such multiple (user) sub-inputs. For example, when such electrical contacts (23E), (24E) of the press-ID and directional elements (23), (24) form an electrical connection in one of four quadrants, a terminal regards this as running a messenger operation and generate a $1^{st}$ control signal. To the contrary, when such contacts (23E), (24E) forms another electrical connection in another quadrant, a terminal regards this as running a camera operation and generate a $2^{nd}$ control signal which is different from a $1^{st}$ control signal. In this regard, a directional input unit of FIG. 10B can make four different control signals in response to four different electrical connections formed between its press-ID element (23) and its directional element (24). As a result, a user may pre-select four operations from all operations which a terminal may run, include those four pre-selected operations in the matching list described above, and assign different $UI_{SEL}$'s to each of the pre-selected operations. A terminal may then run one of such four different pre-selected operations while or (immediately) after it powers on, wakes up, or switches modes, based upon $UI_{SEL}$ which has been provided by a user, particularly on a direction of a user input or a user input force.

A terminal may concurrently run (or start to run) such turning on, authenticating and selecting. In the alternative, a terminal may run at least one of such operations not concurrently with the rest thereof. That is, a terminal may run at least one of such turning on, authenticating, and selecting, after a terminal runs (or starts to run) another of such operations (e.g., in different clock cycles). Accordingly, even when a terminal may concurrently acquire $UI_{ACT}$, $UI_{THEN}$, and $UI_{SEL}$, a terminal may [1] concurrently run (or start to run) such turning on, such authenticating, and such selecting, [2] concurrently run (or start to run) only two of such operations, while running the last operation thereafter, or the like. A terminal may also [1] concurrently finish to run all of such operations, [2] concurrently finish to run two of such operations and then complete the last one (e.g., in different clock cycles), [3] finish each of the above operations in different instances (e.g., in different clock cycles) with a temporal overlap therebetween, or the like.

A directional input unit may also include a different press-ID element or directional element which may have different configurations, which may interact with each other in different arrangements, or which may operate according to different sequences, or the like.

7-2. Modifications or Variations of Press-ID Elements

A protective layer may include or may be made various materials as long as they provide proper mechanical resistance to abrasion, shock, or the like, as long as they provide appropriate transparency, as long as they provide appropriate electrical or electromagnetic properties enough not to adversely affect or to interfere with other layers of a press-ID element such as a detection ring, fingerprint sensor, tactile sensor, or the like. In addition, a detection ring may operatively couple with a fingerprint sensor and, therefore, a detection ring may be modified to the extent that it may be compatible with a fingerprint sensor. As a result, a terminal may use a prior art sensor or actuator for activating a corresponding conventional fingerprint sensor. When desirable, a press-ID element may not include any detection ring or its equivalents when a fingerprint sensor may automatically activate itself, when such a sensor may be activated by another portion of a press-ID element, when a terminal conditions an authentication operation upon another operation not related to an authentication operation, when a terminal does not employ a user authenticating, or the like.

A fingerprint sensor may be similarly modified as well. For example, any prior art authentication sensor other than a fingerprint sensor may be used, although its detailed implementation or operation may depend upon its mechanism and on biometric features which are required for such user authenticating. As shown in FIG. 10A, a fingerprint sensor may be best implemented into a press-ID element. However, other prior art authentication sensors for an iris, retina or face authentication, for a voice authentication, or the like, may be implemented inside, on, or external to a press-ID element, as long as it is appropriate for such a sensor to receive a single user input (or multiple concurrent user inputs) or to acquire an appropriate (user) sub-input.

A terminal may use any conventional tactile sensor to detect pressing by a user, touching or contacting by a user, or the like. The tactile sensor may be configured in various ways to detect such manipulation by a user. For example, a terminal may set up a certain threshold force or threshold displacement, and may monitor a force applied to a press-ID element, sense a gap distance between a press-ID element and a directional element, measure a length of an elastic element, or the like. As a result, any user input which is accompanied by a force below the threshold or which results in a displacement of a directional element less than the threshold is not counted as a correct user input, not counted as a correct selecting (user) sub-input, or the like.

Similarly, a terminal may also set up a certain threshold force for making electrical connections between such electrical contacts of a press-ID element and a directional element. A terminal may control the threshold force or displacement in various ways, e.g., [1] by incorporating elastic elements with different spring constants, [2] by defining gaps of different dimensions (by adjusting shapes or sizes of such elements), or the like. Therefore, a terminal may enable a user to make electrical connections with different magnitudes of the input forces, e.g., more easily in an upper-left quadrant than in a lower-right quadrant, or the like. That is, a user [1] may move a press-ID element more easily in one direction to supply $UI_{SEL-1}$ than in other directions to supply others such as $UI_{SEL-2}$, $UI_{SEL-3}$, and $UI_{SEL-4}$, [2] may translate a press-ID element in a shorter distance or about a smaller angle in one direction to supply $UI_{SEL-1}$ than others such as $UI_{SEL-2}$, $UI_{SEL-3}$, and $UI_{SEL-4}$, or the like.

A directional input unit or its press-ID element or its directional element may define various shapes and sizes, and may be assembled in various arrangements, orientations or configurations, as long as a directional input unit can concurrently acquire such multiple (user) sub-inputs from a single user input (or multiple concurrent user inputs). However, it is appreciated that a compact press-ID element or a compact directional input unit is typically favored than a bulky element or unit, for a mobile communication terminal itself is getting compact or such a terminal tends to incorporate therein more and more hardware elements.

In addition, a protective layer or another top layer of a press-ID element may be configured to be flat so that a user has to apply a user input (or an input force) not vertically but at an angle such that a press-ID element may move not only move in a vertical direction due to a vertical component of the force but also in a lateral or horizontal direction due to its horizontal component. Alternatively, a top layer of the press-ID element may be configured to be non-flat or contoured such that, when a user vertically presses such a top layer, a force vertically applied by a user thereto automatically acts in both horizontal and vertical directions, whereby the vertical component of the user input activates a tactile sensor, while a horizontal component thereof slides a press-ID element toward a directional element, thereby providing $UI_{SEL}$.

A press-ID element may have overall layer configurations or arrangements different from that exemplified in FIG. 10B. In one case, not all layers have to be deposited one over the other. For example, at least a portion of a detection ring or a fingerprint sensor may be exposed on a top surface of the press-ID elements, i.e., a top surface exposed to an exterior may be occupied by a portion of a detection ring or by another portion of a fingerprint sensor in a vertical arrangement. Alternatively, some layers may be disposed laterally or side by side, as long as such an arrangement does not adversely affect intended functions of each of such layers. In addition, such layers may also be disposed in a combination of such vertical and lateral arrangements. That is, exact dimensions of such multiple different layers and implementation arrangements are generally within a scope of one of ordinary skill in the relevant art.

7-3. Modifications or Variations of Directional Elements

In another exemplary embodiment of this fourth exemplary aspect, a terminal may allow a user to provide a certain $UI_{SEL}$ more conveniently than other $UI_{SEL}$'s, e.g., by providing a greater area (e.g., a greater length, a greater width, a wider angle, or the like) capable of forming an electrical connection between the electrical contacts of a press-ID element and a directional element. Alternatively, a terminal may allow a user to provide a $1^{st}$ sub-input more conveniently than other sub-inputs, e.g., by disposing a sensor for acquiring a $1^{st}$ sub-input in a position on or around a terminal which is more easily accessible to a user than others. Following description relates to various examples in which a user may supply $UI_{SEL-1}$ more easily than the rest of $UI_{SEL}$'s.

As described above, a directional element of FIG. 10B makes four different electrical connections, where each electrical contact of the press-ID element and the directional element has the same configuration and is also spaced apart from others at an equal distance or angle. However, a directional element, along with a press-ID element, may make various electrical connections defining different extents.

Figure 10C:
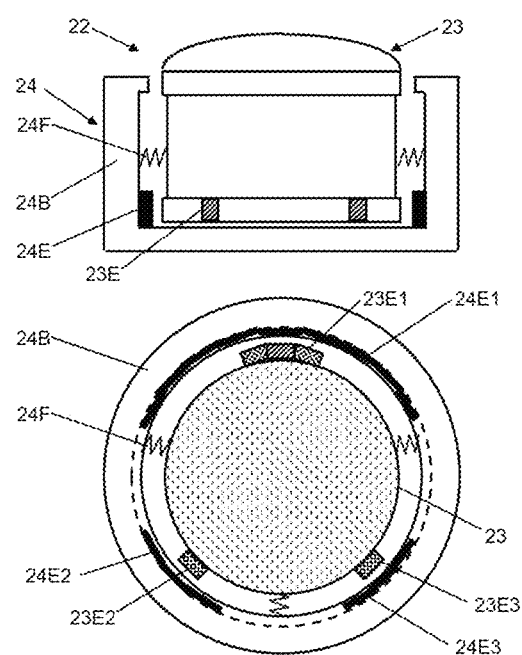

FIG. 10C shows another directional input unit capable of acquiring $UI_{ACT}$, $UI_{THEN}$, and $UI_{SEL}$, where a terminal provides $UI_{SEL-1}$ with more contact access than other two $UI_{SEL}$'s such as $UI_{SEL-2}$ and $UI_{SEL-3}$. For example, a directional element (24) includes three electrical contacts, where one contact (24E1) is longer (or spans over a wider angle) than other two contacts (24E2), (24E3). Similarly, a press-ID element (23) also includes three electrical contacts, where one contact (23E1) is longer than other two contacts (23E2), (23E3). Accordingly, when a user provides a selecting (user) sub-input, he or she may more easily provide $UI_{SEL-1}$ by contacting a pair of longer or wider electrical contacts (23E1), (24E1) than other two pairs.

This arrangement allows a user to more conveniently form an electrical connection, e.g., by moving a press-ID element forwardly over a wider angle (or length). Therefore, a terminal may provide a user with an attractive option that a most widely used or most often used operation may be matched to a control signal generated by an electrical connection between the longer electrical contacts (23E1), (24E1). That is and in the perspective of a user, he or she may assign the most often used operation to $UI_{SEL-1}$ which is provided simply by bringing such electrical contacts (23E1), (24E1) disposed on a top quadrant to contact each other and form an electrical connection.

Conversely, a user may also adjust a length or a width of an available area for an electrical connection that a least used operation may be matched or allocated to a pair of electrical contacts defining a minimum linear or arcuate length or with a smallest arcuate angle. Similarly, a terminal may match or assign different areas of different electrical connections which are formed by each pair of such electrical contacts to different linear or arcuate lengths or arcuate angles according to their frequency of use, or the like.

It is appreciated that a longer electrical connection (or a shorter one) may not necessarily require both of the electrical contacts of a press-ID element and a directional element to extend longer or to span about a wider angle. Rather, one electrical contact of either of such elements may define a longer arcuate length or arcuate angle in order to provide a greater area with a longer length or width, whereas another electrical contact may only need to have a minimum length enough to form an electrical connection with a longer electrical contact. In this manner, various electrical connections defining various length or angles as well as dead angles (i.e., arcuate lengths or angles along or around which no electrical contact is provided and, therefore, no electrical connection is formed) may be provided, e.g., by adjusting a number or a location of such electrical contacts of a press-ID element and a directional element.

A directional element of FIG. 10B or 10C may be shaped or sized to movably hold or enclose therein an entire portion of a matching press-ID element. Therefore, when a press-ID element defines a circular or oval cross-section, a directional element may include a matching interior. In addition, when a press-ID element defines a different shape or size, a directional element may have a matching shape or size or still define a circular or oval internal cross-section. Alternatively, a cross-sectional shape of a directional element does not have to match that of a press-ID element, for a directional input unit may allow a user to translate a press-ID element to move different lengths (or angles) to form an electrical connection and to deliver $UI_{SEL}$ to such an input unit.

In another exemplary embodiment of this fourth exemplary aspect, a terminal may allow a user to use only a certain range of a directional input unit to supply $UI_{SEL}$ so that a user does not have to manipulate a press-ID element into each quadrant provided around a directional element or all 360° therearound. For example and contrary to the examples of FIGS. 10A and 10B where the electrical contacts are formed around entire portions of a press-ID element and a directional element, a directional input unit may include such electrical contacts around not an entire portion of the press-ID or directional element but only a selected portion thereof.

Figure 10D:
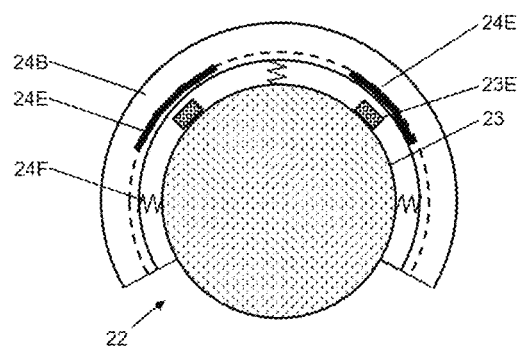

FIG. 10D depicts another directional input unit capable of acquiring $UI_{ACT}$, $UI_{THEN}$, and $UI_{SEL}$, but a directional input unit defines electrical contacts around only selected portions of such press-ID and directional elements. Therefore and as shown in the figure, a directional element allows a user to move a press-ID element either in a north-west direction or in a north-east direction. However, when a user provides a user input in a south, east, south-west, or south-east direction, no electrical connection is formed, whereby a directional input unit cannot acquire any $UI_{SEL}$. This arrangement may be viewed as a modification of those of FIGS. 10B and 10C, and may be useful in reducing an area which is occupied by a directional input unit upon a surface of a terminal.

7-4. Modifications or Variations for Reverse Arrangements

In another exemplary embodiment of this fourth exemplary aspect, a directional input unit may be fabricated into a more compact configuration by reversing arrangements between a directional element and a press-ID element. For example and contrary to various directional input units of FIGS. 10B to 10D where each directional element encloses therein each press-ID element, a directional element may rather be enclosed by or placed inside at least a (or an entire) portion of a press-ID element.

Figure 10E:
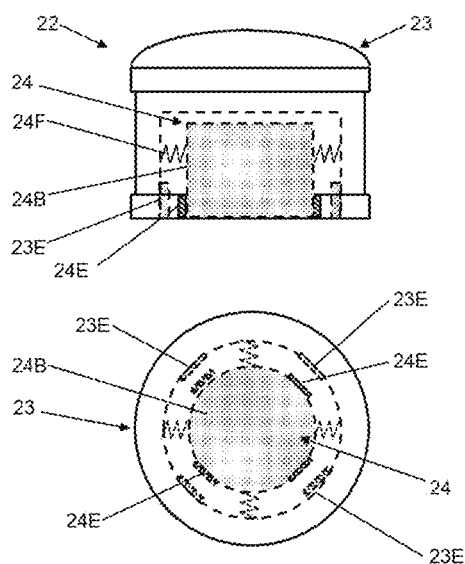

FIG. 10E exemplifies a directional input unit capable of concurrently acquiring $UI_{ACT}$, $UI_{THEN}$, and $UI_{SEL}$, but its directional element is enclosed by or disposed inside a press-ID element. For example, a directional input unit (22) also includes a press-ID element (23), a directional element (24), or the like, where the former (23) defines an internal cavity in which the latter (24) sits. Similar to those of FIGS. 10B and 10C, a press-ID element (23) includes multiple electrical contacts (23E) which, however, are implemented to an inner surface thereof. Contrary to other exemplary embodiments as provided above, a directional element (24) is rather disposed inside at least a portion of a press-ID element and similarly includes multiple electrical contacts (24E) on its outer or exterior surface. In addition, a directional input unit (22) may include at least one elastic element (24F) which may mechanically couple a press-ID element (23) to a directional element (24) and which recoils at least one mobile element of a directional input unit (22) into its rest state with its recoil force. To this end, such elastic elements (24F) are disposed between an inner surface of a press-ID element (23) and an outer surface of a directional element (24).

As a user supplies a single user input to a directional input unit (22) of a terminal in its off-state, a directional input unit (22) receives the user input(s), and concurrently acquires $UI_{ACT}$ and $UI_{THEN}$ with its tactile sensor and its authentication sensor. In response thereto, a movable press-ID element (23) moves toward one quadrant of a stationary directional element (24), and electrical contacts (23E), (24E) of such elements (23), (24) formed in such a quadrant eventually contact each other, thereby forming at least one electrical connection in such a quadrant. A directional input unit (22) then acquires $UI_{SEL}$ based upon a location of such a quadrant in which the electric contacts (23E), (24E) form the electrical connection. As a result, a directional input unit (22) may concurrently acquire $UI_{SEL}$ along with $UI_{ACT}$ and $UI_{THEN}$ (e.g., in the identical clock cycle or overlapping in the clock cycle). When a user provides multiple concurrent user inputs, such a directional input unit (22) may still concurrently acquire at least two (user) sub-inputs.

Because a press-ID element (23) encloses a directional element (24) therein, a press-ID element (23) is bigger than a directional element (24), although the former (23) may have a shape and size different from those of the latter (24), and a cross-section of the former (23) may be different from that of the latter (24), as long as the former (23) may enclose at least a portion of the latter (24) therein, and as long as the latter (24) may move closer to and away from the former (23) in response to a user input. In one example, a cross-sectional shape (e.g., a sagittal view) of a press-ID element (23) may be a triangle, a rectangle, a square, a polygon, a circle, an oval, a portion of any of the above, a combination of at least two of the above, or the like, whereas a cross-sectional shape of a directional element (24) may be identical to, similar to, or different from that of a press-ID element (23). Accordingly, shapes and sizes of a press-ID element (23) and those of a directional element (24) may be determined with respect to each other as long as one element may move with respect to another, while such elements form multiple electrical connections each denoting different $UI_{SEL}$'s in response to a single user input (or multiple concurrent user inputs).

A directional element (24) of a reversely-arranged directional input unit (22) is typically configured stationary disposed inside a press-ID element (23). A directional element (24) also mechanically couples with a press-ID element by at least one elastic element (24F), where the elastic element (24F) is in its rest (or unbiased) state when a user input is not supplied thereto, whereas the elastic element (24F) moves to its biased state as a user input presses a press-ID element (23) in a preset direction at a certain angle. Once a user ceases to supply the user input, the elastic element (24) moves to its rest state, while moving a press-ID element (23) back to its rest state as well.

As described above, a press-ID element (23) is mobile, while a directional element (24) disposed in a press-ID element (23) is stationary. However, a directional element may be configured to be mobile, while a press-ID element may be configured to be stationary so that it is the directional element which moves in response to a user input, while staying inside the press-ID element. This arrangement may be embodied in such a way that at least a portion of a directional element is exposed through a press-ID element, that a user provides a user input directly to such a portion of a directional element and, therefore, that a directional element moves in response to a user input and with respect to a stationary press-ID element.

The reversely-arranged directional input unit (22) includes a press-ID element (23) which encloses therein an entire portion of a directional element (24). Alternatively, at least a portion of a directional element (24) may be exposed through a press-ID element (23) as described hereinabove. Other configurational or operational characteristics of a reversely-arranged directional input unit are similar or identical to those of a directional input unit of FIG. 10B, as long as such features may take account of the fact that physical arrangements of an internal element and an external element have been reversed.

7-5. Further Modifications or Variations

In another exemplary embodiment of this fourth exemplary aspect, various directional input units of FIGS. 10A to 10E, their press-ID elements, or their directional elements may be modified without departing from a spirit or scope of such various units and elements. Following description provides some examples of modifications or variations thereof.

In one example, a directional input unit may acquire $UI_{SEL}$ and may select or locate which one of multiple pre-selected operations corresponds to such $UI_{SEL}$ from the matching list as explained above. As shown in FIG. 9 (steps 061, 063, and 065), a terminal may run such selecting or locating by various prior art algorithms such as, e.g., by performing multiple "[if . . . then] comparisons" so that a terminal may perform one comparison after another until a terminal may locate one pre-selected operation which matches $UI_{SEL}$. A terminal may instead perform at least one "[switch] statement" which may change a control flow of a program execution via, e.g., a multi-way branch. As a result, a terminal may locate a selected operation more readily and efficiently than by performing multiple "[if . . . then] comparisons." A terminal may perform multiple comparisons depending upon a nature of an O/S as well. For example, when the O/S only permits a single tasking, a terminal may rely on the above steps to perform multiple comparisons. However, when an O/S permits a multiple-tasking, such a terminal may perform the multiple comparisons in concurrency by time sharing.

In another example, a directional input unit may receive a single user input or multiple concurrent user inputs such that a directional input unit concurrent acquires multiple (user) sub-inputs including $UI_{SEL}$ and, optionally acquiring one or both of $UI_{THEN}$ and $UI_{ACT}$. In response thereto, a terminal runs (or starts to run) an activation operation for turning on its display unit (based upon $UI_{ACT}$), may run (or start to run) at least one authentication operation (based on $UI_{THEN}$), may run (or start to run) a selecting operation (based on $UI_{SEL}$), may optionally run (or start to run) at least one auxiliary operation (based on $UI_{AUX}$), or the like.

However, a terminal may run all or at least some of such operations of the preceding paragraph concurrently or sequentially based on various sequences. For example, a terminal may concurrently run (or start to run) all of such selecting, turning on, and authenticating. In another example, a terminal may concurrently run (or start to run) [1] such selecting and authenticating, and thereafter run such turning on, [2] such authenticating and turning on, and thereafter perform such selecting, [3] such turning on and such selecting, and thereafter run such authenticating, or the like. A terminal may complete at least two or all of such operations concurrently (e.g., the same clock cycle or overlapping in a certain clock cycle), may complete all of such operations in different instances (e.g., in different clock cycles). A terminal may also run (or starts to run) or finish at least two of such operations sequentially.

When a terminal does not authenticate a user, a terminal may run a turning on operation and run a selecting operation concurrently or sequentially in various sequences. For example, a terminal may [1] concurrently run such selecting and turning on, [2] run such selecting and then run such turning on, or [3] run such turning on and then run selecting. A terminal may complete at least two of such operations [1] concurrent with each other, [2] sequentially, or the like.

In another example, a terminal (or a user) may match multiple $UI_{SEL}$'s with multiple pre-selected operations in various arrangements such as, e.g., in a 1-to-1 matching, in a m-to-1 matching, in a 1-to-n matching, in a m-to-n matching, or the like. A terminal (or a user) may rather match multiple $UI_{SEL}$'s with multiple settings of a single operation, where such settings may relate to granting or denying an access to a hardware element of a terminal or where such settings may instead relate to granting or denying an access to its software element. In one case when a user wants to run a scheduling operation as a terminal powers on, wakes up, or switches modes, a terminal may establish multiple different settings so that, e.g., a user may [1] access all schedules and all data stored in a $1^{st}$ setting which corresponds to $UI_{SEL-1}$, [2] access only those schedules related to personal or family matters in a $2^{nd}$ setting which matches with $UI_{SEL-2}$, or [3] access only business-related schedules in a $3^{rd}$ setting which matches $UI_{SEL-3}$. In another case when a user wants to run a word-processing operation when a terminal powers on, wakes up, or switches modes, a terminal may similarly establish multiple different settings such that, e.g., a user [1] may retrieve, edit, and store all documents and create a new document in a $1^{st}$ setting which corresponds to $UI_{SEL-1}$, [2] may retrieve, edit, and store all documents but cannot create a document in a $2^{nd}$ setting which corresponds to $UI_{SEL-2}$, or [3] may only retrieve and view but cannot create or edit a pre-existing document in a $3^{rd}$ setting which corresponds to $UI_{SEL-3}$. That is, a terminal (or a user) may [1] match multiple $UI_{SEL}$'s with multiple pre-selected operations, or [2] match multiple $UI_{SEL}$'s with multiple features (or access authorities) of one pre-selected operation In another example, a terminal may run multiple different authentication operations either concurrently or one at a time. Each of such authentication operations may determine whether or not a current user has a proper access authority [1] to operate a terminal in a lock, intermediate, or unlock mode, [2] to drive a certain hardware or software element, or the like. When a user is authorized, he or she may then advance to an unlock mode and begin to operate a terminal therein. Otherwise, a terminal may keep a user in a lock mode or turn off its display unit. In this context, such an authentication operation may be viewed as an on-off type operation. Alternatively, an authentication operation may determine what kind of access authority or how much extent of access a user may have.

When a user is authorized, he or she may then access a certain mode which a user intends or which a terminal may see fit. In a $1^{st}$ case where a terminal offers only two modes of operation such as, e.g., an unlock and lock mode, it is almost the same as the on-off type as explained above. However, in a $2^{nd}$ example when a terminal may offer more than two modes of operation such as, e.g., a lock, intermediate, and unlock mode, a terminal may allow or deny a user to switch from a current mode to a new mode granted with more access authorities, to stay in a current mode, to switch to a different mode granted with less access authorities, or the like.

In another example where a terminal authenticates a user, a terminal may also run at least one supplemental or alternative authentication operation which may authenticate other body parts of a user such as, e.g., an iris, a retina, a face, or another body part, or which may authenticate other non-biometric information such as, e.g., a password, a pass code, or the like. As explained above, a terminal may run multiple authentication operations which checks identical or different body parts or non-biometric information to verify whether or not a current user has an access authority to switch from a current mode of operation to a new mode or to whom a terminal has to grant certain access authorities. A terminal may run a primary authentication operation and such supplemental or alternative authentication operation concurrently or may run the primary authentication operation first and then sequentially run such a supplemental or alternative authentication operation.

In another example, a terminal receives a single user input including $UI_{SEL}$ and $UI_{THEN}$, which may optionally include $UI_{ACT}$ or $UI_{AUX}$. A terminal concurrently may acquire $UI_{SEL}$ and $UI_{THEN}$ through a directional input unit which receives an image including therein certain biometric information of a user such as, e.g., a retina, an iris, a face, or another body part and which acquires $UI_{THEN}$ therefrom. Such an image may be generated to be viewable in various frequency ranges such as, e.g., visible light rays, UV light rays, IR light rays, or laser. A directional input unit may instead sense a position of an iris, a retina, a face or another body part, sense a relative position thereof with respect to a certain reference, sense its movement, sense a 2-D or 3-D path of such a movement, sense its orientation, or the like, from which a directional input unit may acquire $UI_{SEL}$.

When such operations in the preceding paragraphs may be run when (or while) a display unit was (or has been) turned off, a directional input unit may acquire [1] all of $UI_{THEN}$, $UI_{SEL}$, and $UI_{ACT}$ concurrently, or [2] only $UI_{THEN}$ and $UI_{SEL}$ concurrently, while acquiring $UI_{ACT}$ before or after such acquiring by a directional input unit or another input unit. When a terminal runs such operations while a display unit is (or has been) turned on, a directional input unit may concurrently acquire [1] both of $UI_{THEN}$ and $UI_{SEL}$, [2] all of $UI_{THEN}$, $UI_{SEL}$, and $UI_{ACT}$, or the like. The $UI_{ACT'}$ may be a $2^{nd}$ activation (user) sub-input which is different from a $1^{st}$ $UI_{ACT}$ and which turns on a display unit but controls various lighting features of a display unit, where examples of such "lighting features" may include, but not limited to, an intensity, a color, a hue, a contrast, or other features of a screen displayed on a turned-on display unit.

In another example, a terminal may run an alternative or supplemental authentication operation by recruiting the identical, similar or different hardware or software elements, by executing the identical, similar or different sequences or operational procedures as described above. In one case, a terminal may authenticate a user with at least one image of at least one user body part or non-user object which may be designated by a user (or terminal) as an authenticating object. A terminal or a directional input unit may then acquire either or both of $UI_{THEN}$ and $UI_{SEL}$ therefrom. A directional input unit may instead acquire $UI_{THEN}$ and $UI_{SEL}$ from an absolute or relative position of the body part or object or from a movement thereof, by using a prior art position sensor, a prior art motion sensor, or the like. A terminal may authenticate a user not by such images but by sounds which are in an audible or inaudible frequency ranges, where such sounds may be generated by a user (e.g., by his or her vocal cord or by other body parts), by a pre-selected non-user object, by an environment, or the like, where a terminal or a directional input unit may acquire either or both of $UI_{THEN}$ and $UI_{SEL}$ from such sounds by using a prior art microphone, another acoustic sensor, or the like In another example where a terminal does not employ any authentication operation at all, a directional input unit or, more particularly, a press-ID element may not include any authentication sensor. In another example where a directional input unit does not incorporate any authentication sensor, another non-directional input unit of the same terminal may include such an authentication sensor.

In another example where such turning on a display unit is conditioned on either such authenticating or such selecting, a terminal does not need to turn on a display unit upon receiving a single user input. Accordingly, a directional input unit or, more particularly, a press-ID element may not include any tactile sensor. In this case, a terminal may turn on a display unit after confirming a current user is an authorized user, selecting one pre-selected operation from the matching list, or the like. In the alternative, when a directional input unit does not incorporate any tactile sensor, another input unit of the same terminal may include such a tactile sensor.

7-6. Modifications or Variations in User Inputs

As described above, a single user input provided by a user typically includes multiple (user) sub-inputs therein. In addition, many of such single user inputs include therein or are accompanied by at least one $UI_{SEL}$, at least one $UI_{THEN}$, at least one $UI_{ACT}$, or the like. That is, a terminal receives a single user input including therein a certain number of (user) sub-inputs before powering on, waking up, or switching modes, and runs the same certain number of operations while or (immediately) after such powering on, waking up, or switching modes.

It is appreciated that, when a terminal conditions certain operations upon any of such three operations (e.g., such turning on, authenticating, and selecting), a terminal may run at least one additional operation other than such operations. For example, when a selected operation is an operation of assessing emergency situations and where a camera operation is conditioned upon the selected operation, a terminal runs the selecting, turning on, and authenticating, and concurrently runs a camera operation after powering on, waking up, or switching modes. In addition, even when a terminal concurrently acquires $UI_{SEL}$, $UI_{THEN}$, and $UI_{ACT}$, it may not necessarily run such three operations concurrently, particularly when one of such operations is conditioned upon another of such operations, details of which are to be provided below.

In another exemplary embodiment of this fourth exemplary aspect, a user may only provide a less number of (user) sub-inputs, while a terminal may be configured to run a greater number of operations while (or after) a terminal powers on, wakes up, or switching modes. For example, a user may provide a single user input which includes only two of such three (user) sub-inputs (i.e., $UI_{SEL}$, $UI_{THEN}$, and $UI_{ACT}$) or only one of such sub-inputs. In addition, even when a user provides a single user input including therein only two of such (user) sub-inputs, a terminal may perform all three of such operations such as the turning on, authenticating, and selecting, either concurrently or sequentially. Alternatively, even when a user provides a single user input including therein only one of such (user) sub-inputs, a terminal may run at least two of (or all three of) such operations, concurrently or sequentially. Alternatively, a user may provide at least two user inputs to at least two input units concurrently, where one of multiple input units is a directional input unit and where such user inputs include therein at least one $UI_{SEL}$, at least one $UI_{THEN}$, and at least one $UI_{ACT}$, where [1] all three (user) sub-inputs are included in a single user input provided to a directional input unit, [2] $UI_{SEL}$ and only one of remaining (user) sub-inputs are included in a single user input provided to a directional input unit, or [3] only $UI_{SEL}$ is included in a single user input provided to a directional input unit. Within the scope of this disclosure, a "simplified user inputs" refers to a user input with which a terminal can run a greater number of operations than a number of (user) sub-inputs included in a single user input, when or (immediately) after the terminal powers on, wakes up, or switches modes.

A simplified user input is beneficial to a user, for a user simply provides a single user input but a terminal can run all necessary operations while (or after) powering on, waking up, or switching modes, whereby a user can enjoy more seamless operations to a greater extent. A simplified user input is also beneficial to a manufacturer of terminal, for a manufacturer can cut down a cost of manufacturing a terminal as well as may make a terminal more compact and portable.

A simplified user input may be embodied by various means such as, e.g., [1] by utilizing a static feature or a dynamic feature of a user input (or a user sub-input) which is inherent therein, [2] by utilizing a static feature or dynamic feature of a user input (or a user sub-input) which is intentionally added to such a user input, [3] by matching (or assigning) each of multiple static features or dynamic features of a user input (or a user sub-input) with (or to) each of multiple features of the hardware or software elements of a directional input unit, or the like.

Following examples explain several representative examples of such user inputs, such directional input units, and terminals of the preceding paragraph, where disclosure is directed to a case where a terminal receives a single user input from a user and where such a terminal utilizes various features of a simplified user input. It is appreciated, however, that similar configurations or operations may similarly apply to other terminals which concurrently receive multiple concurrent user inputs and, accordingly, details of the latter arrangement will be omitted herein.

7-6-1. Simplified Selecting and Activation (User) Sub-Inputs

In another exemplary embodiment of this fourth exemplary aspect, a $1^{st}$ exemplary simplified user input may combine (or integrate) $UI_{SEL}$ with $UI_{ACT}$ (or vice versa). In other words, when a user provides a terminal with the single simplified user input, a directional input unit acquires only one of $UI_{SEL}$ or $UI_{ACT}$. However, a terminal may run a selecting operation in response to $UI_{SEL}$ (or $UI_{ACT}$) as well as may run an activation operation in response to the same $UI_{SEL}$ (or $UI_{ACT}$). In this regard, a terminal (or a user) may deem $UI_{SEL}$ and $UI_{ACT}$ to be complementary to each other. In other words, a terminal may run a selecting operation which typically leads to running at least one selected operation and, as a result, it is natural to turn on a display unit after completing to run a selecting operation or completing to run a selected operation. Similarly, a terminal may turn on a display unit which typically leads to displaying a screen on a turned-on display unit, where such a screen may include information about a status of running a selecting operation or running a selected operation.

Upon receiving a single user input including one of $UI_{SEL}$ or $UI_{ACT}$, a terminal runs (or starts to run) the selecting and turning on [1] concurrently with each other, or [2] sequentially. A terminal may manipulate how to precisely turn on a display unit, e.g., by setting or controlling an intensity of light of a screen (i.e., a brightness), a contrast, a color, a hue or other characteristics of a screen of such a display unit (which is referred to as "lighting features" hereinafter).

More particularly, when a user provides a certain $UI_{SEL}$ to run, e.g., an emergency alarming operation which corresponds to a $3^{rd}$ operation from the matching list after a terminal powers on, wakes up, or switches modes, the terminal acquires $UI_{SEL}$ and runs the $3^{rd}$ pre-selected operation. During this process, a terminal may turn on a display unit in various timings such as, e.g., [1] concurrently with, (immediately) after, or within a certain period after acquiring $UI_{SEL}$, [2] concurrently with, (immediately) after, or within a certain period of time after running (or starting to run) a selecting operation, or [3] concurrently with, (immediately) after, or within a certain period after running (or starting to run) the $3^{rd}$ selected operation. Alternatively, a terminal may run the selecting and then such turning on sequentially. That is, such turning on in this arrangement is conditioned upon such selecting (or vice versa, depending on detailed arrangements).

Alternatively, a terminal (or a user) may set up multiple $UI_{ACT}$'s so that each $UI_{ACT}$ renders a terminal turn on a display unit according to different lighting features and that each $UI_{ACT}$ is also matched with each of at least two pre-selected turning on operations. Therefore, when a user provides a certain $UI_{ACT}$, a terminal turns on a display unit and runs one of multiple pre-selected operations which is matched to $UI_{ACT}$ in one of the above timings such as, e.g., [1] concurrently with, (immediately) after, or within a certain period after acquiring $UI_{ACT}$, [2] concurrently with, (immediately) after, or within a certain period after running (or starting to run) such turning on, or the like. A terminal may sequentially perform such selecting and then such turning on. Therefore, such selecting in this arrangement is conditioned upon such turning on (or vice versa depending upon detailed arrangement).

A terminal may also run such operations in other pairings as well, e.g., [1] $UI_{SEL}$ and $UI_{ACT}$ are matched to a single pre-selected operation in a 2-to-1 matching, [2] multiple $UI_{SEL}$'s or $UI_{ACT}$'s are matched to a single pre-selected operation in a m-to-1 matching, [3] one of $UI_{SEL}$ or $UI_{ACT}$ is matched with at least two pre-selected operations in a 1-to-n matching, or the like. Accordingly, due to such 1-to-1, m-to-1, or 1-to-n matchings, a terminal (or a user) may select what kind of lighting features to use to run such turning on.

When desirable, a terminal may include at least one additional input unit which may be identical to, similar to or different from a directional input unit and may be used along with such a directional input unit. In addition, a terminal may receive a single user input or multiple concurrent user inputs which include $UI_{SEL}$ (or $UI_{ACT}$) as well as $UI_{THEN}$ such that a terminal may also run at least one authentication operation along with one of such operations described above. Accordingly, a terminal may still provide a user with seamless operations which may be simpler or more convenient-to-use.

7-6-2. Simplified Selecting and Authentication (User) Sub-Inputs

In another exemplary embodiment of this fourth exemplary aspect, a $2^{nd}$ exemplary simplified user input may combine (or integrate) $UI_{SEL}$ with $UI_{THEN}$ (or vice versa). That is, when a user provides a terminal with a single simplified user input, a directional input unit acquires only one of $UI_{SEL}$ Or $UI_{THEN}$. However, a terminal may run a selecting operation in response to $UI_{SEL}$ (or $UI_{THEN}$) as well as run an authentication operation in response to the same $UI_{SEL}$ (or $UI_{THEN}$). In this regard, a terminal may deem $UI_{SEL}$ and $UI_{THEN}$ to be complementary to each other. That is, a terminal may run a selecting operation which typically leads to running a selected operation and, as a result, it is natural to check whether a current user has an access authority to run a selected operation by running an authentication operation. Similarly, a terminal may run an authentication operation and, when a user passes such authenticating, it is natural to run at least one selected operation which a user desires to run once a terminal powers on, wakes up, or switches modes.

Upon receiving a single user input including one of $UI_{SEL}$ Or $UI_{THEN}$, a terminal runs (or starts to run) the selecting and such authenticating [1] concurrently with each other, or [2] sequentially. A terminal may manipulate how to precisely authenticate a user, e.g., by authenticating a thumb, an index finger, or another finger of a user, by authenticating an iris or a retina, by authenticating a face or another body part, by authenticating a voice of a user, by authenticating a movement of a body part of a user or that of a non-user object, or the like.

More particularly, when a user provides a certain $UI_{SEL}$ to run, e.g., an email operation which is listed as a $2^{nd}$ operation in the matching list when (or after) a terminal powers on, wakes up, or switch modes, a directional input unit may acquire $UI_{SEL}$ and may run a $2^{nd}$ pre-selected operation. During this process, a terminal may authenticate a user in various timings such as, e.g., [1] concurrently with, (immediately) after, or within a certain period after receiving a single user input or after acquiring $UI_{SEL}$, [2] concurrently with, (immediately) after, or within a certain period of time after running (or starting to run) a selecting operation, [3] concurrently with, (immediately) after, or within a certain period after running (or starting to run) a $2^{nd}$ selected operation, or the like. In the alternative, a terminal may run such authenticating and sequentially run such selecting. That is, such selecting in this arrangement is conditioned upon such authenticating (or vice versa depending upon the arrangement).

Alternatively, a terminal (or a user) may set up multiple $UI_{THEN}$'s, where each $UI_{THEN}$ renders a terminal run a certain authentication operation out of multiple authentication operations and where, upon authenticating the user, a terminal runs a certain selected operation which matches a certain $UI_{THEN}$ or which matches a certain authentication operation. That is, such selecting (or running one pre-selected operation) in this arrangement is conditioned upon $UI_{THEN}$. In one case when a user puts a thumb onto a directional input unit, the input unit acquires $UI_{THEN-1}$ from his or her thumb. Upon authenticating a user and after powering on, waking up, or switching modes, a terminal runs, e.g., a scheduling operation which matches $UI_{THEN-1}$ and is a $4^{th}$ operation from the matching list. In another case when a user puts an index finger onto a directional input unit, the input unit acquires $UI_{THEN-2}$. Upon authenticating a user and after powering on, waking up, or switching modes, a terminal runs, e.g., an e-mail operation which matches $UI_{THEN-2}$ and is a $5^{th}$ operation from the matching list. During the above processes, a terminal may run a certain pre-selected operation which matches $UI_{THEN-1}$ or $UI_{THEN-2}$ in one of various timings such as, e.g., [1] concurrently with, (immediately) after, or within a certain period after acquiring $UI_{THEN-1}$ Or $UI_{THEN-2}$, or [2] concurrently with, (immediately) after, or within a certain period after running (or starting to run) an authentication operation. A terminal may also run such authenticating and the selected operation sequentially, with or without forming any temporal gap therebetween but without any temporal overlap therebetween.

As described above, a directional input unit may receive a single user input, acquire one of multiple $UI_{THEN}$'s, and locate which one of multiple pre-selected authentication operations matches the acquired $UI_{THEN}$. Thus, the directional input unit can not only acquire $UI_{THEN}$ but also estimate $UI_{SEL}$ based thereon, thereby providing seamless operations to a user.

A terminal may run such selecting and authentication operations in other matchings, e.g., [1] a single $UI_{THEN}$ Or $UI_{SEL}$ is matched to a single pre-selected operation, [2] multiple $UI_{THEN}$'s or multiple $UI_{SEL}$'s are matched to a single pre-selected operation, or [3] a single $UI_{THEN}$ or $UI_{SEL}$ is matched to multiple pre-selected operations. Therefore, due to such 1-to-1 matching, m-to-1 matching, 1-to-n matching, or m-to-n matching, a terminal (or a user) may select what kind of authentication operations to run in order to run such selecting.

When desirable, a terminal may include at least one additional input unit which may be identical to, similar to or different from a directional input unit and may be used along with the directional input unit. A terminal may receive a single user input or multiple concurrent user inputs which include one of $UI_{THEN}$ (or $UI_{SEL}$) as well as $UI_{ACT}$ so that a terminal may run an activation operation not necessarily conditioned upon the authenticating or the selecting. Accordingly, a terminal may provide further seamless operations with a more compact and user friendly directional input unit to a user.

7-6-3. Simplified Activation and Authentication (User) Sub-Inputs

In another exemplary embodiment of this fourth exemplary aspect, a $3^{rd}$ exemplary simplified user input may combine (or integrate) $UI_{ACT}$ with $UI_{THEN}$ (or vice versa). That is, as a user provides a terminal with a single simplified user input, a directional input unit acquires only one of $UI_{ACT}$ Or $UI_{THEN}$. However, a terminal may run an activation operation in response to $UI_{ACT}$ (or $UI_{THEN}$) as well as run an authentication operation in response to the same $UI_{ACT}$ (or $UI_{THEN}$). In this regard, a terminal may deem $UI_{ACT}$ and $UI_{THEN}$ to be complementary to each other. That is, a terminal may run an activation operation which typically leads to running at least one selected operation and, as a result, it is natural to check whether a current user has an access authority to run the selected operation by running an authentication operation. Similarly, a terminal may run an authentication operation and, when a user passes such authenticating, it is natural to run an activation operation to turn on a display unit.

Upon receiving a single user input including one of $UI_{ACT}$ Or $UI_{THEN}$, a terminal runs (or starts to run) the turning on and the authenticating [1] concurrently with each other, or [2] sequentially. A terminal may manipulate how to precisely authenticate a user, e.g., by authenticating a thumb, an index finger, or another finger of a user, by authenticating an iris or a retina, by authenticating a face or another body part, by authenticating a voice of a user, by authenticating a movement of a body part of a user or that of a non-user object, or the like.

A terminal may manipulate how to precisely control the lighting features of a display unit depending on, e.g., a type of authentication operations or results obtained by running an authentication (e.g., a "pass" or a "fail"). More particularly, when a user provides a certain $UI_{ACT}$ to turn on its display unit with certain lighting features, a terminal turns on the display unit according to $UI_{ACT}$ with such certain lighting features. During this process, a terminal may authenticate a user in various timings such as, e.g., [1] concurrently with, (immediately) after or within a certain period after acquiring $UI_{ACT}$, [2] concurrently with, (immediately) after, or within a certain period after running (or starting to run) an activation operation, [3] concurrently with, (immediately) after, or within a certain period after completing to turn on the display unit, or the like. Alternatively, a terminal may run such turning on and such authenticating (or vice versa) sequentially. Therefore, such authenticating in this arrangement is conditioned upon such turning on (or vice versa depending on the arrangement).

Alternatively, a terminal (or a user) may set up multiple $UI_{THEN}$'s, where each $UI_{THEN}$ renders a terminal run a certain authentication operation out of multiple authentication operations and where, upon authenticating the user, a terminal runs a certain activation operation which matches such $UI_{THEN}$. In other words, such turning on in this arrangement is conditioned upon such authenticating or $UI_{THEN}$. Further details of this arrangement are similar to those of the above $2^{nd}$ example and, therefore, are to be omitted.

When desirable, a terminal may include at least one additional input unit which may be identical to, similar to or different from a directional input unit and may be used along with the directional input unit. A terminal may receive a single user input or multiple concurrent user inputs which include one of $UI_{THEN}$ and $UI_{ACT}$ as well as $UI_{SEL}$ so that a terminal may run a selecting operation, not necessarily conditioned upon such authenticating or such turning on. Therefore, a terminal may provide further seamless operations with a more compact and convenient-to-use directional input unit to a user.

7-6-4. Simplified Selecting, Activation and Authentication (User) Sub-Inputs

In another exemplary embodiment of this fourth exemplary aspect, a $4^{th}$ exemplary simplified user input may combine (or integrate) all of $UI_{SEL}$, $UI_{ACT}$, and $UI_{THEN}$. In other words, as a user provides a terminal with a single simplified user input, a directional input unit acquires only one of $UI_{SEL}$, $UI_{ACT}$, Or $UI_{THEN}$. However, a terminal may run such selecting, turning on, and authenticating, all in response to a single $UI_{SEL}$, $UI_{ACT}$, Or $UI_{THEN}$. That is, a terminal (or a user) may deem each of $UI_{SEL}$, $UI_{ACT}$, and $UI_{THEN}$ to be complementary to each other.

This arrangement is a typical example of more seamless operations, in that a terminal runs a greater number of operations even when a user includes only a smaller number of (user) sub-inputs into a single user input which in turn is provided to a terminal, to a directional input unit, or to another non-directional input unit. To this end, when a directional (or non-directional) input unit acquires a $1^{st}$ of $UI_{SEL}$, $UI_{ACT}$, and $UI_{THEN}$, a terminal is configured to directly or indirectly acquire the rest of such (user) sub-inputs therefrom (e.g., a $2^{nd}$ and $3^{rd}$ of $UI_{SEL}$, $UI_{ACT}$, and $UI_{THEN}$). A terminal then runs (or start to run) such selecting, turning on, and authenticating, all of such operations in response to a single (user) sub-input which may be termed as $UI_{SEL}$, $UI_{ACT}$, Or $UI_{THEN}$, in various timings such as, e.g., [1] concurrently with each other, or [2] sequentially. A terminal may manipulate how to precisely turn on a display unit, or how to run an intended authentication operation, as described above.

In one case, a terminal may configure a directional input unit to monitor at least one static or dynamic feature of a user input or a (user) sub-input (e.g., $UI_{SEL}$) while or after receiving a single user input or acquiring $UI_{SEL}$. A terminal then directly or indirectly acquires one or both of $UI_{THEN}$ and $UI_{ACT}$ therefrom. In one arrangement, while acquiring $UI_{SEL}$ (e.g., by locating in which quadrant electrical contacts of a directional input unit form an electrical connection), the input unit may concurrently monitor an amplitude of a user input force, and then may authenticate a user only when a measured amplitude falls in a pre-selected range. Therefore, a directional input unit may concurrently acquire both $UI_{SEL}$ and $UI_{THEN}$. In addition, while acquiring $UI_{SEL}$, a directional input unit may concurrently sense reception of a user input and regards such as $UI_{ACT}$. Therefore, a directional input unit may concurrently acquire all three of $UI_{SEL}$, $UI_{THEN}$, and $UI_{ACT}$, in response to a single acquired $UI_{SEL}$.

In another arrangement, while acquiring $UI_{SEL}$ as exemplified in the preceding paragraph, a directional input unit concurrently senses a trajectory of a movement of a movable press-ID element, and then authenticates a user only when a trajectory does not cross pre-selected prohibited regions. Accordingly, a directional input unit may concurrently acquire both of $UI_{SEL}$ and $UI_{THEN}$. In addition, while acquiring such $UI_{SEL}$, a directional input unit concurrently senses a movement of a press-ID element and regards such a movement as $UI_{ACT}$. Therefore, a directional input unit may concurrently acquire all three of $UI_{SEL}$, $UI_{THEN}$, and $UI_{ACT}$ from a single $UI_{SEL}$.

In addition, a terminal may combine various examples provided in this embodiment (or other embodiments of this disclosure). For example, a terminal may combine the $1^{st}$ example of acquiring $UI_{SEL}$ and $UI_{ACT}$ with the $2^{nd}$ example of acquiring $UI_{SEL}$ and $UI_{THEN}$, thereby concurrently acquiring all of $UI_{SEL}$, $UI_{ACT}$, and $UI_{THEN}$ even when a terminal acquires only one of such (user) sub-inputs from a single user input. In another example, a terminal may combine the $1^{st}$ example of acquiring $UI_{SEL}$ and $UI_{ACT}$ with the $3^{rd}$ example of acquiring $UI_{ACT}$ and $UI_{THEN}$, thereby concurrently acquiring all of $UI_{SEL}$, $UI_{ACT}$, and $UI_{THEN}$ even when a terminal acquires only on of such (user) sub-inputs. In yet another example, a terminal may combine such $3^{rd}$ example of acquiring $UI_{ACT}$ and $UI_{THEN}$ with the $2^{nd}$ example of acquiring $UI_{SEL}$ and $UI_{THEN}$, thereby concurrently acquiring all of $UI_{SEL}$, $UI_{ACT}$, and $UI_{THEN}$ even when a terminal may acquire only one of such (user) sub-inputs. Accordingly, a terminal may concurrently acquire all three of such (user) sub-inputs by simply receiving a single user input which simply carries a single (user) sub-input therein.

When desirable, a terminal may also be configured in such a way that another auxiliary (user) sub-input may be incorporated into such arrangements that a terminal may acquire four or more (user) sub-input when such a terminal only acquires a single (user) sub-input from a single user input. In addition, a terminal may also be configured in such a way that the terminal may acquire three or more (user) sub-inputs even when a terminal acquires a single (user) sub-input from multiple concurrent user inputs.

It is appreciated that a terminal may use various static or dynamic features which may be inherent in a single user input or a single (user) sub-input so as to allow a directional input unit to directly or indirectly acquire at least one (user) sub-input therefrom. In the alternative, a terminal may add various static or dynamic features to a single user input or a single (user) sub-input. It is also appreciated that each of at least two features of a single (user) sub-input may be matched with (or assigned to) each of at least two features of another user sub-input or that each of multiple features of a single (user) sub-input may be matched with (or assigned to) each of multiple features of hardware elements of a directional input unit. It is appreciated that details of such static or dynamic features will be provided below.

Various directional input units operating under such simplified user inputs and various mobile communication terminals employing such directional input units offer numerous benefits. First of all, a user may manipulate a directional input unit more readily and more conveniently, e.g., by providing the input unit with a single user input which includes a single (user) sub-input therein, while fully enjoying the seamless operations. Secondly, a manufacturer may fabricate a directional input unit by using simpler and more compact hardware elements, simpler and more compact software elements, or the like, while improving an accuracy of receiving a single user input and acquiring a single (user) sub-input and while providing enhanced flexibility.

7-7. Static and Dynamic Features

In another exemplary embodiment of this fourth exemplary aspect of the disclosure, a directional input unit or another non-directional input unit may receive a single user input or multiple concurrent user inputs, and may acquire multiple (user) sub-inputs in various ways. For example, a directional input unit may acquire a (user) sub-input directly from a user input. Therefore, the input unit acquires $UI_{THEN}$ directly from a user input (e.g., a fingerprint or a voice of a user presented to the input unit). Alternatively, a directional input unit acquires $UI_{ACT}$ directly from a user input (e.g., a pressing or a contacting by a user). In another case, a directional input unit may acquire $UI_{SEL}$ directly from a single user input (e.g., a location of electrical connection or a direction of a movement of a movable press-ID element).

However, a directional input unit may instead acquire a (user) sub-input indirectly from a user input from, e.g., various mechanical, electrical, optical or magnetic features inherent in the user input. In one example and as disclosed with the type-1 directional input unit above, such features may include a 2-D or 3-D movement pattern of a movable portion of a directional input unit caused by a user input, a temporal or spatial sequence of the movement caused by a user input, or the like. In another example and as discussed with the type-2 directional input unit, such features may include a 2-D or 3-D movement pattern of a user body part, a temporal or spatial sequence of the movement of the body part, or the like. In another example and as disclosed with a type-3 directional input unit, such features may include a 2-D or 3-D movement pattern of a non-user object, its temporal or spatial sequence of the movement of the non-user object, or the like.

In addition, a type-2 directional input unit may monitor static or dynamic features of a user at a distance, i.e., a movement of a user away from a directional input unit or a movement of another user body part which may not contact or touch a directional input unit. Accordingly, when a user holds a mobile communication terminal while touching or pressing a directional input unit with a finger, examples of such a non-contacting user input may include, but not limited to, [1] a movement of a hand, an arm, a wrist, a leg, a torso, a head, a shoulder, or other body parts other than a finger touching a directional input unit, [2] an image of a face, an eye (e.g., a retina or an iris), an ear, or body parts other than his or her finger touching the directional input unit, or the like.

Such static or dynamic features inherent in a user input may include, e.g., [1] a force which accompanies a user input and which can be measured by a prior art force transducer, [2] a velocity of a movable portion, a contacting or non-contacting body part or a non-user object attainable by a user input, where a velocity can be measured by a prior art velocimeter or can be estimated by integrating an acceleration and where such a velocity may be a linear velocity or an angular velocity, [3] an acceleration of a movable portion, a contacting or non-contacting body part or a non-user object resulting from a user input, where an acceleration can be sensed by a prior art accelerometer or estimated by differentiating a velocity and where the acceleration may be linear or angular, [4] a displacement of a movable portion, a body part or a non-user object which results from a user input, or the like, where a displacement may be measured by a prior art displacement sensor or estimated by integrating a velocity, where a displacement may be a net distance from a starting position to an ending position or an arcuate length along a curvilinear path, and where a displacement may be linear or angular. It is appreciated that any prior art sensor may be recruited by a terminal or its directional input unit as long as such a sensor fits into a terminal and that such sensors are provided in a compact configuration. Thus, a directional input unit may recruit prior art micro-electromechanical (i.e., MEMS) sensors to this end.

Further conventional sensors may be recruited to measure one or more of such features, where examples of such sensors may include a gyroscopic sensor, an inclinometer, a tilt sensor, or the like. More particularly, a directional input unit may include a prior art gyroscopic sensor to measure orientation, where examples of such gyroscopic sensors may include, e.g., a fiber-optic gyroscope, a hemispherical resonator gyroscope, a vibrating structure gyroscope, a wineglass resonators, a dynamically-tuned gyroscope, a London moment gyroscope, or a ring laser gyroscope. Such gyroscopic sensors may be useful in enabling a directional input unit to monitor an orientation of a user (or his or her non-contacting body part), static or dynamic features of such an orientation, changes in orientation, or the like. Accordingly, a directional input unit can sense such features from a gesture, a motion, an orientation, or a position of a body part of a user or a non-user object.

Such static or dynamic features inherent in a user input may also include various force-related features such as, e.g., [1] an intensity or amplitude of a force, [2] a direction thereof, [3] an alignment with a portion of an input unit, [4] its duration, [5] its time-dependent or position-dependent changes, [6] a point(s) of application, [7] an average thereof, where such an average may include an arithmetic average, a weighted average, or the like. Such inherent features may include various velocity-related features such as, e.g., [1] a magnitude of a velocity, [2] a direction thereof, [3] an alignment with a portion of an input unit, [4] a duration thereof, [5] its time-dependent or position-dependent changes, or the like. Such inherent features may also include various acceleration-related features such as, e.g., [1] a magnitude of an acceleration, [2] a direction thereof, [3] an alignment with a portion of an input unit, [4] its alignment, [5] its duration, [6] its time-dependent or position-dependent changes, or the like. Such inherent features may also include displacement-related features such as, e.g., [1] a net displacement (a vector distance from a previous position to a present position), [2] a length of a displacement along its curvilinear path, [3] a path or trajectory of such a displacement, [4] a pattern of the displacement, [5] its direction, [6] a current position, [7] its destination, or the like.

It is appreciated that each of such static or dynamic features may be a time-independent value or a position-independent value such that they may be deemed as a constant value. Alternatively, each of such features may be a time-dependent value or a position-dependent value such that a certain feature may be function of a time or a position. When a certain feature is not a constant value, a terminal may use an average value of such a time-varying or position-varying feature, where an average may be a time-averaged value or a space-averaged value, may be an arithmetic average, a logarithmic average, or a weighted average. When a user may apply multiple concurrent user inputs in a form of a pulse train or may apply multiple concurrent (user) sub-inputs in a form of another pulse train, such inherent features may also include various characteristics of the pulse train such as, e.g., a number of user inputs (or sub-inputs) in one pulse train, a wavelength of the pulse train, a period of the pulse train, or a presence or absence of any temporal gap between such pulses.

It is appreciated that each of such static or dynamic features may be a scalar value or a vector value, where the latter value may include multiple components defined based on one of coordinate systems such as, e.g., a Cartesian coordinate, a cylindrical coordinate, a spherical coordinate, or the like. As briefly mentioned in the simplified user inputs above, such inherent features may be a feature which is directly measured by a prior art sensor, or another feature which can be derived or estimated from a value measured by such a sensor, where such derivation or estimation may be done electronically (e.g., by using a hardware element) or numerically (e.g., by using a software element).

In another example and as discussed in conjunction with such a type-4 directional input unit, such features may include, e.g., an intensity of electromagnetic or acoustic waves, their frequency, their wavelength, their phase angle or lag, or the like. When such features may relate to magnetic properties, such features may include, e.g., an intensity of a magnetic field, a magnetic polarity, dipole characteristics, an arrangement or a disposition of magnetic materials, or the like.

Accordingly, a terminal may monitor various static or dynamic features of a user input or (user) sub-input and may acquire at least one (user) sub-input therefrom. Of course, such a terminal preferably includes a proper sensor which can sense or quantify such a feature in real time or at least in pseudo-real time, whereby such a terminal can provide a user with seamless operations. A terminal may also incorporate any prior art sensor for sensing or monitoring such a feature.

7-8. Interchangeability

Although the foregoing embodiments or examples of this fourth exemplary aspect typically relate to various directional input units of a mobile communication terminal, it is to be understood that all such embodiments or examples equally apply to other mobile communication terminals each of which includes at least one input unit which may operate similar to various directional input units of this fourth exemplary aspect and, therefore, may be capable of acquiring $UI_{SEL}$, optionally along with other (user) sub-inputs by various embodiments. Therefore, various embodiments or examples of this fourth exemplary aspect may equally apply to any input unit which acquires such $UI_{SEL}$ alone or in concurrency with at least one another sub-inputs such as $UI_{ACT}$ and $UI_{THEN}$.

Configurational or operational variations (or modifications) of such directional input units described in various embodiments or examples of this fourth exemplary aspect may be interchangeable in such a way that certain features of one embodiment or one example of this fourth aspect may be applied to another embodiment or example of the same aspect. Other configurational or operational features, their variations or modifications of various directional input units of this fourth exemplary aspect may [1] apply to, [2] be incorporated into, [3] be replaced by, [4] replace, or [5] be combined with the corresponding features of another exemplary aspect, embodiment or example of this disclosure which have been described heretofore or which will be described hereinafter, subject to a certain modification, addition, and/or omission, each of which may become apparent based on detailed context of this fourth exemplary aspect or other exemplary aspects of this disclosure.

8. Configuration 5—Type-2 Directional Input Unit

In the fifth exemplary aspect of this disclosure, an exemplary mobile communication terminal may include a directional input unit which includes at least one movable portion and which is to be referred to as a "type-2 directional input unit" hereinafter. A user may contact, touch, press or otherwise manipulate such a portion to provide a single user input including multiple (user) sub-inputs or to provide multiple concurrent user inputs including multiple (user) sub-inputs.

It is appreciated that a type-2 directional input unit of this fifth exemplary aspect is different from the type-1 directional input unit of the above fourth aspect in that the previous type-1 input unit includes a portion which moves laterally or in a substantially horizontal direction, whereas this type-2 input unit includes a portion which moves substantially vertically. It is appreciated that the type-2 directional input unit may be readily implemented into any mobile communication terminal which have been exemplified in the above first, second, and third aspects of this disclosure and that various features related to such vertical movements of this type-2 directional input unit may be readily combined with other directional input units described heretofore and hereinafter.

It is also appreciated that, as a directional input unit acquires more (user) sub-inputs, a terminal may provide a user with more seamless operations. Therefore, a directional input unit may include multiple sensors for the purpose of concurrently acquiring multiple (user) sub-inputs. As a result, a terminal may run (or start to run) as many operations as possible concurrently or sequentially, all in response to a single user effort such as, e.g., a single user input or in response to multiple concurrent (user) sub-inputs.

It is also appreciated that this type-2 directional input unit generally includes at least one "press-ID element" and at least one "directional element," where a press-ID element can acquire at least one of $UI_{ACT}$ and $UI_{THEN}$, while a directional element can acquire $UI_{SEL}$. More particularly, a press-ID element of this type-2 directional input unit may serve as a movable portion of a directional input unit so that a user moves a press-ID element and delivers $UI_{SEL}$ to such an input unit.

8-1. Type-2 Directional Input Unit—Overall

In one exemplary embodiment of this fifth exemplary aspect, a mobile communication terminal includes at least one directional input unit which can receive a single user input or multiple concurrent user inputs, can acquire multiple (user) sub-inputs from a user input, and can generate multiple control signals each representing each (user) sub-input. When a terminal receives multiple concurrent user inputs, this directional input unit may receive all of such multiple user inputs or may receive at least one of such user inputs which include $UI_{SEL}$.

Figure 11A:
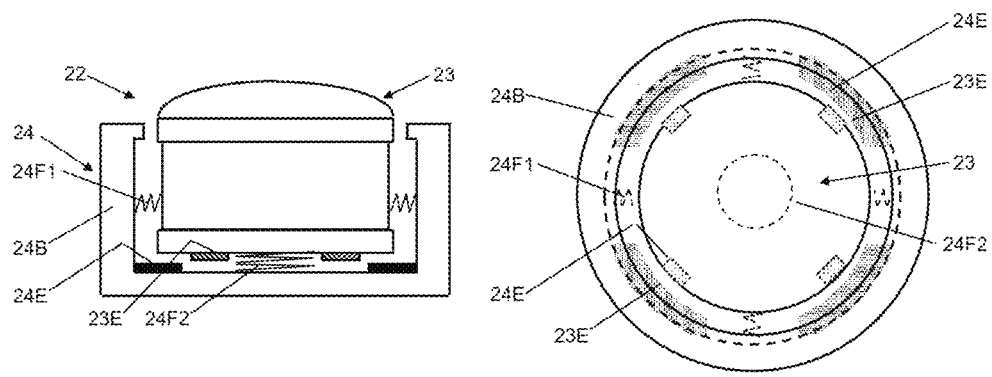
FIGS. 11A and 11B are cross-sectional and vertical views of an exemplary press-ID element according to the fifth exemplary aspect of this disclosure.

FIG. 11A is an exemplary directional input unit which can acquire three (user) sub-inputs such as $UI_{SEL}$, $UI_{ACT}$, and $UI_{THEN}$, along with other optional (user) sub-inputs. An exemplary press-ID element (23) of FIG. 11A is button-shaped and includes a layered structure which is identical to that of FIG. 10A of the fourth aspect. A press-ID element (23) also includes, e.g., four electrical contacts (23E) disposed in each corner (or quadrant) of a bottom surface thereof.

A directional element (24) includes a stationary body (24B) which defines an internal cavity in which a press-ID element (23) movably sits and which includes multiple electrical contacts (24E) provided on its top surface of its bottom portion of the element (24). A directional element (24) also defines, e.g., four electrical contacts (24E) each of which is disposed in each corner (or quadrant) of a top surface of a bottom portion of such an element (24). It is appreciated that such electrical contacts (24E) are vertically spaced away from those (23E) of a press-ID element (23) such that, when a press-ID element (23) moves vertically downwardly in response to a user input, such electric contacts (23E), (24E) of both elements (23), (24) come to contact each other. A directional element (24) includes multiple elastic elements (24F1, 24F2) (e.g., compression springs, tension springs or a combination thereof) which abut opposing surfaces of a press-ID element (23) and a directional element (24) and which move between their rest states and biased states.

When a user presses a directional input unit (22) by applying a user input at an angle thereto, the user input may include a vertical component as well as a lateral component. In response thereto, a movable press-ID element (23) moves downwardly from its rest position. Because those electrical contacts (23E) of a press-ID element (23) are provided on a bottom surface of the element (23) and those contacts (24E) of a directional element (24) are provided on its top surface of the element (24), such electrical contacts (23E), (24E) come to contact each other and form an electrical connection after a press-ID element (23) moves a $1^{st}$ distance laterally and a $2^{nd}$ distance vertically and downwardly. In response thereto, lateral elastic elements (24F1) disposed in a movement direction are also compressed in a lateral direction to their biased states, while a vertical elastic element (24F2) disposed in an upper portion of a directional input unit is also vertically compressed to its biased state.

When a user ceases to apply a user input, vertical and lateral force components of a user input also cease to push a movable press-ID element (23). Therefore, multiple lateral elastic elements (24F1) return to their rest states via their recoil force, thereby returning a press-ID element (23) to its rest state in a lateral direction. In addition, the vertical elastic element (24F2) also returns to its rest state, while lifting a press-ID element (23) upwardly to its rest state. As a result, the press-ID element (23) returns to its original position and gets ready for receiving another round of user input.

In operation, a terminal may store a matching list which matches multiple $UI_{SEL}$'s with multiple pre-selected operations which a user wants to run when a terminal powers on, wakes up, or switch modes. When a terminal is in its off-state, a user may provide a single user input (or multiple concurrent user inputs) by pressing a press-ID element (23) at an angle. As a result, a horizontal force component of a user input slides a press-ID element (23) toward a directional element (24), whereas a vertical force component of a user input presses a press-ID element (23) downwardly.

More particularly, when a user presses a press-ID element (23), a fingerprint sensor (23C) implemented into the element (23) acquires $UI_{THEN}$, and a tactile sensor (23D) in the same element (23) also acquires $UI_{ACT}$. In addition, as a press-ID element (23) moves toward a directional element (24) in response to the user input, both elements (23) and (24) come into contacting each other and their electrical contacts (23E), (24E) form at least one electrical connection depending on a direction of a user input. Based upon a location of such electrical connection, a directional element (24) acquires $UI_{SEL}$ from the user input. As a result, a directional input unit (22) concurrently acquires $UI_{SEL}$, $UI_{ACT}$, and $UI_{THEN}$. Upon acquiring such multiple (user) sub-inputs, a terminal generates control signals each representing each (user) sub-inputs. As a result, a terminal can run a selecting operation along with running an activation operation and an authentication operation in one of various timings as described above.

Various directional input units (with their press-ID and directional elements) disclosed in this fifth exemplary aspect are typically identical to those directional input units (with their press-ID and directional elements) of the above fourth exemplary aspect, with exceptions that [1] a press-ID element of this fifth exemplary aspect includes multiple electrical contacts (23E) provided under its bottom surface, [2] a directional element of this fifth exemplary aspect includes multiple electrical contacts (24E) provided on its bottom surface, or [3] each pair of opposing electrical contacts of such press-ID and directional elements form electrical connections as a press-ID element moves vertically and downwardly as well as translates laterally. Other configurational or operational characteristics of such directional input units of this fifth exemplary aspect are identical or similar to those of the fourth aspect and, therefore, are omitted herein.

8-2. Modifications or Variations of Type-2 Directional Input Units

In another exemplary embodiment of this fifth exemplary aspect, a press-ID element and a direction element of a directional input unit of the fifth exemplary aspect may be modified or changed without departing from a spirit and a scope of various directional input units explained throughout this disclosure.

For example, the protective layer of a press-ID element may incorporate or may be made of other equivalent materials as described above. A press-ID element may include other prior art detection rings, authentication sensors, or tactile sensors, where such rings or sensors may be modified as explained above. An overall (external) shape or size of a press-ID element and its overall layer configuration or arrangement may also be changed as described above. Because sole differences between the directional input units of this fifth aspect and those of the fourth aspect lie in a movement direction or depth of a press-ID element and a disposition of multiple electrical contacts, other structural and operational variations of the directional input units of the third or fourth aspect may equally apply to the directional input unit of this fifth aspect.

A directional element may be shaped or sized to movably contain therein or to enclose therearound an entire portion of a matching press-ID element as also described above. Alternatively, not all but only a portion of a press-ID element may also be enclosed by a directional element, thereby, e.g., reducing a volume or an area occupied by a directional element or an overall directional input unit upon a surface of a terminal, fabricating a terminal more compact, or the like.

A directional element may define an inside or outside shape and size which may be different from those of a press-ID element as far as a directional element may enclose at least a (or an entire) portion of a press-ID unit therein. As described above, a directional element and a press-ID element may include various number of electrical contacts thereon or may form various number of electrical connections along different lengths or angles similar to those of FIG. 10C but provided between a bottom of a press-ID element and a top surface of a bottom of a directional element.

Other configurational or operational characteristics of such press-ID elements, such directional elements and such directional input units of this fifth aspect are identical or similar to those of the fourth aspect. Therefore, further details of such modifications or variations are omitted herein.

8-3. Modifications or Variations for Reverse Arrangements

Above directional input units of this fifth exemplary aspect generally dispose a directional element around an entire (or at least a) portion of a press-ID element. Conversely and in another exemplary embodiment of this fifth exemplary aspect, an entire (or at least a) portion of a directional element may be implemented inside a press-ID element. In this context, a directional input unit of this fifth exemplary aspect may be deemed as a reversely-arranged directional input unit.

Figure 11B:
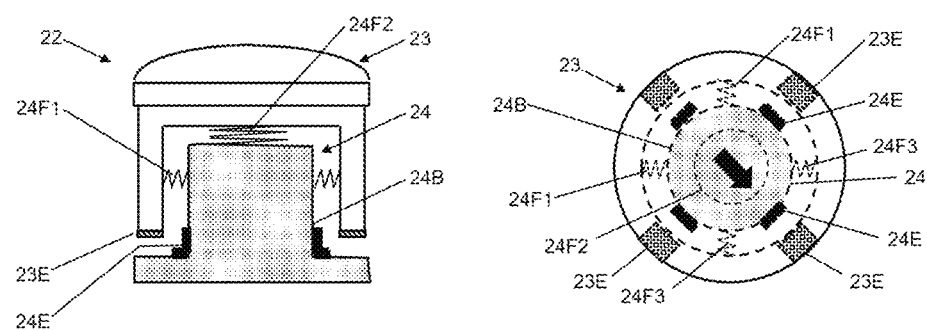

FIG. 11B depicts a directional input unit which can concurrently acquire $UI_{SEL}$, $UI_{ACT}$, and $UI_{THEN}$, but of which directional element is entirely (or at least partially) enclosed by or disposed inside a press-ID element, where this reversely-arranged directional input unit may include various portions which are identical or similar to those of FIG. 11A. A directional input unit (22) similarly includes a press-ID element (23) and a directional element (24), where its press-ID element (23) acquires $UI_{ACT}$ and $UI_{THEN}$, whereas its directional element (24) acquires $UI_{SEL}$, similar to those of FIG. 10A.

More particularly, a press-ID element (23) forms multiple electrical contacts (23E) around or under a bottom so that each of such contacts (23E) may form an electrical connection with a corresponding electrical contact (24E) of a directional element (24) when the former (23E) moves laterally and downwardly so as to approach and touch the latter (24E). A directional element (24) includes a body (24B) which is stationary and disposed inside a press-ID element (23), while not physically or electrically contacting the press-ID element (23) in its rest (or unbiased) state.

A directional element (24) also includes multiple electrical contacts (24E) which may be formed on or under its bottom and spaced away at a certain distance from a press-ID element (23), where each of such electric contacts (24E) may also form an electrical connection (or electrically closed circuit) when contacting each of such electrical contacts (23E) of a press-ID element (23). A directional element (24) includes multiple lateral elastic elements (24F1) disposed between opposing vertical surfaces of such elements (23), (24), and also includes at least one vertical elastic element (24F2) disposed in an upper portion of a directional input unit (22). Similar to those of FIG. 10A, such elastic elements (24F1), (24F2) are typically compressed as a press-ID element (23) moves along a direction of a user input toward a directional element (24), and return to their rest states from their biased states both laterally and vertically due to their recoil forces when a user ceases to apply the user input.

As a user presses a press-ID element (23) at an angle, a lateral component and a vertical element of a user input force moves a press-ID element (23) in different directions. For example, a lateral component of a user input slides a press-ID element (23) toward a south-east quadrant as indicated by an arrow in a lower panel of FIG. 11B. In response thereto, a pair of elastic elements (24F3) disposed in the east and south quadrants are compressed, while another pair of elastic elements (24F1) disposed in the opposite quadrants (e.g., the west and north quadrants) are extended. In addition, a vertical element of a user input force pushes a press-ID element downwardly, compressing an elastic element (24F2) vertically disposed under a press-ID element (23). Accordingly, such elastic elements (24F1~24F3) accumulate recoil energy which pushes themselves (24F1~24F3) back to their rest states in both lateral and vertical directions as a user ceases to apply a user input. The situations would be similar when a directional input unit (22) employs extension springs instead of compression springs, for one set of elastic elements would be compressed when a press-ID element moves in response to a user input in a certain direction, while another set thereof would be extended.

Although the exemplary directional input unit (22) of FIG. 11B includes a mobile press-ID element (24) and a stationary directional element (24), a press-ID element may be configured to be stationary, but a directional input unit may move with respect to a press-ID element in response to a user input. This arrangement may be embodied by exposing at least a portion of the directional element to an exterior and by allowing a user to manipulate such an exposed portion, thereby directly actuating a directional element, not directly moving the press-ID element.

A directional input unit may be configured that at least a portion of a press-ID element and at least a portion of a directional element may be mobile at the same time. By mechanically coupling one of such elements to another thereof, such elements may move together in the same direction in response to a user input. In the alternative, such elements may be arranged to move in opposite or transverse directions by incorporating at least one gear assembly or other prior art transmissions as well.

8-4. Interchangeability

Although the foregoing embodiments or examples of this fifth exemplary aspect relate to various directional input units of a mobile communication terminal in general, it is to be understood that all such embodiments or examples equally apply to other mobile communication terminals each of which includes at least one input unit operating like such directional input units and, therefore, capable of acquiring selecting (user) sub-inputs ($UI_{SEL}$). Therefore, various embodiments or examples of this fifth exemplary aspect may equally apply to any input unit which acquires such $UI_{SEL}$ alone or in concurrency with at least one another (user) sub-inputs such as $UI_{ACT}$ and $UI_{THEN}$.

Configurational or operational variations (or modifications) of such directional input units described in various embodiments or examples of this fifth exemplary aspect may be interchangeable in such a way that certain features of one embodiment or one example of this fifth aspect may be applied to another embodiment or example of the same aspect. Other configurational or operational features, and variations or modifications of such directional input units of this fifth exemplary aspect may [1] apply to, [2] be incorporated into, [3] replace, [4] be replaced by, or [5] be combined with corresponding features of another exemplary aspect, embodiment or example of this disclosure which have been described heretofore or which will be described hereinafter, subject to a certain modification, addition, and/or omission, each of which may become apparent based on detailed context of this fifth exemplary aspect or other exemplary aspects of this disclosure.

9. Configuration 6—Type-3 Directional Input Unit

In the sixth exemplary aspect of this disclosure, a mobile communication terminal includes a directional input unit which includes at least one stationary touch-ID element and at least one stationary directional element, where this directional input unit is to be referred to as a "type-3 directional input unit" hereinafter. A user may contact, touch, press or otherwise manipulate a portion of the input unit to provide a single user input including multiple (user) sub-inputs or to provide multiple concurrent user inputs including multiple (user) sub-inputs, where at least one of such (user) sub-inputs is a selecting (user) sub-input, $UI_{SEL}$.

However, because both touch-ID element and directional element are stationary, all (or at least substantial) portions of a directional input unit may not have to move in response to a user input (i.e., a user input force). Rather, at least one of a touch-ID element and directional elements is configured to sense a movement of at least one user body part which contacts at least a portion of either element, with or without actively pressing such a portion. Because neither a touch-ID element nor a directional element is mobile, it then follows that at least one of such touch-ID and directional elements may include at least one sensor for sensing at least one static or dynamic feature of a user input, where such a feature is directly or indirectly associated with at least one movement of at least one body part of a user. In addition, for providing seamless operations, a directional input unit may sense at least one (user) sub-input in real time or at least in pseudo real time.

Because both of such touch-ID element and directional elements are stationary, it is not material whether a user provides a user input by simply contacting or touching it without applying any force or by pressing it with a measurable force. Accordingly, an intensity of a user input force may not be important in this sixth exemplary aspect of this disclosure, even though a type-3 directional input unit may be configured to monitor at least one static or dynamic feature of a user input and to acquire at least one (user) sub-input therefrom directly or indirectly. Following description explain various type-3 directional input units which may be incorporated into a mobile communication terminal, where configurational or operational characteristics thereof are similar or identical to those of other directional input units in the above first, second, third or fourth aspect of this disclosure.

It is appreciated that, as a directional input unit may acquire more (user) sub-inputs, a terminal may provide a user with more seamless operations. Accordingly, a type-3 directional input unit may include multiple sensors for the purpose of concurrently acquiring multiple (user) sub-inputs. As a result, such a terminal may also run (or start to run) as many operations as possible concurrently or sequentially, all in response to a single user input or in response to multiple concurrent (user) sub-inputs.

This type-3 directional input unit typically includes at least one "touch-ID element" capable of acquiring $UI_{ACT}$ and $UI_{THEN}$ and at least one "directional element" capable of acquiring $UI_{SEL}$. Alternatively, a type-3 terminal may also configure a touch-ID element to acquire $UI_{SEL}$. As will be explained below, such a touch-ID element of this sixth exemplary aspect may be similar to a press-ID element of the above exemplary aspects, except that a touch-ID element does not have to move in response to a user input 9-1. Type-3 Directional Input Unit—Overall In one exemplary embodiment of this sixth exemplary aspect, a mobile communication terminal may include a directional input unit which in turn includes at least one type-3 directional input unit which in turn includes at least one stationary touch-ID element and at least one stationary (or mobile) directional element. A type-3 directional input unit receives a single user input (or multiple concurrent user inputs), concurrently acquires therefrom at least two (user) sub-inputs one of which is $UI_{SEL}$, and generates multiple control signals each of which represents each of such multiple (user) sub-inputs. A terminal may then run multiple operations while powering on, waking up, or switching modes, where each of such operations corresponds to [1] each of certain multiple control signals or [2] each of certain multiple (user) sub-inputs.

To this end, a touch-ID element of a directional input unit monitors a touch or a contact between at least one body part of a user and at least a portion of such an element or such an input unit, where a touch or contact may accompany a force of a minimum magnitude. A directional input unit then acquires multiple (user) sub-inputs from such a contact or a touch, or from a static or dynamic feature related to such a contact or a touch. Because a directional input unit and its touch-ID element do not require any movable portion, a directional input unit including such a stationary touch-ID element may be provided in a simpler configuration than other directional input units including such movable press-ID elements or such movable directional elements.

FIG. 12 depicts an exemplary directional input unit of the sixth exemplary aspect of this disclosure. As shown in the figure, a directional input unit (22) generally includes a "touch-ID element" (23) which may concurrently acquire $UI_{SEL}$, $UI_{THEN}$, $UI_{ACT}$, or the like. Because a directional input unit (22) does not include a movable portion, the input unit (22) may acquire $UI_{SEL}$ with its touch-ID element (23). Accordingly, a configuration of a touch-ID element (23) may be identical to that of a directional input unit (22) or may be negligibly or slightly smaller or narrower than a directional input unit (22). It is appreciated that the above exemplary directional input unit is specifically tailored to run a fingerprint authentication operation.

Still referring to FIG. 12, a button-shaped directional input unit (22) or a stationary touch-ID element (23) may form therealong a layered structure which in turn includes a touch screen layer (23H), a detection ring (23B), a fingerprint sensor (23C), and a tactile sensor (23D). This touch-ID element (23) can concurrently acquire at least one $UI_{SEL}$, at least one $UI_{THEN}$, and at least one $UI_{ACT}$, as will be described in greater detail below.

A top layer of a directional input unit (22) and its touch-ID element (23) is a touch screen layer (23H) which may include or may be made of at least one prior art touch screen (input) element which may receive a user input, may acquire a selecting (user) sub-input ($UI_{SEL}$) from a user touch or may acquire a series of multiple user touches as $UI_{SEL}$. A touch screen layer (23H) may acquire $UI_{SEL}$ based on any conventional operational principles or mechanisms.

In a $1^{st}$ example, a touch screen layer (23H) of a touch-ID element (23) or another portion of the element (23) may monitor electrical capacitance, temporal changes in such capacitance (i.e., such conductance changes over time) or spatial changes in such capacitance (i.e., such conductance depends on (or varies in) positions in a 2-D plane or in a 3-D space) for acquiring $UI_{SEL}$, e.g., by including an insulator and an electric conductor (e.g., InSnO) which is coated on the insulator. As a result, a touch-ID element (23) or its touch screen layer (23H) may generate an electrostatic field when an electrical voltage is applied thereto. When a user touches a touch screen layer (23H) or another portion of a touch-ID element (23), such electrostatic field is distorted and such distortion is measurable as changes in capacitance, where such capacitances may include, e.g., a surface capacitance, a projected capacitance, a mutual capacitance, a self-capacitance, or the like.

In a $2^{nd}$ example, a touch-ID element (23) or its touch screen layer (23H) may monitor electrical resistance, a temporal change in such resistance or a spatial change in such resistance in order to acquire $UI_{SEL}$, e.g., by separating at least two electrically resistive layers by a thin space, where a $1^{st}$ resistive layer is applied with an electric voltage, while a $2^{nd}$ resistive layer senses such voltage through conductive connections. As a user touches a touch screen layer (23H) or another portion of a touch-ID element (23), the above resistive layers may contact each other and behave as a pair of voltage dividers, one axis at a time. A touch screen layer (23H) then senses a position of pressure from rapid switching between each layer and monitors changes in such resistance.

In a $3^{rd}$ example, a touch-ID element (23) or its touch screen layer (23H) may sense absorption of ultrasonic waves or their temporal or spatial changes for acquiring $UI_{SEL}$, e.g., by passing ultrasonic waves over a touch screen layer (23H). As a user touches a touch screen layer (23H) or another portion of a touch-ID element (23), a portion of such ultrasonic waves is absorbed, and a touch screen layer (23H) or another portion of a touch-ID element (23) may register a position of a user touch from such changes in absorption of ultrasonic waves. A directional input unit may also use other prior art sensors which operate on different operational principles or mechanisms examples of which may include, but not limited to, an optical imaging, an infrared grid or infrared acrylic projection, an acoustic pulse recognition, dispersive signal technologies, or the like.

Using at least one of such principles or mechanisms, a touch-ID element (23) or its touch screen layer (23H) may monitor at least one of such temporal or spatial changes in such capacitance, resistance or absorption due to a touch by a user, a series of multiple user touches, or a pattern of multiple user touches, in order to receive a user input or to acquire $UI_{SEL}$. In one example, with such a touch screen layer (23H), a directional input unit (22) may monitor at least one of such temporal or spatial changes from, e.g., [1] a position of such a user touch(es), [2] changes in positions of a user touch(es), [3] a pattern of such a user touch(es), or [4] other static or dynamic feature related to such a touch (es). Based thereupon, a touch-ID element (23) or its touch screen layer (23H) may function as a directional element of the input unit of this sixth exemplary aspect, e.g., by receiving a single user input or multiple concurrent user inputs, by acquiring $UI_{SEL}$ therefrom, or the like. A directional input unit may optionally include at least one protective layer over an entire (or at least a) portion of a touch screen layer (23H) as described above, as far as such a protective layer does not interfere with acquisition of $UI_{SEL}$.

A detection ring (23B) serves to detect a presence of a user and to render a fingerprint sensor (23C) ready to run at least one authentication operation. Upon receiving a user input and confirming the presence of a user (or a body part), a fingerprint sensor (23C) begins to read a fingerprint of a user ($UI_{THEN}$) based upon various mechanisms as described above. A tactile sensor (23D) may monitor or sense an application of a user input force (e.g., $UI_{ACT}$) thereon by a user, or a contact by a user whether or not a user applies a force or a pressure thereon. It is appreciated that, based on an O/S or hardware characteristics of the fingerprint sensor (23C), a terminal may complete to acquire both of $UI_{THEN}$ and $UI_{ACT}$ concurrently (i.e., with a temporal overlap therealong) or sequentially (i.e., without any temporal overlap therebetween). Other configurational or operational characteristics of such a detection ring and fingerprint sensor are similar or identical to those of various directional input units of the fourth and fifth exemplary aspects and, therefore, are omitted herein.

9-2. Operating Type-3 Directional Input Unit

In another exemplary embodiment of this sixth exemplary aspect, a user may operate a directional input unit of this sixth exemplary aspect as well as a mobile communication terminal including the directional input unit while enjoying more seamless operations. A terminal manufacturer (or a user) may select in advance at least two operations which may be run when or (immediately) after a terminal powers on, wakes up, or switches modes. Thereafter, a manufacturer or a user may match each of multiple pre-selected operations with each of multiple $UI_{SEL}$'s, as explained above in conjunction with the matching list.

A user provides a single user input (or multiple concurrent user inputs) to a directional input unit while a terminal is in its powered-off state or in its off-state. In one example, a user may contact, touch, or press at least a portion of a directional input unit to provide a single user input (or multiple concurrent user inputs). With such contacting touching, or pressing, a user may deliver (user) sub-inputs to a tactile sensor or an authentication sensor, in addition to a directional element or its equivalent. A user may add one more feature to a user input to include $UI_{SEL}$ therein. Accordingly, when a user provides a single user input (or multiple concurrent user inputs), e.g., by moving at least one body portion (e.g., his or her finger) across at least a portion of a directional input unit in a certain direction, along a preset curvilinear path, or the like, a directional input unit may acquire $UI_{SEL}$ using a touch screen input unit (23H), may acquire $UI_{THEN}$ with a fingerprint sensor (23C), may directly acquire $UI_{ACT}$ with a tactile sensor, may acquire $UI_{SEL}$ with a touch screen layer (23H) or another portion of a directional input unit (22), or may acquire $UI_{SEL}$ indirectly from $UI_{ACT}$ or $UI_{THEN}$.

More particularly, when a user presses, contacts or touches a directional input unit (22), a tactile sensor (23D) may acquire $UI_{ACT}$ in various means. For example, a tactile sensor may monitor a contact or touch by a user from a change in electric capacitance of at least a portion of such an input unit (22), may measure a force or a pressure applied by a user to at least a portion of such an input unit (22) (e.g., its stationary touch screen layer), and may acquire $UI_{ACT}$ from the contact, force or pressure of the user input. In order to acquire $UI_{ACT}$, a tactile sensor may measure [1] a presence or absence of an application of such a force or pressure, [2] the force or pressure applied to a certain portion of a touch-ID element (23), [3] an average of such force or pressure applied thereto over a certain period of time or applied over a certain area of a tactile sensor, or [4] a static or dynamic feature related to such a force or pressure.

When a user presses, contacts, touches or otherwise manipulates a directional input unit (22), the input unit may acquire $UI_{THEN}$ in various means. For example, a fingerprint sensor (23C) may acquire $UI_{THEN}$ from a user input. Alternatively, such an input unit may employ an additional authentication sensor, and acquire one or more different authentication (user) sub-inputs therefrom.

A directional input unit (22) may instead receive a fingerprint or another authentication information and then acquire both of $UI_{THEN}$ and $UI_{SEL}$. In one example, after the input unit directly acquires $UI_{THEN}$ from a fingerprint or other authentication information, the input unit may monitor a position of a fingerprint (or another $UI_{THEN}$) on a fingerprint sensor or another authentication sensor) and may acquire $UI_{SEL}$ therefrom. In another example, the input unit may acquire $UI_{SEL}$ based on which finger a user presents to a fingerprint sensor. In other words, the input unit may acquire $UI_{SEL-1}$ when a user puts a thumb on the sensor, may acquire $UI_{SEL-2}$ when a user puts his or her index finger, or the like. In another example, the input unit may monitor a movement distance or a movement direction of a finger or another body part and acquire $UI_{SEL}$ therefrom. Details of such simplified arrangements have been described in terms of the simplified user inputs and, therefore, are omitted herein.

A touch screen layer (23H) or a touch-ID element (23) may monitor a movement or related static or dynamic features of the movement of at least one contacting user body part or at least one non-contacting user body part for acquiring $UI_{SEL}$. For example, a touch screen layer (23H) may sense a position of a contacting body part (such as, e.g., a finger) of a user on the layer (23H) to acquire a fingerprint or a different $UI_{SEL}$. A touch screen layer (23H) may instead monitor a displacement or a distance of travel of the displacement of the contacting body part across (or on) a touch screen layer (23H) for acquiring a fingerprint or a different $UI_{SEL}$. A touch screen layer (23H) or a touch-ID element (23) may be configured to be at least partially mobile with respect to the rest of a directional input unit.

When a user places a finger or another body part proximate to a directional input unit (22) while not touching or contacting the unit (22) at all, a fingerprint sensor (23C) or another authentication sensor may still acquire $UI_{THEN}$ or $UI_{SEL}$ by various means such as, e.g., by monitoring a position or a movement of a finger or a body part as described above, by acquiring an image of a finger or another body part captured by a terminal (e.g., a camera) at a distance, or by monitoring changes in electrical capacitance or resistivity as described above. A directional input unit may acquire $UI_{SEL}$ based upon $UI_{THEN}$ (or vice versa), may acquire $UI_{ACT}$ from $UI_{THEN}$ or $UI_{SEL}$ (or vice versa) or from another concurrent user input which may be received by the same directional input unit or another non-directional input unit.

That is, a directional input unit may receive a single user input (or multiple concurrent user inputs) and acquire $UI_{SEL}$ concurrently, along with at least one of other (user) sub-inputs such as, e.g., $UI_{ACT}$ or $UI_{THEN}$, and then generate at least two control signals based thereon. A terminal may then concurrently or sequentially run (or start to run) [1] a selecting operation to identify a pre-selected operation to run from a matching list upon or (immediately) after powering on, waking up, or switching modes, [2] an activation operation to turn on a display unit, [3] an authentication operation to authenticate a current user or optionally, [4] at least one selected operation which is selected after running a selection operation. Therefore, a direction input unit may receive a single user input (or multiple concurrent user inputs) and then concurrently acquire $UI_{SEL}$ and at least one of $UI_{ACT}$ and $UI_{THEN}$, whereas such a terminal may complete each of such operations concurrently or sequentially as described above.

9-3. Modifications or Variations of Type-3 Directional Input Units

In another exemplary embodiment of this sixth exemplary aspect, a directional input unit as well as a mobile communication terminal incorporating the directional input unit may be modified as follows. In one example, instead of employing a tactile sensor, a directional input unit may acquire $UI_{ACT}$ using other prior art sensors such as, e.g., a position sensor, a motion sensor, a proximity sensor, a gyroscopic sensor, or the like. That is, a directional input unit may acquire $UI_{ACT}$ from various movements of a non-contacting body part of a user, or a non-user object. A terminal may instead acquire $UI_{ACT}$ from a position, an elevation or an orientation of a non-contacting body part of a user, a non-user object, or the like. Therefore, a prior art position sensor may monitor a position of a contacting or non-contacting body part of a user, a position of a non-user object, or an orientation of such objects, and the register such as $UI_{ACT}$. A directional input unit may also screen a position or an orientation, and may only register those positions or orientations which meet a certain criteria (e.g., a position falls within a pre-selected area of the input unit). In another example, a conventional motion sensor or proximity sensor may monitor a presence of a user body part within a certain distance therefrom, monitor a presence or an absence of a body part of a user, monitor a movement of such a user body part, monitor a vector length of a path of such movement, or monitor a length along a curvilinear path of such a movement. In other words, a directional input unit may acquire $UI_{ACT}$ using a prior art tactile sensor or any other prior art sensors for monitoring such static or dynamic features which indicate an application of a user input or which indicate a need to turn on a display unit.

As briefly described above, a directional input unit of this sixth aspect may include a protective layer which is disposed above a touch screen layer for providing mechanical, electrical, magnetic or optical reinforcement thereto. A detection ring may also be modified or altered as described above or may be omitted therefrom. In particular, when a terminal may condition running an authentication operation upon turning on a display unit or upon running a selecting operation, a directional input unit may obviate a detecting ring, for acquiring an authentication (user) sub-input may then start to run once $UI_{SEL}$ or $UI_{ACT}$ is acquired, or once such turning on or selecting is performed (or starts to be performed). In addition, an overall shape, size, or layer configuration of a touch screen layer, a touch-ID element as well as those of a directional input unit may be modified or altered as well.

A directional element receives a single user input and concurrently acquires $UI_{SEL}$ and at least one of $UI_{THEN}$ and $UI_{ACT}$. When a user provides multiple concurrent $UI_{SEL}$'s, a directional element, with a touch screen layer, may acquire such multiple different $UI_{SEL}$'s in various ways which are similar to those of the type-1 and type-2 direction input units. A directional input unit may configure a certain area or side of a touch screen layer to be longer or wider than other areas or sides thereof for acquiring $UI_{SEL}$'s so that, similar to that of FIG. 10C, a user may more easily provide a certain $UI_{SEL}$ than other $UI_{SEL}$'s. Accordingly, a user may more conveniently provide a certain $UI_{SEL}$ which is matched or assigned to the most frequently-used pre-selected operation than the rest of $UI_{SEL}$'s which are matched or assigned to less frequently-used pre-selected operations. Contrary to such examples, not all but only a portion of a touch screen layer may receive a user input or acquire $UI_{SEL}$ and generate a control signal as well. A touch screen layer may also define a shape or a size which may be different from those of other portions of a touch-ID element.

A directional input unit may acquire $UI_{SEL}$ and locate which one of multiple pre-selected operations to run by employing multiple prior art [if . . . then] comparisons or a single [switch' statement] with a multi-way branch as described above. In addition, a directional input unit may concurrently acquire $UI_{SEL}$ and at least one of other (user) sub-inputs such as $UI_{THEN}$ or $UI_{ACT}$, and may run such selecting, such authenticating, or such turning on. However, a terminal may run such operations either concurrently or in various sequences so that, when a terminal employs an authentication operation, a terminal may run (or start to run) such selecting or turning on as described in conjunction with the type-1 and type-2 direction input units. In contrary, when a terminal does not employ an authentication operation, a terminal may run such selecting and turning on concurrently or sequentially, as described above. A terminal may employ multiple authentication operations, or may use alternative or supplemental authentication operations as described above. To the contrary, a directional input unit may be modified or altered to not employ any authentication operation.

A terminal may also configure a directional input unit to receive a simplified user input and to acquire one or multiple (user) sub-inputs therefrom. In one example, a terminal may receive a single user input (or multiple concurrent user input), and its directional input unit may acquire a $1^{st}$ number of (user) sub-inputs to run a $2^{nd}$ number of operations when or (immediately) after a terminal powers on, wakes up, or switches modes, where the $2^{nd}$ number is greater than the $1^{st}$ number, whereby a terminal still provides benefits of seamless operations to a user, whereby a manufacturer may fabricate a directional input unit at a lower cost or in a more compact shape or size. To this end, a terminal may configure a directional input unit to utilize static or dynamic features which may be inherent in a user input, or which may be added to a user input. A terminal may assign or match each of such multiple features of a (user) sub-input with each of such multiple features of another (user) sub-input, may assign or match each of such multiple features of a (user) sub-input with each of multiple hardware features of such an input unit, or the like. Therefore, various example exemplified in conjunction with the "simplified user inputs" may be applied to this directional input unit of this sixth aspect.

9-4. Interchangeability

Although various embodiments or examples of this sixth exemplary aspect of this disclosure relate to various directional input units of a mobile communication terminal, it is appreciated that all of such embodiments or examples equally apply to other mobile communication terminals each of which includes a similar directional input unit or which includes at least one input unit which operates like such directional input units and which is therefore capable of acquiring selecting (user) sub-inputs ($UI_{SEL}$). Thus, such embodiments or examples of this sixth exemplary aspect may equally apply to any input unit which acquires $UI_{SEL}$ alone or in concurrency with at least one another (user) sub-inputs such as $UI_{ACT}$ and $UI_{THEN}$.

Configurational or operational variations (or modifications) of such directional input units described in various embodiments or examples of this sixth exemplary aspect may be interchangeable in such a way that certain features of one embodiment or one example of this sixth aspect may be applied to another embodiment or example of the same aspect. Other configurational or operational features of various directional input units of this sixth exemplary aspect and their variations or modifications may [1] apply to, [2] be incorporated into, [3] be replaced by, [4] replace, or [5] be combined with corresponding features of another exemplary aspect, embodiment or example of this disclosure which have been described heretofore or which will be described hereinafter, subject to a certain modification, addition, and/or omission, each of which may become apparent based on detailed context of this sixth exemplary aspect or other exemplary aspects of this disclosure.

10. Notifying Selected Operations

In the seventh exemplary aspect of the disclosure, a mobile communication terminal may incorporate at least one "notice unit" which informs a user of various information related to selecting at least one operation to run when or (immediately) after a terminal powers on, wakes up, or switches modes. For example, a terminal may provide a user with information which is related to [1] which one of multiple pre-selected operations a terminal is to run once (or after) powering on, waking up, or switching modes, [2] which one of multiple selecting (user) sub-inputs ($UI_{SEL}$'s) a user is providing (or has provided) to a directional input unit, [3] which one of multiple $UI_{SEL}$'s a directional input unit is receiving (or has received), or the like. The notice unit may be configured to inform a user (or a terminal) of such information in various means such as, e.g., by generating [1] "visual notice signals," [2] "audible notice signals," [3] "tactile notice signals" or a combination thereof.

10-1. Notice Units and Notice Signals—Visual

Such notice units and various notice signals offered thereby may be beneficial to a user. For example, when a user provides a wrong or incorrect $UI_{SEL}$, a terminal may power on or wake up and run an operation which in fact is not an operation which a user has actually intended to run. In addition, a terminal may switch to a new mode which a user has not intended. Such incorrect $UI_{SEL}$ may not only cause an inconvenience on the part of a user but also mandate a user to take actions to provide a correct $UI_{SEL}$ to a directional input unit, usually through an additional, non-concurrent user input. In this respect, a notice unit may offer the benefit to a user [1] by informing a user which $UI_{SEL}$ a user is providing (or has provided), [2] by informing a user which one of multiple pre-selected operation is to be run once (or after) a terminal powers on, wakes up, or switches modes and by giving a user another chance of confirming which $UI_{SEL}$ a user is providing (or has provided), [3] by even giving a user a chance of rectifying an error or providing a correct $UI_{SEL}$, or the like. As a result, a terminal still provides a user with more convenient seamless operations, improves an accuracy of operations, provides a user with an opportunity to correct a wrong $UI_{SEL}$ or an incorrect $UI_{SEL}$, and to take a remedial action, or the like.

In one exemplary embodiment of this seventh exemplary aspect, a notice unit may notify a user, with various visual, audible or tactile notice signals, [1] which one of multiple $UI_{SEL}$'s a user has provided (or is providing) to a directional input unit, [2] what additional (user) sub-inputs a user is providing (or has provided) to the input unit or another non-directional input unit, [3] how many concurrent user inputs are provided (or have been provided) by a user to provide such $UI_{SEL}$, [4] how many (user) sub-inputs are (or have been) provided by a user along with such $UI_{SEL}$, [5] what (user) sub-inputs are (or have been) provided concurrently with $UI_{SEL}$, [6] which one of multiple pre-selected operations a terminal is going to run based on such $UI_{SEL}$ once powering on, waking up, or switching modes, or the like. A notice unit may issue such visual, audible or tactile notice signals in one of various "noticing timings" as, e.g., (immediately) before, concurrently with, (immediately) after, or within a certain period of time after [1] such turning on, [2] such authenticating, [3] such selecting, or the like. Therefore, a user may confirm which $UI_{SEL}$ he or she is providing and may rectify any error in case he or she made one.

In another exemplary embodiment of this seventh exemplary aspect, a notice unit may take remedial actions in case a user commits a mistake in supplying a correct $UI_{SEL}$ to a directional input unit (or another input unit which may or may not be directional). For example, once acquiring $UI_{SEL}$, a notice unit may request a user to confirm an acquired $UI_{SEL}$ and, when a user does not reply, presume the acquired $UI_{SEL}$ is a correct $UI_{SEL}$. In case a user makes a correction or provides a new $UI_{SEL}$, a notice unit may update $UI_{SEL}$, optionally confirm a newly acquired $UI_{SEL}$ once again or just go ahead by presuming a newly acquired $UI_{SEL}$ to be a correct $UI_{SEL}$. In another example, a directional input unit may acquire $UI_{SEL}$ and deliver $UI_{SEL}$ (with or without confirmation from a user) to a terminal, but a terminal may not be able to locate or select any matching operation from the matching list (e.g., an acquired $UI_{SEL}$ may not be included in the matching list or may not be matched with any of multiple pre-selected operations). In this case, a notice unit may start the above confirmation procedure and may require a user to provide a new $UI_{SEL}$. Alternatively, even if a terminal may not locate or select a matching operation from the matching list, a notice unit may still identify one of such multiple pre-selected operations to be a presumably correct operation based on other criteria such as, e.g., identifying an operation of which $UI_{SEL}$ is most similar to an acquired $UI_{SEL}$, selecting an operation which is most frequently used by a user over a certain period, or locating an operation which a user has run in the previous session, or the like. When a selecting operation is conditioned upon another operation such as, e.g., an authentication operation, a terminal may presume an incorrect entry of $UI_{SEL}$ by a user as a failure of user authenticating and may perform one of various steps as described above.

As is the case of incorrect entry of $UI_{SEL}$ as explained in the above paragraph, a user may similarly supply an incorrect $UI_{ACT}$ or an incorrect $UI_{THEN}$ to a directional input unit or another non-directional input unit. In this case, a terminal may simply not turn on its display unit or not authenticate a current user. However, when a directional input unit or another input unit is configured to receive one (or more) of multiple $UI_{ACT}$'s or multiple $UI_{THEN}$'s in order to [1] manipulate such lighting features, [2] manipulate a proper access authority granted to a current user, or [3] acquire $UI_{SEL}$ from one of such multiple $UI_{ACT}$'s or $UI_{THEN}$'s, a terminal may repeat those procedures in the preceding paragraph as well.

In another exemplary embodiment of the seventh exemplary aspect, a notice unit informs a user by providing him or her with various visual notice signals and by informing which one of multiple pre-selected operations a user has requested (or is requesting) to run while or (immediately) after a terminal powers on, wakes up, or switches modes, which one of multiple $UI_{SEL}$'s he or she has entered (or is entering). To this end, a notice unit may display a visual notice signal directly thereon or a terminal may instead recruit a display unit as a notice unit and display the visual notice signals thereon. In other words, a notice unit may include a display panel to display an image or a notice unit may include at least one LED or other lighting elements to emit visible light rays, if not displaying an image.

In one example, a notice (or display) unit may display at least one GUI or icon which represents a certain $UI_{SEL}$ or a certain pre-selected operation matching such $UI_{SEL}$. This notice (or display) unit may display words (such as, e.g., words, texts or sentences) representing a certain $UI_{SEL}$ or a certain pre-selected operation. In another example, a notice unit or a display unit may display at least one screen thereon or may emit light rays therefrom, where such a screen or such light rays may include a certain "visual feature" (either static or dynamic) which represents a certain $UI_{SEL}$ or a certain operation to be selected after completing to run such a selecting operation, where examples of such features may include, but not limited to, a position, a shape, a size, a pattern, an orientation, an arrangement, a brightness, a color, a hue, or a combination thereof. With visual aids from such visual features, a user may confirm which $UI_{SEL}$ he or she has provided to a directional input unit or which one of multiple pre-selected operations a terminal is going to run when or (immediately) after a terminal powers on, wakes up, or switches modes.

In another example, a notice unit may be directly incorporated into at least a portion of a touch screen or, in the alternative, a touch screen may be utilized as a notice unit. FIG. 13A shows a schematic view of a touch screen which serves as a notice unit as well. As depicted in the figure, a terminal uses its touch screen-type display unit in order to request a user to confirm whether an acquired $UI_{SEL}$ (i.e., $UI_{SEL}$ acquired from a single user input or multiple concurrent user inputs) corresponds to or matches an e-mail operation or whether a user desires a terminal to run an e-mail operation when or (immediately) after it powers on, wakes up, or switches modes.

A terminal may recruit an entire portion of a touch screen as a notice unit or only a portion thereof as the notice unit. A terminal may optionally blink the word "e-mail,' may use a special color for such a word, may change a size or a position of such a word for a preset period of time or until receiving a user confirmation, or the like. A terminal may further recruit different areas of a touch screen as a notice unit which may inform a user of additional $UI_{SEL}$'s or different pre-selected operations to run after powering on, waking up, or switching modes. Therefore, a notice unit may always display "EMAILS?" in a middle lower portion of a touch screen, while displaying "LOAD CAMERA?" in an upper left corner thereof, or while displaying "SURE TO SWITCH TO A LOCK MODE?" across an entire portion of the touch screen. A touch screen may also display words or sentences to inform a user of what other (user) sub-inputs a user is providing (or has provided), what other operations a terminal will run (or is to run), or the like.

In another exemplary embodiment of this seventh exemplary aspect, a notice unit may include therein one or multiple prior art LEDs or other lighting elements. FIG. 13B shows a schematic view of a notice unit including three LEDs implemented in a vertical arrangement along a right edge of a terminal. This notice unit may turn on or off such LEDs (54A) in a preset pattern for informing a user of different $UI_{SEL}$'s or different operations to run when or (immediately) a terminal powers on, wakes up, or switches modes. Accordingly, the notice unit (54A) allows a user to confirm which one of multiple $UI_{SEL}$'s a user is providing (or has provided) to a directional input unit, which one of multiple pre-selected operations a terminal is to run upon powering on, waking up, or switching modes.

Similar to that of FIG. 13A, a notice unit (54A) may change a pattern or a sequence of turning on such LEDs to inform a user of different $UI_{SEL}$'s. Therefore, a notice unit may turn on different LEDs with different colors or brightness for different periods of time for each of multiple $UI_{SEL}$'s or pre-selected operations. A notice unit may turn on such LEDs in different sequences for each $UI_{SEL}$ or pre-selected operation. When desirable, a notice unit may include a single LED turning on and off, blinking on and off with or without a temporal gap, changing its color, or otherwise control different visual features, so that even a single LED may generate different, unique notices to a user. Of course a notice unit may perform the same using multiple LEDs.

A notice unit may include such LEDs in almost any location on or around a terminal as long as a user easily watches such LEDs. A terminal may include multiple LEDs which may have the same or different shapes or sizes, which may emit lights of the same or different colors, hues or intensities, which may blink, or the like, in order to provide multiple different or unique visual notice signals to a user. A terminal may further employ other prior art light-emitting elements to provide such visual notices to a user. When desirable, a terminal may inform a user not only through such visual notice signals but also audible or tactile notice signals as will be explained below.

In another exemplary embodiment of this seventh exemplary aspect, a notice unit may rather include at least one sub-screen which may function as a supplemental display unit (e.g., by displaying therein an image or a text) or as an assembly of LEDs or other lighting elements. FIG. 13C shows a schematic view of a notice unit including a sub-screen (54B) may turn on or off, may blink (with or without a temporal gap), may change its color, may display words, sentences or images thereon, or the like. Accordingly, operational characteristics of such LEDs in FIG. 13C are similar or identical to those of a notice unit (54A) of FIG. 13B. Similar to that of FIG. 13A, a sub-screen (54B) may also display a text as to which one of multiple $UI_{SEL}$'s a user is providing (or has provided), which one of multiple pre-selected operations is to be run (or is run) by a terminal in one of such timings, or the like. Accordingly, a notice unit of this kind may provide more detailed notice signals to a user.

A notice unit (54B) may incorporate various sub-screens which correspond to variations of that of FIG. 13C. For example, a terminal may incorporate any desired number of such notice units with sub-screens in almost any location, as long as a user may easily see such. In addition, a terminal may apply such features of LEDs of FIG. 13B to such a sub-screen so that a sub-screen may turn on and off in a preset pattern, may blink with or without any temporal gap, may change its color, or may manipulate other different visual features thereof. A notice unit may also include any other prior art display elements as a sub-screen to provide various visual notice signals to a user, including texts and any images which a user may see fit.

In another exemplary embodiment of this seventh exemplary aspect, another notice unit may include at least one sub-screen which may similarly function as that shown in FIG. 13C (e.g., as a supplemental display unit or as an assembly of multiple LEDs or other lighting elements) but which substantially encircles a directional input unit. FIG. 13D depicts a schematic view of a notice unit including four sub-screens (54C) encircling an entire periphery of a directional input unit (22) therein. Each sub-screen of the notice unit (54C) [1] may similarly turn on or off, [2] may blink (with or without a temporal gap), [3] may change its color, or [4] may function similar to those of the notice units of FIG. 13B or 13C. The notice unit may include any number of sub-screens each defining the same or different shapes or sizes, may display an image or a text, or may just emit visual light rays while changing various visual features, or the like.

It is appreciated in each of the above examples that a notice unit may provide a user with such visual notice signals in real time so that a user may readily confirm which one of multiple $UI_{SEL}$'s a user is providing in real time immediately after he or she manipulates a directional input unit and provides $UI_{SEL}$. In addition, a notice unit may generate a new visual notice signal as a user provides a new $UI_{SEL}$. For example, a user may move a movable portion of a directional input unit toward a third quadrant while intending to provide $UI_{SEL-I}$ so that a terminal runs an operation of advancing to a unlock mode when or (immediately) after it powers on, wakes up, or switches modes. Upon acquiring $UI_{SEL-I}$, a terminal informs a user using its notice unit that it acquired $UI_{SEL-A}$.

When a user confirms that the acquired $UI_{SEL-A}$ IS $UI_{SEL-1}$ which is what he or she intended, a user provides a confirmation signal to a terminal which may thereafter run the intended operation when or (immediately) after powering on, waking up, or switching modes. Or a terminal may proceed to run the intended operation when a user does not provide a new $UI_{SEL}$ within a preset period. When a user finds out that an acquired $UI_{SEL-A}$ does not match his or her intended $UI_{SEL-I}$, a terminal may allow a user to take a remedial action such as, e.g., providing a correct $UI_{SEL-1}$ once again. A terminal may repeat the above steps before running the intended operation when or (immediately) after it powers on, wakes up, or switches modes.

It is also appreciated in each of the above examples that a notice unit may not only provide a user with such visual notice signals but also inform a user of a new visual notice signal in real time when a user corrects an old $UI_{SEL}$ with a new $UI_{SEL}$ seamlessly. In one example, a user moves a movable portion of a directional input unit toward a $2^{nd}$ quadrant while intending to provide $UI_{SEL-2}$ such that a terminal runs a navigation operation when or (immediately) after it powers on, wakes up, or switches modes. In response thereto, a terminal informs a user with its notice unit that it just acquired $UI_{SEL-A}$. Upon confirming that the acquired $UI_{SEL-A}$ is what he or she intended, a user provides a confirmation signal to a terminal which then runs the intended operation after powering on, waking up, or switching modes. A terminal may instead proceed to run the intended operation if a user does not provide a new $UI_{SEL}$ within a preset period of time. As a user finds out that $UI_{SEL-A}$ which is acquired by a directional input unit does not match $UI_{SEL-2}$ intended by a user, he or she may provide $UI_{SEL-2}$ again while continuing to hold or otherwise manipulate a movable portion of a directional input unit with the same or different body part. A terminal may then inform a user with a newly acquired $UI_{SEL}$ and a user may confirm $UI_{SEL}$ or may provide an additional correction. This arrangement provides a user with more convenient seamless operations, for a user can see which $UI_{SEL}$ he or she is providing to a directional input unit in real time.

10-2. Notice Units and Notice Signals—Audible

In another exemplary embodiment of this seventh exemplary aspect, a notice unit may provide audible notice signals using, e.g., at least one speaker of an output member of a terminal or at least one additional speaker. A notice unit may generate various audible sounds such as, e.g., [1] sounds which represent a certain $UI_{SEL}$ according to a pre-determined 1-to-1 or m-to-n matching between each of multiple different $UI_{SEL}$'s and each of multiple sounds, [2] sounds which represent each of multiple pre-selected operations which a terminal is to run when or (immediately) after it powers on, wakes up, or switches modes, [3] oral instructions representing one of multiple $UI_{SEL}$'s which a user has provided (or is providing), [4] oral instructions which tell a user which one of multiple pre-selected operation a terminal will (is to) run in one of such timings of the above [2], or [5] a combination of the above. By delivering the audible notice signals, a user may ascertain which $UI_{SEL}$ has been provided, which one of multiple pre-selected operations a user has selected, or the like. When feasible, a terminal may include a voice control mode which allows a user to cancel a wrong $UI_{SEL}$ and to provide a correct $UI_{SEL}$ to a directional input unit via sound signals or various other user inputs.

Similar to those visual notice units of FIGS. 13A to 13D (i.e., those notice units capable of generating various visual notice signals), an audible notice unit capable of generating various and unique audible notice signals may manipulate a certain static or dynamic "audible feature" of the audible signals so as to generate multiple, different audible notice signals. For example, a notice unit may manipulate a loudness of an audible signal, a tone of the signal, a length thereof, or other features related to a shape of a waveform of the audible signal. Accordingly, a notice unit may include an equalizer to manipulate a frequency distribution of such a signal, a shape of a waveform (e.g., a musical instrumental sound, a metallic sound, a smooth sound, a coarse sound, or the like.

A terminal may include various hardware elements to generate the audible notice signals, e.g., by recruiting its own speaker of an output member, by incorporating an additional speaker only for generating the audible notice signals, or the like, where the additional speaker may be a speaker which may be simpler, smaller or cheaper than the speaker of an output member, or where an additional speaker may only generate beeps. In one case, a notice unit may generate a single beep of different tones, durations, loudness or other features related to a shape of the waveforms of the beeps as described above.

In another case, a notice unit may generate a train of beeps while varying various features of the train of beeps to inform a user of which mode he or she is in. In another case, a terminal may change a number of beeps included in a single train, an interval between such beeps in the train of beeps, an interval between two trains, a duration of each beep in a train or each train, a ratio of various features of the beep (e.g., a ratio of loudness of adjacent beeps, a ration of durations of adjacent beeps, or the like).

10-3. Notice Units and Notice Signals—Tactile

In another exemplary embodiment of this seventh exemplary aspect, a notice unit may provide tactile notice signals using, e.g., at least one vibrator of an output member of a terminal or at least one additional vibrator. A notice unit may generate various tactile notice signals such as, e.g., [1] vibrations denoting a certain $UI_{SEL}$ based on a matching between each of multiple different vibrations with each of multiple $UI_{SEL}$'s, [2] vibrations representing a certain preselected operation which a terminal is to run (or will run) after powering on, waking up, or switching modes, or the like. With such tactile notice signals, a user may confirm which $UI_{SEL}$ he or she is providing (or has provided), which one of multiple pre-selected operations a user has commanded (or is commanding) a terminal to run when or (immediately) after the terminal powers on, wakes up, or switches modes. When feasible, a terminal may allow a user to cancel wrong or incorrect $UI_{SEL}$ and to provide new $UI_{SEL}$ or other (user) sub-inputs to a directional input unit, e.g., by informing a user with various tactile signals. A notice unit may generate various tactile notice signals as far as a user can feel and tell differences among such different tactile notice signals. Therefore, a notice unit may generate continuous tactile signals, may insert a temporal gap therealong, may change amplitudes or frequencies of such tactile signals, or may change types of such signals.

Similar to various visual and audible notice units, a tactile notice unit for generating the tactile notice signals may manipulate a certain "tactile feature" (either static or dynamic) of such tactile notice signals to generate multiple tactile notice signals. For example, a notice unit may manipulate an amplitude (or a magnitude) of a tactile signal, a length of the signal, other static or dynamic features related to a shape of a waveform of the tactile signal, or the like. Thereby, a tactile notice unit may generate various tactile notice signals such as, e.g., vibrations, oscillations or rotations, for informing a user of each of multiple $UI_{SEL}$'s. A tactile notice unit may also generate a pulse train of multiple tactile notice signals and manipulate, e.g., a number of the tactile signals in a single train, a number of temporal gaps in a single train, a duration of a single train, a duration of each of multiple trains, or the like.

A terminal may include various electromechanical notice units for generating such vibrations or other tactile notice signals. For example, a terminal may use its own vibrator of an output member to generate the tactile notice signals. Alternatively, a terminal may include an additional vibrator which may be simpler, cheaper or smaller than the vibrator of the output member, where the additional vibrator may be incorporated to any location of a terminal as long as a user may feel such vibrations while holding a terminal with a hand or placing the terminal nearby.

It is appreciated that various notice units do not have to be implemented into a terminal and that such visual, audible or tactile notice signals do not have to be generated by a display unit, a speaker or a vibrator each of which is included in an output member of a terminal. In other words, a terminal may recruit external devices (i.e., those implemented not inside a terminal but external thereto) to generate such visual, audible or tactile notice signals and then to deliver the notice signals to a user. In one case, a terminal may recruit a wearable device worn by a user so that, when a terminal sends a control signal to the wearable device, such a device generates corresponding visual, audible or tactile notice signals and delivers such signals to a user, where examples of such wearable devices may include, but not limited to, a watch, a glove, a wrist or arm band, a ring, a goggle, a pair of glasses, a helmet, a hat, a belt, a necklace, a bracelet, an earring, a nail, a shoe, and any other devices portably worn by a user.

10-4. Notice Units for Other Purposes

In another exemplary embodiment of this seventh exemplary aspect, a notice unit may provide a user with a warning or a confirmation whether or not a terminal has received a proper user input, or whether or not such a terminal has acquired a proper (user) sub-input or a proper set of multiple (user) sub-inputs. To this end, a notice unit may use any of the above visual, audible or tactile notice signals.

In one example, a notice unit may provide a user with one of the above visual, audible or tactile notice signal such that a user can confirm whether or not he or she has provided a proper user input. Accordingly, when a terminal receives a proper user input, the terminal may proceed to a next step of operation or provide one of such signals to a user. When a terminal fails to receive a proper user input, however, a terminal may provide a warning signal to a user, where such a warning signal may be visual, audible or tactile.

Alternatively, a terminal may use a notice unit or a display unit which has received a user input as a notice unit. In response thereto, a user may confirm that he or she has provided the user input which he or she intended. When the user identifies any error in the user input, he or she may then rectify the error by correcting the wrong user input or may provide another user input anew.

In another example, a notice unit may provide a user with one of such visual, audible or tactile notice signals so that a user can confirm whether or not the user has provided a proper (user) sub-input. Accordingly, when a terminal acquires a proper (user) sub-input, the terminal may proceed to a next step of operation or provide one of such signals to a user. A terminal may use a notice unit or a display unit which has received a (user) sub-input as a notice unit. In response thereto, a user may confirm that he or she has provided the (user) sub-input which he or she intended. When the user identifies an error in the (user) sub-input, he or she may rectify the error by correcting the wrong (user) sub-input or may provide another (user) sub-input anew.

When a terminal fails to acquire a proper (user) sub-input, however, a terminal may provide a warning signal to a user, where such a warning signal may be visual, audible or tactile. More particularly, when a terminal expects to acquire a certain number of (user) sub-inputs but fails to acquire one of such (user) input-signals, a terminal may notify a user which (user) sub-input a terminal has not received or the terminal has not been able to recognize. In response thereto, he or she may correct the wrong (user) sub-input or may provide another (user) sub-input anew.

10-5. Interchangeability

Although the foregoing embodiments or examples of this seventh exemplary aspect relate to various notice units used in conjunction with various directional input units of a mobile communication terminal in general, it is appreciated that all of such embodiments or examples of this seventh aspect may equally apply to another mobile communication terminal which incorporates at least one of such directional input units or at least one non-directional input unit which operates like such directional input units and, therefore, capable of acquiring $UI_{SEL}$ and at least one another (user) sub-input concurrently as described above. Therefore, such embodiments or examples of this seventh exemplary aspect equally apply to any directional or non-directional input unit of a terminal capable of acquiring $UI_{SEL}$ alone or in concurrency with at least one another (user) sub-input such as $UI_{ACT}$ and $UI_{THEN}$, or any other input unit which acquires at least one (user) sub-inputs such as $UI_{ACT}$ and $UI_{THEN}$ but does not acquire $UI_{SEL}$.

Configurational or operational variations (or modifications) of such notice units described in such exemplary embodiments or examples of this seventh exemplary aspect may be interchangeable so that certain features of one embodiment or example of this seventh aspect may be applied to other embodiments or examples of the same aspect. Other configurational or operational features of such notice units of this seventh exemplary aspect and various variations or modifications thereof may [1] apply to, [2] be incorporated into, [3] replace, [4] be replaced by, or [5] be combined with related features of another exemplary aspect, embodiment or example of this disclosure which have been described heretofore or will be described hereinafter, subject to certain modifications, additions, or omissions, each of which may be apparent based on detailed context of this seventh exemplary aspect or other exemplary aspects of this disclosure.

11. Alternatives or Further Details of Directional Input Units

Various directional input units and a mobile communication terminal incorporating the directional input units acquire $UI_{SEL}$ from at least one movement of at least one movable portion of the directional input unit. As a result, a user may cause the movement by directly, e.g., pressing, pushing, pulling, pivoting, rotating, sliding, or deforming the movable portion of the directional input unit. Alternatively, a user may cause such a movement by directly or indirectly applying mechanical, electrical, or magnetic energy to the movable portion of such an input unit.

11-1. Acquiring Selecting (User) Sub-Inputs

In one exemplary embodiment of this eighth exemplary aspect, a directional input unit may acquire at least one $UI_{SEL}$ [1] directly from a movement, [2] indirectly from a movement, i.e., indirectly from at least one static or dynamic feature of such a movement, or the like. A directional input unit generates at least one control signal which corresponds to an acquired $UI_{SEL}$ and sends the control signal to a terminal. In response thereto, a terminal runs a "selecting operation" for selecting or identifying at least one pre-selected operation from the matching list (i.e., matching each of multiple $UI_{SEL}$'s to each of multiple pre-selected operations based upon a 1-to-1 matching, m-to-1 matching, 1-to-n matching or m-to-n matching) in various "timings" such as, e.g., [1] concurrently with or (immediately) after the movement, [2] concurrently with or (immediately) after receiving a single user input (or multiple concurrent user inputs), [3] concurrently with or (immediately) after acquiring $UI_{SEL}$ from a single user input (or multiple concurrent user inputs), or [4] concurrently with or (immediately) after sending a control signal to a terminal.

In the eighth exemplary aspect of this disclosure, directional input units and mobile communication terminals incorporating such input units may be fabricated in different configurations, may operate in different orders or sequences, or may include different hardware or software elements.

More particularly, a directional input unit may acquire $UI_{SEL}$ or generate a control signal based upon various static or dynamic features of the movement, where examples of such features may include, but not limited to, [1] a direction of the movement, [2] a velocity or an acceleration thereof, [3] a pattern or a sequence thereof, [4] a position before or after the movement, [5] a displacement caused by the movement, or [6] other static or dynamic features.

A directional input unit may instead acquire $UI_{SEL}$ or generate a control signal based on movements of such movable portions of a directional unit. For example, a directional input unit may acquire $UI_{SEL}$ from opening or closing of electrical contacts to break or form at least one electrical connection, from opening or closing of optical contacts for breaking or forming at least one optical connection, from opening or closing of magnetic contacts to break or form at least one magnetic connection, or the like. In addition, a directional input unit may also acquire $UI_{SEL}$ from changing electrical, optical or magnetic properties of each of such contacts.

Conversely, a manufacturer of a terminal or a directional input unit may determine how a user manipulates a movable portion of a directional input unit for providing a certain UI$_{SEL}$. Based thereon, a directional input unit may be configured to operate according to a certain mechanism so that a user may manipulate a direction of a movement of at least one movable portion of a directional input unit, a velocity or an acceleration thereof, a pattern or a sequence thereof, a displacement caused thereby, a position before or after such a movement, or other static or dynamic features of the movement. Following descriptions provide detailed embodiments or examples of several representative movements, e.g., translating, pivoting, rotating, or the like.

11-2. Acquiring Selecting (User) Sub-Inputs from Translating Movements

In another exemplary embodiment of this eighth exemplary aspect, a directional input unit may acquire UI$_{SEL}$ by various translating movements caused by a user. Examples of such translating movements may include, but not limited to, [1] a translating movement of at least one movable portion of a directional input unit which is caused by a body part of a user (or a non-user object), [2] a translating movement of a user body part (or a non-user object) with respect to at least one stationary portion of a directional input unit, [3] the translating movement of the above [1] or [2], where the movement changes at least one of its static or dynamic features during such a movement while maintaining (or continuing) a contact between such a portion of a directional input unit and a user body part (or a non-user object), or [4] a translating movement of at least one body part of a user (or at least one non-user object) while the user or non-user object does not contact any directional input unit, or the like. Although following descriptions relate to such translating movements of the movable portion of a directional input unit, following descriptions readily applies to other translating movements which are different from those of the above [2] to [4].

FIG. 14A is a schematic view of a directional input unit which is encircled by an exemplary notice unit of FIG. 13D. As shown in the figure, a notice unit includes four sub-screens (54C) disposed in a north-west quadrant, a south-west quadrant, a north-east quadrant, and a south-east quadrant, and also indicates that each of the quadrants may be assigned to (or match with) each of four pre-selected operations such as, e.g., Operations A, B, C, and D.

When a user applies a user input to a movable portion (23) of a directional input unit in a horizontal direction or when a user applies a user input at an angle (or in a transverse direction) in order to guarantee that a user input force includes a non-zero vertical component, a movable portion (23) begins to translate, e.g., toward a south-west quadrant as described by an arrow shown in the figure. By contacting or pushing (or continuing to contact or push) the movable portion (23), a user may slide, displace, translate, push or otherwise move the movable portion (23) with a user body part (or a non-user object) in a certain direction, e.g., approaching a south-west quadrant in a south-west direction, over a certain distance. Once a user completes to cause such a translating movement, he or she may detach a user body part (or a non-user object) therefrom, whereby a user may provide a directional input unit with a single translating user input which includes UI$_{SEL}$ therein and one or multiple other (user) sub-inputs of his or her choice.

Because a translating movement involves a translation of a movable portion of a directional input unit along a lateral direction, a user needs to push, slide or otherwise translate the portion of the directional input unit while a user continues to contact such a portion. Accordingly, the translating movement is usually completed when a user detaches his or her body part from such a portion of the directional input unit. However, a user does not have to rotate such a portion and does not necessarily have to press such a portion for providing a user input causing the translating movement. Accordingly, a movement path of a translating movement may be straight or curvilinear or may lie in a 2-D area or in a 3-D space. It is appreciated that a directional input unit may be configured that, as a user applies a translating user input, a movable portion may start to move and then continue to move even after a user detaches his or her body part therefrom to some extents. In this case, the translating movement may be completed within a certain period of time after a user detaches his or her body part therefrom.

As a directional input unit receives a user input which causes a translating movement of its movable portion or which accompanies a translating movement of at least one user body part (or non-user object) on or over a surface of a movable or stationary portion of a directional input unit, such an input unit may acquire UI$_{SEL}$ directly from the translating movement, indirectly from a static or dynamic feature of such a movement, or the like. Therefore, a directional input unit may sense a position or a movement of a movable portion of such an input unit, a user body part, or a non-user object thereon (or thereover) from, e.g., mechanical, electrical, magnetic or optical properties of a movable portion of a directional input unit, a user body part or a non-user object or changes in such properties as described above. Based thereon, a directional input unit generates at least one control signal corresponding to UI$_{SEL}$ by, e.g., forming an electrical connection by contacting a pair of abutting electrical contacts provided to a press (or touch)-ID element and to a directional element of such an input unit. A terminal then receives the control signal denoting UI$_{SEL}$ and runs at least one selected operation which matches the control signal (or UI$_{SEL}$) from the matching list.

It is appreciated that such directional input units exemplified in FIGS. 10A to 10E and FIGS. 11A and 11B are capable of receiving various translating user inputs which translate a movable portion of such an input unit. In addition, the directional input unit exemplified in FIG. 12 is capable of receiving a user input corresponding to a movement of a user body part with respect to such an input unit. It is appreciated that such a directional input unit for receiving a translating user input may also receive other user inputs or may acquire other (user) sub-inputs different from UI$_{SEL}$, depending upon its configuration or operating mechanisms.

It is appreciated that a translating movement of a movable portion of a directional input unit or of a user body part is substantially in a direction which is transverse (even if not exactly 90° thereto) to a vertical axis of the input unit. In this context, a translating movement generally includes any movements in any lateral (i.e., non-vertical) direction. A translating movement may be obtained due to various reasons such as when, e.g., [1] a user applies a user input force in at least a substantially lateral direction, [2] a directional input unit guides its movable portion in at least a substantially lateral direction, [3] a contour of a surface of a directional input unit extends in a lateral direction so that a user body part which moves along the contour of such a surface also moves in at least a substantially lateral direction, or [4] when a user input force applied to a directional input unit at an angle includes at least some lateral (or horizontal) force component, regardless of a magnitude of a vertical force component thereof.

The above descriptions of this exemplary embodiment may also apply to various directional input units which receive a user input from a translating movement of at least one user body part with respect to a directional input unit or that of at least one non-user object with respect thereto, e.g., those translating movements of [2] to [4] in the preceding paragraph. It is appreciated, however, that a directional input unit capable of receiving a translating user input from [3] of the above paragraph does not typically include any movable portion but that another directional input unit for receiving a translating user input of [4] of the above paragraph may or may not include a movable portion. When various descriptions of this exemplary embodiment are applied to a directional input unit capable of receiving a translating user input of [4] of the above paragraph, a user may provide such a translating user input at a distance from a directional input unit. Accordingly, a terminal may receive such a user input by recruiting a camera to take an image of a user body part or non-user object, a microphone to acquire sounds or other hardware elements capable of obtaining such translating user inputs of a user body part or a non-user object.

11-3. Acquiring Selecting (User) Sub-Inputs from Pivoting Movements

In another exemplary embodiment of this eighth exemplary aspect, a directional input unit may acquire $UI_{SEL}$ from various pivoting movements caused by a user. Examples of such pivoting movements may include, but not limited to, a pivoting movement of [1] at least one movable portion of such an input unit about a center of pivoting (i.e., a pivoting center), [2] at least one user body part with respect to a directional input unit along a pivoting path while he or she continues to contact or to press at least a portion of a directional input unit, [3] at least one non-user object held by a user with respect to a directional input unit along a pivoting path while the non-user object continues to contact or to press at least a portion of a directional input unit, or [4] at least one body part of a user or at least one non-user object while the user or the object generates such a pivoting movement at a certain distance from a directional input unit while not contacting any portion of such an input unit. Although following descriptions relate to the pivoting movements of the movable portion of a directional input unit, following descriptions may be applied to different pivoting movements of the above [2] through [4] of this paragraph.

A user may cause a pivoting movement of at least one movable portion of a directional input unit when he or she pivots a movable portion about a pivoting center while continuing to contact and to push such a movable portion. In other words, a user may push, pull or otherwise move the movable portion about the pivot center by contacting it with at least one body part and continue to do so along a direction of his or her choice. Once, a user detaches his or her body part and, thereby, a user provides a single pivoting user input to a directional input unit, while accompanying therewith one or multiple (user) sub-inputs. To this end, a movable portion of a directional input unit generally includes a handle or a protruding part either of which extends outwardly from the input unit and is shaped and sized to be grabbed by a user. In addition, either of the handle or part is coupled to a pivot center so that a user may [1] protract or retract the handle or portion, [2] rotate or twist the handle or portion, [3] extend or adduct the handle or portion, or [4] abduct or flex the handle or portion. A prior art joystick is a typical example of this directional input unit.

In general, a path of a pivoting movement is curvilinear or lies in a 3-D spherical coordinate. It is appreciated that a directional input unit may be configured to allow a movable portion to start to move and to continue to move even after a user detaches a body part from such a portion. In this case, a pivoting movement may be deemed to be completed within a certain period of time after a user detaches his or her body part therefrom.

Upon receiving a pivoting movement of its movable portion, a directional input unit may acquire $UI_{SEL}$ directly from a pivoting movement, indirectly from a static or dynamic feature of the pivoting movement, or the like. Thus, a directional input unit may sense a position (or a pivoting movement) of a movable portion thereon (or thereover) from electrical, magnetic or optical properties of the movable portion or from temporal or spatial changes in such properties, as described above. Based thereupon, a directional input unit generates at least one control signal representing $UI_{SEL}$ by, e.g., forming at least one electrical connection by contacting a pair of abutting electrical contacts provided to a press (or touch)-ID element and to a directional element of such an input unit. A terminal may then receive the control signal denoting $UI_{SEL}$ and may run at least one selected operation which may match the control signal (or $UI_{SEL}$) from the matching list.

FIG. 14B is a cross-sectional view of an exemplary directional input unit capable of receiving a pivoting user input from a pivoting movement of its movable portion. As described in the figure, a directional input unit (22) includes a press-ID element (23) and a directional element (24), where the former (23) includes a pivot stem (23P) which pivots around a pivot joint or a pivoting center (24P). The directional input unit (22) may similarly be encircled by a notice unit of FIG. 14A, thereby informing a user which one of multiple $UI_{SEL}$'s a user has provided (or is providing) or which one of multiple pre-selected operations is to be run by a terminal when or (immediately) after the terminal powers on, wakes up, or switches modes.

In operation, a user supplies a user input to an upper portion of a press-ID element (23) of the input unit (22) by pushing, pulling or otherwise sliding a press-ID element (23), substantially along a horizontal direction. In response to such a lateral force exerted thereto, a pivot joint (24P) prevents a pivot stem (23P) from moving in the lateral direction. As a result, a press-ID element (23) pivots about the pivot joint (24P). It is appreciated that a vertical user input may not move a press-ID element (23), for a vertical force associated therewith may not move such an element (23) in any direction at all. However, when a user presses a press-ID element (23) at an angle, a lateral or horizontal component of a user input force may pivot the press-ID element (23).

As a press-ID element (23) pivots toward, e.g., a north-western quadrant, an electrical contact (23E) disposed therein moves closer to an opposing electrical contact (24E) of a directional element (24) and, when pivoted beyond a certain angle or distance, forms an electrical connection therewith. Upon detecting formation of an electrical connection in the northwestern quadrant, a directional input unit acquires $UI_{SEL-NW}$. In other words, out of a set of four quadrants such as a north-eastern quadrant (denoted by $UI_{SEL-NE}$), a north-west quadrant (denoted by $UI_{SEL-NW}$), a south-east quadrant (denoted by $UI_{SEL-SE}$), and a south-west quadrant (denoted by $UI_{SEL-SW}$), a directional input unit may locate or identify that an electrical connection formed in response to a user input corresponds to $UI_{SEL-NW}$. A directional input unit then generates a control signal which informs a terminal that an acquired selecting (user) sub-input is $UI_{SEL-NW}$. Out of four pre-selected operations such as a $1^{st}$ operation matched to $UI_{SEL-NE}$, a $2^{nd}$ operation matched to $UI_{SEL-NW}$, a $3^{rd}$ operation matched to $UI_{SEL-SE}$, a $4^{th}$ operation matched to $UI_{SEL-SW}$, a terminal locates or identifies the $3^{rd}$ operation as the one matching such $UI_{SEL\text{-}NW}$, and then runs the $3^{rd}$ operation in one of such "timings" as described above. Once a user pivots a press-ID element (23) to a certain distance or angle, a user detaches his or her finger from a directional input unit, thereby completes providing a single user input to such an input unit.

When a user provides the single user input and a directional input unit (22) pivots to the north-west quadrant, a $1^{st}$ elastic element (24F) disposed in the north-west quadrant is compressed to its biased state, whereas a $2^{nd}$ elastic element (24F) disposed in the opposite, south-east quadrant is stretched to its biased state. When a user completes providing the single pivoting user input, a $1^{st}$ elastic element (24F) may recoil back to a rest state, while a $2^{nd}$ elastic element (24F) may also recoil back to its rest state, thereby returning a press-ID unit (23) to its rest state. Once a control signal is delivered, a terminal runs at least one selected operation which is selected from a matching list and which corresponds to $UI_{SEL}$ included in the user input.

It is noted that a pivoting press-ID (or touch-ID) element may be implemented in different configurations. For example, a pivot joint may be implemented into not (always) at a center of a bottom of such an element but elsewhere, such as, e.g., at an off-center position of the bottom, along a side of such an element, on (or near) a top of such an element or other positions of the element as far as such configurations allow a user to apply a user input and as far as such an element may pivot in response thereto. Once a position of a pivot joint is decided, a pivot stem of a suitable shape or size may be implemented based thereon. A directional input unit including a press-ID (or touch-ID) element may include various features of other embodiments of this aspect such that a press-ID (or touch-ID) element may translate while pivoting, may pivot while rotating, or the like.

11-4. Acquiring Selecting (User) Sub-Inputs from Rotating Movements

In another exemplary embodiment of this eighth exemplary aspect, a directional input unit may acquire $UI_{SEL}$ from various rotating movements caused by a user. Examples of such rotating movements may include, e.g., a rotating movement of [1] at least one movable portion of a directional input unit about a center of rotation (i.e., a rotation center), [2] at least one user body part with respect to a directional input unit along a rotating path while a user continues to contact or to press at least a portion of a directional input unit, [3] at least one non-user object held by a user with respect to such an input unit along a rotating path (e.g., along an oval or circular path) while such an object may continue to contact or to press at least a portion of a directional input unit, [4] at least one body part of a user or at least one non-user object while such a user or non-user object does not contact any portion of a directional input unit. Although following descriptions relate to the rotating movements of a movable portion of such an input unit, following descriptions may be readily applied to other rotating movements of the above [2], [3] or [4] of this paragraph.

Figure 14C:
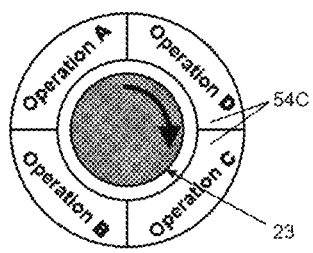

FIG. 14C shows a schematic view of a directional input unit which is encircled by an exemplary notice unit of FIG. 13D. As depicted in the figure, an exemplary notice unit includes four sub-screens (54C) disposed in a north-west quadrant, a south-west quadrant, a north-east quadrant, and a south-east quadrant, and indicates that each of such quadrants is assigned to (or matches with) Operations A, B, C, and D, respectively. A user causes a rotating movement of at least one movable portion (23) of a directional input unit as a user rotates such a movable portion (23) about a rotating center in a clockwise direction or a counter-clockwise direction, while continuing to contact and to push the movable portion (23). That is, a user may turn, twist or otherwise rotate such a movable portion (23) about the rotating center by contacting it with at least one body part and continue to do so along a direction of his or her choice.

Once a user completes providing a rotating movement, a user detaches his or her body part, whereby a user provides a single rotating user input to a directional input unit, while including therein at least one (user) sub-inputs. To facilitate such providing, a movable portion of such an input unit may include at least one handle or protruding portion which extends outwardly from a directional input unit and which is shaped and sized to be grabbed by a user. In addition, such a handle or portion is coupled to a rotating center so that a user may [1] protract or retract a handle or portion while rotating such, [2] rotate or twist the handle or the portion, [3] extend or adduct such a handle or portion while rotating such, or [4] abduct or flex the handle or portion while rotating such. A conventional track-ball, rotary switch or rotary knob may be examples of the directional input units.

A rotating movement typically involves rotations of at least one movable portion of a directional input unit, but may not necessarily accompany any translating movement of an entire (or at least one) portion of a press-ID (or touch-ID) element, or may not include any pivoting movement of an entire (or at least one) portion thereof. Accordingly, a user needs to rotate, angularly push or pull, or otherwise rotate a movable portion of the input unit about a rotating center while continuing to contact the movable portion. Therefore, a rotating movement is completed when a user detaches a user body part from a movable portion of a directional input unit. But a user does not necessarily press or push the movable portion to provide a rotating user input.

Because a user rotates a movable portion about a rotating center, a movement path of a rotating movement is generally angular or lies in a 3-D spherical or cylindrical coordinate. When a user applies a rotating user input, a movable portion of a directional input unit may be configured to start to rotate and to continue to rotate even after a user detaches a user body part therefrom. In this case, the rotating movement may be deemed to have been completed within a certain period of time after a user detaches his or her body part therefrom.

Upon applying a rotating movement to a movable portion, a directional input unit acquires $UI_{SEL}$ directly from a rotating movement, or indirectly from at least one static feature or dynamic feature of a rotating movement. Therefore, a directional input unit senses a position (or a rotating movement) of a movable portion based on [1] a mechanical, electrical, magnetic or optical property of such a movable portion, or [2] from a temporal or spatial change in such a property as described above. In response thereto, a directional input unit generates at least one control signal which denotes $UI_{SEL}$ by, e.g., forming an electrical connection by contacting a pair of abutting electrical contacts implemented on a press-ID (or touch-ID) element and to a directional element of a directional input unit. A terminal then receives the control signal representing $UI_{SEL}$ and runs at least one selected operation which may match the control signal (or $UI_{SEL}$) from the matching list.

Figure 14D:
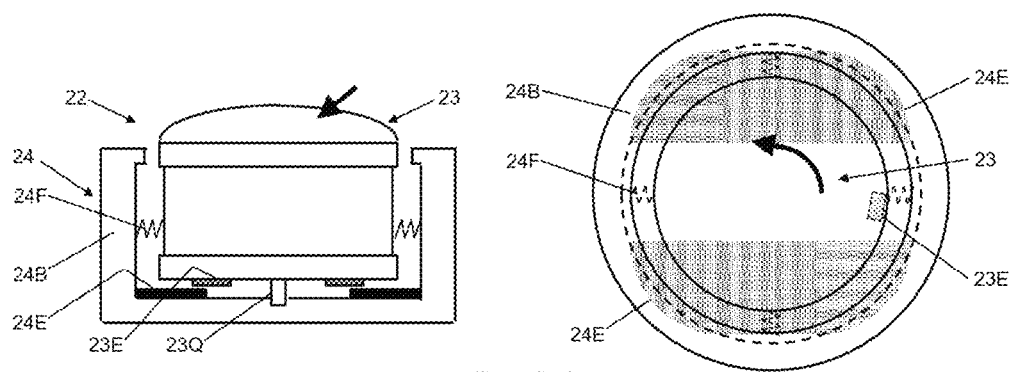

FIG. 14D is a cross-sectional view of an exemplary directional input unit capable of receiving a rotating user input from a rotating movement of its movable portion. As described in the figure, a directional input unit (22) includes a press-ID (or touch-ID) element (23) and a directional element (24), where the former element (23) includes a rotating stem (23Q) around which at least one movable portion thereof rotates. That is, a rotating stem (23Q) acts as a rotating joint or a rotating center of such a rotating movement.

In operation, a user decides to which one of an upper portion and a lower portion of a press-ID (or touch-ID) element (23) of a directional input unit (22) a user may provide a single user input. For example, a user may provide a single user input to an upper portion of a press-ID (or touch-ID) element (23) by touching, turning, twisting or otherwise rotating a press-ID (or touch-ID) element (23) in an angular direction. In response to an angular user input force exerted thereto, a rotating stem (24Q) rotates about a desired angle. It is noted that a rotating stem (24Q) may be provided in a center of a press-ID (or touch)-ID element (23) or in an off-center position thereof. It is also noted that a user input applied in a vertical direction may not rotate a press-ID (or touch)-ID element (23), for a vertical force associated with a vertical user input may not rotate such an element (23) along any angular direction at all. However, as a user presses a press-ID (or touch-ID) element (23) at an angle, an angular component of the user input force may begin to rotate a press-ID (or touch-ID) element (23).

As a user begins to rotate a press-ID (or touch-ID) element (23) in a clockwise or counter-clockwise direction, an electrical contact (23E) of such an element (23) rotates closer to an opposing electrical contact (24E) of a directional element (24). When a user rotates the element (23) beyond a certain angle or more than a preset distance, an electrical contact (23E) of a press-ID (or touch-ID) element (23) forms an electrical connection with that of a directional element (24E). Upon detecting the electrical connection formed, e.g., in the northern or upper hemisphere, a directional input unit acquires $UI_{SEL-N}$. That is, from a set of two hemispheres such as one in the North (assigned to, e.g., $UI_{SEL-N}$) and another in the South (assigned to, e.g., $UI_{SEL-S}$), a directional input unit identifies that an electrical connection formed in the "North" in response to a user input corresponds to $UI_{SEL-N}$.

A directional input unit then generates a control signal which informs a terminal of acquiring a selecting (user) sub-input which corresponds to $UI_{SEL-N}$. Out of two pre-selected operations such as, e.g., Operation 1 which is matched to $UI_{SEL-S}$ and Operation 2 which is matched to $UI_{SEL-N}$, a terminal locates or identifies Operation 2 as the one matching the $UI_{SEL-N}$, and runs Operation 1 when or (immediately) after it powers on, wakes up, or switches modes. When a user detaches a finger from a directional input unit (or all body parts therefrom when a user has used or manipulated multiple body parts to provide a single user input or multiple concurrent user inputs), a user completes providing the user input to a directional input unit. In response thereto, an elastic element (24F) uses its recoil force to return itself as well as a press-ID (or touch-ID) element (23) back to its rest state.

It is noted that a rotating press-ID (or touch-ID) element may be implemented in different configurations. For example, a rotating joint (or rotating center) may be disposed into not always at a center of a bottom of the element but elsewhere, such as, e.g., at an off-center position of the bottom, along a side of the element, on (or near) a top of the element or other positions of the element as far as such configurations allow a user to apply a user input and the element can rotate in response thereto. Once a position of a rotating joint is fixed, a rotating stem of a suitable shape or size is implemented accordingly. A rotating stem may be enclosed inside a holder (not shown in the figure), where a user indirectly rotates a press-ID (or touch-ID) element by directly rotating such a holder.

Figure 14E:
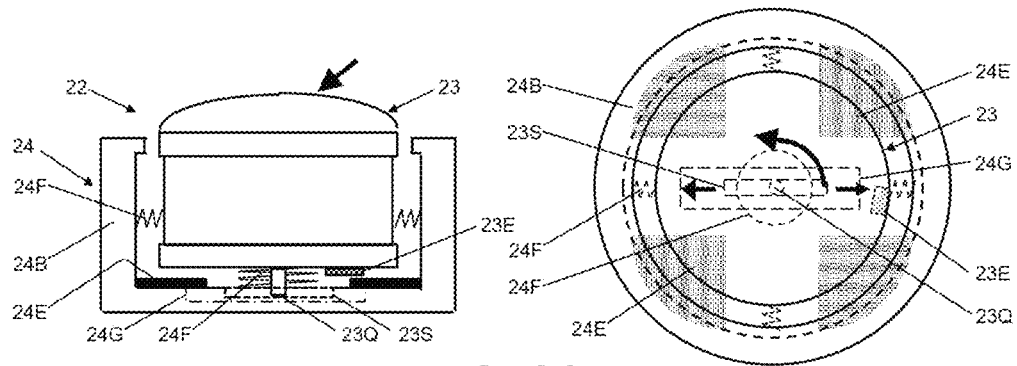

In addition, a directional input unit including a press-ID (or touch-ID) element may incorporate some features of other embodiments of this eighth exemplary aspect such that a press-ID (or touch-ID) element may rotate while translating, may rotate while pivoting, or the like. For example, FIG. 14E shows a cross-sectional view of an exemplary directional input unit capable of receiving a user input and capable of acquiring $UI_{SEL}$ from a translating movement as well as a rotating movement of at least one movable portion of the input unit. It is to be understood, for illustration purposes, that a directional input unit of FIG. 14E includes a press-ID element but a touch-ID element may replace the press-ID element.

As in the figure, a press-ID element (23) is similar to that of FIG. 14D and includes a rotating stem (23Q) on its bottom. Unlike that of FIG. 14D, however, a directional element (24) defines an elongated guide (24G) on its bottom plate, while a press-ID element (23) defines a rotating stem (23Q) and a slider (23S). In addition, a rotating stem (23Q) mechanically and movably couples to a slider (23S) in such a way that the rotating stem (23Q) rotates with respect to the slider (23S) while maintaining the mechanical coupling with the latter (23S). Moreover, a slider (23S) is shaped and sized to slide along a guide (24G) substantially in a lateral direction. As a result, a rotating stem (23Q), a slider (23S), and the rest of a press-ID element (23) may translate as an assembly along the guide (24G) in response to a user input.

In operation, a user provides a user input force to a press-ID element (23) at an angle. A lateral or horizontal component of a user input force then laterally translates the above assembly while guiding such an assembly along an elongated guide (24G). In addition, an angular component or another off-center component of such a user input force rotates a rotating stem (23Q) along an angular direction and, therefore, rotates a press-ID element (23) in a counter-clockwise (or clockwise) direction. As a result, a user may provide not only a lateral force component but also an angular force component to a press-ID (or touch-ID) element, thereby causing a translating movement as well as a rotating movement of at least one portion of a directional input unit. That is, a press-ID (or touch-ID) element may slide or translate to the left or right along an elongated guide (24G), while concurrently rotating about a rotating stem (23Q) as shown in the figure. Such an arrangement offers a user with a benefit of manipulating a directional input unit (22) in more diverse directions and, accordingly, of providing a single user input (or multiple concurrent user inputs) more conveniently and readily.

When a user translates and rotates a press-ID element (23), at the same time, an electrical contact (23E) of a press-ID element (23) approaches an opposing electrical contact (24E) of a directional element (24) faster or quicker. As a user slides a press-ID element (23) beyond a certain distance or rotates such an element more than a preset angle, an electrical contact (23E) of a press-ID element (23) forms an electrical connection with that of a directional element (24). Upon identifying such an electrical connection formed, e.g., in a north-west quadrant, a directional input unit acquires $UI_{SEL-NW}$.

A directional input unit then generates a control signal informing a terminal that $UI_{SEL}$ acquired from a single user input corresponds to $UI_{SEL-NW}$. Out of four different pre-selected operations which have been matched to four different $UI_{SEL}$'s, a terminal locates one of such operations as the one matching $UI_{SEL-NW}$, and then runs the pre-selected operation in one of such "timings" as described above. When a user detaches a finger from a directional input unit, a user completes providing a single user input to a directional input unit. In response thereto, an elastic element (24F) recoils back to its rest state while carrying a terminal returns to its rest state as well. A directional input unit, along with its press-ID (or touch-ID) element and directional element, waits for another round of a single user input or multiple concurrent user inputs.

Figure 14F:
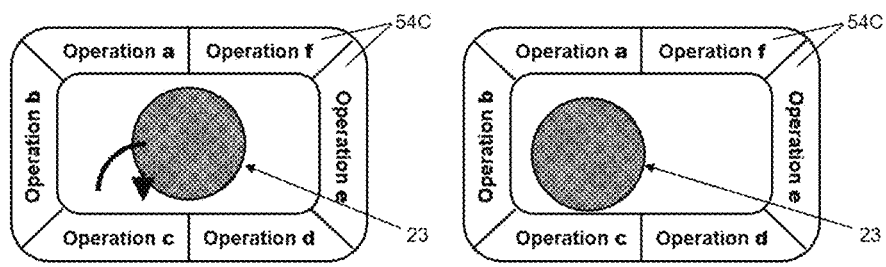

Such an arrangement generally offers various benefits to a user such as, e.g., enabling him or her to provide a diverse (or more) user inputs or (user) sub-inputs, enabling a user to choose a certain pre-selected operation from a set of a greater number of pre-selected operations. FIG. 14F is a schematic view of a directional input unit capable of receiving a single user input which may cause not only a translating movement but also a rotating movement of at least a portion of such an input unit. As exemplified in the left panel of FIG. 14F, because a user can rotate a press-ID element (23) as well as translate the element (23), a user can move the element (23) more easily than either rotating the element (23) alone or translating the element (23) alone. Thereby, a user may more readily form an electrical connection between an electrical contact of a press-ID element and that of a directional element. In the example of FIG. 14F, as a user provides a rotating or pivoting movement to at least one portion of a directional input unit, a terminal displays six pre-selected operations on its notice unit (or on only a portion or an entire portion of a touch screen-type display unit), a user translates the same (or different) portion of such an input unit to provide a certain $UI_{SEL}$ (e.g., $UI_{SEL\text{-}SW}$ in this example), and then a terminal runs the pre-selected operation matched with $UI_{SEL\text{-}SW}$ when or (immediately) after it powers on, wakes up, or switches modes.

In addition and as described in the right panel of FIG. 14F, because a directional input unit can translate and rotate, a notice unit may define an elongated periphery along which a notice unit may incorporate more sub-screens (54C) such as, e.g., as many as 6 sub-screens (54C) along an elongated and rectangular periphery of a directional input unit, than only 4 sub-screens defined around a circular periphery of such an input unit as shown in FIGS. 14A and 14C. Accordingly, a terminal may enable a user to select a certain $UI_{SEL}$ or a certain pre-selected operation from more multiple $UI_{SEL}$'s or a greater number of pre-selected operations. For example, a terminal according to the arrangement of FIG. 14F may inform a user that he or she is selecting (or has selected) one of six pre-selected operations such as, e.g., Operation a, Operation b, Operation c, Operation d, Operation e, and Operation f, by providing a certain $UI_{SEL}$ Which is assigned to (or which matches) one of such Operations. In contrary, a terminal of FIG. 14C only displays 4 pre-selected operations such as, e.g., Operation A, Operation B, Operation C, Operation D, or the like. Due to such an elongated periphery, a user can also more precisely position a movable portion of a directional input unit (22) than otherwise as well.

Still referring to FIG. 14F, a user may provide $UI_{SEL}$ and may render a terminal run at least one pre-selected operation in various ways. In one example, in response to a rotation of at least a portion of a directional input unit, a notice unit displays 8 pre-selected operations on its 6 sub-screens, and a user slides or translates the portion of such an input unit toward the pre-selected operation he or she wants to run until a certain pair of electrical contacts of a directional input unit makes an electrical connection in response to such a translating movement. Thereafter, the input unit generates a control signal signifying such an electrical connection, and a terminal runs that a certain pre-selected operation when or (immediately) after the terminal powers on, wakes up, or switches modes.

It is appreciated in this example that a user may have to first rotate a certain portion of a directional input unit, to look what is displayed by a notice unit, and then to translate the same (or different) portion of a directional input unit in a certain direction. Accordingly, there will usually be a temporal gap of 1 second or less (or more) between a $1^{st}$ instance of providing a rotating movement to such an input unit and a $2^{nd}$ instance of providing a translating movement thereto. However, as long as the user continues to press, push, contact or touch the portion of a directional input unit, such $1^{st}$ and $2^{nd}$ movements can be deemed as a "single user input" which results from a "single user effort" within the scope of this disclosure.

Even when a user detaches his or her body part from a portion of a directional input unit after providing a $1^{st}$ rotating (or pivoting) movement (for displaying a certain group of pre-selected operations) and before a user presses, pushes, contacts or touches the same (or different) portion of such an input unit in order to provide a $2^{nd}$ translating movement (for providing $UI_{SEL}$), such separate, multiple actions can be deemed as a "single user input" within the scope of this disclosure, when such separate actions qualify as "quick efforts" which are temporally separated less than or equal to 2.0 sec., less than or equal to 1.5 sec, or less than or equal to 1.0 sec., or the like. When a user provides such multiple movements sequentially, however, with an interval exceeding two seconds or more, such separate user inputs may not then be deemed as a single user input but may be deemed as multiple user inputs. Of course, such sequential user inputs may prevent a user from fully enjoying seamless operations provided by such a terminal.

It is also appreciated that a terminal may display the names, icons or images of such pre-selected operations on a screen of its touch screen-type display unit. In this case, a terminal may display such names, images or icons of such pre-selected operations on an entire (or a selected) portion of the display unit, depending upon where the screen displays a portion which a user can move, contact or otherwise manipulate. A terminal may instead display such names, icons or images of the pre-selected operations in a $1^{st}$ preset portion of its touch screen-type display unit, while displaying such user manipulating portion in a $2^{nd}$ portion thereof.

11-5. Selecting (User) Sub-Inputs from a Single User Input Caused by Multiple Movements In another exemplary embodiment of the eighth exemplary aspect, a directional input unit may also receive a single user input (or multiple concurrent user inputs) and also acquire multiple (user) sub-inputs from multiple different (or similar) movements of [1] at least one movable portion of a directional input unit, [2] at least one user body part, [3] at least one non-user object, or [4] a combination of the above [1] to [3]. In other words, a directional input unit may receive a user input(s) or acquire multiple (user) sub-inputs from, e.g., [1] multiple translating movements, [2] multiple pivoting movements, [3] multiple rotating movements, [4] a combination of the above [1] to [3], [5] a translating movement and a pivoting movement, [6] a translating movement and a rotating movement, [7] a pivoting movement and a rotating movement, [8] another combinations of the above [1] to [7], or the like.

A terminal may be configured to regard pressing of at least a portion of a directional input unit by a user (or a non-user object) as a separate movement, where such pressing may include, e.g., pushing such a portion or otherwise applying a user input force to such a portion of such an input unit. Similarly, a terminal may regard contacting of at least a portion of a directional input unit by a user (or a non-user object) as another separate movement, where such contacting may include, e.g., touching such a portion with or without applying a force thereto. In these arrangements, a user may combine such pressing or contacting with at least one of various movements enumerated in the preceding paragraph. It is appreciated, however, that each of such translating, pivoting or rotating presupposes a contact between such a portion of such an input unit and a user (or a non-user object), and that a force associated with an input force applied by a user (or a non-user object) typically exceeds a certain magnitude to effect such translating, pivoting or rotating. In this context, such pressing or touching is already included in each of such translating, pivoting or rotating. Notwithstanding such inherent nature, such pressing which is directly applied by a user (or indirectly applied by a user through a non-user object) may also be regarded by a terminal as a separate movement when such pressing is accompanied by or results from an input force of which a magnitude is greater than a certain threshold magnitude. Similarly, a terminal may regard such contacting which continues longer than a threshold period of time as a separate movement.

11-6. Acquiring Selecting (User) Sub-Inputs from Group by Group Displays

In another exemplary embodiment of the eighth exemplary aspect, a terminal may also synchronize a group of multiple $UI_{SEL}$'s with a certain movement(s) of a user (or a non-user object) with respect to a terminal, and directly display such multiple $UI_{SEL}$'s or indirectly display a list of such multiple $UI_{SEL}$'s which belong to such a group. In the alternative or in addition to the above, such a terminal may directly display multiple pre-selected operations each of which may match each of such multiple $UI_{SEL}$'s or may indirectly display a list of multiple $UI_{SEL}$'s which may match such operations which belong to such a group. This embodiment is particularly useful when a matching list (i.e., a list matching each of multiple $UI_{SEL}$'s with each of multiple pre-selected operations in a 1-to-1 matching or other matchings) includes a far greater number of $UI_{SEL}$'s or pre-selected operations than a user can easily select or locate by relying on his or her memory, when such a matching list includes a far more $UI_{SEL}$'s or pre-selected operations than a terminal may display on a single screen.

In one example, when the matching list includes 18 pre-selected operations and corresponding 18 $UI_{SEL}$'s, it is not practical for a user to remember an exact matching between 18 $UI_{SEL}$'s and 18 pre-selected operations. Similarly, it is not practical at all to display such a long matching list to a user using a notice unit or even a full display unit. It is therefore beneficial to a user to display a subset of the matching list, i.e., a sub-set (or group) of multiple $UI_{SEL}$'s or multiple pre-selected operations of which the number is less than 18 such as, e.g., only 6 $UI_{SEL}$'s or pre-selected operations. That is, a terminal may divide 18 $UI_{SEL}$'s (or 18 pre-selected operations) into three different groups, where each group includes therein only 6 $UI_{SEL}$'s or 6 pre-selected operations. As a result, a $1^{st}$ group includes Operations a, b, c, d, e, and f, a $2^{nd}$ group includes Operations 1, 2, 3, 4, 5, and 6, a $3^{rd}$ group includes Operations A, B, C, D, E, and F, or the like.

In the above exemplary arrangement, a user may rotate at least one $1^{st}$ movable portion of a directional input unit in a clockwise direction in order to select a certain group of pre-selected operations from such 3 different groups while displaying on its sub-screen only those 6 $UI_{SEL}$'s (or 6 Operations) which belong to one of such groups. A user then translates (or slides) the same $1^{st}$ movable portion of a directional input unit or a different $2^{nd}$ movable portion of a directional input unit so as to select at least one operation from the six pre-selected operations of the selected group. It is appreciated that a user may manipulate at least two different movable (or stationary) portions of a single directional input unit so as to provide multiple movements, that a user may manipulate a single movable (or stationary) portion of such an input unit in order to provide multiple different movements thereto, or that a user may manipulate a single portion of a $1^{st}$ directional input unit and a single portion of a $2^{nd}$ directional (or non-directional) input unit to provide similar or different multiple movements to such input units.

Figure 14G:
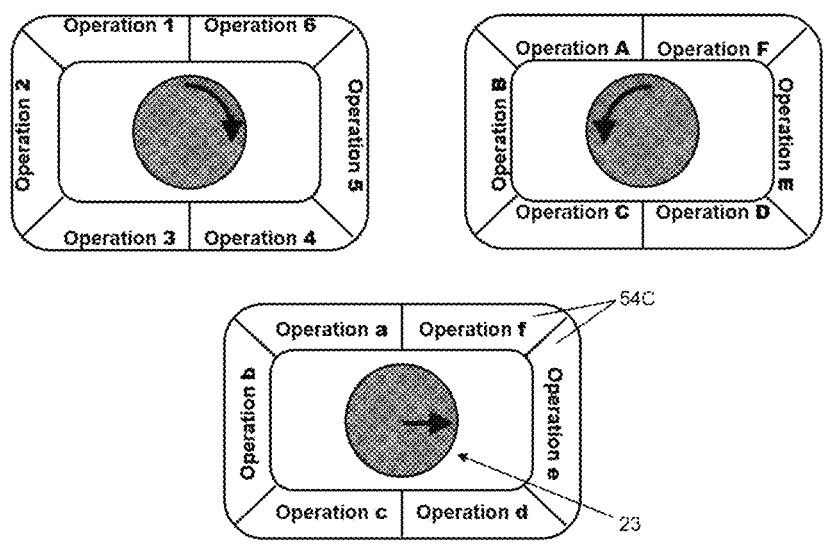

FIG. 14G shows schematic diagrams of a directional input unit according to the above embodiment, where the input unit includes a single movable portion, e.g., a single movable touch-ID element (23), which can receive a user input provided by a user through a translating movement as well as a rotating movement. As depicted above, a terminal defines a total of 18 pre-selected operations which such a terminal may run once powering on, waking up, or switching modes in response to a single user input, and classifies 18 pre-selected operations (or 18 $UI_{SEL}$'s) into three sets of operations (or 18 $UI_{SEL}$'s) each of which includes 6 operations (or 6 $UI_{SEL}$'s).

Referring to the center panel of FIG. 14G, a user may provide a single user input to a press-ID (or touch-ID) element (23) of a directional input unit, e.g., (1) by providing a clockwise rotating (or pivoting) movement of at least a portion of a directional element (23) to the right as well as (2) by pressing (or contacting) the same (or different) portion of the input unit (or pressing a portion of a different directional input unit or a non-directional input unit), either concurrently or sequentially. In response to the rotating (or pivoting) movement, a terminal displays a $1^{st}$ set of six pre-selected operations on its six sub-screens (54C) of a notice unit, where such a $1^{st}$ set includes six different operations such as, e.g., Operation a, b, c, d, e, and f, and where each sub-screen (54C) displays a name, an icon or an image which represents each of such pre-selected operations thereon. A terminal also acquires $UI_{SEL}$ from the pressing movement of the same (or different) portion of such an input unit, locates which one of the Operations a, b, c, d, e, and f to run when or (immediately) after a terminal powers on, wakes up, or switches modes, and runs the selected operation thereafter. It is noted that such a pressing movement may desirable include a static or dynamic feature indicating a direction of such a pressing movement such that a terminal may readily acquire $UI_{SEL}$ therefrom. Alternatively, such a pressing movement may be replaced by translating movements which almost always accompany a static or dynamic feature indicating a direction of such a movement.

As described above, there may be a temporal gap between a $1^{st}$ instance of providing a rotating (or pivoting) movement and a $2^{nd}$ instance of providing a pressing (or translating) movement. However, as long as a user continues to press, push, touch or otherwise contact at least a portion of a directional input unit with a body part, such movements can be deemed as a "single user input" resulting from a "single user effort" within the scope of this disclosure. Even when a user supplies a $1^{st}$ movement (e.g., rotating, pivoting, or the like) and a $2^{nd}$ movement (e.g., pressing, translating, or the like) sequentially (i.e., one after another, e.g., detaching all of his or her body parts from a directional input unit after the $1^{st}$ movement and before the $2^{nd}$ movement), such multiple actions can also be deemed as a "single user input" when such multiple, "quick actions" may be temporally separated less than or equal to 2.0 sec., less than or equal to 1.5 sec, or less than or equal to 1.0 sec., or the like. It is noted that a terminal may also display names, icons or images of the pre-selected operations on a touch screen-type display unit, e.g., by displaying such names, icons or images on an entire (or a selected) portion of such a display unit.

Referring to the left panel of FIG. 14G, a user provides a user input to a touch-ID element (23) of a directional input unit (1) by causing a rotating movement of at least a portion of the input unit in a clockwise direction as well as (2) by causing a translating movement of the same (or different) portion of the input unit. In response to the rotating movement, a terminal displays a $2^{nd}$ set of six pre-selected operations on its six sub-screens (54C), where the $2^{nd}$ set includes Operations 1, 2, 3, 4, 5, and 6, and where each sub-screen (54C) displays at least one of such pre-selected operations thereon. In addition, a directional input unit acquires $UI_{SEL}$ from the translating movement, identifies which one of Operations 1, 2, 3, 4, 5, and 6 to run, and then runs the pre-selected operation when or (immediately) after the terminal powers on, wakes up, or switches modes. Further operational details of this example are similar or identical to those of the center panel of FIG. 14G.

Referring to the right panel of FIG. 14G, a user similarly applies a single user input to a touch-ID element (23) of a directional input unit (1) by generating a counter-clockwise rotating movement of at least a portion of the input unit as well as (2) by creating an upward translating movement. In response to the rotating movement, a terminal displays a $3^{rd}$ set of six pre-selected operations on its six sub-screens (54C), where such a $3^{rd}$ set includes Operations A, B, C, D, E, and F, and where each sub-screen (54C) displays at least one of such six pre-selected operations thereon. Either concurrently or sequentially with acquiring the rotating movement, a directional input unit acquires $UI_{SEL}$ from the translating movement, locates which one of Operations A, B, C, D, E, and F to run, and then runs the pre-selected operation when or (immediately) after the terminal powers on, wakes up, or switches modes. Further operational details of this example are similar or identical to those of the center panel of FIG. 14G.

As described above, various arrangements in FIG. 14G allow a terminal to adopt a greater number of $UI_{SEL}$'s (or pre-selected operations) than it may display on its sub-screens (or its display unit) at one time. Therefore, a user may select any number of pre-selected operations and divide them into a desirable number of groups each of which may include a certain number of $UI_{SEL}$'s (or pre-selected operations) as long as a terminal may identify the same certain number (or less number) of $UI_{SEL}$'s (e.g., differentiate one $UI_{SEL}$ from other $UI_{SEL}$'s), as long as a user may readily select at least one of such pre-selected operations displayed on a notice unit (or a display unit) of a terminal, or the like.

In addition and as also depicted in the left and right panels of FIG. 14G, a terminal may allow a user to view all pre-selected operations or to view all $UI_{SEL}$'s which are matched to such multiple pre-selected operations), e.g., [1] by displaying names, icons, or images of such pre-selected operations of multiple groups one group at a time or [2] by displaying similar names, icons or images of such $UI_{SEL}$'s of multiple groups one group at a time, simply by generating different movements of at least a portion of a directional input unit. For example, when a user rotates at least one movable portion of a directional input unit, e.g., by 120° counterclockwise, a terminal may display the names, icons or images representing multiple pre-selected operations of a $1^{st}$ group (e.g., Operations A, B, C, D, E, and F) or may instead display similar names, icons or images representing multiple $UI_{SEL}$'s of the $1^{st}$ group (e.g., $UI_{SEL-A}$, $UI_{SEL-B}$, $UI_{SEL-C}$, $UI_{SEL-D}$, $UI_{SEL-E}$, or $UI_{SEL-F}$) each corresponding to each of such multiple pre-selected operations belonging to the same group on the sub-screens (54C) (or on its touch screen-type display unit). As a user rotates the same (or different) portion of a directional input unit by another 120° in the same (or different) direction, a terminal may display the names, icons or images of multiple pre-selected operations of a $2^{nd}$ group (e.g., Operations a, b, c, d, e, and f) or may instead display the names, images or icons of multiple $UI_{SEL}$'s (e.g., $UI_{SEL-a}$, $UI_{SEL-b}$, $UI_{SEL-c}$, $UI_{SEL-d}$, $UI_{SEL-e}$, or $UI_{SEL-f}$) each of which represents such multiple pre-selected Operations of the $2^{nd}$ group on the sub-screens (54C) (or on its touch screen-type display unit). When a user rotates the same (or different) portion of a directional input unit by another 120° in the same direction (or when a user translates, presses, pivots or otherwise manipulate the same or different portion differently from the above rotations), a terminal may display such names, images or icons of multiple pre-selected operations which belong to a $3^{rd}$ group (e.g., Operations 1, 2, 3, 4, 5, and 6) or may instead display names, icons or images of multiple $UI_{SEL}$'s (e.g., $UI_{SEL-1}$, $UI_{SEL-2}$, $UI_{SEL-3}$, $UI_{SEL-4}$, $UI_{SEL-5}$ or $UI_{SEL-6}$) each of which corresponds to multiple pre-selected operations of the sane group on the sub-screens (54C) (or on its display unit). Accordingly, simply by moving a certain portion (or multiple portions) of such an input unit, without having to detach his or her body part (or a non-user object) from such an input unit, a user can view an entire matching between multiple pre-selected operations and multiple $UI_{SEL}$'s, group by group or one group at a time.

Similarly to such examples of the preceding paragraph, a terminal may allow a user to preview all $UI_{SEL}$'s (or pre-selected operations) by displaying multiple groups of such $UI_{SEL}$'s (or pre-selected operations) one after another, when a user touches or contacts different stationary (or movable) portions of a directional input unit one after another. For example, when a user contacts a body part (or a non-user object) with a $1^{st}$ portion of a directional input unit, a terminal may display a $1^{st}$ group of pre-selected operations (e.g., Operations A to F) or may instead display names, icons or images of a $1^{st}$ group of $UI_{SEL}$'s (e.g., $UI_{SEL-A}$ to $UI_{SEL-F}$) on its multiple sub-screens (54C) (or a touch screen-type display unit). As a user touches a $2^{nd}$ portion of a directional input unit, a terminal may display a $2^{nd}$ group of pre-selected operations (e.g., Operations a to f) or may display the names, icons or images of a $2^{nd}$ group of $UI_{SEL}$'s (e.g., $UI_{SEL-a}$ to $UI_{SEL-f}$) on the sub-screens (54C) (or a touch screen-type display unit). In addition, as a user moves his or her body part (or a non-user object) to another portion of such an input unit, a terminal may display a $3^{rd}$ group of pre-selected operations (e.g., Operations 1 through 6) or may display names, icons or images of a $3^{rd}$ group of $UI_{SEL}$'s (e.g., $UI_{SEL-1}$ to $UI_{SEL-6}$) on the sub-screens (54C) (or a touch screen-type display unit). Accordingly, a user may view an entire list of such matching between multiple $UI_{SEL}$'s and multiple pre-selected operations, one group at a time.

Such exemplary arrangements may enable a simpler configuration of a directional input unit and may relieve a user from a headache, for he or she does not have to memorize all different $UI_{SEL}$'s. It is appreciated once more that such multiple, separate manipulations of a single portion (or multiple portions) of a directional input unit may still be deemed as a "single user input" within the scope of this disclosure, particularly when a user does not detach his or her body part (or a non-user object) from such an input unit while rotating the portion by 120°, another 120°, and then further 120°, while rotating the portion in a counterclockwise direction and in a clockwise direction thereafter, or while otherwise moving or contacting the portion of such an input unit for viewing different groups of multiple $UI_{SEL}$'s (or multiple pre-selected operations of different groups). When a user provides a user input by pressing, touching, contacting or otherwise manipulating at least a portion of a directional input unit with a non-user object, such a user input may similarly be deemed a single user input when a user does not detach the object from the input unit while viewing different groups of multiple $UI_{SEL}$'s (or multiple pre-selected operations).

When a user provides a user input but decides to not provide any specific $UI_{SEL}$, a user may do so in various ways. In other words, a user may provide a user input which includes other (user) sub-inputs except $UI_{SEL}$ so that a user provides, e.g., a rotating (or pivoting) movement or a pressing movement to at least one portion of a directional input unit, but does not provide a directional input unit with any movement which is matched to running a selecting operation. As a result and in one example, a terminal turns on a display unit, runs an authentication operation, or the like, but does not run any selecting operation. Rather, such a terminal may advance to a lock mode while displaying a lock screen on a display unit when a user fails the authenticating, may advance to an unlock mode while displaying a home screen on its display unit when a user passes the authenticating, or the like. In another example, such a terminal may instead turn on a display unit, run an authentication operation, and also run a $1^{st}$ default selecting operation when a user fails such authenticating, run a $2^{nd}$ default selecting operation when the user passes the authenticating, or the like.

Although not depicted in FIGS. 14F and 14G, a terminal may be configured to display multiple groups of pre-selected operations more easily one at a time or concurrently with each other. In one example, when a user rotates (or pivots) at least one portion of a directional input unit in a certain direction with his or her body part (or a non-user object), a terminal may display names, icons or images of multiple pre-selected operations of multiple groups one at a time (i.e., one group at a time) or may display such names, icons or images of such operations of two groups or more. In another example, when a user translates (or slides) at least one portion of a directional input unit (or translates his or her body part or a non-user object with respect to such an input unit) in a certain direction, a terminal may display names, icons or images of multiple pre-selected operations of multiple groups one at a time or may instead display the names, icons or images of such operations of two groups or more. In another example, as a user presses, pushes, touches, contacts or otherwise manipulates at least one portion of a directional input unit with a body part (or a non-user object), a terminal may display such names, icons or images of multiple pre-selected operations of multiple groups one at a time based on, e.g., [1] a temporal length of such a press, push, touch or contact, [2] a magnitude of a force associated with such a press, push, touch or contact, [3] a contact area between a user body part (or a non-user object) and a directional input unit for providing such a press, push, touch or contact, [4] a disposition (or an angle) of a directional input unit (or a terminal) with respect to a reference which may be measured by a gyroscope or a prior art sensor equivalent thereto, [5] an absolute (or relative) velocity (or acceleration) of a body part of a user or those of a non-user object with respect to a reference (such as, e.g., a terminal), [6] an absolute (or relative) velocity (or acceleration) of a terminal with respect to a reference, or [7] a distance between a body part of a user (or a non-user object) to a terminal.

It is appreciated that a total number of such names, icons or images of all pre-selected operations (e.g., all of those listed in the matching list) does not always have to match a total number of $UI_{SEL}$'s. For example, when a terminal defines a total of 18 pre-selected operations as exemplified in FIG. 14G, such a terminal does not have to define all 18 different $UI_{SEL}$'s, for a single $UI_{SEL}$ may match two or more operations (e.g., Operations b and c) of the same group, may instead match multiple operations (e.g., Operations b, 2, and B) of different groups, or the like.

It is to be understood that the exemplary arrangement in FIG. 14G can be reversed as well. In other words, a terminal may locate which one of multiple pre-selected operations to run from a rotating movement of at least one movable portion of a directional input unit, while a terminal locates which one of multiple different sets of multiple pre-selected operations to display on the sub-screens from a translating movement thereof. It is also appreciated that the exemplary arrangement in FIG. 14G may be applied to a different combination of other movements. Accordingly, a terminal may perform the above functions by receiving a user input which may be caused by both of the translating and pivoting movements, by both of the pivoting and rotating movements, or by combining one of such translating, pivoting, and rotating movement with another movement as will be described below.

It is also understood that such examples of this exemplary embodiment not only apply to a single user input caused by multiple different movements of a single movable portion of various directional input units but also to multiple concurrent user inputs applied [1] to a single movable portion of a single directional input unit, [2] to multiple movable portions of a single directional input unit, [3] to multiple different input units one of which is a directional input unit, or the like. Accordingly, one of such multiple concurrent user inputs may be used to locate which set of multiple sets of pre-selected operations is to be displayed on multiple sub-screens and another of such concurrent user inputs may be used to locate which one operations belonging to such a set is to be run when or (immediately) after a terminal powers on, wakes up, or switches modes.

11-7. Acquiring Selecting (User) Sub-Inputs from Other Movements

In another exemplary embodiment of this eighth exemplary aspect, a directional input unit may acquire $UI_{SEL}$ from various deforming movements caused by a user. Examples of such deforming movements may include a shape-changing movement of at least one deformable portion of such a directional input unit in response to a user input (or caused by a user input), a size-changing movement of the deformable portion in response to the user input (or caused thereby), a volume-changing movement of such a deformable portion in response to the user input (or caused thereby), or the like. When a user stops to apply the user input, the deformable portion may recover its shape, size or volume while returning to its rest state when such a portion may store at least a portion of a user input force by generating a recoil force and then releases the stored portion of the input force, thereby preparing another round of deformation in response to (or caused by) another round of deformation-causing user input.

A directional input unit may employ various deforming configurations for receiving a deforming user input and for acquiring $UI_{SEL}$ therefrom. In one example, a press-ID element may include a deformable portion which is made of (or includes) an elastic material which can deform in response to a user input. Accordingly, when a user provides a user input by pressing or pushing, the deformable portion deforms in response thereto, and displaces an electrical contact toward an opposing electrical contact of a directional element, thereby forming an electrical connection. A directional input unit acquires $UI_{SEL}$ therefrom and generates a control signal which is delivered to a terminal. Once a user ceases to apply the user input, the deformable portion returns to its rest state due to its recoil force. In another example, a press-ID element does not include any deformable portion thereon but is mechanically coupled to a deformable base disposed in a directional element. Accordingly, the deformable base deforms in response to a user input while rendering the electrical contacts of the press-ID and directional elements to form an electrical connection. Other configurational or operational features of this directional input unit capable of receiving a deforming user input are similar or identical to those of the above directional input units for receiving a transforming user input, a pivoting user input a rotating user input or the like.

In another example, a directional input unit may store the deformation energy and then release such energy in order to return to its rest state even when the directional input unit may not be made of or may not include any deformable portion therein. For example, a directional input unit may include a shape-changing element, a size-changing element or a volume-changing element each of which is made of or includes rigid materials but each of which includes a structure allowing such an element to change its shape, a size, a volume, or the like. A piston-cylinder assembly may be an example of such an element, where the assembly changes its overall shape, a size, or a volume as the piston moves into or away from a cylinder.

11-8. Acquiring Selecting (User) Sub-Inputs from Various Features of Movements

In most of the aforementioned exemplary aspects and embodiments of this disclosure, each directional input unit may receive a single user input (or multiple concurrent user inputs), acquire at least one selecting (user) sub-input ($UI_{SEL}$), and locate a certain pre-selected operation corresponding to such $UI_{SEL}$ from the matching list which matches each of multiple $UI_{SEL}$'s with at least one of multiple pre-selected operations (e.g., in 1-to-1, 1-to-n, m-to-1, or m-to-n matching, where m and n are integers). To this end, such directional input units acquire $UI_{SEL}$ from locations of electrical connections which are formed by two or more electrical contacts of a touch-ID (or press-ID) element and a directional element, where such connections are in turn are caused by one or various user inputs.

Therefore and in another exemplary embodiment of the eighth exemplary aspect, a directional input unit may directly (or indirectly) acquire at least one $UI_{SEL}$ from various temporal or spatial features of such movements, where examples of such movements may include, but not limited to, movements of [1] at least one movable portion of a directional input unit, [2] at least one user body part on, over or across at least a portion of such an input unit, [3] at least one non-user object on, over or across at least a portion of such an input unit, or [4] at least one user body part (or a non-user object) disposed at a certain distance from a directional input unit. Based on various temporal or spatial features of such movements, a directional input unit acquires $UI_{SEL}$ and generates a control signal based thereon. A terminal then receives the control signal and runs a pre-selected operation which is selected from a set of multiple pre-selected operations based on $UI_{SEL}$. It is appreciated that a directional input unit may acquire $UI_{SEL}$ from a single user input or from multiple concurrent user inputs.

Various temporal features of such movements may include, e.g., a velocity of at least one movable portion of a directional input unit, a velocity of at least one user body part contacting at least one stationary (or movable) portion of such an input unit, an acceleration of such a movable portion or such a user body part, an instance of starting a movement of such a portion (or user body part), an instance of finishing the movement of such a portion (or user body part), a duration of such a movement, or the like. It is appreciated that the velocity or acceleration may be a scalar or a vector and that the velocity or acceleration may include a curvilinear value such as, e.g., a linear or angular velocity, a linear or angular acceleration, or the like. Therefore, a terminal may acquire different $UI_{SEL}$'s from a $1^{st}$ force forwardly pushing a movable portion of a directional input unit, from a $2^{nd}$ force backwardly pulling such a portion, from a $3^{rd}$ force of rotating such a portion, from a $4^{th}$ force vertically pressing such a portion, or the like. A directional input unit may also acquire $UI_{SEL}$ from only one component of one of such forces, from two components of at least one of such force, or the like, where the force may include components which are [1] defined in a Cartesian coordinate such as $f_x$, $f_y$, and $f_z$, [2] which are defined in a cylindrical coordinate such as $f_r$, $f_\uparrow$, and $f_z$, or [3] which are defined in a spherical coordinate such as $f_r$, $f_\uparrow$, and $f_\uparrow$.

For example, when a user presses a movable portion of a directional input unit to the right, such an input unit acquires $UI_{SEL\text{-}1}$ from the movement, a terminal selects a pre-selected operations from a matching list based thereon, and then runs a single pre-selected operation such as, e.g., turning on its display unit, running a $1^{st}$ authentication operation, advancing to a lock mode, advancing to an unlock mode, or the like. Thereafter, a user may apply another user input to run another operation with the terminal.

In another example, as a user presses a movable portion of a directional input unit to the right, such an input unit acquires $UI_{SEL\text{-}1}$ from such a movement, a terminal selects two pre-selected operations from a matching list based thereon, and then the terminal runs two pre-selected operations either concurrently or sequentially. Accordingly, in response to a single user input, a terminal may run at least two pre-selected operations such that, e.g., a terminal may turn on a display unit and run a $1^{st}$ authentication operation (either concurrently or sequentially), a terminal may run a $1^{st}$ authentication operation and turn on a display unit (either concurrently or sequentially), a terminal may run a $1^{st}$ pre-selected operation and running a $1^{st}$ authentication operation (either concurrently or sequentially), or a terminal may run a $1^{st}$ authentication operation and run a $2^{nd}$ pre-selected operation. When one of such two pre-selected operations is an authentication operation, a terminal may advance to an unlock mode when a user passes the authenticating or instead advance to a lock mode when a user fails the authenticating.

In another example, when a user moves a finger from left to right across a stationary portion of a directional input unit while keeping the finger contacting such a portion, a directional input unit may acquire $UI_{SEL\text{-}2}$ from such a translating movement, and a terminal may select a single pre-selected operation from a matching list or may instead select at least two pre-selected operations from the matching list based thereon, e.g., running a $1^{st}$ authentication operation and a $2^{nd}$ authentication operation (concurrently or sequentially). Thereafter, a terminal may advance to a lock mode when a user fails at least one of such authenticating, may advance to an unlock mode when a user passes both of such authentication operations, may advance to a semi-unlock mode when a user passes only one of two authentication operations, or the like.

Various temporal features of such a movement may be combined with another feature such as a mass of at least one movable part of a directional input unit (or a user body part) such that a directional input unit may acquire $UI_{SEL}$ from, e.g., a force exerted to a movable or stationary portion of the input unit, a momentum of such a portion (or a user body part), or a mechanical energy applied to the input unit. It is appreciated that the force or the momentum may be a scalar or a vector and that the force or the momentum may include a curvilinear value such as a linear or angular force, a linear or angular momentum, or the like.

Various spatial features of such a movement may include, e.g., a starting position (before the movement) of a certain portion of a directional input unit, an ending position (after the movement) of the portion of such an input unit, a distance from the ending position to the starting position, a curvilinear movement path of such a portion, a length of such a curvilinear path, a direction of the movement, a distance from a certain reference point of a directional input unit to such a portion, an angle from the certain point in the cylindrical or spherical coordinate, or the like. In this context, such velocities, accelerations, forces or momentums as described above may be measured from the starting position to the ending position along a curvilinear path, or may be measured along a movement path which connects the starting position to the end position along a straight path.

For example, when a user swivels a movable portion of a directional input unit farther than one half of a full circular path, a directional input unit acquires $UI_{SEL-3}$ from such a movement, and a terminal selects a single operation from a matching list based thereupon, e.g., a camera operation. In another example, when a user moves the movable portion along a zigzag path, a directional input unit may acquire $UI_{SEL-4}$ from such a movement, and a terminal may select and run two operations from a matching list based thereupon, e.g., running a $1^{st}$ authentication operation and turning on a display unit concurrently with each other. Based on the results of the authenticating, a terminal may then advance to a lock mode or unlock mode.

Therefore and in another exemplary embodiment of the eighth exemplary aspect, a directional input unit may directly (or indirectly) acquire at least one $UI_{SEL}$ from a sequence of the same, similar or different movements of, e.g., [1] at least one movable portion of a directional input unit, [2] at least one user body part on, over or across such a input unit, [3] at least one non-user object on, over or across the input unit, or [4] at least one user body part (or non-user object) which are disposed at a certain distance from the input unit. Based upon such sequences, a directional input unit acquires at least one $UI_{SEL}$ and generates at least one control signal based thereon. A terminal receives the control signal(s) and runs at least one pre-selected operation which is (or are) selected from multiple pre-selected operations based upon $UI_{SEL}$. It is appreciated that a directional input unit may acquire at least one $UI_{SEL}$ from a single user input or multiple concurrent user inputs. It is also appreciated that, even when two sequences may include identical multiple movements, such sequences are deemed to be different from each other when an order of such movements changes.

A sequence of movements presumes a user providing a single user input or multiple concurrent user inputs, where a single user input or at least one of multiple user inputs involves multiple concurrent (or sequential) movements of [1] a single movable portion of a single directional input unit, [2] multiple movable portions of a single directional input unit, or [3] multiple movable portions of multiple input units, where one of such input units is a directional input unit. In the alternative, a sequence of movements may involve multiple concurrent (or sequential) movements of [1] a single user body part moving over or across a single directional input unit while maintaining a contact with such an input unit, [2] at least two user body parts moving over or across a single directional input unit while maintaining a contact between at least one of such body parts and the input unit, [3] multiple user body parts moving on, over or across multiple input units, where at least one of such input units is a directional input unit and where a user maintains a contact between the directional input unit and at least one of his or her body parts, or the like. Alternatively, the sequence of movements may include multiple concurrent (or sequential) movements of [1] a single non-user object moving over or across a single directional input unit while maintaining a contact with such an input unit, [2] multiple non-user objects moving over or across a single directional input unit while maintaining a contact therewith, or [3] multiple non-user objects moving over multiple input units, where one of such input units is a directional input unit. In addition, a sequence of movements may be a combination of at least two of any of the above.

For example, a user may provide at least two movements concurrently such as, e.g., vertically pressing while translating a movable portion of a directional input unit, vertically pressing while angularly rotating a movable portion thereof, contacting without pressing while circling his or her finger around and over such an input unit, or the like. In another example, a user may provide multiple movements rather sequentially, with including a temporal gap therebetween, but without providing any temporal overlap therebetween, or the like. In another example, a user may provide multiple same or similar movements concurrently such as, e.g., [1] pressing a $1^{st}$ stationary (or movable) portion of a directional input unit with a $1^{st}$ finger while concurrently pressing a $2^{nd}$ movable (or stationary) portion of the same directional input unit with a $2^{nd}$ finger, [2] pressing a movable (or stationary) portion of a $1^{st}$ directional input unit with a $1^{st}$ finger while concurrently pressing a stationary (or movable) portion of a $2^{nd}$ directional (or non-directional) input unit with a $2^{nd}$ finger, or the like.

When multiple sequences include the same number of multiple movements of the identical types in the same order, such multiple sequences may be deemed to be identical to each other. However, such sequences are deemed to be different from each other, e.g., [1] when a duration of at least one movement of a $1^{st}$ sequence is different from a duration of at least one corresponding movement of a $2^{nd}$ sequence, [2] when a duration of a gap defined between two movements of a $1^{st}$ sequence is different from a duration of a corresponding gap between two movements of a $2^{nd}$ sequence, [3] when a duration of an overlap between two movements of a $1^{st}$ sequence may be different from another duration of a corresponding overlap between two movements of a $2^{nd}$ sequence, [4] when a ratio of a duration of at least one movement (or a duration of a gap or an overlap) of a $1^{st}$ sequence to a reference may be different from another ratio of a duration of at least one movement (of a duration of a gap or an overlap) of a $2^{nd}$ sequence to such a reference, [5] when a $1^{st}$ ratio of a duration of a $1^{st}$ sequence to a preset ($1^{st}$) reference may be different from a $2^{nd}$ ratio of a duration of a $2^{nd}$ sequence to a preset ($2^{nd}$) reference, [6] when other temporal sequence or other characteristics of a $1^{st}$ sequence may be different from corresponding temporal sequence or characteristics of a $2^{nd}$ sequence, or the like.

As described above, a user input is deemed to be synonymous with a single user input which refers to a user input which is supplied by a user to a directional input unit (or another input unit) of a terminal without having to detach his or her body part from a directional input unit. In this context, a single user input includes, e.g., a step in which a user starts to provide a user input through a movement of his or her body part or a non-user object, another step in which, once starting to provide the user input, the user continues (or does not stop) the movement, or the like. When such a user input does not relate to a direct manipulation of a movable or stationary portion of a directional input unit or does not relate to that of a user body part or a non-user object, but rather relates to indirect manipulation as described above, a single user input may similarly include, e.g., a step of starting sending electromagnetic (or acoustic) waves to a terminal or starting showing images to the terminal, another step of continuing (or not stopping) such sending or showings, or the like. When desirable, the user input may not include another step of not making an additional sending or additional showing other than original sending or showing, or the like.

When a directional input unit acquires $UI_{SEL}$ and send a control signal to a terminal, a terminal may select at least one operation from a set of multiple pre-selected operations based on the matching list and run such an operation. When a terminal may acquire $UI_{SEL}$ based upon at least two movements of a movable portion of a directional input unit (or at least two movements of a user body part or those of a non-user object), however, a terminal may select multiple pre-selected operations from a matching list based on a single $UI_{SEL}$ and then run such multiple pre-selected operations either concurrently or sequentially. In contrary, a directional input unit may acquire multiple $UI_{SEL}$'s from a single user input which may involve multiple movements therein, and may also generate multiple control signals either concurrently or sequentially. Upon receiving such control signals, a terminal selects multiple pre-selected operations based on a matching list, and runs multiple pre-selected operations either concurrently or sequentially. As discussed above, a user input involving multiple movements may still be deemed as a single user input within the scope of this disclosure as long as such a user input satisfies various requirements as described hereinabove, regardless of whether a directional input unit may acquire a single $UI_{SEL}$ or multiple $UI_{SEL}$'s therefrom.

In contrary to such examples of the preceding paragraph, a directional input unit may acquire a single $UI_{SEL}$ or multiple $UI_{SEL}$'s which involve multiple movements therein, but a terminal does not have to run two or more operations. Rather, a terminal selects a single operation to run based on at least one of multiple movements, while a terminal may select what kind of (or how much) access authority to grant to a user based on another of such movements.

In one example, a user may touch or contact a certain portion of a top surface of a directional input unit while translating his or her finger with respect to such an input unit. Based on a position of the portion touched by a user, a terminal selects which one of multiple pre-selected operations to run, e.g., selecting to run an e-mail operation. In addition, based on a type or a nature of the translating movement (e.g., a straight one, a curved one, a direction of such a movement, or the like), a terminal selects what kind of access authority to grant a user and then allows a user, e.g., [1] to access all previous and current emails, [2] to access emails which are related only to work, [3] to access only new emails, or the like. In other words, according to the access authority granted to a user, a terminal may allow a user to access different portions of data stored inside or outside a terminal.

In another example, a user may press a press-ID element of a directional input unit while also pivoting such an element in a north-east direction. Based upon an intensity of a force provided by a user to the element, a terminal selects which one of multiple pre-selected operations to run, e.g., selecting to run a word-processing operation. In addition, based upon a direction of the pivoting, a terminal selects what kind of access authority to grant a user and then allows a user [1] to only create a new document by granting a user with a $1^{st}$ access authority, [2] to review and edit an existing document by granting a user with a $2^{nd}$ access authority, or the like, i.e., by allowing a user to access different portions of data stored inside or outside a terminal.

In another example, a user may touch a press-ID element of a directional input unit while also swiveling his or her finger along a circular path. Based on a position which is touched by a user, a terminal selects which one of multiple pre-selected operations to run, e.g., selecting to run a game operation. In addition, based on a shape of a path of the swiveling movement, a terminal selects what kind of access authority to grant a user and then allows a user [1] to only play in a beginner's level, or [2] to play in an advanced level while utilizing various options provided by such a game, i.e., by allowing a user to utilize different amounts (or extents) of various options of an operation.

In another exemplary embodiment of this eighth exemplary aspect, a directional input unit acquires at least one $UI_{SEL}$ from various temporal features of such movements, where examples of such features may include, but not limited to, [1] an instance of starting such a movement, [2] an instance of ending the movement, [3] a duration of the movement, or the like. Based on such temporal features, a directional input unit acquires at least one $UI_{SEL}$ and then generates at least one control signal based thereon. A terminal receives the control signal(s) and runs at least one pre-selected operation(s) which is (or are) selected from a set of multiple pre-selected operations based on the control signal(s) (i.e., $UI_{SEL}$ ('s)). It is noted that a directional input unit may acquire $UI_{SEL}$ from a single user input (or multiple concurrent user inputs). It is also appreciated that, even if multiple movements may occur for the same duration, such movements may result in different $UI_{SEL}$'s based on the starting or ending instances.

In general, a duration of a movement generally refers to a temporal period of a movement. More particularly, a duration of a movement refers (or relates) to at least one period of a movement such as, e.g., [1] a period required to move from a $1^{st}$ point of a movement path to a $2^{nd}$ point of such a path, [2] a period required to move along a certain portion of the movement path, [3] a period required to move along a pre-selected path, while excluding a period to move off such a path, or the like. A duration may also be defined as an absolute period of time or in a relative sense, where a relative period may be defined as a ratio of an absolute period of a movement to a reference time.

When a user input includes multiple movements therein, a duration may refer to each period of a movement, a sum of multiple periods of multiple movements, or the like. When at least two movements are separated by a temporal gap, a duration may or may not include such a gap. In addition, when at least two movements overlap each other, a duration may count such an overlap only once, such that a duration refers to a period from a starting instance of a $1^{st}$ movement to an ending instance of a $2^{nd}$ movement. Alternatively, when a user input includes a single movement which in turn includes multiple segments, the above examples of this paragraph also applies to each segment or to an overall movement.

A duration of such a movement may be directly monitored by any prior art clock or timer. In the alternative, a duration may be indirectly measured by a prior art force transducer or a prior art acceleration sensor, e.g., by an analytic or numerical integration of an acceleration, velocity, or the like. In addition, such a duration may be measured using an image sensor such as a camera or other image acquisition sensors.

Based on such control signals, a terminal may select at least one operation from a set of multiple operations pre-selected by a user (or a terminal). When a user input involves multiple movements, [1] each movement may represent a different $UI_{SEL}$ as well as a certain pre-selected operation matching such $UI_{SEL}$, [2] at least one movement may represent a certain access authority as described above, or the like. Therefore, when a user translates at least one portion of a directional input unit (with or without pressing such a portion) for a period longer than a preset threshold or when a user moves at least one body part with respect to the input unit for such a longer period, a terminal selects and runs one of multiple pre-selected operations. However, when a user translates the same portion for a period shorter than a preset threshold, a terminal may instead [1] run a different pre-selected operation, [2] run the same pre-selected operation but only with a less access authority, or the like.

In another example, when a user translates the portion of the input unit along a curvilinear path with multiple segments while assigning a shorter period of time with a $1^{st}$ segment while spending a longer period of time with a $2^{nd}$ segment, a directional input unit may acquire $UI_{SEL-1}$ and a terminal may select a certain operation such as, e.g., a navigation operation. However, when a user spends more time along the $1^{st}$ segment than $2^{nd}$ segment, a terminal may then run another operation such as, e.g., a voice-command operation such as Siri. In another example, when a user touches or contacts the portion (with or without pressing the portion) while translating or pivoting the portion for a longer period of time, a terminal may turn on a display unit, run an authentication operation (either concurrently or sequentially), and advance to (or remains in) a lock mode when a user fails the authenticating but advance to an unlock mode when a user passes the authenticating. Alternatively, when a user touches or contacts the portion while translating or pivoting the portion for a short period of time, a terminal then turns on its display unit and stays in (or switches to) a lock (or unlock) mode.

In another exemplary embodiment of this eighth exemplary aspect, such a directional input unit may acquire at least one $UI_{SEL}$ from a number of such movements. For example, a user may provide a single input which is associated with multiple concurrent (or sequential) movements, or may provide multiple concurrent user inputs each of which may be associated with at least one movement. A directional input unit then generates a control signal matching with such $UI_{SEL}$. A terminal then selects at least one operation from a set of multiple pre-selected operations, and runs the operation.

A user input may be associated with various movements examples of which may include, but not limited to [1] movements of at least one movable portion of a directional input unit, [2] movements of at least one body part of a user, [3] movements of at least one non-user object, or [4] movements of at least one body part or non-user object which does not contact any portion of a terminal (or a directional input unit) but which may rather be disposed away from a terminal (or a directional input unit) at a certain distance. Similarly, examples of a number of such movements may include or relate to [1] a number of movable portions of a directional input unit involved in the movement, [2] a number of user's body parts involved therein, [3] a number of non-user objects involved therein, or [4] a combination of the above. When multiple movements are involved in a user input, a pattern of each movement, a number of temporal gaps included therein, a number of temporal overlaps included therein or other characteristics of such gaps or overlaps may be used in acquiring $UI_{SEL}$ as well. A terminal may also utilize the number of movements or various features associated with such numbers similar to the above temporal or spatial features of various movements, or sequence of such movements.

A number of movements or movement sequences associated with various user inputs may be monitored by various conventional sensors such as, e.g., a prior art clock or timer, a prior art force or acceleration sensor, a prior art displacement sensor, a prior art motion or position sensor, or the like. When desirable, a terminal may indirectly monitor such number or sequence by an image sensor such as, e.g., a camera or other image acquisition sensors, each capable of capturing images associated with such user inputs and analyzing such images from which a terminal may discern movements of movable portions of a directional input unit, those of user body parts which may (or may not) physically, electrically or magnetically contact at least a portion of a directional input unit or another part of a terminal. When desirable, a directional input unit or another part of a terminal may also acquire and analyze other features associated with the user inputs and indirectly acquire such a number of movements or movement sequences associated with various user inputs.

11-9. Interchangeability

Although the above embodiments or examples of this eighth exemplary aspect relate to various directional input units of a mobile communication terminal in general, it is to be understood that all such embodiments or examples equally apply to other mobile communication terminals each of which includes at least one input unit operating like such directional input units and, therefore, capable of acquiring selecting (user) sub-inputs ($UI_{SEL}$). Accordingly, various embodiments or examples of this eighth exemplary aspect may equally apply to any directional input unit of any mobile communication terminals.

Configurational or operational variations (or modifications) of such directional input units described in various embodiments or examples of this eighth exemplary aspect may be interchangeable so that certain features of one embodiment or one example of this eighth aspect may be applied to another embodiment or example of the same aspect. Other configurational or operational features, their variations or modifications of various directional input units of this eighth exemplary aspect may [1] apply to, [2] be incorporated into, [3] replace, [4] be replaced by, or [5] be combined with corresponding features of another exemplary aspect, embodiment or example of this disclosure described heretofore or to be described hereinafter, subject to a certain omission, addition, and/or modification, each of which may become apparent based on detailed context of this eighth exemplary aspect or other exemplary aspects of this disclosure.

12. Further Variations and Modifications

In the ninth exemplary aspect of this disclosure, various directional input units and various touch-ID or press-ID elements of such directional input units as well as various mobile communication terminals incorporating such directional input units may be modified or varied to receive various user inputs, to acquire various (user) sub-inputs, to generate various control signals. Therefore, when (or after) powering on, waking up, or switching modes, a terminal may run one or multiple pre-selected operations in direct or indirect response to various user inputs, various (user) sub-inputs or various control signals.

12-1. Intuitively Seamless Operations

In one exemplary embodiment of this ninth exemplary aspect, a terminal may match various selecting (user) sub-inputs ($UI_{SEL}$'s) to various movements caused by a user in order to grant him or her with different access authorities. More particularly, such a terminal may allow a user to use his or her intuitions to allocate different access authorities to each $UI_{SEL}$, thereby guaranteeing a user with seamless operations fortified with intuitive manipulations. To this end, a terminal may be configured to acquire $UI_{SEL}$ while monitoring a direction of the movement, a force causing the movement, a duration of the movement, or the like.

In one example, when a user rotates a movable portion of a directional input unit along a clockwise direction, a terminal (based on $UI_{SEL-CL}$, i.e., a clockwise selecting sub-input) runs a pre-selected operation while giving a user with more access authority. However, when a user rotates the movable portion in a counter-clockwise direction, a terminal (based on $UI_{SEL-CCL}$, i.e., a counter-clockwise selecting sub-input) may run the same (or a different) pre-selected operation while giving a user with less access authority. In the alternative, a terminal may be configured that, when a user rotates a movable portion over a greater (or smaller) angle, a terminal may run the same pre-selected operation (or different pre-selected operations) while granting the user with more (or less) access authority. This example also applies when a user provides a user input by moving his or her body part across or on a surface of a movable or stationary portion of a directional input unit (e.g., one with a press-ID element or another with a touch-ID element), when a user provides a user input by rotating a non-user object over such an input unit with or without contacting such an input unit, or the like.

In another example, when a user translates a movable portion of a directional input unit over a short distance, a terminal may run a pre-selected operation while granting less access authority to a user. However, when a user translates a movable portion over a greater distance, a terminal may instead run the same (or different) pre-selected operation while giving a user with more access authority. A terminal may be configured so that, when a user translates such a portion over a greater (or shorter) distance, a terminal may grant the user with access authority which is proportional to such a distance, regardless of a direction of a translating movement. This example also applies when a user provides a user input by translating his or her body part across or on a surface of a movable or stationary portion of a directional input unit (e.g., one with a touch-ID element or one with a touch-ID element), when a user provides a user input by translating a non-user object over such an input unit with or without contacting such an input unit, or the like.

In another example, when a user pushes or presses a movable portion of a directional input unit with a weak force (or for a shorter period), a terminal runs a pre-selected operation while granting less access authority to a user. However, when a user pushes or presses such a movable portion with a greater force (or for a longer period), a terminal runs the same (or different) pre-selected operation while granting a user with more access authority. Therefore, such a terminal may be configured that, when a user pushes or presses the portion with a force of a greater (or smaller) magnitude or for a longer (or shorted) period, a terminal may run the same (or different) pre-selected operation while grant the user with access authority which may be proportional to a magnitude of the force or to a length of the contact. These examples also apply when a user provides a user input by touching a body part across (or on) a surface of a movable or stationary portion of a directional input unit (e.g., one with a touch-ID or press-ID element), when a user provides a user input by employing a non-user object, or the like.

In another example, a terminal may grant a user with greater access authority when a user pivots a movable portion of a directional input unit (or his body part) over a greater angle, at a faster speed, with a greater force, for a longer period of time, for a greater number of times, or the like. Similarly, a terminal may grant a user with greater access authority when a user presses or pushes (or touches) a movable (or stationary) portion of a directional input unit for a longer period of time, at a faster speed, with a greater force, or with a greater number of times, or the like. Similarly, a terminal may grant greater access authority to a user as he or she makes a bigger motion such as, e.g., moving or waving at a terminal with bigger motions or bigger movements of his or her body parts, or the like.

12-2. Sensors for Acquiring Static and Dynamic Features

In another exemplary embodiment of this ninth exemplary aspect, a directional input unit acquires a selecting (user) sub-input ($UI_{SEL}$) from various static or dynamic features of structural or operational characteristics of a hardware element of such an input unit. For example, a directional input unit may acquire $UI_{SEL}$ from at least one static or dynamic feature of an electrical contact or a magnetic contact, those related to an opening (or a closing) of an electrical connection formed by the above electrical contacts, those related to an opening (or a closing) of a magnetic connection formed by the above magnetic contacts, those related to an opening (or a closing) of an optical connection formed by the above optical contacts, or the like. In addition, a directional input unit may acquire $UI_{SEL}$ from absolute values of the above features or from temporal or spatial changes in such values. Depending upon such static or dynamic features, a directional input unit may also generate different control signals at least one of which may correspond to a desired $UI_{SEL}$. A terminal may then select at least one pre-selected operation from a set of multiple pre-selected operations, and may then run the pre-selected operation when or (immediately) after a terminal powers on, wakes up, or switches modes.

It is appreciated that such static or dynamic features of structural or operational characteristics of a hardware element of a directional input unit have to inherently depend on the hardware element. Therefore, a shape, a size, an arrangement, a disposition, a mechanism of operation, a contact (mechanical, electrical, magnetic or optical), or a coupling (mechanical, electrical, magnetic or optical) may also determine such static or dynamic features. In addition, a response time, a sensitivity, a friction, or an elasticity may also affect such dynamic or static features to some extent.

In another exemplary embodiment of this ninth exemplary aspect, a directional input unit may also acquire a selecting (user) sub-input ($UI_{SEL}$) based upon various static or dynamic features of a movement of [1] at least one movable portion of a directional input unit, [2] at least one user body part which may directly or indirectly contact a movable (or stationary) portion of a directional input unit, [3] a non-user object, [4] a user body part or a non-user object which moves at a distance from such an input unit, or the like. Therefore, a directional input unit may acquire $UI_{SEL}$ from various static or dynamic features of (or associated with) such movements of a user body part or a non-user object, where such features may be defined in 2-D or 3-D, may be a vector or a scalar, or the like.

More examples of such features may include those which may be related to, e.g., [1] a force causing such a movement, [2] a velocity of the movement, [3] an acceleration of the movement, [4] a momentum of such a movement, [5] an energy associated with the movement, [6] a displacement caused by a movement, where each of such features may be defined in a 2-D or a 3-D space, may be a scalar or a vector (when applicable), may be an extent related to the movement (e.g., a magnitude, a speed, or a distance of travel), may relate to a path of the movement which may be time-varying or constant or which may be straight or curvilinear, may be a temporal duration, or the like. Such a feature may also include a 2-D or 3-D position which may cause or result from the movement such as, e.g., a starting point, an ending point, a point which lies along a 2-D or 3-D curvilinear path of the movement, or the like. Such features may also include a temporal change in any of such features (e.g., its change over time), a spatial change in any of such features (e.g., its change over a unit length or a unit angle in a preset direction), or the like. When the movement is oscillatory in its nature, such features may include various wave characteristics such as, e.g., a (maximum or minimum) amplitude, a frequency, a wavelength, a phase angle, a phase lag, or the like.

Various prior art sensors other than those described above may be implemented into a directional input unit in order to monitor at least one of the above features of such movements. In one example, a prior art position sensor may be recruited and included in a directional element, where such a sensor may monitor a position of at least one movable part of the input unit or at least one body part of a user (immediately) before a user provides a user input, while a user is providing a user input, (immediately) after a user is done with providing a user input, or the like. Such a sensor may monitor an absolute position of such a portion or body part in a desirable coordinate system such as, e.g., a Cartesian coordinate system, a cylindrical coordinate system, a spherical coordinate system, or another system customized for a certain configuration or mechanism of such an input unit. In the alternative, such a position sensor may monitor a relative position (i.e., a position of such a portion or user body part) with respect to a certain reference point, line or plane, or a movement path with respect to a certain reference point, line or plane in a certain coordinate system. Such a position sensor may monitor an absolute (or relative) position in a 2-D plane or in a 3-D space. Therefore, a directional input unit may incorporate a prior art position sensor such as, e.g., a capacitive transducer, a capacitive displacement sensor, an eddy-current sensor, an ultrasonic sensor, an inductive non-contact position sensor, a Hall-effect sensor, a gravity sensor, a laser-Doppler vibrometer (if a space is available), a linear variable displacement sensor (LVDT), a multi-axis displacement sensor, a photo-diode array, a piezo-electric transducer, a proximity sensor (optical), a rotary encoder (angular), a string potentiometer (e.g., string pot), a seismic displacement pickup, a potentiometer, or the like.

Various prior art switches may be implemented into a directional input unit in order to monitor at least one of the above features of such movements or, more particularly, to acquire $UI_{SEL}$. For example, prior art switches may be recruited so as to form at least one electrical connection between different elements of the input unit, where various poles or throws of various switches may serve as an electrical contact of a press-ID (or touch-ID) element or a directional element. Therefore, such prior art switches may be included in at least one of the elements of a directional input unit as long as such prior art switches may be shaped or sized to fit into such an element(s) of a directional input unit. In another example, such prior art switches may be (1) a single-pole, double-throw (SPDT) switch, (2) a single-pole, multiple-throw (SPMT) switch which is similar to the SPDT but includes multiple throws, (3) a double-pole, changeover (DPCO) switch, (4) a single-pole, changeover switch (SPCO) which is similar to DPCO but includes a single pole, or (5) multiple single-pole, single throw switches (SPST). In addition, any prior art switches, any prior art control units, or their hardware elements may also be recruited as long as such switches or control units may receive a user input or acquire $UI_{SEL}$, e.g., receiving a single user input which accompanies therewith $UI_{SEL}$ and optionally at least one another (user) sub-input. In another example, such switches, control units or their hardware elements which can be incorporated into the directional input unit may include those which may be conventionally incorporated into (or included) in [1] a video-game console (e.g., a joystick), [2] a computer (e.g., a pointing stick found in a prior art IBM laptop) or other computer peripherals, [3] a control seat of an electric vehicle or an airplane, [4] a control panel of a lab instrument, or [5] a control panel of other places such as a factory.

Other prior art sensors may be implemented into a directional input unit in order to monitor at least one of the above features of such movements. For example, a prior art motion sensor may be recruited and included in a directional element, where such a sensor may monitor movements of at least one portion of such an input unit or movement of at least one body part of a user. Typical examples of such prior art motion sensors may include, but not limited to, an accelerometer, a gyroscope, a compass, a barometer, or other sensors based on various images. In another example, a prior art displacement sensor may be recruited and included in the directional element, where such a sensor may monitor displacement of at least one portion of such an input unit or movement of at least one body part of a user caused by a user input. In another example, other prior art sensors which may sense a force, pressure, or the like, may also be recruited and included in such an input unit as long as such sensors may also monitor at least one of the above static or dynamic features of at least one movable portion of the input unit, at least one body part of a user, at least one non-user object, or the like.

12-3. Multiple Concurrent User Inputs and (User) Sub-Inputs

In another exemplary embodiment of this ninth exemplary aspect, a directional input unit may also include [1] multiple movable portions for receiving a single user input (or multiple concurrent user inputs) or for acquiring a single $UI_{SEL}$ (or multiple $UI_{SEL}$'s), [2] multiple stationary portions for receiving a single user input (or multiple concurrent user inputs) or for acquiring a single $UI_{SEL}$ (or multiple $UI_{SEL}$'s), or [3] at least one movable portion and at least one stationary portion for receiving a single user input (or multiple concurrent user inputs) or for acquiring a single $UI_{SEL}$ (or multiple $UI_{SEL}$'s) in combination. It is appreciated that a single user input refers to a user input applied to a terminal (or its directional input unit) in such a way that, once a user supplies a user input by generating a movement (of at least one movable portion of the input unit, of at least one body part of a user while contacting such an input unit, of a non-user object contacting such an input unit, or of such a body part or a non-user object disposed at a distance from the input unit and, therefore, not contacting such an input unit), a user does not detach his or her single body part (or all of his or her multiple body parts) or a non-user object (or all of multiple non-user objects) from a directional input unit or another input unit of the terminal until he or she is completely finished with providing the single user input to such an input unit or another input unit of a terminal. In such a context, when a user presses, pushes, contacts or touches a directional (or a non-directional) input unit with his or her multiple body parts, a user can still provide multiple concurrent user inputs, e.g., by generating a $2^{nd}$ movement which is different from an original $1^{st}$ movement with a certain body part, by generating a new movement with another body part, or by detaching a $2^{nd}$ body part from such an input unit as long as a user continues to press, push, contact or touch the input unit with a $1^{st}$ body part, or the like.

Therefore, when a single directional input unit (or multiple directional input units) of a terminal incorporates at least two of such movable or stationary portions of the above paragraph thereinto in order to acquire a single $UI_{SEL}$ or multiple $UI_{SEL}$'s, a user may provide a terminal (or its directional input unit) with "multiple concurrent user inputs" by concurrently providing to the terminal (or such an input unit), e.g., [1] an identical movement, a similar movement or a different movement to each of at least two movable portions of the multiple portions, [2] an identical contact (or touch), a similar contact or a different contact to each of at least two stationary (or movable) portions of such multiple portions, [3] a movement to at least one movable portion of such multiple portions, as well as a contact (or touch) to at least one stationary (or movable) portion of the multiple portions, [4] a movement as well as a contact to one of such multiple portions, along with only one of a movement and a touch to another of such multiple portions, or the like. As long as a directional input unit may acquire such $UI_{SEL}$ (or $UI_{SEL}$'s) from multiple concurrent user inputs, a terminal may allow a user to provide the directional input unit with various movements as described above.

It is appreciated that such "multiple concurrent movements" do not have to be provided to a single directional input unit (or at least two different directional input units) at exactly the same instance (or clock cycle). Rather, a user can provide a directional input unit with the "multiple concurrent movements" [1] when a user provides (or starts to provide) each of at least two movements at the exactly same instance (or clock cycle), [2] when a user provides (or starts to provide) a $1^{st}$ movement and then provides (or starts to provide) a $2^{nd}$ movement before a user finishes the $1^{st}$ movement, i.e., there exists at least one temporal overlap between such $1^{st}$ and $2^{nd}$ movements (i.e., in different clock cycles), [3] when a user provides (or starts to provide) each of multiple contacts (or touches) at the exactly identical instance (or clock cycle), [4] when a user provides (or starts to provide) a $1^{st}$ contact and then provides (or starts to provide) a $2^{nd}$ contact before a user finishes a $1^{st}$ contact (i.e., in different clock cycles), [5] when a user provides (or starts to provide) a $1^{st}$ movement (or $1^{st}$ contact) and thereafter provides a $2^{nd}$ contact (or $2^{nd}$ movement) before a user finishes the $1^{st}$ movement, respectively (i.e., starting in different clock cycles), or the like.

Therefore, a user may provide such multiple movements in various manners. For example, a user may move a $1^{st}$ movable portion of a directional input unit with a $1^{st}$ body part while moving another $2^{nd}$ movable portion of such an input unit with a $2^{nd}$ body part, where the $1^{st}$ (or $2^{nd}$) portion may incorporate therein the $2^{nd}$ (or $1^{st}$) portion, where the $1^{st}$ and $2^{nd}$ portions may be disposed away (or provided separately) from each other, or the like. In another example, a user may move a $1^{st}$ movable portion of a directional input unit with a $1^{st}$ body part while maintaining a contact with the $1^{st}$ portion (or a different $2^{nd}$ portion) of the same input unit with the $1^{st}$ body part (or a different $2^{nd}$ body part), where the $1^{st}$ portion may incorporate therein a $2^{nd}$ portion (or vice versa), where the $1^{st}$ and $2^{nd}$ portions are disposed away (or provided separately) from each other, or where the $1^{st}$ and $2^{nd}$ body parts correspond to the same body part of a user or such body parts are different body parts of the user. In another example, a user may touch a $1^{st}$ stationary (or movable) portion of a directional input unit with a $1^{st}$ body part, while manipulating a $2^{nd}$ movable portion of the same input unit with a $1^{st}$ (or $2^{nd}$) body part, where the $1^{st}$ portion may incorporate the $2^{nd}$ portion therein (or vice versa), where the $1^{st}$ and $2^{nd}$ portions are disposed away (or provided separately) from each other, or where the $1^{st}$ and $2^{nd}$ body parts are the same body part of a user or different body parts of the user. In another example, a user may touch a $1^{st}$ stationary (or movable) portion of a directional input unit with a $1^{st}$ body part while touching a $2^{nd}$ portion of the same unit with a $2^{nd}$ body part, where the $1^{st}$ portion may include the $2^{nd}$ portion therein (or vice versa), or where the $1^{st}$ and $2^{nd}$ portions are provided separately from each other.

It is noted in the preceding paragraph that the term "while" typically means that there is at least one temporal overlap between the movements, between the movement and the touch (or contact), or between the touches. It is also appreciated in the preceding paragraph that the $1^{st}$ and $2^{nd}$ body parts of a user may correspond to [1] a single body part, [2] multiple portions (e.g., a proximal end, a distal end, a median end, a dorsal end, or a ventral end) of a single body part (e.g., a finger, a palm, a back hand, an eye, an iris, a retina, or a face), [3] multiple fingers of the same hand, [4] multiple fingers of different hands, [5] one finger and another body part (e.g., a hand, a palm, a back hand, an eye, an iris, a retina, or a face), or [6] two different other body parts at least one of which can provide at least one physiological feature or condition as described above. It is noted in the two preceding paragraphs that at least one of such $1^{st}$ and $2^{nd}$ body parts may be replaced by at least one non-user object such that, e.g., a user may touch or press a directional input unit while manipulating his or her stylus or another non-user object, or the like. In addition, it is appreciated that the $1^{st}$ and $2^{nd}$ portion of a directional input unit may correspond to, e.g., [1] two portions of a single directional input unit, where a $1^{st}$ portion may incorporate a $2^{nd}$ portion therein or thereon, [2] a $1^{st}$ portion belongs to a $1^{st}$ directional input unit, while a $2^{nd}$ portion belongs to a $2^{nd}$ directional input unit, [3] a $1^{st}$ portion belongs to a directional input unit, while a $2^{nd}$ portion belongs to a non-directional input unit, or the like. For the $3^{rd}$ and last arrangement of the preceding sentence, [1] both of such directional and non-directional input units may be implemented into a mobile communication terminal, [2] one of such input units may be implemented to a non-user object, or [3] one of such input units may be incorporated into a prior art wearable device as described above.

More particularly, a user may manipulate (e.g., press, move, touch, contact, or the like) multiple movable or stationary portions of a directional input unit with one finger such as, e.g., by moving a $1^{st}$ portion with a tip of a finger while touching a $2^{nd}$ portion with a wide middle portion of the same finger, where the $2^{nd}$ portion sits on top of the $1^{st}$ portion. Alternatively, a user may manipulate multiple movable or stationary portions of such an input unit with at least two fingers of the same hand such as, e.g., by concurrently using a thumb as well as another finger of one hand while a user grabs a terminal with such a hand, by concurrently using a palm and one finger of one hand, or the like. A user may also manipulate multiple movable or stationary portions of such an input unit using two fingers of two different hands such as, e.g., by using a thumb of a right hand to run an authentication operation while concurrently pressing at least one button or touching a touch screen with an index finger of a left hand, by concurrently manipulating two fingers of two different hands on or over a touch screen, or the like. A user may instead move a movable portion of such an input unit with a finger, while providing various images, sounds, or electromagnetic (or acoustic) waves to another portion (or unit) of a terminal such as, e.g., by showing a face to a camera unit or another image acquisition unit, while touching such a portion of a directional input unit, or talking or singing to a terminal while pressing such a portion of such an input unit. Accordingly, such multiple portions of a directional input unit may concurrently acquire multiple (user) sub-inputs from each of such multiple portions. When desirable, a terminal (or its directional input unit) may also acquire at least two (user) sub-inputs one of which is an $UI_{SEL}$.

Thus, a directional input unit can acquire at least one $UI_{SEL}$ from each manipulation (e.g., a single movement, contact or touch directly or indirectly caused by a user) of at least two portions of a directional input unit, from a relative movement between multiple portions of a directional input unit (e.g., when the input unit acquires at least one $UI_{SEL}$ based on a distance between such movable or stationary portions), or the like. A directional input unit may generate an identical control signal when, e.g., such portions may be disposed in two different locations but where such multiple portions are separated by an identical distance.

A user may also use his or her single or multiple body part while (at least substantially) concurrently pressing, touching, contacting or otherwise manipulating multiple portions of a directional input unit (i.e., without having a considerable time gap therebetween, or without requiring a user from continuing to contact or touch such an input unit and then requiring the user to restart another manipulation, or the like). In other words, a user may press, push, contact, touch or otherwise manipulate such multiple portions of a directional input unit in a single movement (or effort) utilizing multiple body parts such as, e.g., multiple portions of a single finger, two fingers of the same or different hands, or the like. Therefore, such user inputs are deemed as a single user input within the scope of this disclosure. Of course a user may provide multiple (user) sub-inputs along with such a single user input. As a result, a directional input unit acquires $UI_{SEL}$ from such a single user input, and may optionally acquire at least one another (user) sub-inputs such as, e.g., $UI_{ACT}$, $UI_{THEN}$, $UI_{AUX}$, or the like In another exemplary embodiment of this ninth exemplary aspect, a directional input unit may acquire one or multiple (user) sub-inputs through at least one portion of the input unit, where one of the (user) sub-inputs is $UI_{SEL}$. As defined above, a single user input refers to an input applied to a terminal so that, once providing the user input by a movement (or contact) of at least one movable (or stationary) portion of such an input unit or by a movement of at least one user body part (or a non-user object) over, on or with respect to the input unit, a user does not have to stop the movement or contact and then to make any additional movement or touch of any portion of the input unit, the body part, or the non-user object. Thus, a directional input unit receives a single user input and acquires $UI_{SEL}$, optionally along with at least one another (user) sub-input, where a user may move multiple body parts with respect to the input unit, [1] where at least one body part supplies $UI_{SEL}$, while at least one another body part provides another (user) sub-input, [2] where multiple body parts supply $UI_{SEL}$ together, while at least one another body part provides another (user) sub-input, or [3] where multiple body parts together supply $UI_{SEL}$ as well as at least one another (user) sub-input, where a user may use such multiple body parts concurrently, i.e., not necessarily at the exactly same instance (or clock cycle), but with a temporal overlap between acquisition timings of at least two of such (user) sub-inputs. That is, a user may manipulate such multiple portions of a directional input unit in a single movement by using his or her multiple body parts, e.g., two portions of a single finger, two fingers of the same or different hands, or the like.

More particularly, a user may manipulate his or her multiple body parts with respect to a directional input unit (at least substantially) concurrently, e.g., similar to a prior art "pinch-to-zoom" or touching different portions of a directional input unit with two fingers. A user may instead manipulate one or more fingers and an eye (or a face) with respect to such a directional input unit at least substantially concurrently, e.g., pushing or touching at least one portion of a directional input unit with a finger and concurrently disposing his (or her) face (or eye) for being captured by a camera element, e.g., to run a fingerprint authentication operation and a face (or an iris) authentication operation. Other combinations are also possible but details are omitted here.

It is appreciated that the "user input" or "single user input" explained in this Sub-Section 12.3 is to be referred to as the "$3^{rd}$ user input" or as the "$3^{rd}$ single user input" hereinafter. Of course this $3^{rd}$ single user input is one of "user inputs" or "single user inputs" as will be explained below.

12-4. Manually Selecting Pre-Selected Operations

As described above, a terminal (or a user) may select multiple pre-selected operations and may match such operations with multiple $UI_{SEL}$'s in various ways in such a way that a user may select at least one operation from a set of multiple pre-selected operations while a terminal is in its off-state and that a terminal runs the selected operation when or (immediately) after a terminal powers on, wakes up, or switches modes. Such a terminal may run the selected operation either concurrently with, (immediately) after or with a certain period of time after a terminal may [1] turn on a display unit, [2] run (or start to run) at least one authentication operation, [3] start such turning or running, or [4] complete such turning or running. Accordingly, a terminal (or a user) may choose at least two operations to be included in the set of multiple pre-selected operations, e.g., [1] after a terminal manufacturer manufactures the terminal, [2] after a wholesaler or retailer purchases a terminal but before selling the terminal to a user, [3] after a user purchases a terminal but before he or she uses such a terminal, [4] while a user uses such a terminal, or the like.

In another exemplary embodiment of this ninth exemplary aspect, a manufacturer of a terminal may choose multiple pre-selected operations and may include them into a set of such multiple pre-selected operations. A manufacturer may then assign each of such multiple pre-selected operations into each of multiple different or unique $UI_{SEL}$'s so that such a set may establish a 1-to-1, 1-to-multiple, multiple-to-1 or multiple-to-multiple matching therebetween. Thereafter, a terminal may allow a user to add at least new operation to a set or to delete at least one operation therefrom. Thus, by assigning a new operation to a new $UI_{SEL}$, a new matching is established between the new operation and the new $UI_{SEL}$. To the contrary, by invalidating or canceling a pre-existing matching between at least one operation and at least one $UI_{SEL}$, a previous matching is deleted from such a set. In either way, an entire matching in such a set may also be modified or updated. A terminal may lock such a set in order to prevent a user from adding any new operation thereto, from deleting any pre-existing operation therefrom, from changing the matching between such pre-selected operations and $UI_{SEL}$'s, or the like. Accordingly, an entire matching in such a set may not be modified or updated. In the alternative, a terminal may allow a user to add certain operations to a set, to delete any (or only certain) operations from a set, or the like.

In another exemplary embodiment of this ninth exemplary aspect, a terminal manufacturer selects multiple operations, include such pre-selected operations to the set as described in the above example, but allows a user to modify or update the set. Alternatively, a terminal may not select any pre-selected operation so that such a set may remain empty or may instead include at least one essential pre-selected operation which a user may or may not delete. In either case, a user may select at least one operation of his or her own choice and includes such an operation into such a set. Such a terminal may match each of such $UI_{SEL}$'s with each of such multiple pre-selected operations, e.g., [1] based upon a temporal order of selection, [2] based upon an order as stored in such a set, [3] based on a priority determined by a user, [4] in an alphabetical (or reverse) order, [5] randomly, or the like. In either way, an entire matching in a set may then be established. A user may add at least one new operation to such a set or may delete at least one pre-existing operation therefrom. Alternatively, a user may lock the set such that only an authorized user may change the set (or even such a user may not change the set). When desirable, a terminal may allow a user to change matchings in the set so that multiple $UI_{SEL}$'s may be matched to different control signals or to different pre-selected operations and that a terminal may locate which one of such multiple pre-selected operations to run in one of various timings as described above.

12-5. Adaptively Selecting Pre-Selected Operations

In another exemplary embodiment of this ninth exemplary aspect, a terminal may be configured to select the pre-selected operations adaptively. That is, a terminal is equipped with an "adaptive selection" capability and, therefore, such a terminal may adaptively choose such multiple pre-selected operations and establish the set which matches multiple $UI_{SEL}$'s with multiple pre-selected operations (or multiple control signals) according to, e.g., 1-to-1, 1-to-n, m-to-1 or m-to-n matchings. To this end, such a matching list may be provided to a user as an empty set (i.e., no pre-selected operations stored therein), as a set with one or multiple manufacturer-selected operations included therein, or the like. A user may then add a new operation to such a set, may replace pre-existing operations with new operations (e.g., newer version of the same operations or different operations), or the like. Thereafter, a terminal may [1] add new operations to the set, [2] delete pre-existing operations from the set, [3] modify pre-existing operations in the set, [4] rearrange an order of operations in the set, [5] change or modify a matching between at least one $UI_{SEL}$ and at least one pre-selected operation (or control signal), [6] grant an access authority to such operations in the set, [7] cancel an access authority therefrom, [8] modify access authority granted to some of such operations, or the like, according to at least one preset "criterion" which may be manually selected by a user or adaptively selected by a terminal.

In one example, a terminal may update or modify pre-selected operations included in such a set based upon at least one of following criteria such as, e.g., [1] a frequency of running such operations by a user (e.g., the most (or $2^{nd}$ most) frequently used operation, or the least used operation), [2] a temporal period which a user spends in running such an operation (e.g., the longest used operation in a single run or cumulatively), [3] an order of running multiple operations (e.g., running an email operation followed by running a SNS operation), [4] the most (or $2^{nd}$ most) frequently used operation while switching from an off-state (in which a display unit is turned off) to an active state (in which a display unit is turned on), [5] the most (or $2^{nd}$ most) frequently used operation while switching from an active state to an off-state, [6] a time of the day (e.g., running work-related operations during the daytime, but running operations related to personal matters at night), [7] a place or location (e.g., running work-related operations in the work place, but running operations for personal matters away from an office or at home), [8] an environment (e.g., running a SNS operation for checking a rating in a restaurant or for shopping information at a shopping mall, [9] access authorities which a user grants to such operations run by a terminal (e.g., promoting an operation with the greatest access authority to the top of such a set, while demoting an operation with the least access authority to a bottom of the set or deleting such an operation from the set), or the like.

In another example, a terminal may update or modify such a set of multiple pre-selected operations and also change matchings between multiple $UI_{SEL}$'s with multiple pre-selected operations (or multiple control signals) in various ways based on any of the above criteria. In one case, a terminal monitors each operation run by a user, collects use information, and obtains use statistics of the user. Based on such statistics and the preset criterion as described above, a terminal may modify such set of multiple pre-selected operations (i.e., adding new operations thereto, deleting pre-existing operations therefrom, changing orders of such operation inside the set, or the like) in various instances such as, e.g., [1] when a user activates a terminal (i.e., turning on a display unit), [2] when a user inactivates a terminal (i.e., turning off a display unit), [3] when a user powers on a terminal from a power-off state, [4] when a user powers off a terminal from a power-on state, [5] when a user commands to do so, or the like.

It is appreciated that a user provides a terminal with a user input which includes at least one $UI_{SEL}$ therein so that a terminal may run at least one pre-selected operation when or (immediately) after it powers on, wakes up, or switches modes. Therefore, it is desirable of a user to be aware which $UI_{SEL}$ renders a terminal run a pre-selected operation when it turns on a display unit (or when it advances to a certain mode of operation) or which $UI_{SEL}$ may match which pre-selected operation. To this end and in another example, a terminal may update or modify such a set of multiple pre-selected operations or may change such matchings between multiple $UI_{SEL}$'s and multiple pre-selected operations (or multiple control signals) in such a set, only after obtaining an approval from a user, preferably in advance. A terminal may obtain such a pre-approval in various instances such as, e.g., [1] when a user activates a terminal (i.e., turning on a display unit), [2] when a user inactivates a terminal (i.e., turning off its display unit), [3] when a user powers on a terminal from its power-off state, [4] when a user powers off a terminal from its power-on state, [5] when a user commands to do so, [6] at a certain time of a day (e.g., at every midnight), [7] at a certain day of a week or month (e.g., at every Sunday, on every $1^{st}$ (or last) day of a month, or the like.

In another example, it is desirable of a user to know (or acknowledge) what types of changes or updates are to be (or have been) made onto such a set matching multiple $UI_{SEL}$'s with multiple pre-selected operations (or multiple control signals). Therefore, once a terminal changes or modifies such a set (with or without a user's pre-approval), a terminal may inform a user of a new list of operations included in such a set, new matchings between multiple $UI_{SEL}$'s and multiple pre-selected operations, or the like. In one case, a terminal may use various notice units as have been described above while generating visual, audible or tactile notice signals. In another case, a terminal may use its display unit to display such a new list of the set, such new matchings, or the like, while optionally generating such audible or tactile notice signals.

After a terminal changes or modifies a matching list (e.g., adding new operations to the set, deleting certain operations therefrom, rearranging an order of such operations therein, modifying access authorities granted thereto, or the like), a terminal may alert a user by displaying such operations included in a new matching list, with optionally highlighting changes (e.g., additions, deletions or modifications) made to such a matching list in the sub-screens or on the display unit. More particularly, after making such modifications or changes in the matching list, a terminal may still display unchanged multiple $UI_{SEL}$'s or multiple pre-selected operations on the same sub-screens (or in the same locations on the display unit), while optionally highlighting changes in $UI_{SEL}$'s or pre-selected operations. Alternatively, a terminal may display the unchanged as well as modified $UI_{SEL}$'s or pre-selected operations in a new order or arrangement.

When a terminal monitors a change in a use pattern of various operations, a terminal may modify or change the matching list in response thereto. However, when such modifications or changes are based on a minute change in the use pattern, a user may feel confused rather than satisfied. In order to overcome this problem, a terminal may monitor a change in the use pattern and then modify or change the matching list only when a change exceeds a preset threshold. Accordingly, when a terminal identifies a change in the use patter which exceeds a certain range, a terminal regards a pre-existing matching list as invalid or obsolete and changes or modifies the list. More particularly, when a terminal uses a single criterion, a terminal may readily review and identify a change in a use pattern and, when necessary, may update or modify the matching list. When a terminal employs multiple preset criteria, however, a terminal may obtain a score or an arithmetic, weighted or another average of such changes in the use pattern, and may update or modify the matching list based thereon.

After monitoring use statistics, a terminal may adopt a new criterion or delete a pre-existing criterion, with or without a request by a user, with or without obtaining a pre-approval from a user, or the like. Based thereon, a terminal may modify or change the matching list of multiple pre-selected operations as well. Alternatively, a user may adopt a new criterion or delete a pre-existing criterion. When a terminal adopts multiple criteria as described above, a terminal (or user) may change weighting factors for each criterion. In addition, a terminal may allow a user to turn on or off such adaptive selection capability.

12-6. Switching Modes of Operation

In another exemplary embodiment of this ninth exemplary aspect, various directional input units may receive a single user input including therein at least one $UI_{SEL}$ which represents that a pre-selected operation is the one of switching a mode of operation. It is appreciated that the operation of "switching a mode of operation" corresponds to an operation of "advancing a terminal" to a certain mode of operation, particularly when such a terminal was (or has been) in an off-state and its display unit was (or has been) turned off. Therefore, while or (immediately) after powering on, waking up, or switching modes, such a terminal advances to a lock mode, an unlock mode or an intermediate mode based on $UI_{SEL}$.

In some occasions, however, a terminal which is about to power on or wake up from its off-state may advance to a certain mode or state not only based on $UI_{SEL}$ but also on results obtained by running another operation. A typical example of such an occasion is when a terminal employs at least one user authentication and runs at least one authentication operation concurrently with (or sequentially after) receiving a user input (or acquiring $UI_{THEN}$). Thereafter, a terminal may advance to a lock mode when a user fails the authenticating, regardless of whether $UI_{SEL}$ represents running a pre-selected operation of advancing to an unlock mode. When a user passes such authenticating, a terminal may advance to an unlock mode, or a terminal may still advance to a lock (or intermediate) mode when $UI_{SEL}$ represents running a pre-selected operation of advancing to a lock (or intermediate) mode, regardless of the results from the user authentication. It then follows that a terminal may employ one of various hierarchies to advance to a lock mode, to an unlock mode or to any intermediate mode.

As described above, once advancing to or operating in an unlock mode, a terminal may typically grant a user to access [1] an entire (or at least a substantial) portion of at least one hardware element of a terminal, [2] all (or almost all) hardware elements of a terminal, [3] an entire (or at least a substantial) portion of at least one software element thereof, [4] all (or almost all) software elements thereof, or the like. Therefore, a terminal operating in an unlock mode may grant a current user to [5] run all (or a majority of) operations which can be run (or executed) by the hardware or software elements of a terminal, [6] select all (or a majority of) options available in running the operation, [7] access or retrieve all (or a majority of) data permanently or temporarily stored in a memory member or other hardware elements, [8] store all (or a majority of) data into the memory member or other hardware elements when needed, or [9] modify, change or rearrange all an entire (or only a selected) portion of such hardware or software elements.

In contrary, when a terminal advances to or operates in a lock mode, a terminal may typically grant the user with the least access authority. Therefore, a user may not access any portion or any element as described in [1] to [4] of the preceding paragraph in a lock mode, may not run any operation as enumerated in [5] to [9] in the preceding paragraph in a lock mode, or the like. In the alternative, a user may access only a limited portion or element as described in [1] to [4] of the above paragraph in a lock mode, or may run only a limited number of operation as enumerated in [5] to [9] in the preceding paragraph in a lock mode. When a terminal advances to or operates in an intermediate mode, a terminal may grant a user with access authorities which fall between those in the unlock mode and those in the lock mode.

Various directional input units as described above may be recruited for switching (or advancing to) a mode of operation. In one example, the matching list may include at least one $UI_{SEL}$ which is matched to an operation of switching (or advancing to) a certain mode of operation. Based thereon, a terminal may switch or advance to a complete lock mode, a partial lock mode, a partial unlock mode, a complete unlock mode, or the like. In the alternative, a terminal may switch or advance to an unlock mode with the most access authorities, a semi-unlock mode with more access authorities, a semi-lock mode with less access authorities, a lock mode with the least access authorities, or the like. In other words, a terminal may define various hierarchies each of which may include multiple modes with different access authorities.

It is appreciated that a terminal typically requires a user authentication when a user switches from a $1^{st}$ mode granted with less access authority to a $2^{nd}$ mode granted with more of such access authority. However, such a terminal may not require any authenticating when it switches from a mode with more access authority to a mode with less access authority. Although a terminal may switch a mode of operation according to the above typical arrangements, a terminal may switch or advance to a new mode in different arrangements, where one example of such arrangements is when a user provides a certain $UI_{SEL}$ with an intention that a terminal must switch (or advance) to a desirable mode of operation, whether or not a user may pass such authenticating. It is therefore understood that a software designer may configure an O/S or a (software) application in order to account for such various design interests, user needs or user convenience.

In the above examples of this exemplary embodiment of the ninth exemplary aspect, it is presumed that a user provides a terminal with a user input including therein or accompanying therewith $UI_{SEL}$ which corresponds to an operation of switching to a preset mode in which a user may desire to operate a terminal when or (immediately) after a terminal powers on, wakes up, or switches modes. In another exemplary embodiment of this ninth exemplary aspect, however, a user may instead manipulate a terminal to advance to (or switch to) a certain mode, not by directly rendering a terminal advance to a certain mode of operation but by rendering the terminal run a certain pre-selected operation which may have to be run in a certain mode of operation. In other words, by providing $UI_{SEL}$ and selecting a certain operation, the terminal indirectly selects in which mode it should operate once powering on, waking up, or switching modes. In some cases, the indirect selection of the modes may be straightforward so that running a database operation on personal financial data requires a certain authority to access personal data, running an email operation to coworkers may not require higher access authority, or the like. In other cases where matching a proper access authority to a certain operation is not straightforward, a user may grant a desired access authority to a certain operation.

In another exemplary embodiment of this ninth exemplary aspect, a terminal may also allow a user to drive a preset hardware element or to execute a certain software element with the same access authority regardless of circumstances. To the contrary, a terminal may allow the user to drive such an element or to execute such an element with different access authorities based on circumstances. Therefore, when a user runs an email operation, a terminal may grant a user with the same access authority whether a user selects a coworker or a family member as a recipient. In the alternative, such a terminal may selectively grant a user with different access authority depending upon which person a user selects as a recipient.

To this end, a terminal may allow a user to access its storage member but, depending upon a user's access authority, a terminal may allow a user to access different portions of data stored therein, to access different sectors of the storage member, to execute different portions of a software element, or the like. Therefore, it may be desired to notify a user of a mode of operation which a terminal takes such a user. A user may then ascertain he or she is to operate a terminal in a right or desirable mode of operation. When a user finds out that he or she is in a wrong mode of operation, a user may [1] provide $UI_{SEL}$ once more, [2] provide different $UI_{THEN}$ for another authenticating, or [3] take other remedial actions.

As described above, a terminal may generate various notice signals about which mode of operation a terminal may advance to and in which mode of operation he or she is to operate by providing, e.g., [1] visual signals each of which corresponds to each of such modes of operation by utilizing different colors, brightness, contrasts, or hues, by displaying different characters, images or objects in different shapes, sizes, patterns or arrangements, [2] audible signals each corresponding to each of such different modes of operation by using different melodies, sounds, beeps, or the like, by generating such signals in different volumes or durations with or without temporal gaps or overlaps, or [3] tactile signals each corresponding to each of such modes of operation by using a vibration or a series of vibrations in different amplitudes or durations, with or without any temporal gaps or overlaps, by generating such vibrations in a preset location of a terminal (from a right side of a terminal or a back side thereof), or the like. As a result, a user may ascertain which mode of operation he or she is getting into. When a user finds that a terminal takes him or her to a mode different from what a user expected, then he or she may take remedial actions.

12-7. Details of Type-2 Directional Input Units

As described above, one of the objectives of various mobile communication terminals of this disclosure is to receive a single user input (or multiple concurrent user inputs) and to acquire therefrom at least one (user) sub-input which includes $UI_{SEL}$, where a user input corresponds to a contact, a touch or multiple touches (i.e., "multi-touch" hereinafter) by at least one body part of a user (or a non-user object) and where such a contact, touch or multi-touch by a body part(s) or a non-user object is performed by a user with respect to at least one stationary portion or a movable portion of a directional input unit.

It is appreciated that such a body part of a user may be the body part which is contacting or pressing at least a portion of a directional input unit (i.e., a "contacting body part" which may or may not actively press at least a portion of a directional input unit) or a body part which is positioned away from a directional input unit at a certain distance (i.e., a "non-contacting body part" which does not contact the input unit and which does not press the input unit), or the like.

In another exemplary embodiment of this ninth exemplary aspect, a directional input unit acquires a certain $UI_{SEL}$ from a single contact (or a single touch), where such a contact may be maintained at a certain position of such an input unit. To this end, a directional input unit typically defines multiple portions thereon, thereover or therearound in such a way that a user may contact or touch each of such multiple portions while intending to provide different $UI_{SEL}$'s.

Figure 15A:
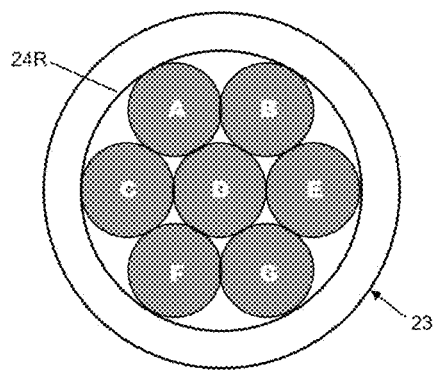
FIGS. 15A to 15E are schematic drawings of top views of exemplary $2^{nd}$-type directional input units, touch-ID elements thereof, and their sensors.

FIG. 15A show an exemplary arrangement of acquiring $UI_{SEL}$ from a point at which a user creates the single contact (or a single touch), where circles A through G show distinct portions defined on an exemplary touch-ID element of a directional input unit and where the input unit of this example is similar to the directional input unit of the sixth exemplary aspect of this disclosure and to that of FIG. 12. It is also noted in this exemplary directional input unit (23) that a substantial area (24R) of a top surface of such an input unit (23) is implemented with multiple sensors and divided into seven portions such as, e.g., portions A to G.

As depicted in the figure, each of multiple portions of a directional input unit may include a sensor which may sense a touch (or a contact) by a user body part (or a non-user object), where each of such portions may be designated to (or matched with) each of multiple $UI_{SEL}$'s so that, e.g., a directional input unit may recognize a touch sensed in a portion A as $UI_{SEL-1}$ for running a mode changing operation, another touch monitored in a portion C as $UI_{SEL-2}$ for running a secondary (or additional) user authentication operation (e.g., different from a primary fingerprint authentication operation), or another contact formed in portion F as $UI_{SEL-3}$ for running an operation of viewing, editing or sending emails. In other words, when a user touches or contacts a certain portion, a directional input unit may acquire a certain $UI_{SEL}$ based upon a location or an identity of the portion, while a directional input unit may acquire a different $UI_{SEL}$ when a user touches or contacts a different portion. When a user desires to provide a single $UI_{SEL}$ or multiple $UI_{SEL}$'s with a multi-touch arrangement, a user may simply touch (or contact) multiple portions of a directional input unit from which a directional input unit may acquires multiple $UI_{SEL}$'s either concurrently or sequentially.

When desirable, a directional input unit may utilize such multiple sensing portions in order to acquire different (user) sub-inputs. For example, such an input unit may incorporate multiple sensors in a single portion such that the sensors may sense different (user) sub-inputs and acquire multiple (user) sub-inputs. Accordingly, a user may simply touch or contact a single portion of a directional input unit which may then acquire different (user) sub-inputs therefrom, where examples of such concurrently acquired (user) sub-inputs may be such as e.g., $UI_{SEL}$ and $UI_{ACT}$, or $UI_{SEL}$ and $UI_{THEN}$.

In another example, a directional input unit may also incorporate at least two different portions each of which includes multiple sensors therein and each of which acquires multiple (user) sub-inputs such as, e.g., $UI_{SEL}$ and $UI_{ACT}$, $UI_{SEL}$ and $UI_{THEN}$, $UI_{ACT}$ and $UI_{THEN}$, or the like. This arrangement may be beneficial in reducing an error in providing wrong (user) sub-inputs or in misidentifying a certain (user) sub-input as another (user) sub-input, at the cost of requiring a user to provide a greater number of (user) sub-inputs.

Although the directional input unit of FIG. 15A exemplifies that of FIG. 12, this input unit may be implemented into other types of various directional input units of this disclosure. Therefore, such an area implemented with such sensors in such portions of a top surface may be provided not on the top surface but around a side edge of such an input unit, may be implemented into a smaller area of a top surface, may be incorporated into a suitable area of various press-ID elements as exemplified above, or the like.

In addition, such an area implemented with such sensors may be provided into a prior art touch screen-type input unit so that a certain (or an entire) sensing area of the touch screen may include the same or different sensors. Therefore, a user may readily provide a single user input (or multiple concurrent user inputs) to one or multiple portions, thereby allowing a terminal to acquire a desired $UI_{SEL}(S)$.

This arrangement provides a benefit of allowing a user to provide each of different $UI_{SEL}$'s simply by touching or contacting different portions of a directional input unit. Accordingly, this arrangement may be implemented into various conventional input units such as, e.g., a touch screen-type input unit, an input unit including one or multiple touch-sensitive or contact-sensitive sensors, examples of which are provided in detail below. This arrangement, however, may require such sensors to be implemented into a certain area of a directional input unit, which may require such an input unit to define a certain minimum surface area.

Therefore and in another exemplary embodiment of this ninth exemplary aspect, a directional input unit may acquire a certain $UI_{SEL}$ from a single contact (or a single touch), where a user may change a position of such a contact (or a touch) over or above various portions of such an input unit. That is, a user may provide such a single touch (or a single contact) with a single effort, and then move a user body part (or a non-user object) on, over or across such portions of the input unit but, while not detaching all of his or her body part(s) (or all non-user object(s)) away from such portions (or directional input unit).

Therefore, a user may move his or her body part (or a non-user object) over various portions of a directional input unit, where various sensors which are disposed into such portions may keep track of positions of such a contact (or a touch) and, accordingly, may sense a movement of at least one user body part or at least one non-user object on, over or across such portions therefrom. A directional input unit then acquires a certain $UI_{SEL}$ from a set of multiple $UI_{SEL}$'s each of which may be matched or designated to at least one pre-selected operation. Accordingly, various directional input units may sense various static or dynamic features which are related to the movement of the user body part (or non-user object). FIGS. 15B to 15E are several exemplary arrangements of such directional input units.

Figure 15B:
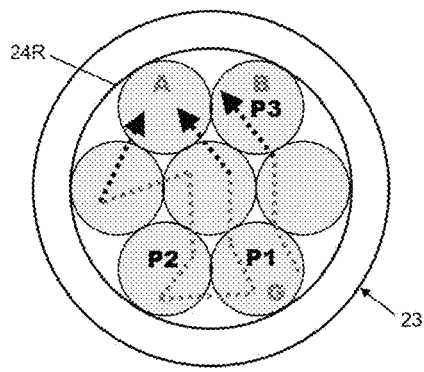

In FIG. 15B, an exemplary directional input unit acquires $UI_{SEL}$ from a vector (or a sum of multiple vectors) of a movement (or a change in a position) of a contact (or touch) between a portion of the input unit and a user body part (or a non-user object). In other words, a directional input unit senses a starting point and an ending point of the movement, and acquires $UI_{SEL}$ therefrom, regardless of a detailed 2-D or 3-D path (or trajectory) of the movement.

Accordingly, as to two exemplary movement paths such as P1 and P2 shown in FIG. 15B, a directional input unit senses a portion G as a starting point of the movement, while sensing a different portion A as an ending point of the movement. The directional input unit may then acquire $UI_{SEL}$ from the positions or nature of such portions B and A, regardless of their actual path of the movement, P1 and P2. Due to this sensing algorithm, a directional input unit acquires the same $UI_{SEL}$ from these two different movements. In this context, such an exemplary input unit of FIG. 15B may be deemed to acquire $UI_{SEL}$ from a vector (or a sum of multiple vectors) of a movement of a user body part (or a non-user object).

Still referring to FIG. 15B, a third movement path P3 has a path (or a trajectory) which is identical to the path P1. Although the paths P1 and P3 start in the same portion G, however, the path P3 terminates in a portion B, while the path P1 ends in the portion A. Therefore, an exemplary directional unit acquires different $UI_{SEL}$'s from each of such paths P1 and P3.

This arrangement provides a benefit of allowing a user to provide each of different $UI_{SEL}$'s simply by starting to touch or contact a certain portion of a directional input unit and then by moving a user body part (or a non-user object) to another portion thereof, without having to worry about a speed of movement or an exact path thereof. In addition, this arrangement may be readily implemented into various prior art input units as long as such conventional input units may sense a starting point of the movement and an ending point thereof, with or without having to keeping track of detailed movement paths or trajectories between such points.

Figure 15C:
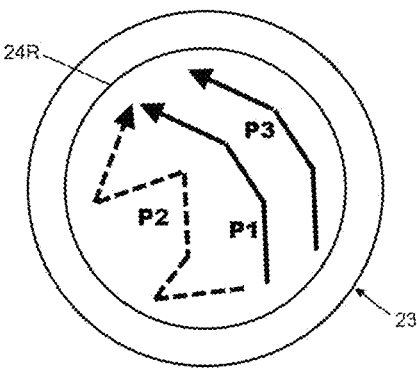

In FIG. 15C, an exemplary directional input unit acquires $UI_{SEL}$, not from a starting point or an ending point of a movement, but from a detailed path of a movement of a contact (or a touch) between a portion of the input unit and a user body part (or a non-user object). That is, a directional input unit keeps track of an actual path (or trajectory) of a movement (or a change in positions) of the contact or touch and acquires $UI_{SEL}$ therefrom. Therefore, this directional input unit is configured to acquire $UI_{SEL}$ only based on a shape or an orientation of the movement path and not based entirely on the starting or ending point.

Accordingly, as to two exemplary movement paths such as P1 and P3 shown in FIG. 15C, a directional input unit senses certain turns or changes in positions of a movement, and acquires the same $UI_{SEL}$ from such two different movements. However, as to two exemplary movement paths such as P1 and P2 both of which start in the same portion G and terminate in the same portion A, such an input unit acquires two different $UI_{SEL}$'s, for their movement paths are not identical to each other. It is appreciated that the directional input unit of this arrangement may be required to keep track of an entire trajectory of the movement or, when desirable, may only need to keep track of a certain portion of the movement, some points of the movement, or the like.

Figure 15D:
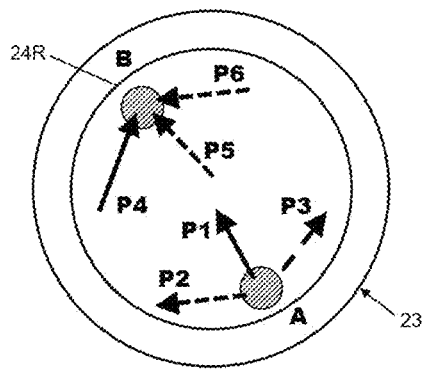

Another exemplary directional input unit in FIG. 15D may be deemed as a simplified version of that shown in FIG. 15C. For example, the input unit acquires $UI_{SEL}$, not from a starting or ending point of a movement, not from a detailed path of the movement, but from a direction of the movement in a certain point. Accordingly, a directional input unit may acquire $UI_{SEL}$ from a direction of a movement at a starting point (or portion A) such as, e.g., P1, P2 or P3. In other words, such an input unit first senses a starting point of a contact (or a touch) and then senses a direction of a movement starting therefrom. In the alternative, a directional input unit may acquire $UI_{SEL}$ from a direction of the movement at an ending point (or portion B) such as, e.g., P4, P5 or P6.

This arrangement offers the benefit of using a simpler sensor and a simpler algorithm than those of FIG. 15D, for this arrangement may not require the directional input unit to keep track of an actual trajectory (or path) of the entire movement. This arrangement also offers the benefit of allowing a user to supply a user input which is simpler than that of FIG. 15D, for the user has only to care about a direction of the movement only at some points, not along an entire (or a substantial portion) path of the movement.

Figure 15E:
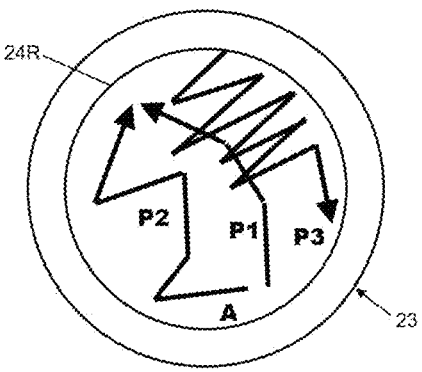

In FIG. 15E, an exemplary directional input unit acquires $UI_{SEL}$, not from a certain point along a trajectory of a movement, not from a direction of such a movement in any point, but from a length of a trajectory (or path) of a movement. As shown in the figure, multiple sensors implemented into the directional input unit may sense and accumulate a total length of a movement of such a contact (or touch), and then acquire $UI_{SEL}$ from a total length of the movement. Instead of measuring the total length of the movement, a directional input unit may acquire a total temporal length of such a movement and acquire $UI_{SEL}$ therefrom as well.

Therefore, as shown in the figure, different user inputs along paths P1, P2, and P3 define movement lengths which is in the order of P1, P2, and P3. A directional input unit then acquires different $UI_{SEL}$'s based on such lengths, and run one of multiple pre-selected operations based on each of such $UI_{SEL}$'s. When such an input unit is arranged to acquire $UI_{SEL}$ from a temporal length of the movement, however, it is not apparent to tell which movement path will takes the shortest or longest period of time, for the period depends not only on a movement length but also a speed of the movement.

This arrangement offers a user with various benefits. One apparent benefit is the simplicity in providing such a selecting (user) sub-input, for a user has to pay attention to a spatial or temporal length of the movement. Another benefit is that a bystander may find it difficult to learn what kind of movement is required to provide a certain $UI_{SEL}$.

Although only several examples have been explained for such an exemplary embodiment, a directional input unit may incorporate various combinations, variations or modifications of the above examples. Therefore and in one example, a directional input unit may employ a combination of at least two features of such examples so that it may acquire $UI_{SEL}$ from a position of a contact (or touch) and a length of a movement path. In another example, a directional input unit may acquire $UI_{SEL}$ from a position of a contact (or a touch) as well as from a direction of movement therefrom. It is appreciated that, as a terminal combines more of the above features, a user may be able to differentiate a greater number of movements (or more static or dynamic features thereof) and to supply each of a greater number of different $UI_{SEL}$'s to a directional input unit. However, too numerous different $UI_{SEL}$'s may confuse a user in memorizing each $UI_{SEL}$ or may induce a user to make inadvertent or unwanted errors in providing a correct $UI_{SEL}$ to such an input unit.

One or more of the above examples may also be implemented when a directional input unit employs a multi-touch arrangement. In one example, a user may touch or contact a directional input unit with two fingers and then generate a movement of one finger but not another. The input unit then utilizes a position of a stationary finger as well as a movement of another finger, and then acquires $UI_{SEL}$ from both of such static and dynamic features.

In another example, a user may touch or contact a directional input unit with his two fingers, and generate at least two movements with both fingers. The input unit may then sense various dynamic features of each of the movements and acquire $UI_{SEL}$ from such features of the movements. To this end, a directional input unit may sense each feature of the movements such as, e.g., a movement path of a $1^{st}$ finger and a position of an ending point of a $2^{nd}$ finger, a direction of a movement of a $1^{st}$ finger at a starting portion and a total length of a movement of a $2^{nd}$ finger, or the like. As a result, each feature of each movement may render such an input unit acquire a different $UI_{SEL}$. In the alternative, the input unit may sense a sum or a cumulative result of multiple movements such as, e.g., a vector sum of a $1^{st}$ vector representing a movement of a $1^{st}$ finger and a $2^{nd}$ vector denoting a movement of a $2^{nd}$ finger, a sum of a spatial (or temporal) length of a movement of a $1^{st}$ finger and another spatial (or temporal) length of a movement of a $2^{nd}$ finger, or the like. Other variations or combinations of such individual static or dynamic features of the above movements may be incorporated into the directional input unit or terminal as well.

In another exemplary embodiment of this ninth exemplary aspect, a directional input unit may acquire $UI_{SEL}$ with conventional capacitive sensing techniques which are based upon capacitive coupling and which can detect and measure anything which is conductive or which has a dielectric constant different from that of air. In general, prior art capacitive sensors can detect a proximity, a position, a displacement or an acceleration and, therefore, such sensors have been incorporated into prior art touch screens, track pads, or the like.

Currently available capacitive sensing techniques are, e.g., surface capacitance technology, and projected capacitive touch technology. In the surface capacitance technology, a sensor includes an insulator only one side of which is coated with a conductive material. Upon applying a small electrical voltage to such a material, a uniform electrostatic field is developed. Due to a sheet resistance of the surface, each corner has a different effective capacitance. Thereafter, when a conductor (e.g., a finger of a user or a conductive tip of a non-user object) touches an uncoated surface, a capacitor is dynamically formed on such a surface. A controller of a sensor can then determine a location of a touch, indirectly from a change in capacitance as measured from the four corners of the sensor; the larger the change in capacitance, the closer the touch is to that corner.

A projected capacitance technology or PCT (i.e., projected capacitive touch technology) is also a capacitive technology which allows more accurate and flexible operation, e.g., by etching at least one conductive layer. For example, an X-Y grid is formed either by etching one layer to form a grid pattern of electrodes or etching two separate, parallel layers of a conductive material with perpendicular lines or tracks so as to form the grid, where this configuration is comparable to a pixel grid commonly found in conventional LCD (i.e., liquid crystal displays. A greater resolution of PCT allows a user to operate even without any direct contact or touch by a user such that the conducting layers can be coated with further protective insulating layers and operate even under screen protectors, or behind weather and vandal-proof glass. Because a top layer of a PCT is a glass, PCT can be a more robust solution compared with a conventional resistive touch technology. Depending on its implementation, an active or passive stylus can be used instead of or in addition to a finger.

The PCT (i.e., projected capacitive touch technology) is also classified into a mutual-capacitance technology and a self-capacitance technology. A sensor of mutual capacitance technology includes a capacitor at each intersection of each row and each column. For example, a 12-by-16 array would have 192 capacitors each independent of the others. When an electrical voltage is applied to such rows or columns, bringing a finger or a tip of a stylus near a surface of a sensor changes a local electric field which reduces a mutual capacitance. The change in capacitance at every individual point on the grid can be measured to accurately determine a location of a touch or contact, by measuring a voltage in another axis. Thus, mutual-capacitance technology allows multi-touch operation where multiple fingers, palms or styli can be accurately tracked at the same time. A sensor of self-capacitance technology can also include the same X-Y grid as mutual-capacitance sensors, but columns and rows of the self-capacitance sensor may operate independently. With self-capacitance, an electrical current senses a capacitive load of a finger on each column or row. This produces a stronger signal than mutual-capacitance sensor, but it is unable to resolve accurately more than one finger, which results in "ghosting" or misplaced location sensing.

In another exemplary embodiment of the ninth exemplary aspect, a directional input unit can acquire a single $UI_{SEL}$ or multiple $UI_{SEL}$'s from a "multi-touch" (or "multi-touch gesture") by a single or multiple user body parts, by a single or multiple non-user objects, by a combination of a user body part and a non-user object, or the like. In general, a multi-touch arrangement relates to monitoring multiple points of contacts (or touch points) between multiple portions of a directional input unit and multiple user body parts, between such portions of a directional input unit and multiple non-user objects, their combinations, or the like. Because the multi-touch arrangement enables a terminal to pre-define multi-touches and to match each of such multi-touches with at least one $UI_{SEL}$, pre-selected operation, or control signal, a user can generate more multi-touches with only a limited number of body parts (or non-user objects), thereby expanding a scope of seamless operations which can be offered to a user by a terminal. For example, a user may move an index finger and a middle finger (or a thumb) together in certain patterns to represent a certain $UI_{SEL}$. In another example, a user may move two fingers, where a $1^{st}$ movement of a $1^{st}$ finger denotes a $1^{st}$ $UI_{SEL}$ for running a certain pre-selected operation, while a $2^{nd}$ movement of a $2^{nd}$ finger represents a $2^{nd}$ $UI_{SEL}$ for obtaining a certain access authority in order to advance to a certain mode of operation. In another example, a user may move two fingers, where a terminal obtains a sum of a $1^{st}$ vector movement of a $1^{st}$ finger and a $2^{nd}$ vector movement of a $2^{nd}$ finger. In another example, a user may move two fingers, where a $1^{st}$ movement of a $1^{st}$ finger denotes a $1^{st}$ $UI_{SEL}$ for running a $1^{st}$ pre-selected operation, whereas a $2^{nd}$ movement of a $2^{nd}$ finger denotes a $2^{nd}$ $UI_{SEL}$ for running a $2^{nd}$ pre-selected operation concurrently with (or sequentially after) running the $1^{st}$ pre-selected operation.

Various conventional hardware and software elements are available to embody this multi-touch arrangement, where examples of such elements can commonly be found in various prior art touch screen-type input unit of a smart phones, track pads, or the like. It is appreciated, as used in the related industry, that a "multi-touch" arrangement includes not only such technology for detecting multiple touches points or points of contacts as described above but also another prior art technology called a "gesture-enhanced single-touch" arrangement.

In another exemplary embodiment of the ninth exemplary aspect, a directional input unit can acquire a single $UI_{SEL}$ or multiple $UI_{SEL}$'s from the above point of contact (or a touch point) or above multi-touch using different technologies. For example, a directional input unit can acquire such $UI_{SEL}$ (or multiple $UI_{SEL}$'s) from pressure-sensitive sensors which may be formed as a coating which flexes differently depending on how firmly it may be pressed. A directional input unit may instead employ resistive technologies for acquiring $UI_{SEL}$ (or multiple $UI_{SEL}$'s) from the above point of contact (or a touch point) or multi-touch, where such resistive technologies may include analog resistive technologies, digital resistive technologies, or in-cell resistive technologies. In addition, a directional input unit may employ optical touch technologies for acquiring $UI_{SEL}$ (or multiple $UI_{SEL}$'s) from the above point of contact (or a touch point) or multi-touch, where such optical touch technologies may function when a finger (or a non-user object) contacts or touches a surface, causing a light to scatter, such a reflection may be caught with a sensor or a camera which sends data to a software element which dictates a response to such a contact (or a touch), depending upon the type of reflection measured. Such optical touch technologies may include, e.g., optical imaging technology, infrared technology, rear diffused illumination (DI) technology, infrared grid technology, digital waveguide touch (DWT) technology, infrared optical waveguide technology, diffused surface illumination (DSI) technology, laser light plane (LLP) technology, in-cell optical technology, frustrated total internal reflection (FTIR) technology, or the like.

Various capacitive sensing techniques have been used in such touch screen-type input units, touch-pads, or other touch- or contact-based input units for the past few decades, with their resolution ever improving year after year. In addition, the resistive or optical sensing techniques have also been successfully used in the art. Because there are ample references how conventional techniques work, how to incorporate such techniques into conventional input units, and how to design hardware and software elements of such conventional input units, such prior art capacitive, resistive or optical sensing techniques can be readily incorporated to various directional input units and various terminals including such directional input units as described hereinabove.

One example is an article which is entitled "How to design capacitive touch and proximity sensing technology into your Application," which is written by Mike Salas and Andres Marcos at Silicon Laboratories Inc., Austin, TX, USA, which provides technical details of such capacitive sensing techniques, overviews of other sensing techniques, comparisons of different techniques, and the pros and cons of each technique, and which can be obtained in http://www.low-powerdesign.com/PDF/How-to-Design-Capacitive-Touch-and-Proximity-Sensing-Technology-into-Your-Application.pdf. Another one is an article which is entitled "Multi-touch Technologies," which is written by Gennadi Blindmann at Impressum, Munich, Germany, which provides technical details on such capacitive, resistive, optical, wave, and force-based sensing techniques, and which can be obtained in http://www.multi-touch-solution.com/en/knowledge-base-en/. Therefore, more configurational and operational details of hardware and software aspects of various directional input units incorporating such techniques are omitted herein, for such details are well within a capability of one of ordinary skill in the relevant art.

It is appreciated that various terminals provided throughout this disclosure may adopt any of such capacitive, resistive, optical, wave, and force-based sensing techniques to acquire a single $UI_{SEL}$ or multiple $UI_{SEL}$'s, or to acquire at least one static or dynamic feature associated with a user input or $UI_{SEL}$, from the above single touch or multi-touch by a user or by a non-user object. For example, a directional input unit may first sense a contact (or a touch) with a user (or a non-user object) and may then track changes in positions of the contact (or a touch) so that such an input unit may receive a user input or acquire $UI_{SEL}$ or one of such features from a position of the first contact, from such a path, or the like. In another example, a directional input unit may sense a position of a $1^{st}$ contact (or a touch) at which a user makes the $1^{st}$ contact (or touch) with a directional input unit and may also sense a position of a last contact (or a touch) at which a user detaches a body part (or a non-user object) from such an input unit, so that such an input unit may receive a user input or acquire $UI_{SEL}$ or one of such features from the position of the $1^{st}$ contact, another position of the last contact, a vector which connects the $1^{st}$ point of contact to the last point of contact (or vice versa), or various static or dynamic features of such a vector. In another example, a directional input unit may instead sense only one of such $1^{st}$ and last points of contact and then receive a user input or acquire $UI_{SEL}$ or one of such features as described above.

12-8. Details of Type-4 Directional Input Units

As described above, one of the objectives of various mobile communication terminals of this disclosure is to receive a single user input (or multiple concurrent user inputs) and to acquire therefrom at least one (user) sub-input which includes $UI_{SEL}$, where a user input corresponds to electromagnetic or acoustic waves which may be irradiated by a user or by a device worn by a user (e.g., a wearable device). A directional input unit (or a terminal) may then receive such waves as a single user input (or multiple concurrent user inputs), may acquire multiple (user) sub-inputs therefrom, and may then run various operations designated to such (user) sub-inputs as described above and below.

In another exemplary embodiment of this ninth exemplary aspect, a directional input unit may further acquire $UI_{SEL}$ from visible light rays which may carry various images such as, e.g., [1] an image of a certain body part of a user, [2] an image of a user (e.g., multiple user body parts or at least a substantial portion of a body of a user), [3] an image of a contacting non-user object, [4] an image of a non-contacting object, [5] an image of an environment or background, [6] a shape, a size, a color, a hue, a contrast, an arrangement or orientation of at least one of [1] to [5] of this paragraph, [7] multiple images of at least two of [1] to [5] of this paragraph, [8] multiple images representing movements of a user body part, a user, or a non-user object, or the like. A terminal may readily obtain such images from a conventional input unit such as, e.g., a camera of a terminal or another image acquisition sensor. When desirable, a directional input unit may acquire $UI_{SEL}$ from infrared images or ultraviolet images, where such images may be obtained by implementing conventional infrared or ultraviolet sensors into a terminal. Because such images may be acquired by various input units of a terminal, it is noted that either a directional input unit or another input unit of a terminal may receive a user input in a form of such images and may acquire $UI_{SEL}$ from such images.

For the above embodiment, a terminal may recruit various conventional image (or imaging) sensors capable of detecting and conveying information that constitutes an image, e.g., by converting variable attenuation of visible light rays (as such rays pass through or reflect off such a user, a user body part or a non-user objects) into signals such as small bursts of current which convey the information. Such image sensors may be used in an analog type or in a digital type, examples of which have been used in prior art digital cameras, camera modules, medical imaging equipment, or the like. More particularly, such image sensors generally employ CMOS sensors, for such sensors may perform better than prior art CCDs, can be readily incorporated into an integrated circuit, can help reduce costs, or the like, although CCD may still be used when a price matters.

In general, a CCD image sensor is an analog device. For example, when visible light rays strike the sensor, it is held as a small electrical charge in each photo sensor. Such charges in a line of pixels which are nearest to one or more output amplifiers are amplified and output, then each line of pixels shifts its charges one line closer to an amplifier(s), thereby filling an empty line closest to such amplifiers. Such processes may then be repeated until all lines of pixels have the electrical charges amplified. To the contrary, a CMOS image sensor may include an amplifier for each pixel, compared to the few amplifiers of a CCD. This configuration requires a less area for capturing photons than a CCD, but such a problem has been overcome by employing in front of each photodiode micro-lenses which focus light rays into the photodiode which would have otherwise hit an amplifier and not be detected. Some CMOS image sensors also use Back-side illumination to increase a number of photons which hit the photodiode.

An image sensor may include a hybrid CCD/CMOS (e.g., sold as "sCMOS") with a CMOS readout integrated circuits (ROICs) which are bump-bonded to a CCD imaging substrate, a technology which was developed for infrared staring arrays and now adapted to silicon-based detector technology. In another variation, an image sensor may use very fine dimensions available in the CMOS technology which are also implemented into a CCD-like structure in a prior art CMOS technology, which can be typically obtained by separating individual poly-silicon gates by very small gaps.

Regardless of their operational mechanisms, such image sensors typically include various color-separation mechanisms. One example is a low-cost and most common Bayer filter which uses a color filter array which passes red, green, or blue light rays to selected pixel sensors, thereby forming interlaced grids sensitive to each of such red, green, and blue light rays, where missing color samples may be interpolated by a prior art demosaicing algorithm. Such a sensor incorporated with a Bayer filter may include back-illuminated sensors, where light rays enters a sensitive silicon on the opposite side of where such transistors and metal wires are provided so that metal connections on a devices side are not an obstacle for the light rays. Another example of an image sensor is a Foveon X3 sensor which uses an array of layered pixel sensors, thereby separating light rays based on inherent wavelength-dependent absorption properties of silicon, and thereby sensing all three-color channels in each location. In another example, an image sensor may include a 3CCD which uses three discrete image sensing elements, with its color separation performed by a dichroic prism.

In another exemplary embodiment of this ninth exemplary aspect, a directional input unit may acquire $UI_{SEL}$ from other electromagnetic waves such as, e.g., infrared rays, ultraviolet rays, microwaves or radio waves, where such waves also carry information as to $UI_{SEL}$ as well. To this end, a terminal may include a prior art sensor for receiving such infrared rays, ultraviolet rays, microwaves or radio waves, where a conventional receiver implemented into a terminal for communication purposes may be utilized for receiving radio waves. It is appreciated that such sensors or receivers may be implemented into a directional input unit or another input unit of a terminal.

Various electromagnetic waves such as, e.g., infrared rays, ultraviolet rays, microwaves or radio waves, may include therein or accompany therewith various information from which a terminal, its directional input unit or another non-directional input unit may acquire $UI_{SEL}$. In one example, such electromagnetic (EM) waves may carry certain information or contents which may designate a certain $UI_{SEL}$. Therefore, a terminal may receive a user input provided as an image(s) of a user, a user body part, a non-user contacting object or a non-user non-contacting object, where such an image(s) is obtained by a prior art infrared camera, ultraviolet camera, radio wave camera (or receiver), or the like. Accordingly, examples of such images may include a thermal image taken by a prior art thermal image devices or a night vision equipment, a radar image taken by a prior art radar equipment, or the like. In another example, the EM waves may have a certain wave feature from which a terminal acquires a certain $UI_{SEL}$, where examples of such wave features may be, e.g., an amplitude, a wavelength, a frequency, a phase angle, a phase lag, a duration, or the like.

Such electromagnetic-wave (i.e., EM-wave) user inputs may also be provided to a terminal, to its directional input unit or to its non-directional input unit by a user in different ways. In one example, such a user may take a picture of his or her body, his or her body part, or non-user object using an IR (i.e., infrared) camera, a UV (i.e., ultraviolet) camera, or a radar equipment, where a terminal may acquire $UI_{SEL}$ from such pictures taken under various light waves.

In another example, a user may provide a terminal with the EM waves which may not carry any of the above pictures or images but which include at least one of such wave features. In one case, a user may emit such EM waves to a terminal using a customized wave generator, where such a generator may be included into a "wave-emitting non-user object" (e.g., a stylus or a wearable device), may be provided as an article which is separate from a directional input unit, from a terminal, or the like. It is appreciated that such wave-emitting object may be configured to emit certain EM waves having a certain wave feature, may be synchronized with a user such that a motion or a gesture of a user may emit certain EM waves of different wave features, or the like. Accordingly, when a user makes a certain gesture representing a $1^{st}$ $UI_{SEL}$, a wave-emitting object may emit EM waves with a $1^{st}$ frequency, while the object may emit EM waves with a different $2^{nd}$ frequency when a user makes a $2^{nd}$ different gesture representing a $2^{nd}$ $UI_{SEL}$. Alternatively, a wave-emitting object may emit EM waves with different amplitudes based on various factors such as, e.g., a time of a day, a location of a user, or other user preferences. Of course, such examples require synchronization between such wearable devices and a terminal.

In order to acquire $UI_{SEL}$ from one of the above images obtained by such prior art images sensors or by such EM sensors (those sensor for receiving such infrared rays, ultraviolet rays, microwaves, radio waves, or the like), a terminal may analyze such images by extracting meaningful information about $UI_{SEL}$ from the images, mainly from digital images by means of various conventional digital image processing techniques. The image processing can be as simple as reading bar coded tags or as sophisticated as identifying a user or his or her body part from such images. Thus, a moderate to heavy digital analysis may be required for such analysis of large amounts of data which typically requires complex computation or extraction of quantitative information.

In another exemplary embodiment of this ninth exemplary aspect, a directional input unit may acquire $UI_{SEL}$ from acoustic waves such as, e.g., audible sound waves, inaudible sound waves, or the like, where such waves carry information as to $UI_{SEL}$ as well. To this end, a terminal may include a prior art sensor capable of receiving such acoustic waves, where a conventional microphone or receiver implemented into a terminal for communication purposes may be utilized for receiving audible sound waves. It is noted that such receivers or microphones may be implemented into a directional input unit or another input unit of a terminal. Accordingly, examples of such waves may include a simple sound, a sonar image obtained from a sonar equipment, or the like.

Such audible or inaudible acoustic waves (or acoustic user inputs) may carry certain sounds therewith each of which represents a certain $UI_{SEL}$, where examples of such sounds may include, e.g., a sound of a user, a sound generated by a user body part, a sound made by an object, a sound from an environment, or a sound made by a terminal. Such acoustic user inputs may also be provided to a terminal, its directional input unit or its non-directional input unit by a user in various ways. In one example, a user may talk to a terminal, where a terminal acquires $UI_{SEL}$ therefrom. In another example, a user may provide a terminal with such acoustic waves including one of the above wave features described in conjunction with the wave features of the EM waves. A user may emit such acoustic waves to such a terminal with a customized acoustic wave generator, where such a generator may be similarly incorporated into the "wave-emitting non-user object" as described in conjunction with the EM wave user inputs.

It is appreciated that various prior art sensors described in this sub-section have been in use for more than a few decades and many electric equipment including such mobile communication terminals incorporate such sensors. Therefore, detailed mechanism and operational procedures for such sensors are omitted herein, for such falls within a capacity of one of ordinary skill in the relevant art.

12-9. Selecting (User) Sub-Inputs and Running Pre-Selected Operations

As has been enumerated hereinabove, one of many objectives of various mobile communication terminals of this disclosure is to provide such a terminal with a single user input (or multiple concurrent user inputs) when the terminal was (or has been) in its off-state, where the user input accompanies therewith (or includes therein) at least one $UI_{SEL}$ which may be related to a direction of such a user input. As a result, once powering on, waking up, or switching modes, such a terminal runs at least one pre-selected operation.

It is appreciated, however, that $UI_{SEL}$ does not always have to be related to a direction of the user input. That is, a user input may include $UI_{SEL}$ which may not be related to a direction of the user input. Therefore, as long as the terminal includes a directional input unit capable of seamlessly acquiring $UI_{SEL}$ from a single user input (or multiple concurrent user inputs), the terminal may then run a pre-selected operation which is matched to such $UI_{SEL}$, once or (immediately) after a terminal powers on, wakes up, or switches modes. As a result, a user of such a terminal can seamlessly run at least one pre-selected operation, simply by providing a single user input (or multiple concurrent user inputs) which includes such $UI_{SEL}$ therein.

Therefore and in another exemplary embodiment of this ninth exemplary aspect, a terminal can acquire $UI_{SEL}$ from a single user input (or multiple concurrent user inputs) and run at least one pre-selected operation once it powers on, wakes up, or switches modes, with or without running an authentication operation or with or without turning on a display unit, [1] concurrently with receiving a user input or [2] concurrently with acquiring $UI_{SEL}$. Thus, a terminal of this disclosure runs at least one pre-selected operation seamlessly once powering on, waking up, or switching modes, [1] whether or not a terminal turns on a display unit concurrently with receiving a single user input (or multiple concurrent user inputs) or acquiring $UI_{SEL}$, [2] whether or not a terminal runs at least one authentication operation concurrently with receiving a single user input (or multiple concurrent user inputs) or concurrently with acquiring $UI_{SEL}$, or the like.

In other words, turning on a display unit or running an authentication operation [1] concurrently with receiving a single user input (or multiple concurrent user inputs) or [2] concurrently with acquiring $UI_{SEL}$ therefrom may not be a default option of such a terminal. However, when a user wants a terminal to turn on a display unit or to run at least one authentication operation concurrently with receiving a single user input (or acquiring $UI_{SEL}$ therefrom), a user is required to include $UI_{ACT}$ Or $UI_{THEN}$ in such a user input, separately from $UI_{SEL}$. Otherwise, such a terminal can turn on its display unit or run an authentication operation only after a terminal receives the user input or acquires $UI_{SEL}$ therefrom.

As described above, however, a terminal may turn on its display unit or run an authentication operation even when a terminal receives a single user input (or multiple concurrent user inputs) and acquires $UI_{SEL}$ from the user input but when the terminal does not acquire a separate $UI_{ACT}$ Or $UI_{THEN}$ from the user input (or when the user does not incorporate any $UI_{ACT}$ or $UI_{THEN}$ in such a user input).

One example is when a user provides a "simplified user input" to a terminal, where a smaller number of (user) sub-inputs may render a terminal run a greater number of operations while or (immediately) after powering on, waking up, or switching modes, when such turning on or authenticating is conditioned [1] upon each other, or [2] upon acquiring $UI_{SEL}$. Accordingly, even when a user includes only a single (user) sub-input (e.g., $UI_{SEL}$) in a single user input, a terminal may turn on its display unit or may run an authentication operation, without acquiring $UI_{ACT}$ Or $UI_{THEN}$.

Another example is when a terminal is specifically configured to turn on its display unit whenever it receives a user input, where such a terminal may display a lock screen before authenticating a current user but may display a home screen once a current user is authenticated. In this case, simply including $UI_{SEL}$ but not $UI_{ACT}$ in a single user input (or multiple concurrent user inputs) is enough to turn on a display unit concurrently with providing the user input. Another example is when a terminal is specifically configured to authenticate a user before switching to its active state (i.e., a state in which a display unit is turned on), e.g., when a designated portion of a directional input unit is designated not only to acquire $UI_{SEL}$ but also $UI_{ACT}$ concurrently with each other. Therefore, even when a user tries to supply only a single (user) sub-input such as $UI_{SEL}$ but not $UI_{THEN}$ in a single user input, a terminal receives the user input while concurrently acquiring $UI_{SEL}$ and $UI_{THEN}$.

In other words, various directional input units enumerated in this disclosure or various mobile communication terminals incorporating such directional input units can acquire $UI_{SEL}$ which is accompanied by (or included in) a single user input (or in multiple concurrent user inputs). Therefore, a mobile communication terminal which may incorporate at least one of such directional input units illustrated this disclosure can run at least one pre-selected operation which is selected from a set of multiple pre-selected operations and which matches $UI_{SEL}$, after powering on, waking up, or switching modes, thereby offering the user with a benefit of running more operations seamlessly.

As described above, an operation of turning on a display unit is not to be deemed as one of multiple pre-selected operations, particularly when such turning on relates to turning on such a display unit concurrently with receiving a single (or multiple concurrent) user input(s) or concurrently with acquiring $UI_{SEL}$ therefrom, when the user input(s) is provided to a terminal while its display unit was (or has been) turned off (i.e., in its off-state). It is similarly appreciated that an authentication operation is neither to be deemed as one of such multiple pre-selected operations, particularly when such an authentication operation relates to running an authentication operation concurrently with receiving a single (or multiple concurrent) user input(s) or concurrently with acquiring $UI_{SEL}$ therefrom, when a user input(s) is provided to a terminal while its display unit was (or has been) turned off (i.e., in its off-state).

To the contrary, a turning on operation or an authentication operation may be deemed as one of multiple pre-selected operations when such a turning on operation is to be run when or immediately after a terminal powers on, wakes up, or switches modes, and then turns its display unit off. In such a case, rendering a terminal to turn on, to turn off, and then to turn on its display unit again can be deemed as one of such multiple pre-selected operations. Similarly, when a terminal runs a $1^{st}$ authentication operation while or (immediately) after a terminal powers on, wakes up, or switches modes, such a terminal may run a $2^{nd}$ authentication operation, where such a $2^{nd}$ authentication operation is then deemed as one of such multiple pre-selected operations.

Similarly and in another exemplary embodiment of this ninth exemplary aspect, such a terminal can receive a single user input (or multiple concurrent user inputs) and can acquire therefrom [1] a single (user) sub-input, $UI_{SEL}$, [2] two (user) sub-inputs where one of the (user) sub-inputs is $UI_{SEL}$, [3] three (user) sub-inputs where one of the (user) sub-inputs is $UI_{SEL}$, or the like. Therefore, whenever a terminal may receive a single user input (or multiple concurrent user inputs), the terminal runs at least one pre-selected operation once it powers on, wakes up, or switches modes, whether or not a terminal turns on its display unit concurrently with such receiving a user input(s) (or acquiring $UI_{SEL}$), or whether or not a terminal runs an authentication operation concurrently with such receiving a user input(s) (or acquiring $UI_{SEL}$).

12-10. Further Seamless Operations

In another exemplary embodiment of this ninth exemplary aspect, a terminal may provide a user with further seamless operations. As described above, various terminals of this disclosure allow a user to run a selected operation when the terminal switches to its active state from its off-state, along with running at least one of an authentication operation for authenticating a user and an activation of turning on a display unit, all in response to a single user input. Such terminals may also allow a user to continue with the selected operation, still in response to the single user input.

For example, when a user provides $UI_{SEL}$ designated to running an email operation, a terminal may turn on its display unit and authenticate the user, and also run an email operation. As such a user continues to press, to push, to contact, to touch or to otherwise manipulate a directional input unit, a terminal displays a result of running the email operation such as, e.g., displaying an inbox of the email account of the user. The user may then move his or her body part or a non-user object in order to navigate through a variety of options offered by the email operation, e.g., opening a new incoming email, writing a new email, switching to a new directory, viewing a list of sent emails, or the like.

In another example, when a user provides $UI_{SEL}$ designated to running a camera operation, a terminal may turn on its display unit and authenticate the user, and also run the camera operation. As a user continues to press, to push, to contact, to touch or to otherwise manipulate a directional input unit, a terminal displays a result of running the camera operation such as, e.g., displaying a viewfinder to take a picture or record a video clip. The user may then move his or her body part or a non-user object in order to navigate through various options offered by such an operation, e.g., zooming in or out, selecting between a camera mode or a video mode, adjusting other setting of the camera operation, or the like.

In another exemplary embodiment of this ninth exemplary aspect, a terminal may provide a user with similar seamless operations but in a manner different from those exemplified in the preceding embodiment. In one example, when a user fails the authenticating, a terminal may allow the user to provide a new user input or a new (user) sub-input, as long as he or she continues to press, to contact, to touch or to otherwise manipulate a directional input unit. The terminal may then receive a new user input or acquire a new (user) sub-input. To this end, the terminal may recruit a notice unit and inform a user about the failure of such user authenticating.

12-11. Miscellaneous

As described above, the "selection failure" happens when a terminal receives a user input which, however, does not include a correct $UI_{SEL}$, when a terminal fails to acquire any $UI_{SEL}$ or to acquire a correct $UI_{SEL}$, or when a terminal receives a certain $UI_{SEL}$ which turns out to be an invalid $UI_{SEL}$. In such a case, a terminal [1] may keep a display unit turned off when the display unit was (or has been) turned off, [2] may turn off a display unit when the display unit is (or has been) turned on, [3] may turn a display unit on in a lock mode when the display unit was (or has been) turned off, [4] may maintain a display unit turned on but stay in a lock mode when the display unit is (or has been) turned on and when the terminal is (or has been) in a lock mode, or [5] may keep a display unit turned on but also switch itself to a lock mode when a display unit is (or has been) turned on and when a terminal is (or has been) in an unlock mode.

However, on certain circumstances, a user may desire to power on or wake up a terminal, while not wanting to run any pre-selected operation when or (immediately) after the terminal powers on, wakes up, or switches modes. Such circumstances may occur, e.g., when a user just intends to confirm a status of various operations of which icons are displayed on a home screen, when a user is not sure which $UI_{SEL}$ a user has to provide in order to run a certain pre-selected operation, or the like. In these cases, a terminal may offer a user a few different options.

In another exemplary embodiment of this ninth exemplary aspect, when a user provides a single user input (or multiple concurrent user inputs) to a terminal but does not include therein any specific $UI_{SEL}$ because the user does not want a terminal to run any of such multiple pre-selected operations after powering on, waking up, or switching modes, a terminal may respond in different ways. In one example, a terminal may do nothing and keep its display unit turned off. In another example, a terminal may turn on its display unit, and display a lock screen regardless of whether a user passes or fails an authentication operation. Alternatively, a terminal may turn on a display unit and then display an unlock screen when a user passes such authenticating. Accordingly, a user may navigate through a home screen and run any operation he or she desires. In another example, a terminal may turn its display unit on when a user passes the authenticating, and display a home screen, where such a home screen may only display icons of those operations which do not belong to the set of multiple pre-selected operations. By doing so, a user may readily locate such icons of those operations which have not been included in the set of multiple pre-selected operations.

In another example of the same embodiment, a terminal may allocate one of multiple $UI_{SEL}$'s as "undecided" or "unselected" so that, when a terminal receives a single user input (or multiple concurrent user inputs) and acquires such $UI_{SEL}$, a terminal recognizes that a user does not want to run any of such multiple pre-selected operations. In such a case a terminal may turn on its display unit, may run an authentication operation, or the like, and then display a lock screen or a home screen accordingly, without running any of such multiple pre-selected operations after powering on, waking up, or switching modes. Alternatively, a terminal may turn on its display unit and display icons of only those operations which do not belong to the set of multiple pre-selected operations, whereby a user may readily locate such icons of those operations which have not been included in the set of multiple pre-selected operations.

In another exemplary embodiment of this ninth exemplary aspect, a terminal may define multiple sets of pre-selected operations, where a terminal runs each set of multiple sets of such pre-selected operations in each of multiple modes of operations. In one example, a terminal may define three sets of pre-selected operations, where a terminal is to run each operation of a $1^{st}$ set of multiple pre-selected operations only in a lock mode (of operation), where a terminal is to run each operation of a $2^{nd}$ set of multiple pre-selected operations only in an intermediate mode (of operation), where a terminal is to run each operation of a $3^{rd}$ set of multiple pre-selected operations only in an unlock mode (of operation), or the like.

It is noted that at least two of such sets of multiple pre-selected operations may include different numbers of pre-selected operations, that at least two of such sets of multiple pre-selected operations may be granted with different access authorities, that at least one operation may be included in at least two sets of such pre-selected operations but may be granted with different access authorities, with different number or extent of operational options, or the like. A user may desire to run a certain pre-selected operation in a lock mode or an intermediate mode when he or she is surrounded by strangers. In another example, a user may desire to run a pre-selected operation in a certain mode of operation but not in other modes of operations.

Such an arrangement offers a user with a greater flexibility in that a user may not only determine a suitable mode of operation but also adjust an access authority in running a certain pre-selected operation. Therefore, such a terminal may provide a user with a heightened security. In addition, such an arrangement may further provide a user with an enhanced safety and privacy when a terminal may block a user from accessing one or more hardware or software elements of a terminal in different modes of operation. For example, when a user operates a terminal in a lock mode, a terminal may block a user from accessing a certain portion of a storage member of a terminal, from driving a certain hardware element thereof, or from executing a certain software element thereof. In addition, such an arrangement offers a user with another seamless operation such that a user may operate a terminal while switching from one mode of operation to another, without having to turn off its display unit or otherwise interrupting a normal operation of the terminal.

Blank

It is appreciated in the above embodiment that such a terminal requires at least two $UI_{SEL}$'s, where a $1^{st}$ $UI_{SEL}$ represents which mode of operation a terminal is to operate and from which set of pre-selected operations a terminal is to select at least one operation (which a terminal is to run after powering on, waking up, or switching modes, and where a $2^{nd}$ $UI_{SEL}$ represents which operation from the selected $1^{st}$, $2^{nd}$ or $3^{rd}$ set of multiple pre-selected operations a terminal is to run when or (immediately) after the terminal powers on, wakes up, or switches modes.

To this end, a user may include at least two $UI_{SEL}$'s in a single user input (or multiple concurrent user inputs). For example, a user may provide multiple $UI_{SEL}$'s by creating two concurrent movements of a single movable portion (or two movable portions) of a press-ID element of a directional input unit, by creating two concurrent contacts between at least two user body parts and two different stationary portions of a touch-ID element of such an input unit, by generating one of such movements and one of such contacts, or the like.

In addition, a terminal may utilize various notice units for displaying such names or icons of different sets of multiple pre-selected operations in order to assist a user in selecting a correct pre-selected operation from a correct set of such pre-selected operation. For example, when a user provides such $UI_{SEL}$'s, a terminal may acquire a $1^{st}$ $UI_{SEL}$, locates which set of multiple pre-selected operations matches such $1^{st}$ $UI_{SEL}$, and displays names or icons of multiple pre-selected operations belonging to such a set. When a user provides a $2^{nd}$ $UI_{SEL}$ after making a selection from such names or icons displayed on multiple sub-screens of a notice unit (or on a display unit), a terminal locates which operation such $2^{nd}$ $UI_{SEL}$ matches from the selected set, and then runs the pre-selected operation when or (immediately) after the terminal powers on, wakes up, or switches modes.

However, when a user provides a new $1^{st}$ $UI_{SEL}$ (with or without providing a $2^{nd}$ $UI_{SEL}$), a terminal then locates which set of multiple pre-selected operations matches such $1^{st}$ $UI_{SEL}$, and displays names or icons of multiple pre-selected operations belonging to such a set. A terminal may repeat to display names or icons of different sets of such pre-selected operations until a user confirms that a current $1^{st}$ $UI_{SEL}$ is a correct selecting (user) sub-input. Thereafter, a terminal may run the pre-selected operation when or (immediately) after a terminal powers on, wakes up, or switches modes.

As enumerated above and in another exemplary embodiment of this ninth exemplary aspect, a terminal may run an operation of displaying an advertisement or a content on a display unit such as, e.g., on a lock screen, on a home screen, or on another default screen. A terminal may do so in various arrangements.

In one example, a terminal may display an advertisement or content whenever a terminal may power on or wake up, and turn on its display unit. Therefore, a terminal may display the advertisement or content on a lock, default or home screen, depending upon its operational sequence. In another example, a terminal may display an advertisement or content whenever a terminal displays a lock screen. Accordingly, a terminal typically displays such an advertisement or content in a lock mode or intermediate mode, where a user may only view the advertisement or content, may sequentially provide an additional user input to manipulate the advertisement or content for navigating therethrough, making selections, accessing external links provided thereby, storing such an advertisement or content or results obtained by such manipulations, or the like. In another example, a terminal may display an advertisement or content whenever a terminal advances to an unlock mode. The terminal may then switch to a home screen once a user provides an additional user input or when a user is done with manipulating such an advertisement or content.

In yet another example, a terminal may include an operation of displaying an advertisement or a content on a display unit as one of such multiple pre-selected operations. To this end, a terminal matches one of multiple $UI_{SEL}$'s with the operation of displaying the advertisement or a content in a lock mode, an intermediate mode or in an unlock mode. Accordingly, upon acquiring such $UI_{SEL}$, a terminal runs the operation of displaying an advertisement or content after powering on, waking up, or switching modes.

12-12. Interchangeability

Although the foregoing examples of this ninth exemplary aspect generally relate to various directional input units and mobile communication terminals each of which includes one of such directional input units, it is to be understood that each of such examples equally applies to another terminal which incorporates a different directional input unit. Accordingly, each embodiment of various exemplary press-ID elements may be equally applied to a terminal which includes a touch-ID element, where a movable portion of the former element may generally correspond to a stationary portion of the latter element.

Configurational or operational variations (or modifications) of such directional input units described in various examples of this ninth exemplary aspect may be interchangeable in such a way that certain features of one example of this aspect may be applied to another example of this aspect. In addition, other configurational or operational features of various directional input units of this ninth exemplary aspect, their variations or their modifications may apply to, may be incorporated into, may replace, may be replaced by or may be combined with corresponding features of other exemplary aspects or embodiments of this disclosure which have been described heretofore or which will be described hereinafter, subject to a certain modification, addition, and/or omission, each of which may become apparent based on detailed context of this exemplary aspect or other exemplary aspects.

13. Directional Input Units and Directions Therefor

As explained above, a single user input (or multiple concurrent user inputs) applied by a user to a directional input unit of this disclosure carries therein (or accompanies therewith) at least one selecting (user) sub-input. Accordingly, when a terminal receives the single user input (or multiple concurrent user inputs) in its off-state, the terminal acquires the selecting (user) sub-input from the single user input (or multiple concurrent user inputs), and then runs at least one selected operation once (or after) the terminal switches to its active state (or advances to a certain mode of operation).

With this configuration, however, a user may have to supply a terminal with at least one more separate (user) sub-input for, e.g., turning on a display unit, authenticating a user, or the like. As a result, the user may not be able to enjoy seamless operations which may have been accomplished with such a terminal.

Accordingly, one objective of various directional input units of this disclosure and various terminals including at least one of such directional input units is to incorporate the selecting (user) sub-input along with as many other (user) sub-inputs as possible. As a result, by providing a single user input, a user can turn on a display unit and also run at least one selected operation when or (immediately) after the terminal powers on, wakes up, or switches modes. In addition, a user may further run an authentication operation along with such an activation operation as well.

To this end and in the tenth exemplary aspect of this disclosure, various directional input units are configured to acquire a selecting (user) sub-input along with other (user) sub-inputs from a single user input (or multiple concurrent user inputs). Such directional input units are also configured to allow a user to easily differentiate a selecting (user) sub-input from other (user) sub-inputs and to distinctly provide a selecting (user) sub-input. With this configuration, a user can readily supply a terminal with his or her desired selecting (user) sub-input, along with multiple (user) sub-inputs.

Following embodiments provide further details with which a user can distinctly provide a terminal with at least one selecting (user) sub-input, while also assisting a terminal or its directional input unit to easily distinguish one (user) sub-input from another. In general, following embodiments focus upon a direction of a single user input (or multiple concurrent user inputs), a direction of at least one sub-component thereof, or the like. It is appreciated that a terminal or its directional input unit can also distinguish one (user) sub-input from another based on other static or dynamic features of the user input(s) but that details of latter have been provided in greater detail hereinabove and are omitted in this section.

13-1. User-Centered Directions of Selecting (User) Sub-Inputs

In one exemplary embodiment of this tenth exemplary aspect, a directional input unit may acquire a selecting (user) sub-input primarily based upon a 2-D or 3-D direction of at least one component of a single user input. Upon sensing the direction (e.g., a $1^{st}$ direction), a terminal selects at least one pre-selected operation from a set of multiple pre-selected operations, where such a $1^{st}$ direction matches at least one selecting (user) sub-input ($UI_{SEL}$) which in turn selects at least one pre-selected operation from the matching list based on a 1-to-1, 1-to-n, m-to-1 or m-to-n matching as described above.

It is appreciated that the $1^{st}$ direction may be selected primarily on the perspective of a user. In other words, a terminal assigns the $1^{st}$ direction in such a way that a user can conveniently provide a selecting (user) sub-input, while not confused with other (user) sub-inputs or not being hindered by providing another (user) sub-input. For example, when the $1^{st}$ direction assigned to a certain selecting (user) sub-input ($UI_{SEL}$) is horizontal or lateral, a $2^{nd}$ direction assigned to another (user) sub-input (e.g., $UI_{ACT}$ or $UI_{THEN}$) may be vertical or in any direction which the input unit can easily distinguish from the $1^{st}$ direction or which a user can easily exercise or maneuver (or vice versa) his or her body part. Similarly, when a $2^{nd}$ direction designated to another (user) sub-input is curved (i.e., not straight), the $1^{st}$ direction assigned to a selecting (user) sub-input ($UI_{SEL}$) may be straight (i.e., linear) (or vice versa).

Therefore and in one example, when a user presses a movable portion of a press-ID element, its directional input unit acquires $UI_{ACT}$ from a $2^{nd}$ direction of a movement of the movable portion (e.g., a movement which is vertical to a terminal), while such an input unit acquires $UI_{SEL}$ from a $1^{st}$ direction of a movement of such a movable portion which is parallel or lateral to a terminal. Accordingly, a user can readily provide $UI_{SEL}$ while being able to readily differentiate and to provide different (user) sub-inputs (e.g., $UI_{ACT}$ or $UI_{THEN}$) in different directions, e.g., by manipulating an angle of a user input force applied to the input unit or to the terminal. A terminal may also acquire $UI_{THEN}$ from a contact (or a touch) formed between the movable portion and a user body part, where $UI_{SEL}$ may only need contacting (or touching) the movable portion but may not require any movement of the movable portion in a direction which may be vertical to the terminal. Therefore, a user can easily incorporate three different (user) sub-inputs in the single user input (or multiple concurrent user inputs), because one is a simple contact or a touch (i.e., $UI_{THEN}$) with the portion of the directional input unit, another is a vertical movement (i.e., $UI_{ACT}$) of the portion, whereas the last is a simple sliding or lateral movement ($UI_{SEL}$) of the portion.

It is noted that a user may first contact and then press (or otherwise move) a movable portion of a directional input unit with a user body part (or a non-user object) in a $2^{nd}$ direction, thereby delivering $UI_{ACT}$ Or $UI_{THEN}$ to the directional input unit. Thereafter, without detaching the user body part (or non-user object) therefrom, the user may continue to move the movable portion in a $1^{st}$ direction, thereby delivering $UI_{SEL}$ to the input unit. As described above, this user input is qualified as a single user input, for a user supplies not only $UI_{SEL}$ but also provides $UI_{ACT}$ or $UI_{THEN}$ While maintaining the contact (or touch) between at least a portion of the directional input unit and a user body part (or a non-user object). In addition, such a $1^{st}$ direction is different from the $2^{nd}$ direction and readily distinguishable from the $2^{nd}$ direction so that, e.g., the $1^{st}$ direction may be transverse (e.g., angled) or perpendicular to the $2^{nd}$ direction. When a terminal may condition turning on the display unit upon authenticating a user, the input unit may not have to acquire $UI_{ACT}$, for the terminal turns on the display unit when the user passes the authenticating, while the terminal keeps the display unit turned off (at least for a certain period of time) when the user fails the authentication.

In the alternative, a user may move the movable portion in the $2^{nd}$ direction concurrently with moving such a movable portion in the $1^{st}$ direction as well. The user may readily move the movable portion in both of the $1^{st}$ and $2^{nd}$ directions, e.g., by moving the movable portion with a user input force applied to a top surface of the input unit at an angle such as, e.g., 30°, 45°, or the like. Then, a vertical component of the user input force presses the movable portion in the $2^{nd}$ vertical direction, while a horizontal component of the user input force translates the same portion in the $1^{st}$ lateral direction. When feasible, a user may also first move the movable portion in the $1^{st}$ direction and then move such a portion in the $2^{nd}$ direction. In other words, as long as a user may provide a single user input which includes therein $UI_{SEL}$ as well as at least one another (user) sub-input, detailed timing of providing such (user) sub-inputs to a terminal (or its directional input unit) is not material within the scope of various terminals exemplified in this disclosure.

It is appreciated that a terminal may provide a notice signal to a user after a user provided $UI_{ACT}$ Or $UI_{THEN}$ (or $UI_{SEL}$) but before he or she provides $UI_{SEL}$ (or $UI_{ACT}$, $UI_{THEN}$, or the like). Accordingly, when a user confirms that he or she has provided proper $UI_{ACT}$ Or $UI_{THEN}$ (or $UI_{SEL}$), a user may proceed to provide $UI_{SEL}$ (or $UI_{ACT}$, $UI_{THEN}$, or the like). When a user finds that he or she has made a mistake, he or she may then rectify such an error before the user provides $UI_{SEL}$ (or $UI_{ACT}$, $UI_{THEN}$, or the like).

Alternatively, a terminal may block or deter a movement of a directional input unit before the terminal allows a user to provide another (user) sub-input or when the terminal finds an error in the (user) sub-input which a user has provided. For example, when a terminal identifies that a user has moved the movable portion in a wrong direction or in undefined direction other than one of multiple $1^{st}$ directions (e.g., providing an undefined or wrong $UI_{SEL}$), a terminal may block or deter a further movement of the movable portion such that the user cannot move the movable portion in the undefined or wrong directions. Accordingly, a user may readily learn that $UI_{SEL}$ which he or she has provided is either wrong or undefined. Based thereupon, a user may readily rectify an error or may provide a new $UI_{SEL}$. The same arrangement may also be applied to $UI_{ACT}$ Or $UI_{THEN}$ when a terminal is configured to first acquire $UI_{ACT}$ Or $UI_{THEN}$ from the $2^{nd}$ direction and then to acquire $UI_{SEL}$ from the $1^{st}$ direction.

In another example, when a user contacts or touches a stationary portion of a touch-ID element, a directional input unit acquires $UI_{ACT}$ from a contact or touch between a stationary portion and a user body part, while the input unit acquires $UI_{SEL}$ from a movement of (or a change in) a position of a contact (or a touch). Because a contact (or a touch) is generally formed on or over the stationary portion of the touch-ID element, the contact (or touch) may be viewed as being horizontal or lateral to the touch-ID element or to the directional input unit. A terminal may acquire $UI_{THEN}$ from the contact or touch as well. Therefore, a user can readily include three different (user) sub-inputs into the single user input (or multiple concurrent user inputs), because one (user) sub-input is a simple contact (or a touch) ($UI_{THEN}$) with the portion of the directional input unit, another is also a contact (or a touch) therewith ($UI_{ACT}$), whereas the last is the movement of a user body part (or a non-user object) ($UI_{SEL}$) which is readily distinguishable from the other two (user) sub-inputs.

It is noted that a user may first contact or touch a stationary portion of a directional input unit with a body part of a user (or a non-user object), thereby delivering $UI_{ACT}$ or $UI_{THEN}$ to such a directional input unit. Thereafter, without detaching a user body part (or a non-user object) therefrom, a user may move a user body part (or a non-user object) in the $1^{st}$ direction, thereby delivering $UI_{SEL}$ to the directional input unit. As described above, this user input is also qualified as the single user input as described above. Such a $1^{st}$ direction is generally different from the $2^{nd}$ direction such that, e.g., the former may be transverse (e.g., angled) or perpendicular to the $2^{nd}$ direction. When a terminal conditions turning on the display unit upon authenticating a user, such an input unit may not have to acquire $UI_{ACT}$ at all, for a terminal turns on the display unit when a user passes the authenticating, while the terminal keeps the display unit turned off (at least for a certain period of time) when the user fails the authentication.

It is appreciated that a terminal may provide a notice signal to a user after a user provided $UI_{ACT}$ Or $UI_{THEN}$ but before he or she provides $UI_{SEL}$. Accordingly, when a user confirms that he or she has provided proper $UI_{ACT}$ Or $UI_{THEN}$, the user may proceed to provide $UI_{SEL}$. When a user finds that he or she has made a mistake, he or she may rectify the error before the user provides $UI_{SEL}$.

Alternatively, a user may move a user body part (or a non-user object) on, over or across a stationary portion of a directional input unit in the $1^{st}$ direction for supplying $UI_{SEL}$, concurrently with contacting (or touching) the stationary portion for supplying $UI_{ACT}$ or $UI_{THEN}$. Because such contacting (or touching) does not accompany any direction at all, a user may readily move a user body part (or a non-user object) in the $1^{st}$ direction, while maintaining a contact (or a touch) with the stationary portion of the input unit. Even when such an input unit may monitor a $2^{nd}$ direction of a user body part (or a non-user object) which comes into a contact (or a touch) with the stationary portion of the input unit for acquiring $UI_{ACT}$ or $UI_{THEN}$, the terminal may readily differentiate $UI_{SEL}$ from $UI_{ACT}$ Or $UI_{THEN}$ as long as the $1^{st}$ direction is defined distinctly or differently from the $2^{nd}$ direction as described above.

It is appreciated that a terminal may provide a notice signal to a user after a user provided $UI_{ACT}$ Or $UI_{THEN}$ (or $UI_{SEL}$) but before he or she provides $UI_{SEL}$ (or $UI_{ACT}$, $UI_{THEN}$, or the like). Accordingly, when a user confirms that he or she has provided proper $UI_{ACT}$ Or $UI_{THEN}$ (or $UI_{SEL}$), a user may proceed to provide $UI_{SEL}$ (or $UI_{ACT}$, $UI_{THEN}$, or the like). When a user finds that he or she has made a mistake, he or she may then rectify such an error before the user provides $UI_{SEL}$ (or $UI_{ACT}$, $UI_{THEN}$, or the like).

Conversely to the above and in another example, when a user contacts (or touches) a stationary portion of a touch-ID element with a user body part (or a non-user object) over such a portion and swipes his or her body part (or object), a directional input unit may acquire $UI_{ACT}$ or $UI_{THEN}$ therefrom. This arrangement corresponds to a situation in which an authentication sensor acquires $UI_{THEN}$ while a user swipes a finger on the sensor. In this arrangement, a directional input unit can easily acquire $UI_{SEL}$ from other static or dynamic features of the swiping (or translating) movement such as, e.g., a speed of the swiping movement, a force applied to such a sensor during the swiping movement, a time to complete swiping the finger (i.e., a temporal duration of such a movement), or the like. As long as a user can easily and distinctly manipulate such a speed, a force or a time while swiping his or her finger on the authentication sensor, a terminal may readily acquire $UI_{SEL}$ as well as $UI_{THEN}$ from the single user input.

In another example where a terminal employs a directional input unit or a non-directional input unit (such as, e.g., a camera or another image acquisition device) to authenticate a user by scanning an iris or a retina of a user, a terminal may acquire $UI_{SEL}$ in various arrangements as well. In one case, such a camera may serve as a directional input unit which acquires an image of the iris or retina to acquire $UI_{THEN}$ therefrom and which also acquires $UI_{SEL}$ from a movement of an iris or retina during or after running an iris or retina authentication operation. In another case, a non-directional input unit may acquire $UI_{THEN}$ from an image of an iris or a retina, while a directional input unit acquires $UI_{SEL}$ from a movement of a user body part (or a non-user object), from a direction associated with such a movement, or the like.

The above last two examples of this exemplary embodiment ascertains that various directional input units of this disclosure can acquire $UI_{SEL}$ based upon various static or dynamic features of a user body part or upon a movement of a user body part (or a non-user object) which may not be directly related to a direction of a user input applied by a contacting user input. In addition, the last example ascertains that a terminal may employ not only a directional input unit but also a non-directional input unit in order to acquire $UI_{SEL}$ along with other (user) sub-inputs such as, e.g., $UI_{ACT}$ and $UI_{THEN}$.

As explained in each of such examples, a terminal may assign, as it sees fit, the $1^{st}$ direction from which the terminal itself or its directional input unit acquires $UI_{SEL}$, as long as the $1^{st}$ direction is readily distinguishable from other directions assigned to other (user) sub-inputs (e.g., $UI_{ACT}$, $UI_{THEN}$, or the like), from other static or dynamic features of other (user) sub-inputs, or the like. Accordingly, the $1^{st}$ direction may be parallel (or lateral) [1] with a front surface or a rear surface, [2] with a top edge or a bottom edge of a terminal, [3] with a side edge thereof, or the like.

Conversely, the $1^{st}$ direction may instead be perpendicular or normal to at least one of such [1] to [3] of this paragraph, or may be transverse (or angled) thereto (e.g., neither parallel nor perpendicular). In other words, the $1^{st}$ direction may be perpendicular or normal to a $2^{nd}$ direction assigned to $UI_{ACT}$ Or $UI_{THEN}$, may be angled or transverse (e.g., 30°, 45° or 123.32°) to such a $2^{nd}$ direction, or the like. In addition, the $1^{st}$ direction may be different from the $2^{nd}$ direction such that one direction is defined in a Cartesian coordinate system but that another direction is defined in a cylindrical, spherical or another coordinate system. Therefore, as long as the $1^{st}$ direction assigned to $UI_{SEL}$ is readily distinguishable from other manipulations which a user has to perform to provide $UI_{ACT}$ Or $UI_{THEN}$, the $1^{st}$ direction can be almost any direction which is parallel with, perpendicular to, or transverse to (e.g., angled) a certain portion of a terminal.

It is appreciated that various examples of this embodiment offer various benefits not only to a manufacturer of a terminal but also to a user. For example, a manufacturer may conveniently design a directional input unit, for such an input unit can distinctly differentiate $UI_{SEL}$ from other (user) sub-inputs such as $UI_{ACT}$ Or $UI_{THEN}$ (or vice versa). In another example, a user may easily memorize how to provide a proper $UI_{SEL}$ along with others such as $UI_{ACT}$ and $UI_{THEN}$.

In addition, such a characterization of a direction for $UI_{SEL}$ and directions for others such as $UI_{ACT}$ and $UI_{THEN}$ may be irrelevant to an actual shape of a terminal, or to that of a directional input unit, to an actual curvature of the terminal or that of the directional input unit. Accordingly, not only a manufacturer but also a user can easily differentiate a direction of $UI_{SEL}$ from those of $UI_{ACT}$ and $UI_{THEN}$, thereby helping them decrease errors in acquiring or providing various (user) sub-inputs.

13-2. Device-Directed Directions of Selecting (User) Sub-Inputs

In another exemplary embodiment of this tenth exemplary aspect, another directional input unit may acquire a selecting (user) sub-input ($UI_{SEL}$) primarily based on a (2-D or 3-D) $1^{st}$ direction of at least one component of a single user input which is defined with respect to a "reference axis" or a "reference plane" of a terminal. Upon sensing the $1^{st}$ direction, a terminal selects at least one pre-selected operation from a set of multiple pre-selected operations, where the $1^{st}$ direction matches at least one selecting (user) sub-input ($UI_{SEL}$) which in turn selects at least one pre-selected operation based upon a 1-to-1, 1-to-n, m-to-1 or m-to-n matching of the matching list as described above.

It is appreciated that the $1^{st}$ direction of this embodiment is selected primarily on the perspective of a terminal and partly on the perspective of a user. That is, a terminal first defines a reference axis or a reference plane, and assigns the $1^{st}$ direction in such a way that a terminal may distinctly acquire $UI_{SEL}$ from a component of a user input whichever is provided by a user body part (or a non-user object) in the $1^{st}$ direction. In contrary, a terminal acquires $UI_{ACT}$ or $UI_{THEN}$ from another component of a user input whichever is provided by at least one body part of a user (or a non-user object) in a direction which is transverse (or perpendicular) to the $1^{st}$ direction, whichever does not coincide with the $1^{st}$ direction, whichever is applied to a directional input unit without being accompanied by any particular direction, whichever is easily or readily distinguishable from the $1^{st}$ direction, or the like.

In one example, when the $1^{st}$ direction designated to $UI_{SEL}$ is horizontal (or lateral) or parallel with to such a reference axis (or plane) of a terminal, a $2^{nd}$ direction designated to $UI_{ACT}$ or $UI_{THEN}$ may be vertical or in any direction which the input unit can easily distinguish from the $1^{st}$ direction or which a user can easily exercise or maneuver (or vice versa) while concurrently providing other (user) sub-inputs such as, $UI_{ACT}$ Or $UI_{THEN}$ with other exercises or maneuvers. It is noted that the reference axis of this embodiment may or may not coincide with a longitudinal (or short) axis of a terminal as will be described in detail below. In another example, when a $2^{nd}$ direction designated to $UI_{ACT}$ Or $UI_{THEN}$ is straight (or linear), the $1^{st}$ direction assigned to may be curved, angular, circular, or the like (or vice versa).

In another example, a terminal may set up a reference plane as a "surface" of a display unit of a terminal and the $1^{st}$ direction is defined with respect thereto. This reference plane may be useful to a user when a display unit is a conventional touch screen and used as a directional input unit, because the user usually operates a terminal in an upright position, while positioning a screen of a display unit facing the user. In one case where a touch screen includes thereon at least one sensor for acquiring $UI_{ACT}$ Or $UI_{THEN}$ as a user presses a screen in a $2^{nd}$ direction vertical to the screen, the touch screen may acquire $UI_{SEL}$ from a horizontal movement or a lateral movement of a user body part (or a non-user object) across, over or on the screen. In another case where the touch screen includes multiple sensors for acquiring $UI_{ACT}$, $UI_{THEN}$, and $UI_{AUX}$, as a user contacts (or touches) the screen, such a touch screen may acquire $UI_{SEL}$ from a lateral or horizontal movement of at least one user body part (or a non-user object) across, over or on the screen. Accordingly, the $1^{st}$ direction in this example is almost always parallel with the reference plane which is the screen of a display unit itself. It is appreciated, however, that such a $1^{st}$ direction may be parallel with, perpendicular to or transverse to a short axis or a longitudinal axis of a terminal as will be explained below.

In another example, a terminal may define a reference axis which changes its orientation depending upon an "orientation of a text" displayed on a display unit, e.g., depending upon whether a display unit displays a text in a portrait orientation or in a landscape orientation. Therefore, this reference axis to the $1^{st}$ direction may or may not coincide with a longitudinal axis or a short axis of a terminal as commonly used in the art. FIGS. 15A to 15D describe exemplary reference axes which are defined in terminals with various shapes and sizes and their relations to a longitudinal axis or a short axis of a terminal as used in the art.

FIG. 16A depicts a top view of a prior art and most popular configuration of a terminal, where a user holds a terminal (10) in an upright position and a terminal displays a text on its display unit (52) from left to right in a portrait orientation. The display unit (52) of this figure is a conventional touch screen-type unit which includes a screen thereon. The terminal also includes a directional input unit (22) in a bottom portion of a front surface thereof, where a user manipulates the directional input unit (22) while positioning the terminal in the upright position. In this case, a terminal defines a "longitudinal axis" which is a vertical axis in the figure, and defines a "short axis" which is a horizontal axis in the figure.

As described hereinabove, a directional input unit (22) may include a press-ID element or a touch-ID element. In this arrangement, a user presses or touches a press-ID (or touch-ID) element in a direction perpendicular to a screen of a display unit (52), and vertical to a longitudinal and short axis of a terminal, thereby providing $UI_{ACT}$ or $UI_{THEN}$ thereto. Concurrently therewith, a user may translate a movable portion of a press-ID element or may move a user body part (or a non-user object) on or over a stationary portion of a touch-ID element in a plane which is parallel with the screen of a display unit, thereby providing $UI_{SEL}$ thereto. Accordingly, the $1^{st}$ direction (55) of the translating movement of the user body part and the $1^{st}$ direction (55) of the movement of the user body part has to be parallel with a screen of the display unit. However, depending on an orientation thereof, the $1^{st}$ direction (55) may be parallel (or lateral) with a longitudinal axis or a short axis of the terminal, may be vertical thereto, or may be transverse thereto.

From time to time, a user may flip a terminal in order to position a display unit into a landscape orientation as depicted in FIG. 15B. In this orientation, a terminal defines a new $1^{st}$ direction (55) which is perpendicular or transverse to a longitudinal axis of the terminal but which is parallel with a short axis thereof.

In addition, when a user presses or touches a press-ID (touch-ID) element and provides $UI_{ACT}$ or $UI_{THEN}$ in a direction vertical to a screen of a display unit (52), a user also concurrently manipulates a movable portion of the press-ID element or moves a user body part (or a non-user object) over or above a stationary portion of the touch-ID element for providing $UI_{SEL}$ on a plane which is parallel with the screen of the display unit (52). Therefore, the $1^{st}$ direction (55) of the translating movement of the movable portion of a directional input unit (22) or the movement of the user body part (or a non-user object) on the same plane may be perpendicular or at least substantially transverse to a $2^{nd}$ direction for providing $UI_{ACT}$ Or $UI_{THEN}$.

FIG. 16C is a top view of another configuration of a terminal, where a short axis of a terminal (10) extends in a vertical direction, while its longitudinal axis extends in a parallel direction when a user holds a terminal (10) in an upright position. When a display unit (52) displays a text thereon in a landscape orientation as shown in the figure and when a user manipulates a directional input unit (22) in an upright position, a $1^{st}$ direction (55) may be defined as an axis which is perpendicular to a direction of a text line and, therefore, the $1^{st}$ direction (55) is parallel with a short axis of a terminal and is denoted by a dotted line in the figure. When a user flips a terminal to position a display unit into a portrait orientation (not shown), a new $1^{st}$ direction is parallel with the longitudinal axis but perpendicular to the short axis.

The terminal also includes a directional input unit (22) which is disposed in a top portion of a right-side edge of a terminal, where the input unit (22) may include a press-ID (or touch-ID) element. Therefore, a user may press or touch the element and provides $UI_{ACT}$ Or $UI_{THEN}$ in a $2^{nd}$ direction which is parallel with a longitudinal axis of the terminal, while concurrently translating a movable portion of the press-ID element or, alternatively, moving a user body part (or a non-user) object over or above a stationary portion of the touch-ID element for providing $UI_{SEL}$ in the $1^{st}$ direction which is perpendicular or transverse to the $2^{nd}$ direction. Therefore, the $1^{st}$ direction (55) may be typically parallel with a plane which is a screen of the display unit (52). However, a user may manipulate the movable portion or the user body part (or non-user object) at an angle with respect to the screen. In this case, the $1^{st}$ direction (55) may be perpendicular or transverse to the screen of the display unit (52), while remaining to be perpendicular or transverse to the $2^{nd}$ direction.

FIG. 16D is a top view of a configuration of a terminal which also includes a directional input unit (22) and a display unit (52), where the display unit (52) defines a screen with a cross-section of a pentagon. When the terminal (10) is positioned in an orientation as shown in the figure and the display unit (52) displays a text in a direction as shown in the figure, a terminal may be regarded to define a longitudinal axis and a short axis as in the figure. In such a case, a $1^{st}$ direction (55) is again defined as being perpendicular to an orientation of a text and, therefore, parallel with the longitudinal axis of the terminal.

Because a directional input unit is (22) positioned at a bottom of a top surface of a terminal (10), a user may press or touch the element and provides $UI_{ACT}$ or $UI_{THEN}$ in a $2^{nd}$ direction which is vertical to a longitudinal as well as short axis of the terminal, while concurrently translating a movable portion of the press-ID element or, alternatively, moving a user body part (or a non-user) object over or above a stationary portion of the touch-ID element in the $1^{st}$ direction which may be perpendicular or transverse to the $2^{nd}$ direction. Accordingly, the $1^{st}$ direction (55) is parallel with a plane which is a screen of the display unit (52). However, a user may move a movable portion of the directional input unit (22) or a user body part (or a non-user object) at an angle with respect to the screen. Therefore, the $1^{st}$ direction (55) may be perpendicular to or transverse to the screen of the display unit (52), while remaining to be perpendicular or transverse to the $2^{nd}$ direction.

As described above, a user may display a text or an image on a display unit of a terminal in either a portrait orientation or a landscape orientation. However, a terminal includes a directional input unit in a fixed position thereon. Therefore, an orientation of the $1^{st}$ direction of the movement caused by a user which is defined with respect to the longitudinal or short axis of a terminal may change whether a terminal displays a text or image in a portrait or landscape orientation. Therefore, the $1^{st}$ direction may be defined [D1] not completely vertical to a longitudinal axis of the terminal, when the input unit is disposed on a front (or rear) surface or on a side edge thereof, [D2] at least partially parallel with a longitudinal axis, when the input unit is disposed on a front (or rear) surface or on the side of a terminal, [D3] not completely vertical to a longitudinal axis, when such an input unit is not disposed on or along a top (or bottom) edge of a terminal, [D4] at least partially parallel with a longitudinal axis, when the input unit is not disposed on a top (or bottom) edge thereof, [D5] not completely parallel with a longitudinal axis, when the input unit is disposed on a top (or bottom) edge of the terminal, [D6] at least partially vertical to a longitudinal axis, when the input unit is disposed on a front (or rear) surface or on a side of the terminal, or the like.

14. Interchangeability

Various directional input units, various mobile communication terminals incorporating such directional input units, and various methods of constructing or using such input units or terminals have been described above, particularly with reference to exemplary aspects, embodiments, examples, and objectives, along with details thereof. It is to be appreciated, however, that the above description is provided only for better understanding various configurational or operational features or characteristics of such terminals and methods. Accordingly, it would be apparent to those of ordinary skill in the relevant art that various modifications or variations of the directional input units, mobile communication terminals, and their related methods may be practiced from the above disclosure.

While exemplary aspects, embodiments, examples, and objectives have been disclosed herein, it should be understood that other modifications or variations thereof may be possible. Such modifications or variations are not to be regarded as a departure from the spirit and scope of such exemplary aspects, embodiments, examples, and objectives of this disclosure, and all such modifications or variations which would be obvious to one skilled in the art are intended to be included within the above disclosure as well as within the scope of the following claims.

Unless otherwise specified, characteristics of such exemplary aspects, embodiments, examples or objectives of this disclosure may apply interchangeably to corresponding characteristics of different exemplary aspects, embodiments, examples or objectives throughout this disclosure.

Accordingly and in one example, any of such touch-ID elements may be replaced by such press-ID elements when a directional input unit incorporating such touch-ID elements may be configured to include at least one movable portion therein or, in the alternative, a directional input unit may be configured to move as a whole. Similarly, any of the press-ID elements may be used as the touch-ID elements when the press-ID elements may include at least one sensor which may receive a user input or may acquire at least one (user) sub-input without requiring a user to move at least a portion of such an input unit.

In another example, various movement paths of the movable portion of the press-ID elements of a directional input unit may be applied to similar movement paths of the user body part or the non-user object on or over the stationary portion of the touch-ID elements of the directional input unit. In addition, such movement paths of the movable portion of the press-ID elements may be similarly applied to the movement paths of the non-contacting non-user object or those paths of the user body part which is disposed away from the directional input unit, those paths of the gestures of the user body part which are performed by a user at a distance from the directional input unit.

It is to be understood that, while various aspects, embodiments, and examples of this disclosure have been described in conjunction with detailed description provided hereinabove, the foregoing disclosure is intended to illustrate and not to limit the scope of various mobile communication terminals, which is defined by the scope of the appended claims. Other aspects, embodiments, examples, advantages, and modifications are within the scope of the following claims as well.

What is claimed is:

1. A method of operating a mobile communication terminal comprising the steps of:
    installing a display unit which is turned off in an off-state but which is turned on in an on-state;
    providing a directional input unit capable of receiving a first user input which is supplied by a user in a first direction and capable of also receiving a second user input which is supplied by said user in a second direction which is different from said first direction, receiving one of said first and second user input when said display unit is in said off-state;

running an authentication operation of authenticating said user in response to said received user input, without having to receive additional user inputs other than said one of said first and second user input and without having to run an activation operation of turning on said display unit; and when said user passes said authentication operation, running one of a first selected operation and a second selected operation when said received user input is one of said first user input and said second user input, respectively, without having to receive any additional user input from said user, wherein said first selected operation is different from said second selected operation and wherein neither of said first and second operations is said activation operation.

2. The method of claim 1, wherein, when said user passes said authenticating, said terminal runs said activation operation in addition to running said one of said first and second selected operations, without having to receive any additional user inputs other than said one of said first and second user input.

3. The method of claim 1, wherein, when said user fails said authenticating, said terminal performs one of:

keeping said display unit in said off-state; and running said activation operation and displaying a lock screen on said display unit.

4. The method of claim 1, wherein, when said terminal receives a third user input which is neither said first user input nor said second user input, said terminal performs one of:

keeping said display unit turned off; and turning on said display unit in a lock mode.

5. The method of claim 1, wherein said terminal runs said authentication operation based on at least one of a face of said user, a fingerprint thereof, an iris thereof, and a retina thereof.

6. The method of claim 1, wherein said receiving includes one of:

including a movable portion in said directional input unit and monitoring a movement of said portion; and including a sensor in said directional input unit and monitoring a movement of a body part of said user with respect to said sensor.

7. The method of claim 1 further comprising the steps of:

providing a top edge, at least one side edge, and a bottom edge on said terminal; and defining said first and second directions as two different curvilinear directions defined on at least one of said edges.

8. The method of claim 1 further comprising the steps of:

providing a top surface, at least one side surface, and a bottom surface on said terminal; and defining said first and second directions as two different curvilinear directions defined on at least one of said surfaces.

9. The method of claim 1, wherein said providing said directional input unit includes the steps of:

providing a button; and arranging at least a portion of said button to move in said first and second directions in response to said first and second user input, respectively.

10. The method of claim 1, wherein one of said first and second selected operations is one of:

a picture taking operation;

a video recording operation;

an audio recording operation;

an image viewing operation;

a sound playing operation;

a location monitoring operation;

a health monitoring operation;

a calling operation;

a wireless communication operation;

a messenger service operation, a short message service operation;

an email processing operation;

a social network service operation;

an event scheduling operation;

a navigation operation;

an operation for connecting to a network of IoT;

an operation for connecting to an appliance through said IoT network;

an operation for connecting to a control system of one of a vehicle and a building;

an operation for manipulating one of an electric unit and an electro-mechanical unit of one of said vehicle and building;

an operation of connecting to a robot; and an operation of manipulating one of an electric unit and an electro-mechanical unit of said robot.

11. The method of claim 10, wherein said vehicle includes one of a combustion engine and an electrical motor, and wherein one of said first and second selected operations is turning on one of said engine and motor.

12. A method of operating a mobile communication terminal comprising the steps of:

installing a display unit which is turned off in an off-state but which is turned on in an on-state;

providing a directional input unit capable of receiving a first user input and a second user input which are movements of a body part of a user over said input unit in a first direction and in a second direction, respectively, wherein said first and second directions are different from each other, receiving one of said first and second user input when said display unit is in said off-state;

running an authentication operation of authenticating said user in response to said received user input, without having to receive additional user inputs other than said one of said first and second user input and without having to run an activation operation of turning on said display unit; and when said user passes said authentication operation, running one of a first selected operation and a second selected operation when said received user input is one of said first user input and said second user input, respectively, without having to receive any additional user input from said user, wherein said first selected operation is different from said second selected operation and wherein neither of said first and second operations is said activation operation.

13. The method of claim 12, wherein, when said user passes said authenticating, said terminal runs said activation operation in addition to running said one of said first and second selected operations, without having to receive any additional user inputs other than said one of said first and second user input.

14. The method of claim 12, wherein, when said user fails said authenticating, said terminal performs one of:
keeping said display unit in said off-state; and
running said activation operation and displaying a lock screen on said display unit.

15. The method of claim 12, wherein, when said terminal receives a third user input which is neither said first user input nor said second user input, said terminal performs one of:
keeping said display unit turned off; and
turning on said display unit in a lock mode.

16. The method of claim 12, wherein said terminal runs said authentication operation based on at least one of a face of said user, a fingerprint thereof, an iris thereof, and a retina thereof.

17. The method of claim 12 further comprising the steps of:
providing a top edge, at least one side edge, and a bottom edge on said terminal; and defining said first and second directions as two different curvilinear directions defined on at least one of said edges.

18. The method of claim 12 further comprising the steps of:
providing a top surface, at least one side surface, and a bottom surface on said terminal; and
defining said first and second directions as two different curvilinear directions defined on at least one of said surfaces.

19. The method of claim 12, wherein said directional input unit includes a touch screen over which said user moves said body part while maintaining a contact between said body part and said directional input unit.

20. The method of claim 12, wherein one of said first and second selected operations is one of:
a picture taking operation;
a video recording operation;
an audio recording operation;
an image viewing operation;
a sound playing operation;
a location monitoring operation;
a health monitoring operation;
a calling operation;
a wireless communication operation;
a messenger service operation,
a short message service operation;
an email processing operation;
a social network service operation;
an event scheduling operation;
a navigation operation;
an operation for connecting to a network of IoT;
an operation for connecting to an appliance through said IoT network;
an operation for connecting to a control system of one of a vehicle and a building;
an operation for manipulating one of an electric unit and an electro-mechanical unit of one of said vehicle and building;
an operation of connecting to a robot; and
an operation of manipulating one of an electric unit and an electro-mechanical unit of said robot.

21. The method of claim 20, wherein said vehicle includes one of a combustion engine and an electrical motor, and wherein one of said first and second selected operations is turning on one of said engine and motor.

22. A method of operating a mobile communication terminal comprising the steps of:
installing a display unit which is turned off in an off-state but which is turned on in an on-state;
providing a directional input unit capable of receiving a first user input which is supplied by a user in a first direction and capable of also receiving a second user input which is supplied by said user in a second direction which is different from said first direction,
receiving one of said first and second user input when said display unit is in said off-state;
running an authentication operation of authenticating said user in response to said received user input, without having to receive additional user inputs other than said one of said first and second user input and without having to run an activation operation of turning on said display unit; and
when said user passes said authentication operation, running said activation operation as well as running one of a first selected operation and a second selected operation when said received user input is one of said first user input and said second user input, respectively, without having to receive any additional user input from said user, wherein said first selected operation is different from said second selected operation and wherein neither of said first and second operations is said activation operation,
wherein one of said first and second selected operations is selected from a group consisting of:
a picture taking operation;
a video recording operation;
an audio recording operation;
an image viewing operation;
a sound playing operation;
a location monitoring operation;
a health monitoring operation;
a calling operation;
a wireless communication operation;
a messenger service operation,
a short message service operation;
an email processing operation;
a social network service operation;
an event scheduling operation;
a navigation operation;
an operation for connecting to a network of IoT;
an operation for connecting to an appliance through said IoT network;
an operation for connecting to a control system of one of a vehicle and a building;
an operation for manipulating one of an electric unit and an electro-mechanical unit of one of said vehicle and building;
an operation of connecting to a robot; and
an operation of manipulating one of an electric unit and an electro-mechanical unit of said robot.

23. The method of claim 22, wherein, when said user passes said authenticating, said terminal runs said activation operation in addition to running said one of said first and second selected operations, without having to receive any additional user inputs other than said one of said first and second user input.

24. The method of claim 22, wherein, when said user fails said authenticating, said terminal performs one of:
keeping said display unit in said off-state; and
running said activation operation and displaying a lock screen on said display unit.

25. The method of claim 22, wherein, when said terminal receives a third user input which is neither said first user input nor said second user input, said terminal performs one of:
  keeping said display unit turned off; and
  turning on said display unit in a lock mode.

26. The method of claim 22, wherein said terminal runs said authentication operation based on at least one of a face of said user, a fingerprint thereof, an iris thereof, and a retina thereof.

27. The method of claim 22, wherein said receiving includes one of:
  including a movable portion in said directional input unit and monitoring a movement of said portion; and
  including a sensor in said directional input unit and monitoring a movement of a body part of said user with respect to said sensor.

28. The method of claim 22, when said user fails said authentication operation, said method comprises one of the steps of:
  running only one of said first and second operations;
  running none of said first and second operations; and
  keeping said display unit in said off-state.

29. The method of claim 22 further comprising the steps of:
  providing a top edge, at least one side edge, and a bottom edge on said terminal; and
  defining said first and second directions as two different curvilinear directions defined on at least one of said edges.

30. The method of claim 22 further comprising the steps of:
  providing a top surface, at least one side surface, and a bottom surface on said terminal; and
  defining said first and second directions as two different curvilinear directions defined on at least one of said surfaces.

31. The method of claim 22, wherein said providing said directional input unit includes the steps of:
  providing a button; and
  arranging at least a portion of said button to move in said first and second directions in response to said first and second user input, respectively.

32. The method of claim 22, wherein said vehicle includes one of a combustion engine and an electrical motor, and wherein one of said first and second selected operations is turning on one of said engine and motor.

33. A method of operating a mobile communication terminal comprising the steps of:
  installing a display unit which is turned off in an off-state but which is turned on in an on-state;
  providing a directional input unit capable of receiving a first user input and a second user input which are movements of a body part of a user over said input unit in a first direction and in a second direction, respectively, wherein said first and second directions are different from each other,
  receiving one of said first and second user input when said display unit is in said off-state;
  running authentication operation of authenticating said user in response to said received user input, without having to receive additional user inputs other than said one of said first and second user input and without having to run an activation operation of turning on said display unit; and
  when said user passes said authentication operation, running said activation operation as well as running one of a first selected operation and a second selected operation when said received user input is one of said first user input and said second user input, respectively, without having to receive any additional user input from said user, wherein said first selected operation is different from said second selected operation and wherein neither of said first and second operations is said activation operation,
  wherein one of said first and second selected operations is selected from a group consisting of:
  a picture taking operation;
  a video recording operation;
  an audio recording operation;
  an image viewing operation;
  a sound playing operation;
  a location monitoring operation;
  a health monitoring operation;
  a calling operation;
  a wireless communication operation;
  a messenger service operation,
  a short message service operation;
  an email processing operation;
  a social network service operation;
  an event scheduling operation;
  a navigation operation;
  an operation for connecting to a network of IoT;
  an operation for connecting to an appliance through said IoT network;
  an operation for connecting to a control system of one of a vehicle and a building;
  an operation for manipulating one of an electric unit and an electro-mechanical unit of one of said vehicle and building;
  an operation of connecting to a robot; and
  an operation of manipulating one of an electric unit and an electro-mechanical unit of said robot.

34. The method of claim 33, wherein, when said user passes said authenticating, said terminal runs said activation operation in addition to running said one of said first and second selected operations, without having to receive any additional user inputs other than said one of said first and second user input.

35. The method of claim 33, wherein, when said user fails said authenticating, said terminal performs one of:
  keeping said display unit in said off-state; and
  running said activation operation and displaying a lock screen on said display unit.

36. The method of claim 33, wherein said terminal runs said authentication operation based on at least one of a face of said user, a fingerprint thereof, an iris thereof, and a retina thereof.

37. The method of claim 33, wherein said receiving includes one of:
  including a movable portion in said directional input unit and monitoring a movement of said portion; and
  including a sensor in said directional input unit and monitoring a movement of a body part of said user with respect to said sensor.

38. The method of claim 33, when said user fails said authentication operation, said method comprises one of the steps of:
  running only one of said first and second operations;
  running none of said first and second operations; and
  keeping said display unit in said off-state.

39. The method of claim 33 further comprising the steps of:
 providing a top edge, at least one side edge, and a bottom edge on said terminal; and
 defining said first and second directions as two different curvilinear directions defined on at least one of said edges.

40. The method of claim 33 further comprising the steps of:
 providing a top surface, at least one side surface, and a bottom surface on said terminal; and
 defining said first and second directions as two different curvilinear directions defined on at least one of said surfaces.

41. The method of claim 33, wherein said directional input unit includes a touch screen over which said user moves said body part while maintaining a contact between said body part and said directional input unit.

42. The method of claim 33, wherein said vehicle includes one of a combustion engine and an electrical motor, and wherein one of said first and second selected operations is turning on one of said engine and motor.

\* \* \* \* \*